(12) United States Patent
Tsutsui et al.

(10) Patent No.: US 10,300,727 B2
(45) Date of Patent: May 28, 2019

(54) PRINT MEDIUM, PRINTED MATERIAL, AND MANUFACTURING METHOD FOR PRINTED MATERIAL

(71) Applicant: CANON FINETECH NISCA INC., Misato-shi (JP)

(72) Inventors: Takahiro Tsutsui, Matsudo (JP); Hiromitsu Hirabayashi, Yokohama (JP); Yusuke Sumikawa, Kashiwa (JP)

(73) Assignee: Canon Finetech Nisca Inc., Misato-shi (JP)

( * ) Notice: Subject to any disclaimer, the term of this patent is extended or adjusted under 35 U.S.C. 154(b) by 0 days.

(21) Appl. No.: 15/689,013

(22) Filed: Aug. 29, 2017

(65) Prior Publication Data
US 2018/0065394 A1    Mar. 8, 2018

(30) Foreign Application Priority Data

Sep. 2, 2016   (JP) .................................. 2016-171827
Sep. 9, 2016   (JP) .................................. 2016-176883
Aug. 23, 2017  (JP) .................................. 2017-160502

(51) Int. Cl.
*B41J 2/00*    (2006.01)
*B41J 2/21*    (2006.01)
(Continued)

(52) U.S. Cl.
CPC ............. *B41M 5/502* (2013.01); *B32B 37/24* (2013.01); *B32B 38/004* (2013.01);
(Continued)

(58) Field of Classification Search
CPC ....... B41J 2/0057; B41J 2/2107; B41M 5/502
See application file for complete search history.

(56) References Cited

U.S. PATENT DOCUMENTS 4,880,465 A    11/1989  Loria et al.
8,252,392 B2   8/2012   Oguri et al.
(Continued)

FOREIGN PATENT DOCUMENTS

JP    H07-237348 A    9/1995
JP    H09-240196 A    9/1997
(Continued)

OTHER PUBLICATIONS

Japanese Office Action dated Jul. 31, 2018, in Japanese Patent Appln. No. 2017-160502.

*Primary Examiner* — Jason S Uhlenhake
(74) *Attorney, Agent, or Firm* — Venable LLP

(57) ABSTRACT

The print medium includes an ink receiving layer that is formed on a substrate and to which a pigment ink containing a pigment and a solvent is applied. The ink receiving layer includes a pigment permeation layer through which the solvent and the pigment are enabled to infiltrate, and a solvent absorption layer through which the pigment is inhibited from infiltrating and the solvent is enabled to infiltrate, and the pigment permeation layer and the solvent absorption layer are laminated in this order from the substrate side. The resin layer includes pieces of thermoplastic resin discretely provided on a front surface of the pigment permeation layer so as to leave an exposed portion from which the front surface of the pigment permeation layer is exposed.

11 Claims, 67 Drawing Sheets

(51) Int. Cl.
    *B41M 5/50*      (2006.01)
    *B41M 5/52*      (2006.01)
    *B32B 38/00*      (2006.01)
    *B32B 37/24*      (2006.01)
    *B05D 5/04*      (2006.01)
    *B05D 3/00*      (2006.01)
    *B32B 37/00*      (2006.01)
    *B32B 37/22*      (2006.01)
    *B32B 38/10*      (2006.01)

(52) U.S. Cl.
    CPC ........... *B41M 5/5218* (2013.01); *B05D 3/007* (2013.01); *B05D 5/04* (2013.01); *B32B 37/025* (2013.01); *B32B 37/22* (2013.01); *B32B 38/10* (2013.01); *B32B 38/145* (2013.01); *B32B 2037/243* (2013.01); *B32B 2329/04* (2013.01); *B32B 2439/70* (2013.01)

(56) References Cited

U.S. PATENT DOCUMENTS

| | | |
|---|---|---|
| 9,056,996 B2 | 6/2015 | Himura et al. |
| 9,278,527 B2 | 3/2016 | Aratani et al. |
| 9,493,011 B2 | 11/2016 | Himura et al. |
| 2006/0281847 A1 | 12/2006 | Furutachi et al. |
| 2008/0055381 A1* | 3/2008 | Doi .................. B41J 2/0057 347/103 |
| 2010/0238252 A1* | 9/2010 | Dinescu ............ B41M 5/0256 347/217 |
| 2012/0225246 A1* | 9/2012 | Wang ................ B41M 5/502 428/141 |
| 2015/0042737 A1 | 2/2015 | Tsutsui et al. |
| 2015/0070437 A1 | 3/2015 | Sumikawa et al. |
| 2016/0288468 A1 | 10/2016 | Tsutsui et al. |
| 2017/0157910 A1 | 6/2017 | Sumikawa et al. |
| 2017/0210123 A1 | 7/2017 | Sumikawa et al. |

FOREIGN PATENT DOCUMENTS

| | | |
|---|---|---|
| JP | H11-129613 A | 5/1999 |
| JP | H11-140365 A | 5/1999 |
| JP | 2000-127613 A | 5/2000 |
| JP | 2001-096907 A | 4/2001 |
| JP | 2001-234093 A | 8/2001 |
| JP | 2003-251920 A | 9/2003 |
| JP | 2004-106459 A | 4/2004 |
| JP | 3562754 B2 | 9/2004 |
| JP | 2006-240113 A | 9/2006 |
| JP | 2011-116125 A | 6/2011 |
| JP | 2013-039791 A | 2/2013 |
| JP | 2014-159110 A | 9/2014 |
| JP | 2016-060124 A | 4/2016 |
| JP | 5944947 B2 | 7/2016 |

* cited by examiner

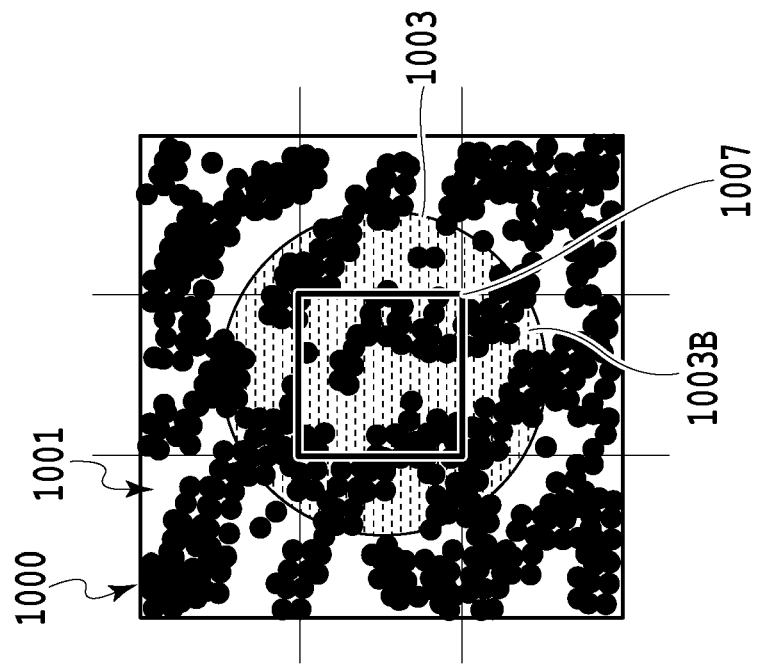
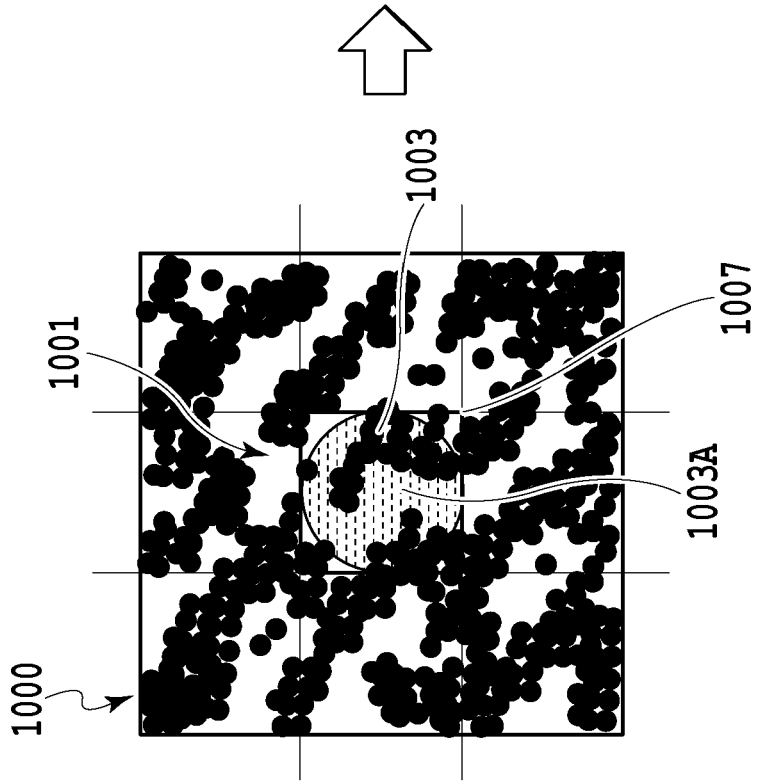
FIG.13B
FIG.13A

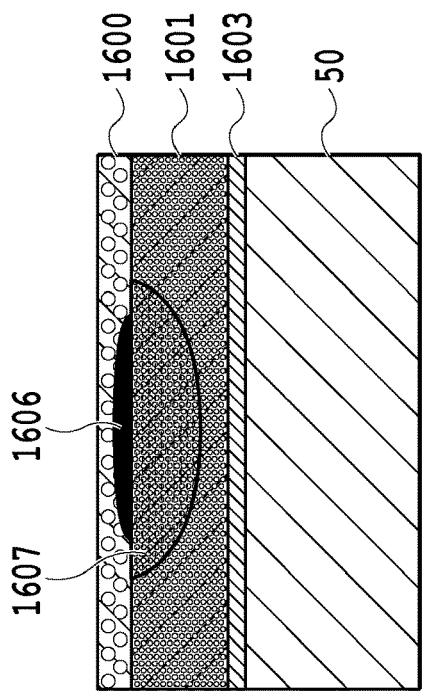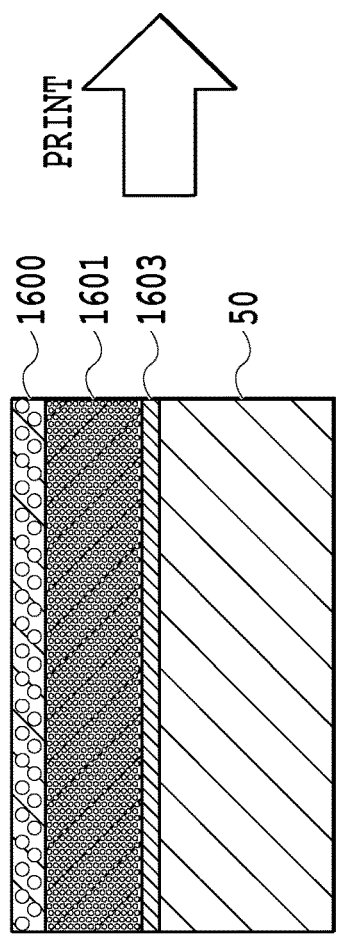
FIG.20B
FIG.20A

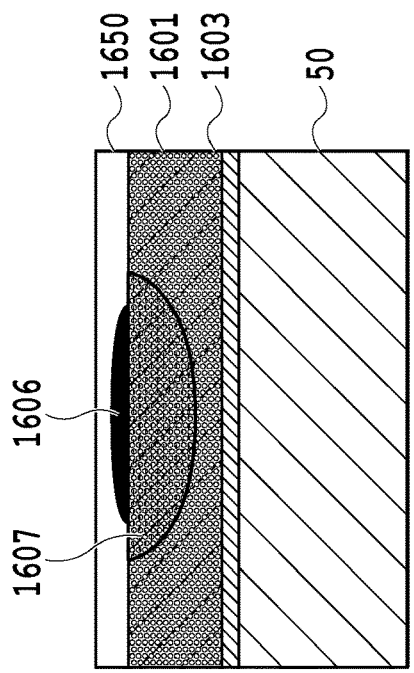
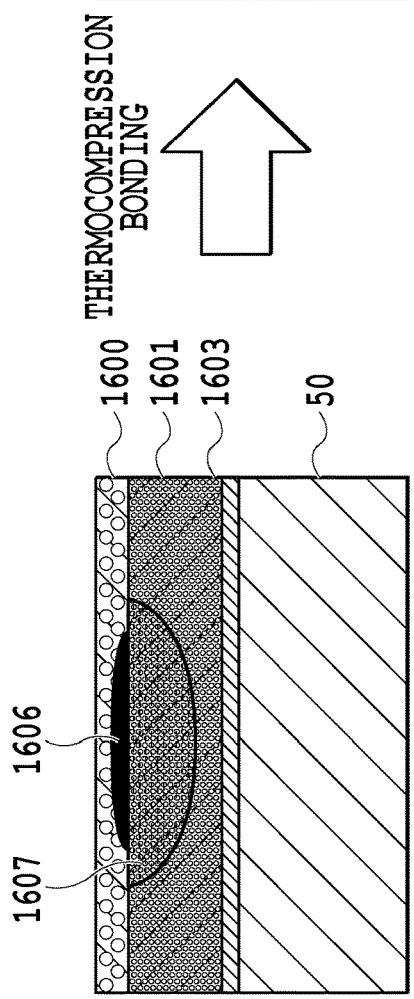

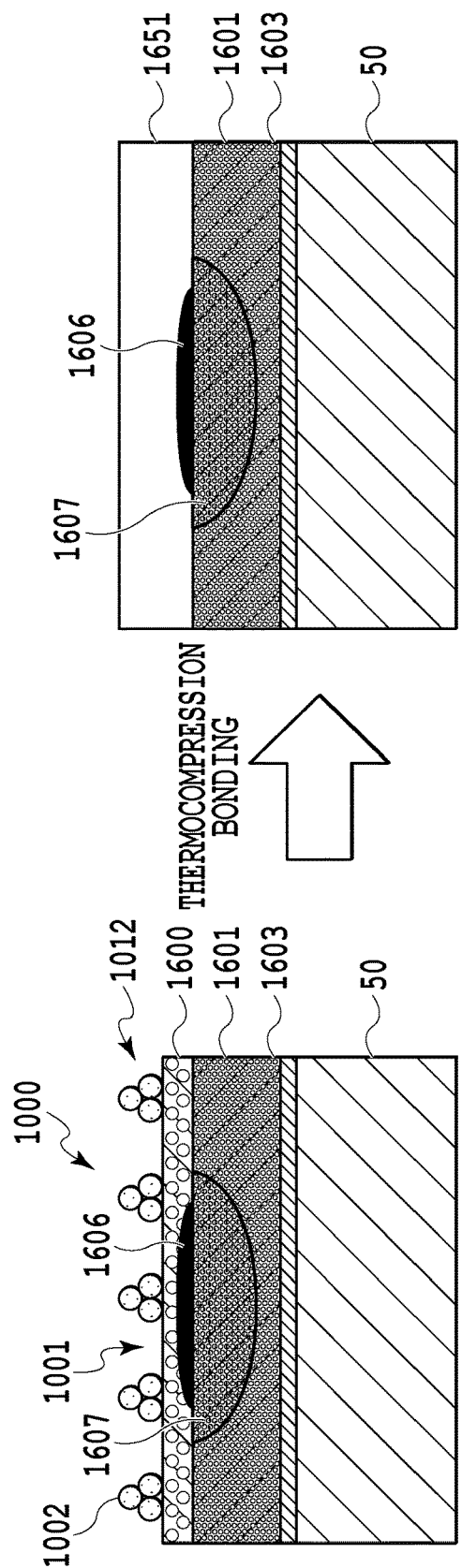

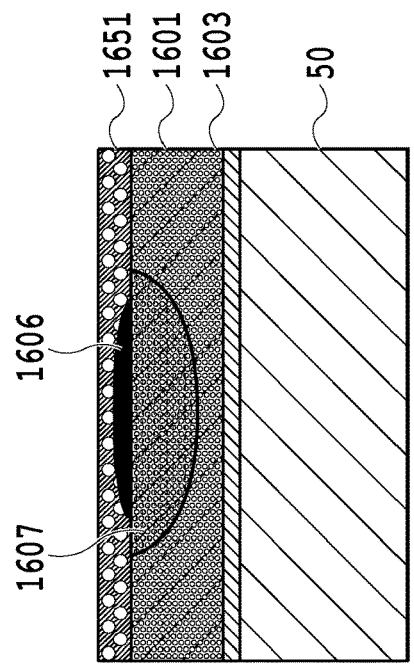
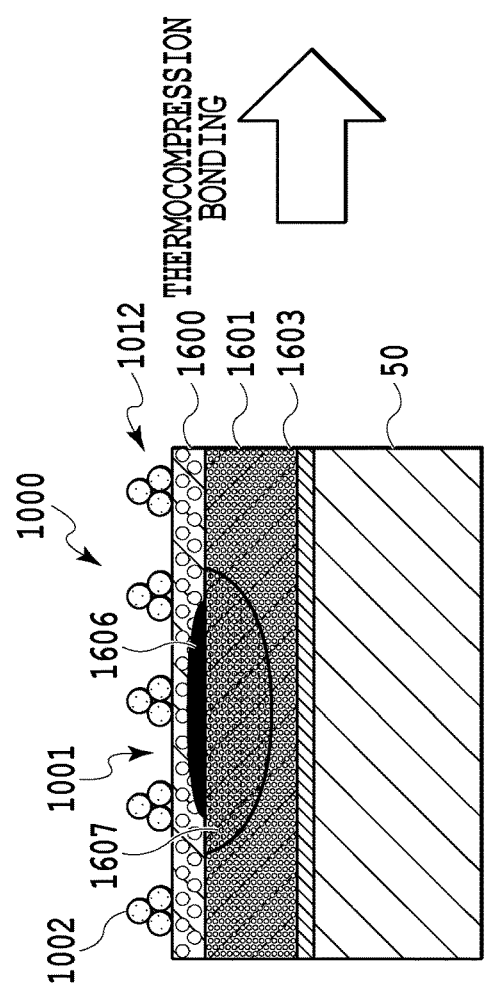

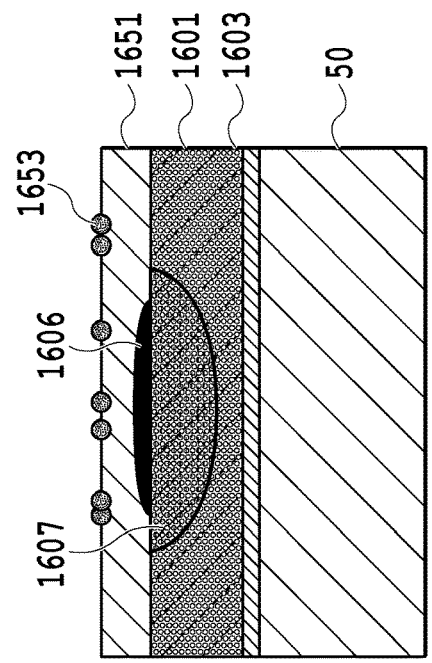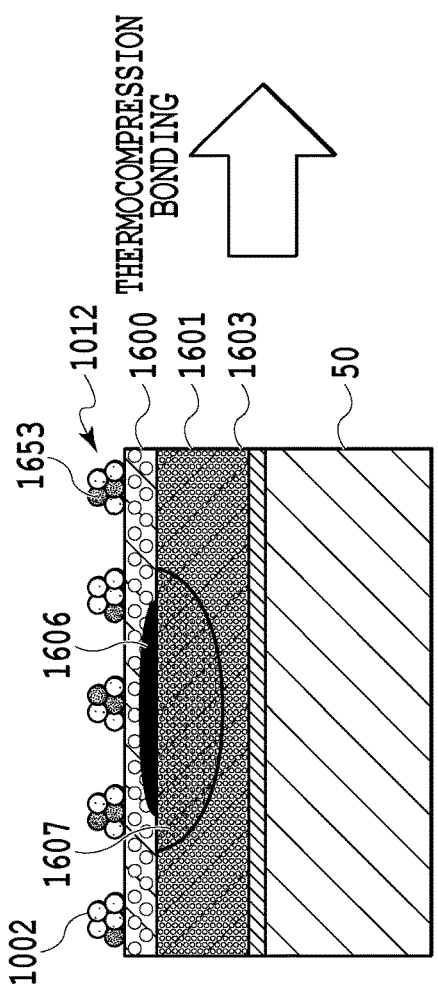
FIG. 25A
FIG. 25B

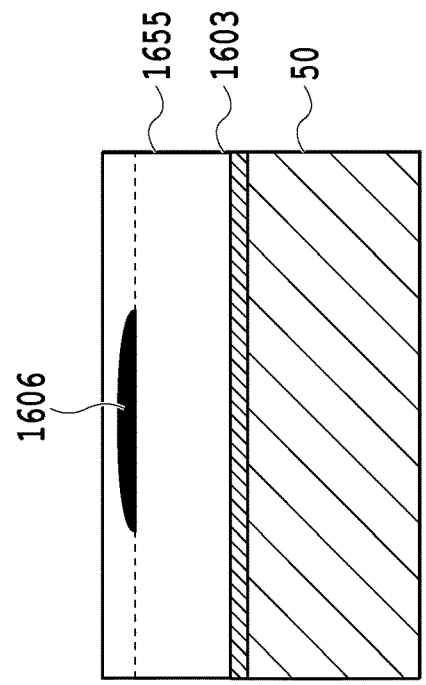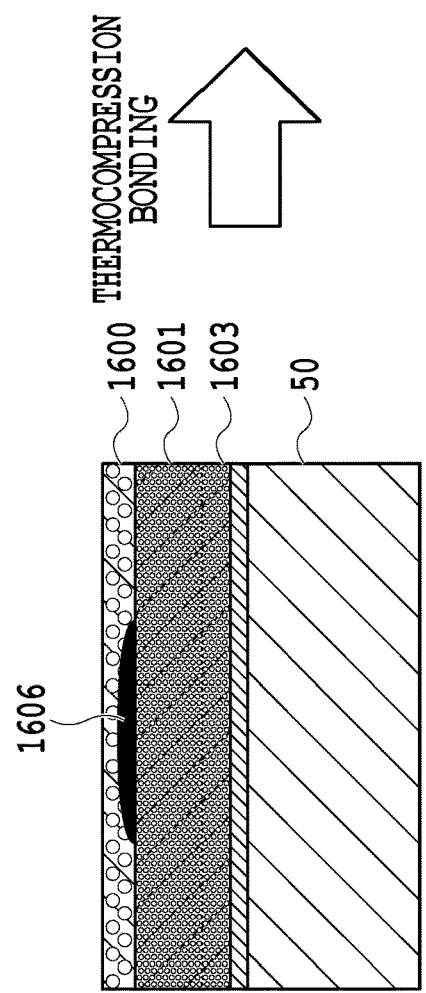

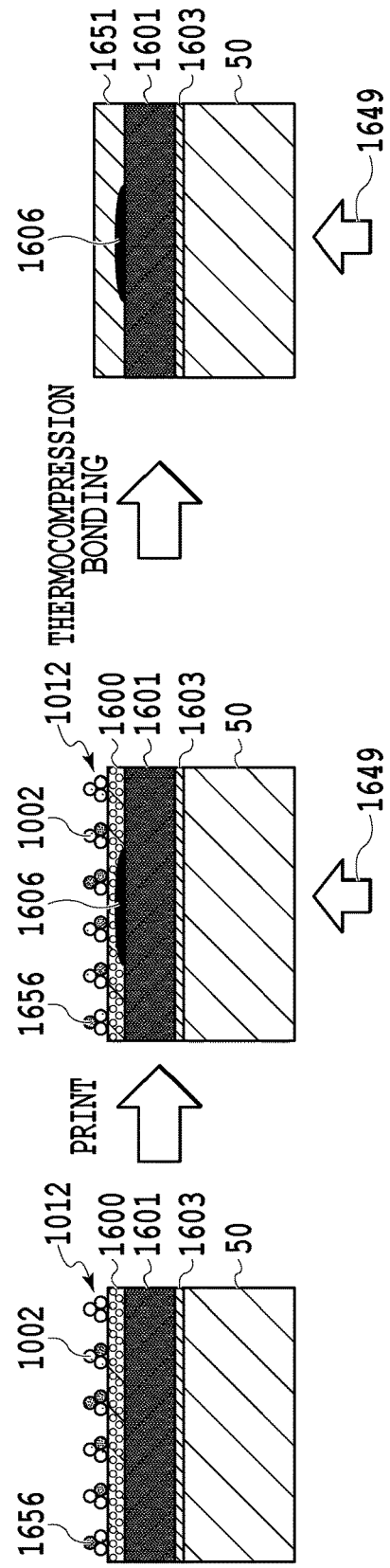

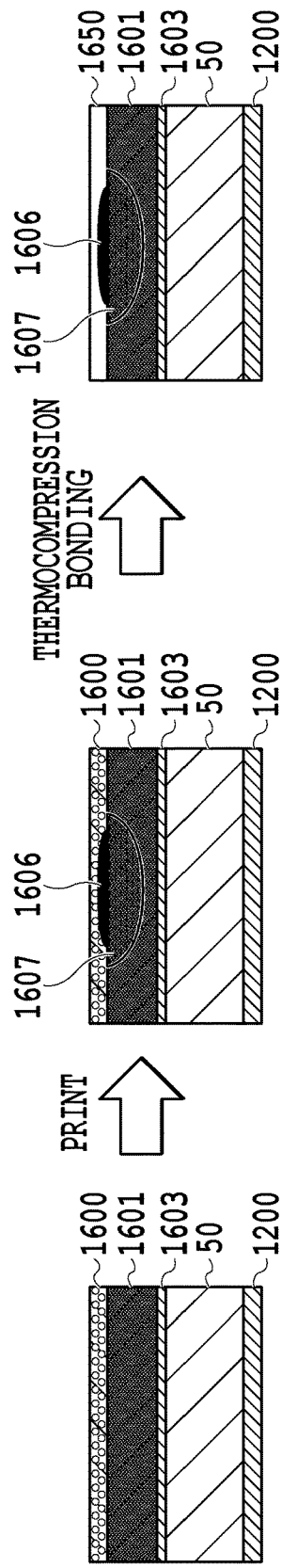

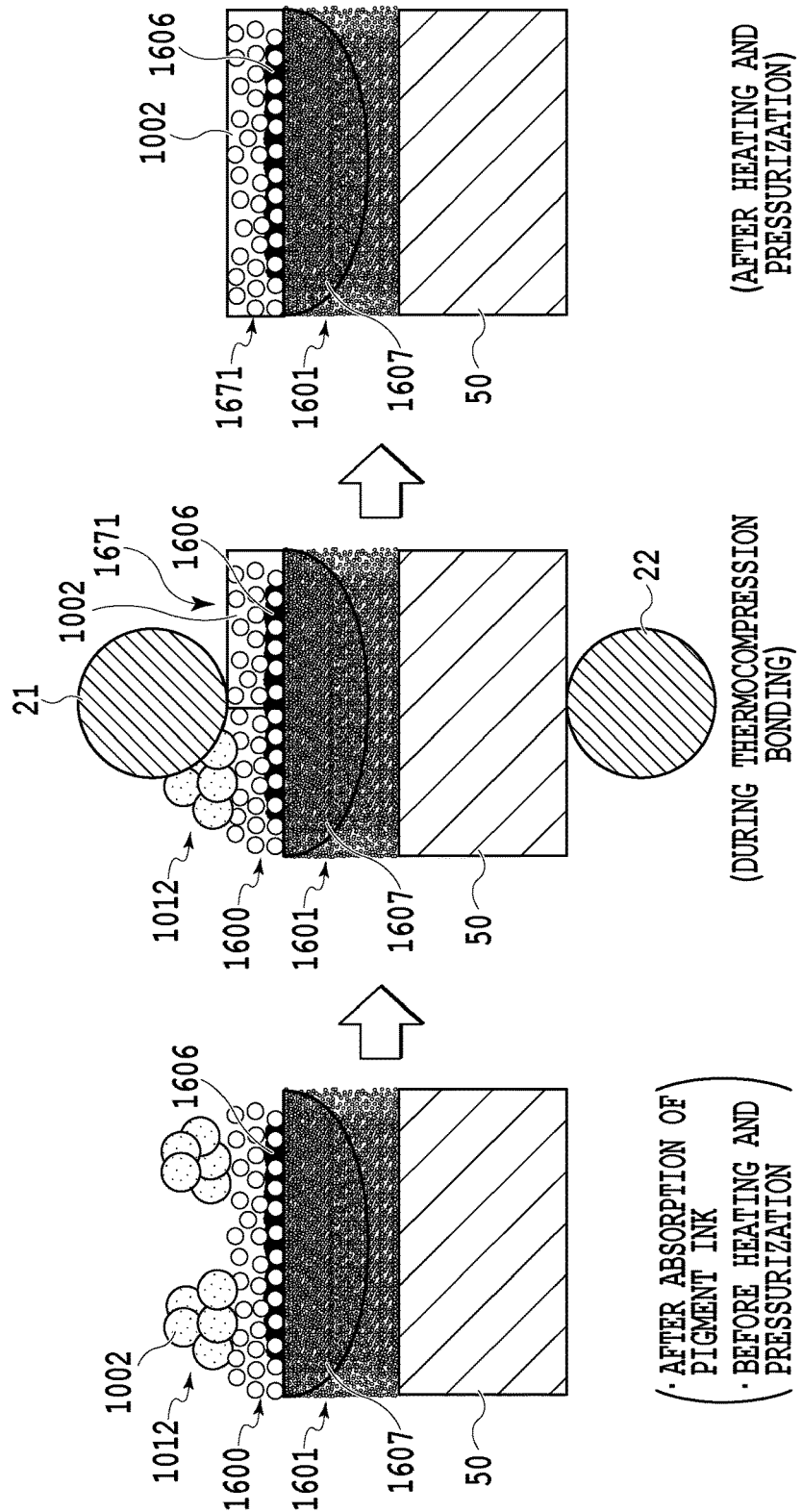

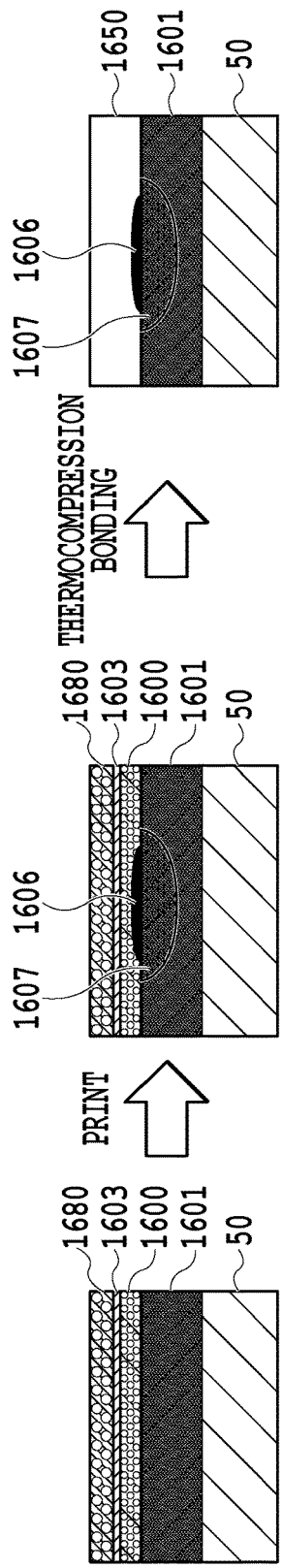

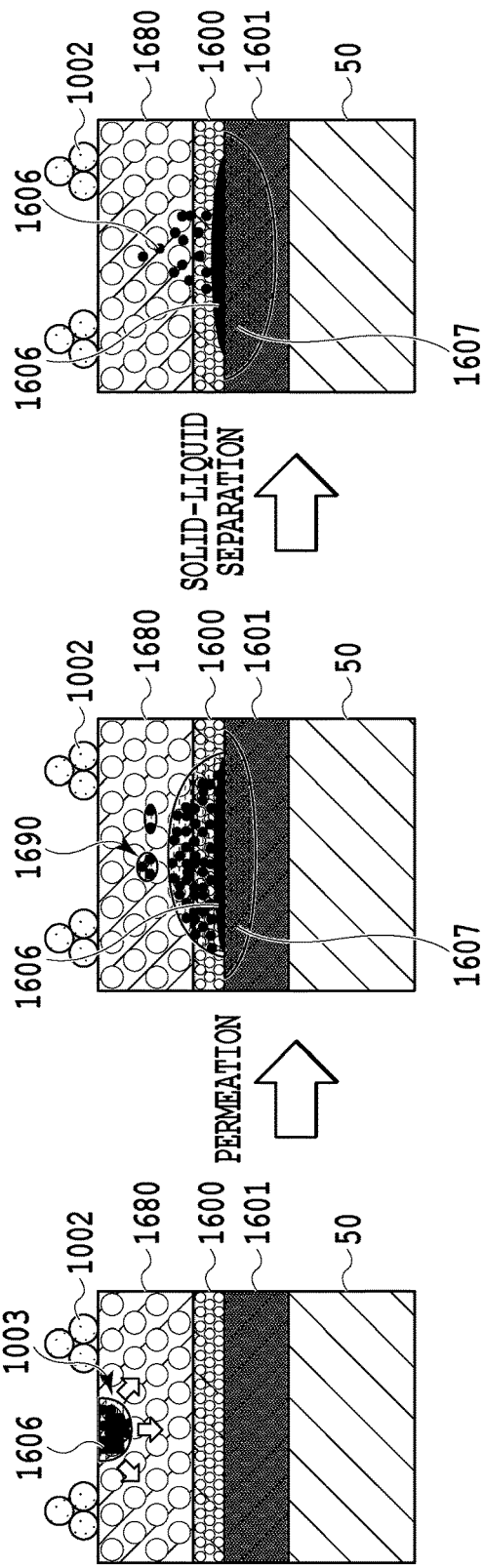

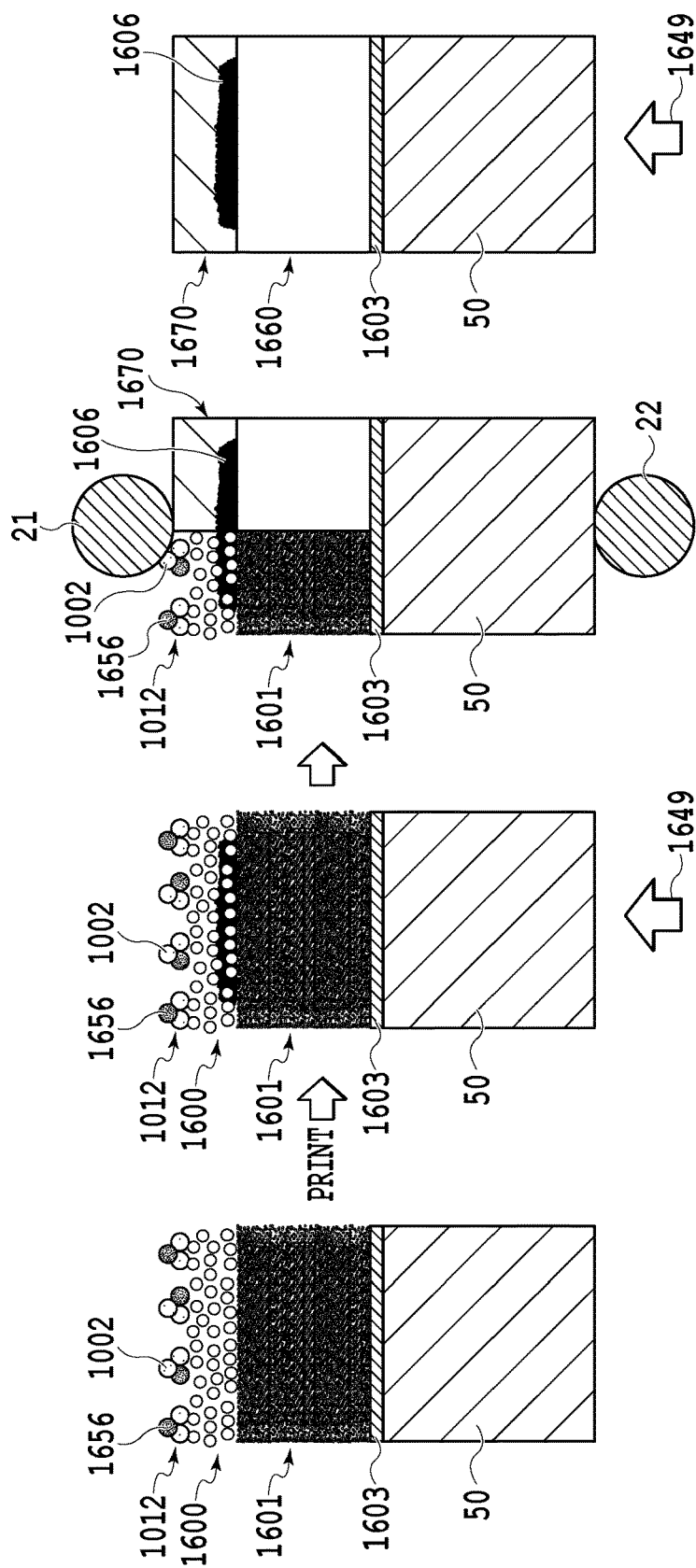

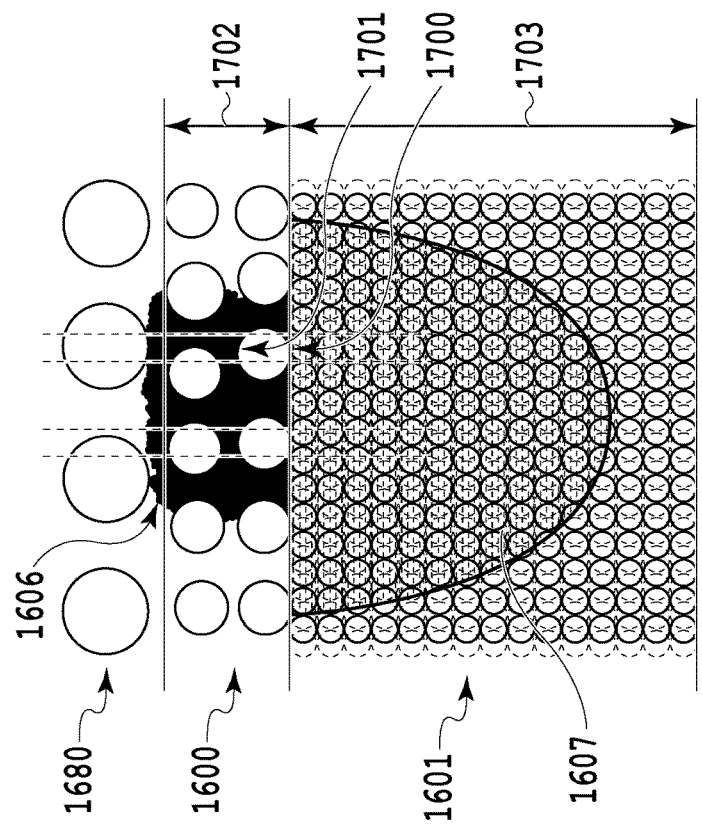
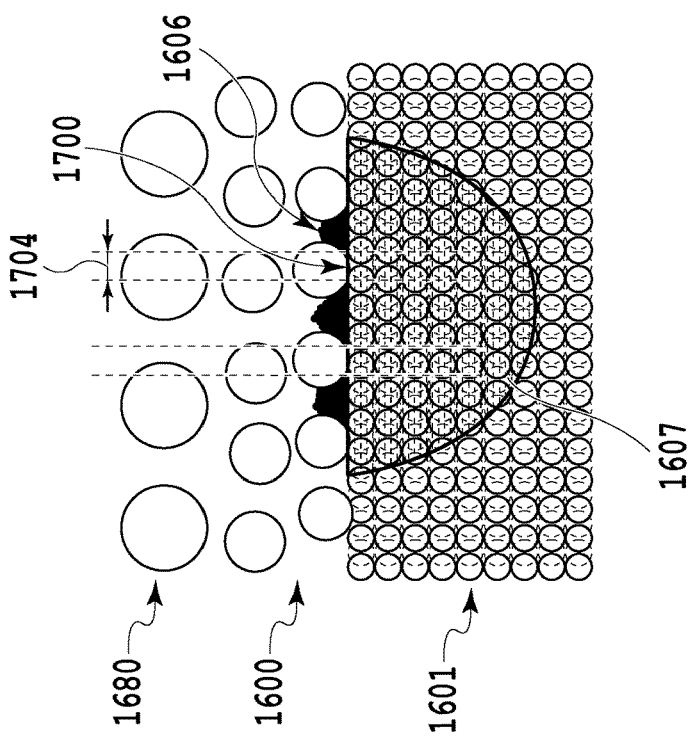
FIG.33B
FIG.33A

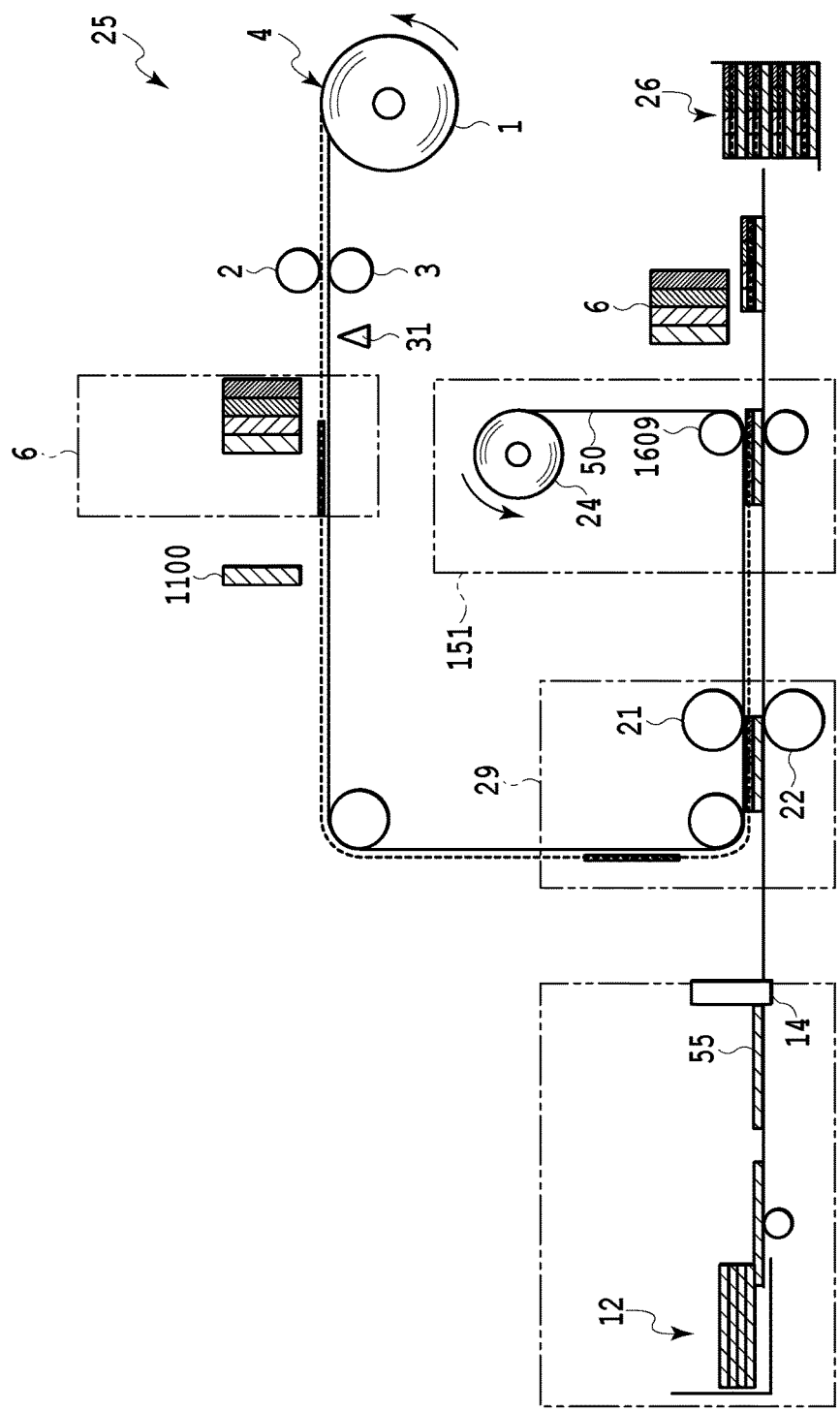

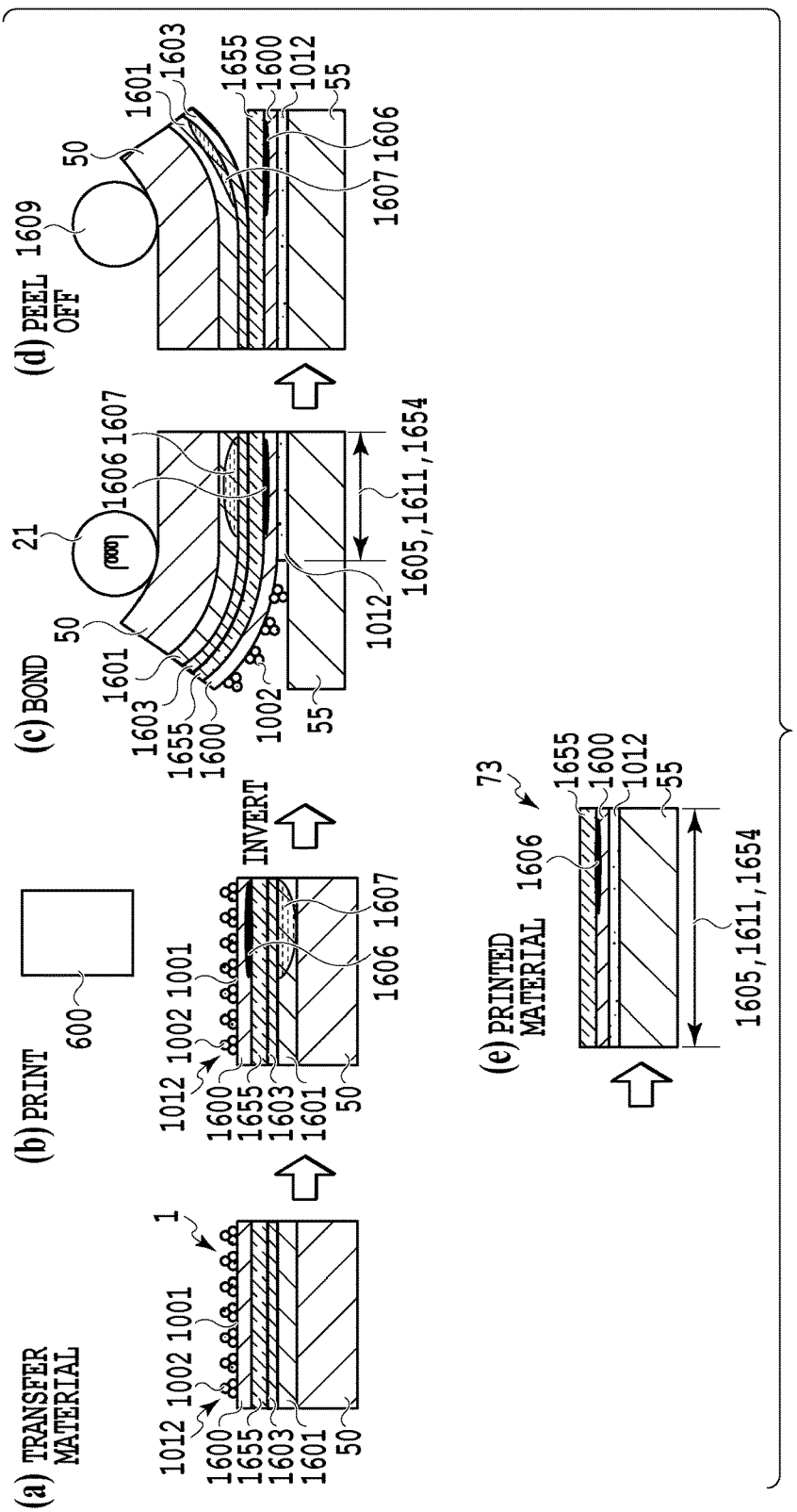

PRINT MEDIUM, PRINTED MATERIAL, AND MANUFACTURING METHOD FOR PRINTED MATERIAL

BACKGROUND OF THE INVENTION

Field of the Invention

The present invention relates to a print medium, a printed material including the print medium, and a manufacturing method for the printed material.

Description of the Related Art

Ink jet print media used for ink jet printing apparatuses are provided with an ink receiving layer that can absorb a large amount of ink, in order to provide printed images with a sufficient image density. Examples of the ink receiving layer include a swelling type mainly formed of a water-soluble resin to receive ink in a network structure of water-soluble polymer and an air gap absorption type that receives ink in a fine air gap structure. The ink receiving layer of the air gap absorption type is preferably used because air gaps can absorb a large amount of ink. The ink receiving layer of the air gap absorption type varies in ink absorption and fixation state according to an ink used. For example, in a case where the ink receiving layer of the air gap absorption type is printed using a die ink, in a case where the dye ink impacts the ink receiving layer, a dye color material and moisture and a solvent in the ink permeate the inside of the ink receiving layer to form ink dots of a predetermined size inside the ink receiving layer according to permeation anisotropy of the ink receiving layer, which is appropriately designed and controlled. In other words, in the ink receiving layer, the ink infiltrates and diffuses according to the permeation anisotropy. Therefore, images with a high resolution can be printed with an area factor needed for image formation maintained.

However, for a printed material in which an image is formed in the ink receiving layer of the air gap absorption type using a dye ink, in a case where moisture adheres to a front surface of the printed material, a dye color material temporarily fixed in the ink receiving layer is dissolved again by moisture absorbed through the front surface to infiltrate and diffuse again through the ink receiving layer, causing the image to bleed. That is, the printed material disadvantageously offers low water resistance. Furthermore, the dye ink is low in light resistance, and in a case where the dye ink is exposed to sunlight or the like for a long time, the printed image is subjected to fading. Thus, the dye ink is disadvantageously low in weatherability.

Japanese Patent Laid-Open No. H07-237348 (1995) discloses a technique in which the ink receiving layer has a two-layer configuration to improve water resistance. Specifically, the ink receiving layer has a front layer formed using a porous polymer layer and a lower layer formed using a porous alumina layer. In the disclosed technique, the ink receiving layer is printed using a dye ink, pigments are fixed in air gaps in the alumina layer, and then, a porous polymer film is formed into a molten film to form a protect film formed of a transparent polymer film, thus improving water resistance and weatherability. However, depending on storage conditions for the printed, material, liquid components and a dye color material of the ink remaining in the ink receiving layer may infiltrate and diffuse through the ink receiving layer again to cause image bleeding (color material migration) associated with storage. Therefore, in a case where the dye ink is used, long-term storage stability disadvantageously fails to be achieved.

On the other hand, in a case where the ink receiving layer of the air gap absorption type is printed using a pigment ink, weatherability such as water resistance and light resistance can be improved. In general, a pigment color material of the pigment ink has an average particle size larger than an air gap size of the ink receiving layer. Thus, the pigment color material of the pigment ink and solvent components thereof, which are a liquid, are subjected to solid-liquid separation on a front surface of the ink receiving layer. The pigment color material is fixed on the front surface of the ink receiving layer, and the solvent components such as water permeate the inside of the ink receiving layer. Consequently, for the pigment color material in the front surface of the ink receiving layer, in a case where a print surface is rubbed with the finger or the like, the print surface may peel off. The pigment color material is thus inappropriate in scratch resistance.

Thus, Japanese Patent Laid-Open No. 2001-96907 discloses a method in which pores forming the air gap structure of the ink receiving layer of the air gap absorption type each have a size larger than a secondary aggregated particle size of the pigment color material and surface roughness is set to 8 µm or more so as to allow the pigment color material to permeate the inside of the ink receiving layer, improving scratch resistance.

However, in Japanese Patent Laid-Open No. 2001-96907, the pores in the ink receiving layer have a sufficiently larger size than the pigment color material in order to allow the pigment color material to permeate the inside of the ink receiving layer. Such a case, compared to a case where the pores involves a lower ink absorption speed, causing the solvent components such as water and the pigment color material to be held inside the ink receiving layer for a long time. In particular, to provide color images with a sufficient image density, the ink receiving layer needs to be able to absorb a sufficient amount of pigment ink and thus has a relatively thick film configuration. In a case where an ink receiving layer with a large film thickness is subjected to ink jet printing using a pigment ink, the pigment ink infiltrates and diffuses planarly over a distance comparable to the film thickness of the ink receiving layer. Thus, excessive image bleeding may occur to reduce a substantial print resolution. Therefore, in a case where ink jet printing is performed on a conventional print medium with an ink receiving layer formed on a substrate so as to have a large film thickness, the ink receiving layer having a pore size larger than the particle size of the pigment particles, excessive image bleeding may result from permeation and diffusion of a pigment ink. In some cases, shadows in the image may be blocked up. Furthermore, pigment particles, which are a color material, disperse widely inside the ink receiving layer, disadvantageously reducing image density to inhibit an appropriate image coloring capability from being achieved. Moreover, in a case where the air gaps in the ink receiving layer are formed using inorganic particulates with a large particle size in order to make each of the air gaps sufficiently larger than each pigment particle, transparency of a pigment permeation layer may decrease, leading to reduced image visibility.

In a case where the surface roughness of the ink receiving layer is set equal to or larger than a predetermined value (for example, 8 µm or more) in order to allow absorption and permeation of the pigment particles, the air gaps need to be formed using inorganic particulates each of which is larger than a wavelength region of visible light. Thus, the pigment particles absorbed by the lower layer of the ink receiving layer fail to sufficiently exhibit optical properties, making an intended density difficult to achieve.

On the other hand, Japanese Patent Laid-Open No. 2001-96907 discloses a technique for forming a protect film of a transparent polymer film by densifying a porous polymer layer in the front layer after a dye ink transmitted through the porous polymer layer is absorbed by a porous alumina layer in the lower layer. However, Japanese Patent Laid-Open No. 2001-96907 does not refer to the above-described problem resulting from the use of a pigment ink. Given that an ink jet print medium of the above-described two-layer configuration using a pigment ink, pigment particles fail to infiltrate and pass through a porous resin layer in a substantially outermost layer, whereas only solvent components infiltrate through and are absorbed by the porous resin layer and the ink receiving layer. Therefore, the pigment particles remain on a front surface of the porous resin layer. Consequently, in a case where a scratch test is conducted on this printed material, the pigment image is scraped off. Thus, disadvantageously, sufficient scratch resistance also fails to be achieved in an actual use state.

Furthermore, Japanese Patent Laid-Open No. H9-240196 (1997) describes a transfer image formation sheet material provided with a porous adhesive layer and an ink receiving layer formed below the adhesive layer. Ink applied from above the adhesive layer passes through the adhesive layer and is absorbed by the ink receiving layer. The adhesive layer is formed all over the ink receiving layer, and the ink receiving layer is of a swelling absorption type that is swollen with the ink.

Japanese Patent Laid-Open No. 2013-39791 describes a transfer film including an ink permeation layer having air gaps through which the ink infiltrates and an ink receiving layer that receives the ink having passed through the ink permeation layer. The ink permeation layer functions as a bonding layer and is formed on a front surface of the ink receiving layer. The ink receiving layer is of an air gap type in which a large number of air gaps configured to absorb the ink are formed.

In Japanese Patent Laid-Open No. H9-240196 (1997), an ink receiving layer of the swelling absorption type is used as the ink receiving layer. Upon absorbing the ink, the ink receiving layer of the swelling absorption type locally swells and becomes uneven, and thus, the adhesion between the ink receiving layer and an image support may be degraded. In a case where the adhesive layer is made thicker to reduce the adverse effect of recesses and protrusions on the ink receiving layer, the time needed to pass the ink through the permeation layer increases, and the ink is retained in the adhesive layer for a long time. The dots thus spread, making image bleeding likely to occur. In a case where an attempt is made to smooth the front surface of the ink receiving layer by drying the ink receiving layer, a transfer speed is limited by the time needed for the drying, a dryer or the like needs to be separately provided.

The ink receiving layer of the swelling absorption type that receives the ink in the network structure of water-soluble polymer has a lower ink absorption speed than the porous adhesive layer. Thus, the ink is retained in the adhesive layer to spread the dots, making image bleeding likely to occur. Furthermore, the ink receiving layer of the swelling absorption type fails to instantaneously absorb a large volume of ink, and thus, a large volume of unabsorbed ink is present in the adhesive layer immediately after image printing. In a case where the adhesive layer with the ink remaining therein is bonded to the image support, the bonding may be inappropriate. In a case where the adhesive layer that has not been bonded to the image support is dried, the transfer speed is limited by the drying time, leading to the need to separately provide a dryer or the like.

On the other hand, in Japanese Patent Laid-Open No. 2013-39791, the ink absorbed into the air gaps in the ink permeation layer is absorbed by the ink receiving layer of the air gap absorption type. In a case where a pigment ink is used as the ink, the air gaps in the ink permeation layer and the ink receiving layer need to have a size that is appropriate to allow pigment particles to pass through. Thus, the ink absorptivity is likely to decrease, and the pigment ink may be retained in the ink permeation layer and the ink receiving layer, resulting in inappropriate bonding. Furthermore, the pigment ink containing the pigment particles infiltrates and diffuses through the ink receiving layer. Thus, the ink dots may spread excessively to make image bleeding likely to occur, leading to a reduced print resolution.

As described above, in the configuration where the ink is absorbed by the ink receiving layer through the adhesive layer or the ink permeation layer, image bleeding may occur to reduce the print resolution. Moreover, the ink may remain in the adhesive layer or the ink permeation layer, resulting in inappropriate bonding. Achieving both the print properties in the former case and the bonding capability in the latter case is difficult.

SUMMARY OF THE INVENTION

Therefore, an object of the present invention is to provide a print medium that achieves appropriate print properties (high resolution and high image density) in image formation using a pigment ink and that enables formation of an image with excellent scratch resistance.

Another object of the present invention is to provide a print material that achieves excellent scratch resistance, weatherability, and long-term storage stability in a printed image.

Yet another object of the present invention is to provide a manufacturing apparatus and a manufacturing method that enable manufacture of a print material provided with an image that is excellent in scratch resistance, weatherability, and long-term storage stability.

Still another object of the present invention is to provide a print medium that enables printing of a highly weatherable image and that is excellent in image print properties and image transfer properties, and printed material with such an image transferred thereto.

A first aspect of the present invention provides a print medium including an ink receiving layer to which a pigment ink containing a pigment and a solvent is to be applied and resin layer, wherein the ink receiving layer and the resin layer are formed on a substrate in series and wherein the ink receiving layer has: a pigment permeation layer through which the solvent and the pigment are enabled to infiltrate; and a solvent absorption layer through which the pigment is inhibited from infiltrating and the solvent is enabled to infiltrate, wherein the solvent absorption layer and the pigment permeation layer are laminated in this order from the substrate side, and wherein the resin layer includes pieces of thermoplastic resin discretely provided on a front surface of the pigment permeation layer so as to leave an exposed portion from which the front surface of the pigment permeation layer is exposed.

In the print medium, in a case where a pigment image is printed on a front surface of the pigment permeation layer using the pigment ink, the pigment particles quickly permeate the air gaps in the pigment permeation layer due to a capillary phenomenon because the pigment permeation layer has an average pore size sufficiently larger than each pigment particle. On the other hand, the air gaps formed such that the thick-film solvent absorption layer has an average pore size smaller than a pigment particle size, and thus, the pigment particles are subjected to solid-liquid separation at an interface between the pigment permeation layer and the solvent absorption layer, resulting in formation of a dense, thin-film-like high-quality image at a bottom of the pigment permeation layer. In a case where the ink is absorbed based on the capillary phenomenon of the air gaps, ink absorption speed increases with decreasing pore size of the air gaps. Thus, substantially all solvent components are quickly absorbed by the solvent absorption layer instead of remaining in the pigment permeation layer.

A second aspect of the present invention provides a printed material that a pigment ink containing a pigment and a solvent is applied to the print medium according to the first aspect of the present invention, wherein the pigment is held in a position nearer to a front surface side than the solvent absorption layer of the ink receiving layer.

The print material in the second aspect is obtained by printing the print medium by applying the pigment ink thereto, for example, as is the case with the first aspect. That is, the printed material in the second form can be obtained by applying the pigment ink to the print medium including the pigment permeation layer formed using the above-described pigment permeation layer and the solvent absorption layer formed using the above-described solvent absorption layer. In this case, the pigment of the pigment ink applied to the pigment permeation layer forms a dense, thin-film-like high-quality pigment image at the interface between the pigment permeation layer and the solvent absorption layer. Thus, the printed material in the second aspect offers appropriate scratch resistance compared to a printed material with a pigment image formed on a front surface thereof. In a case where the pigment permeation layer of the print medium is configured to be able to be formed into a molten film, and in a case where after a pigment image is formed, the pigment image is formed into a molten film to remove the air gaps formed in the pigment permeation layer after, communication between the outside and the pigment image can also be blocked, providing a printed material with more excellent weatherability. The pigment image is enclosed by the pigment permeation layer with the pigment image formed into the molten film. Thus, the image is firmly protected, and a tacky state between the pigment permeation layer and the solvent absorption layer is also improved.

A third aspect of the present invention provides a manufacturing method for manufacturing a printed material by printing the print medium according to the first aspect of the present invention, the manufacturing method comprising: a printing step of forming an image by ejecting a pigment ink to the resin layer of the print medium; and a pressurizing and heating step of pressurizing and heating the print medium including the image formed by the printing step, wherein the pressurizing and heating step includes forming at least the pigment permeation layer into a molten film.

A fourth aspect of the present invention provides a manufacturing method for manufacturing a printed material by printing the print medium according to the first aspect of the present invention, the manufacturing method comprising: a printing step of printing an image on the print medium by applying a pigment ink to the print medium from the resin layer side; and a bonding step of bonding the print medium and the image support by pressurizing and heating in a superposed state where the resin layer in the print medium with the image printed thereon contacts the image support. The heating and pressurizing step forms at least the resin layer into a molten film.

According to the print medium of the present invention, in image formation using a pigment ink, appropriate print properties are obtained and an image with excellent scratch resistance can be formed.

According to the present invention, a printed material can be manufactured in which an image with a high resolution, a high image density, and excellent scratch resistance is formed.

The present invention is based on the following knowledge.

In a case where the pigment ink is applied using an ink jet printing system or the like and is absorbed by the ink receiving layer via a resin layer, a decrease in image density and the visibility of the printed image may result from a decrease in area factor (coverage of ink on a print surface).

Specifically, as depicted in FIG. 36, in a case where an pigment ink with excellent weatherability and storage stability is used and each of the pigment particles 1606 is larger than each of the air gaps in the ink receiving layer 53, the pigment particles 1606 are separated from the pigment ink on the front surface of the ink receiving layer 53 and are unlikely to permeate the inside of the ink receiving layer 53. Thus, the pigment particles 1606 fail to move around to a location immediately below an area where particle-shaped pieces of thermoplastic resin 1002 forming, the resin layer contact the front surface of the ink receiving layer 53. To increase the area factor, the area of an exposed portion of the ink receiving layer 53 that is not covered by the thermoplastic resin needs to be widely adjusted. In this regard, the arrangement and configuration of the thermoplastic resin 1002 may be restricted, for example, it may be necessary to reduce the area where the pieces of thermoplastic resin 1002 contact the front surface of the ink receiving layer 53. In such a case, in a case where an attempt is made to utilize the resin layer of the thermoplastic resin as a bonding layer to bond the print medium to the image support, the image support to which the print medium can be bonded may be limited. Furthermore, the area factor is not completely 100%, and thus, a white point (blank portion) 1608 where no image is printed may occur.

In a case where the air gaps in the ink receiving layer 53 are enlarged to facilitate infiltration of the pigment particles 1606 into the ink receiving layer 53, the amount of ink absorbed by the ink receiving layer 53 increases. In that case, as depicted in FIG. 53B, the pigment ink 1003 containing the pigment particles 1606 infiltrates and diffuses throughout the ink receiving layer 53. In FIG. 53B, a part (b-3) is a plan view of the print surface of the print medium, and parts (b-1), (b-2) are cross-sectional views taken along line b-b in the part (b-3). As depicted in the part (b-1), the pigment ink 1003 applied to a porous ink permeation layer 1640 is absorbed as depicted in the part (b-2). As in the part (b-2) of FIG. 53B, the pigment ink 1003 may bleed excessively to cause image bleeding, and the ink dots may spread to reduce the print resolution. In a case where the pigment ink permeates the ink receiving layer 53 isotropically, the dots spread over a range corresponding to the thickness of the ink receiving layer 53.

In a case where inorganic particulates with a large particle size are used to form the air gaps in the ink receiving layer 53 in order to make each of the air gaps in the ink receiving layer 53 larger than each pigment particle 1606, the transparency of the ink receiving layer 53 may decrease to reduce the visibility of the image. The pigment particles 1606, which correspond to a color material, disperse deeply and widely in the ink receiving layer 53 before being fixed. Thus, an image coloring capability may be degraded.

A print medium of the present invention is a print medium including a resin layer provided on a front surface of an ink receiving layer for a pigment ink provided on a substrate. The ink receiving layer includes a pigment permeation layer of an air gap absorption type positioned closer to the resin layer and enabling permeation of pigment components and solvent components of the pigment ink and a solvent absorption layer of the air gap absorption type positioned closer to the substrate and enabling absorption of the solvent components. The resin layer includes pieces of thermoplastic resin discretely provided on a front surface of the pigment permeation layer, and an exposed portion in which the front surface of the pigment permeation layer is exposed.

According to the present invention, after the pigment components and the solvent components of the pigment ink are allowed to pass through the pigment permeation layer, the solvent components of the pigment ink are absorbed by the solvent absorption layer. Thus, a high-definition and -density image can be formed that is excellent in visibility and weatherability. The pigment permeation layer allows the pigment ink to disperse and infiltrate in a planar direction of the print medium so as to move around to an area immediately below the particle-shaped pieces of thermoplastic resin forming the resin layer, thus allowing an image with an excellent area factor to be printed. The resin layer of the print medium of the present invention may be utilized as a bonding layer, and allows transfer to various supports via the resin layer. Substantially all of the solvent components of the pigment ink are absorbed by the solvent absorption layer, located away from the resin layer, so as to inhibit the solvent components from remaining in the resin layer or in the pigment permeation layer. Thus, the print medium can be appropriately transferred even immediately after image printing.

Further features of the present invention will become apparent from the following description of exemplary embodiments with reference to the attached drawings.

BRIEF DESCRIPTION OF THE DRAWINGS

FIG. 13A and FIG. 13B are plan views illustrating a relation between pixels of the ink jet print medium and the state of the ink droplet immediately after landing and a relation between the pixels of the ink jet print medium and the state of ink subjected to permeation and diffusion;

FIG. 20A and FIG. 20B are diagrams illustrating an ink jet print medium and a manufacturing method for a printed material in Example 1;

FIG. 21A and FIG. 21B are diagrams illustrating a manufacturing method for a printed material in Example 2-1;

FIG. 23A and FIG. 23B are diagrams illustrating a manufacturing method for a printed material in Example 3-2;

FIG. 24A and FIG. 24B are diagrams illustrating a manufacturing method for a printed material in Example 3-3;

FIG. 25A and FIG. 25B are diagrams illustrating a manufacturing method for a printed material in Example 3-4;

FIG. 26A and FIG. 26B are diagrams illustrating a manufacturing method for a printed material in Example 4-1;

FIGS. 27A to 27C are diagrams illustrating a manufacturing method for a printed material in Example 4-3;

FIGS. 28A to 28C are diagrams illustrating a manufacturing method for a printed material in Example 5;

FIGS. 29A to 29C are diagrams illustrating a manufacturing method for a printed material produced using an ink jet print medium provided with a resin layer 1012;

FIGS. 30A to 30C are diagrams illustrating a manufacturing method for a printed material in Example 2-1;

FIGS. 31A to 31C are diagrams illustrating an ink absorption mechanism for an ink jet print medium with a second pigment permeation layer configured to include a thick film;

FIGS. 32A to 32D are diagrams illustrating a manufacturing method for a printed material produced using an ink jet print medium including a transparent substrate and a resin layer 1012 containing a functional material;

FIG. 33A and FIG. 33B are diagrams illustrating an ink absorption mechanism for an ink jet print medium with a plurality of pigment permeation layers;

FIG. 40 is a schematic configuration diagram illustrating an example of a manufacturing apparatus for a printed material;

FIG. 46 is a diagram illustrating a manufacturing method for a printed material including a print medium with a plurality of solvent absorption layers;

DESCRIPTION OF THE EMBODIMENTS

Embodiments of the present invention will be described below based on the drawings.

First Embodiment (1. Basic Configuration of the Ink Jet Print Medium)

Figure 1:
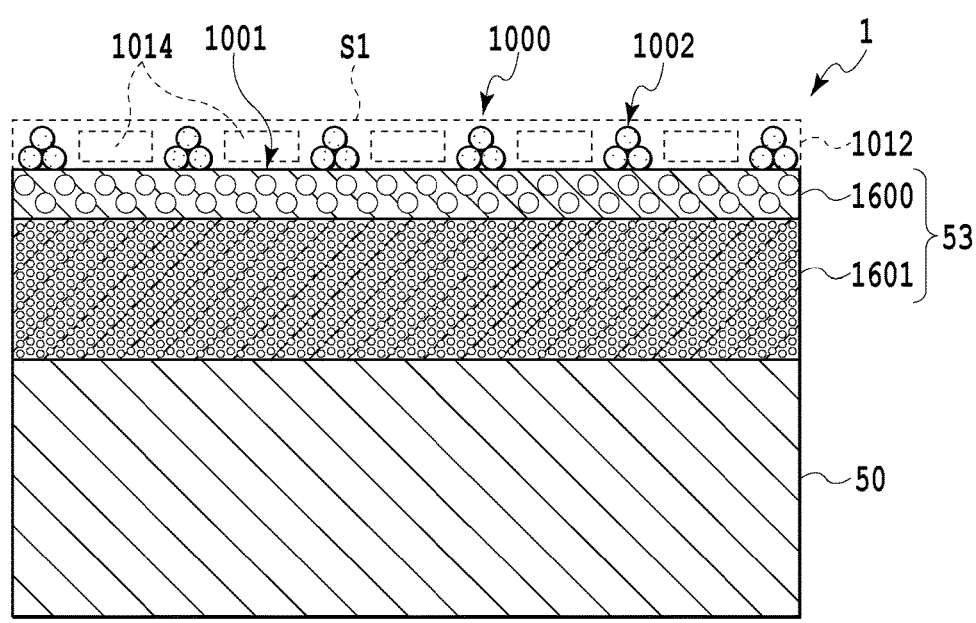
FIG. 1 is a cross-sectional view of the ink jet print medium provided with a sea-and-island-like resin layer in a pigment permeation layer front surface.

FIG. 1 is a longitudinal side view illustrating a basic configuration of an ink jet print medium (hereinafter simply referred to as a print medium) according to a first embodiment of the present invention. In the present invention, an ink jet print medium in the present embodiment is a print medium for ink jet printing having an ink receiving layer 53 provided on a substrate and having a layer structure of two or more layers. The ink receiving layer 53 includes a solvent absorption layer 1601 of an air gap absorption type that is an ink receiving layer on a substrate 50 side and that includes a thick film, the solvent absorption layer 1601 being excellent in absorbing an ink solvent, and a pigment permeation layer 1600 of an air gap absorption type that is an ink receiving layer on a front layer side and that can be formed into a molten film. In the pigment permeation layer 1600, an air gap structure of the solvent absorption layer is configured to have pores each sufficiently smaller than a pigment particle, and an air gap structure of the pigment permeation layer is configured to have an air gap diameter sufficiently larger than the particle size of the pigment particles. The ink receiving layer located at a position facing the substrate 50 is a solvent absorption layer 1601 of the air gap absorption type that includes a thick film and that is excellent in absorbing solvent components of ink. The ink receiving layer 53 located at a position distant from the substrate 50, that is, the ink receiving layer 53 located at a position facing the solvent absorption layer, is a pigment permeation layer 1600 of the air gap absorption type that includes a thin film and that can be formed into a molten film. An ink absorption speed of the solvent absorption layer 1601 is set higher than an ink absorption speed of the pigment permeation layer. The resin layer is formed of pieces of thermoplastic resin discretely provided so as to include an exposed portion where a front surface of the pigment permeation layer is exposed. The substrate 50 is formed of a seat member serving as a support for the ink receiving layer 53.

The ink receiving layer of the air gap absorption type quickly absorbs ink due to a capillary phenomenon of the air gaps, and the ink absorption speed increases with decreasing average air gap diameter. An ink liquid absorption capacity increases consistently with film thickness because the ink absorption capacity varies according to the sum of the capacities of the air gaps. Therefore, the ink jet print medium in the present embodiment is configured such that the pigment permeation layer 1600 has a smaller average air gap diameter than the solvent absorption layer 1601, and solvent absorption layer 1601 has a larger film thickness than the pigment permeation layer 1600.

The ink jet print medium 1 of the present embodiment is assumed to be printed using a pigment ink, and thus, the average air gap diameter of the pigment permeation layer 1600 is configured to be sufficiently larger than an average particle size of the pigment particles. The average air gap diameter of the solvent absorption layer 1601 is configured to be smaller than the average particle size of the pigment particles. Therefore, as described above, the solvent absorption layer 1601 has a much higher ink absorption speed than the pigment permeation layer 1600.

Figure 3:
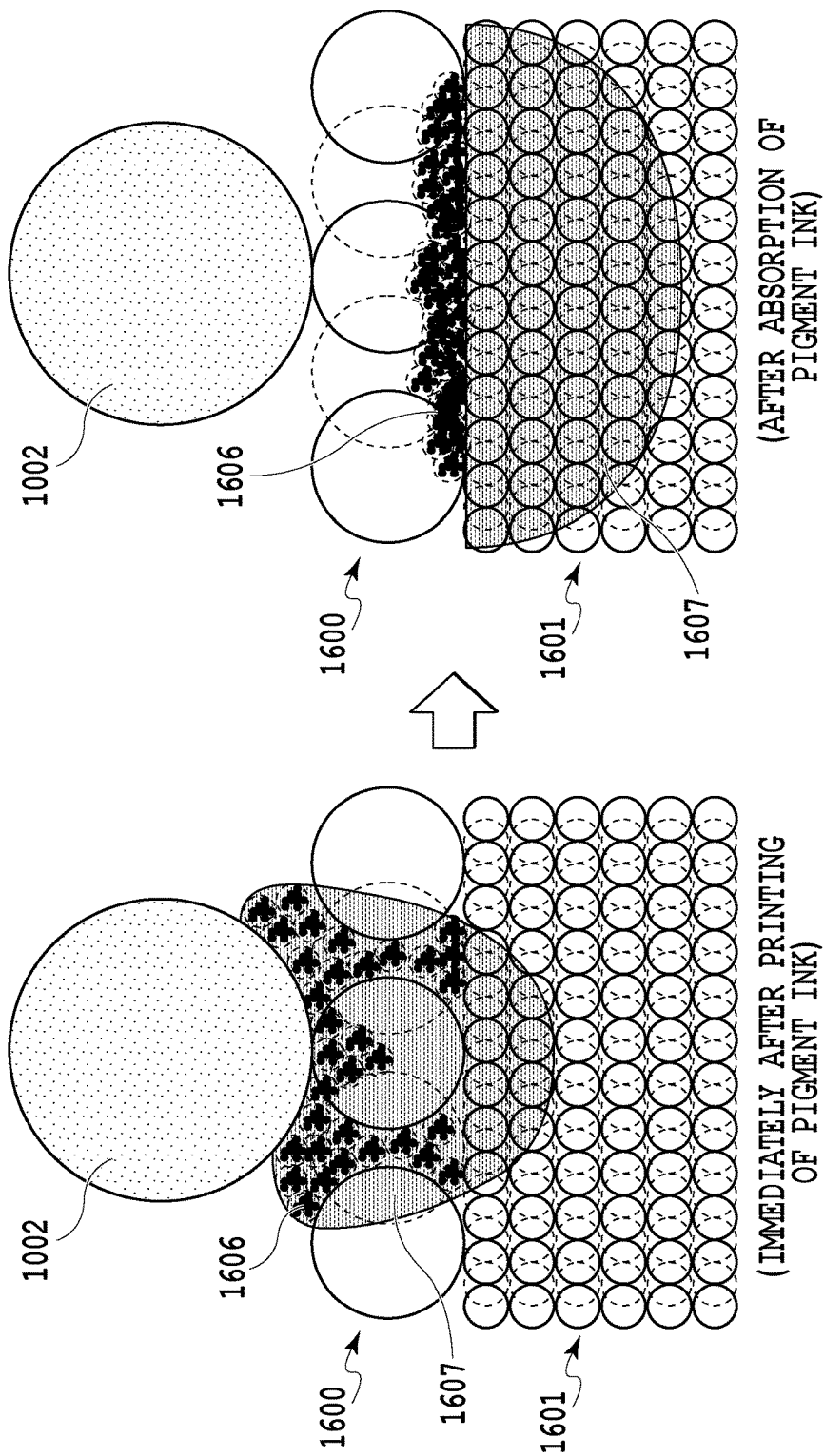
FIG. 3A and FIG. 3B are diagrams illustrating solid-liquid separation of the pigment ink at an interface between a pigment permeation layer and a solvent absorption layer.

Therefore, as depicted in FIG. 3B, the pigment particle-like pieces of the pigment ink 1003 are absorbed into the bottom of the pigment permeation layer 1600, and substantially all solvent components 1607 are absorbed by the thick-film solvent absorption layer 1601. That is, in the print medium of the present embodiment, the air gap structure of the pigment permeation layer is configured to have an air gap diameter sufficiently larger than the particle size of the pigment particles. Therefore, the capillary force of the pigment permeation layer is relatively weak, leading to a slightly low ink absorption speed. However, due to low flow, path resistance, the pigment ink applied to a front surface of the pigment permeation layer smoothly permeates the pigment permeation layer and is smoothly absorbed by the pigment permeation layer, along with the pigment particles, as depicted in FIG. 3A.

On the other hand, the air gap structure of the solvent absorption layer 1601 is configured to have pores each sufficiently smaller than each pigment particle, leading to a significantly strong capillary force and a significantly high ink absorption speed. However, the air gaps formed in the solvent absorption layer are each smaller than each pigment particle and offer high flow path resistance, the pigment particles remain on a front surface of the solvent absorption layer 1601, with only the solvent components of the pigment ink absorbed by the solvent absorption layer 1601 at high speed. That is, the pigment ink is subjected to solid-liquid separation, that is, separated into the pigment particles, which are solids, and the solvent, which is a liquid, at the interface between the solvent absorption layer 1601 and the pigment permeation layer 1600. When the pigment ink absorbed into the pigment permeation layer 1600 through the front surface thereof and having permeated the pigment permeation layer 1600 reaches the interface of the solvent absorption layer 1601, the solvent components of the pigment ink start to be absorbed at high speed due to the substantially strong capillary force of the solvent absorption layer 1601. This quickly increases a permeation speed of the pigment ink in the pigment permeation layer. Therefore, when the pigment particles are subjected to solid-liquid separation at the bottom of the pigment permeation layer 1600 (at the interface between the solvent absorption layer 1601 and the pigment permeation layer 1600), a flow of the solvent absorbed by the solvent absorption layer 1601 at high speed causes the pigment particles to accumulate densely while being compressed so as to form a thin film, thus forming a pigment image. The pigment image resulting from dense accumulation of the pigment particles, which are a color material, in a thin film form as described above is excellent in light absorptivity and is excellently colored.

In the present embodiment, the solvent absorption layer 1601 is formed to have a sufficient thickness to provide a large absorption capacity so that all of the solvent components, which mostly form the pigment ink, can be absorbed by the solvent absorption layer 1601. Thus, the pigment permeation layer 1600 may have an air gap capacity sufficient to house all of the pigment particles and can be formed into a thin layer. Therefore, the pigment ink having landed on the front surface of the pigment permeation layer 1600 also diffuses in a planar direction when the pigment ink is absorbed into the air gaps in the pigment permeation layer 1600 and permeates the air gaps, and the range of the permeation and diffusion is approximately equivalent to the film thickness of the pigment permeation layer. Thus, compared to an ink receiving layer in which ink infiltrates and diffuses through the whole thick-film solvent absorption layer, the ink receiving layer of the present embodiment involves only a small range of permeation and diffusion of the pigment ink in the pigment permeation layer, thus significantly suppressing a decrease in the resolution of an image formed. In an ink jet printing system, image design is performed such that adjacent pigment dots overlap so as to allow each pixel to be filled with the pigment dots. Therefore, the film thickness of the pigment permeation layer to be formed may be adjusted according to the amount of bleeding of the desired pigment dots.

As described above, in the ink jet print medium of the present embodiment, the ink receiving layer 1601 is formed to include at least two layers and subjected to solid-liquid separation at the interface between the layers. The solvent absorption layer 1601 is set to have a large thickness so as to provide a solvent absorption capacity that enables all of the solvent components to be absorbed. Thus, the pigment ink can be densely accumulated so as to have a high density with no concern for image bleeding in the ink receiving layer. A high-density and -definition pigment image can be formed at the bottom of the pigment permeation layer 1600. Therefore, even in a case where a color image is printed at a high density and a high speed, a dense color image can be formed without causing ink overflow. The pigment ink is excellent in weatherability such as water resistance, light resistance, and ozone resistance, but a pigment image formed on a front surface of an image print medium generally involves a weak bonding force between the pigment particles, leading to the need for improvement of scratch resistance as described above. In the ink jet print medium 1 of the present embodiment, the pigment particles 1600 are subjected to solid-liquid separation at the interface with the solvent absorption layer 1601 so as to be separated from the solvent components, forming a dense, thin-film-like pigment image at the bottom of the pigment permeation layer. Thus, the pigment permeation layer itself serves as a protect layer for the pigment image to allow scratch resistance to be improved.

Figure 2:
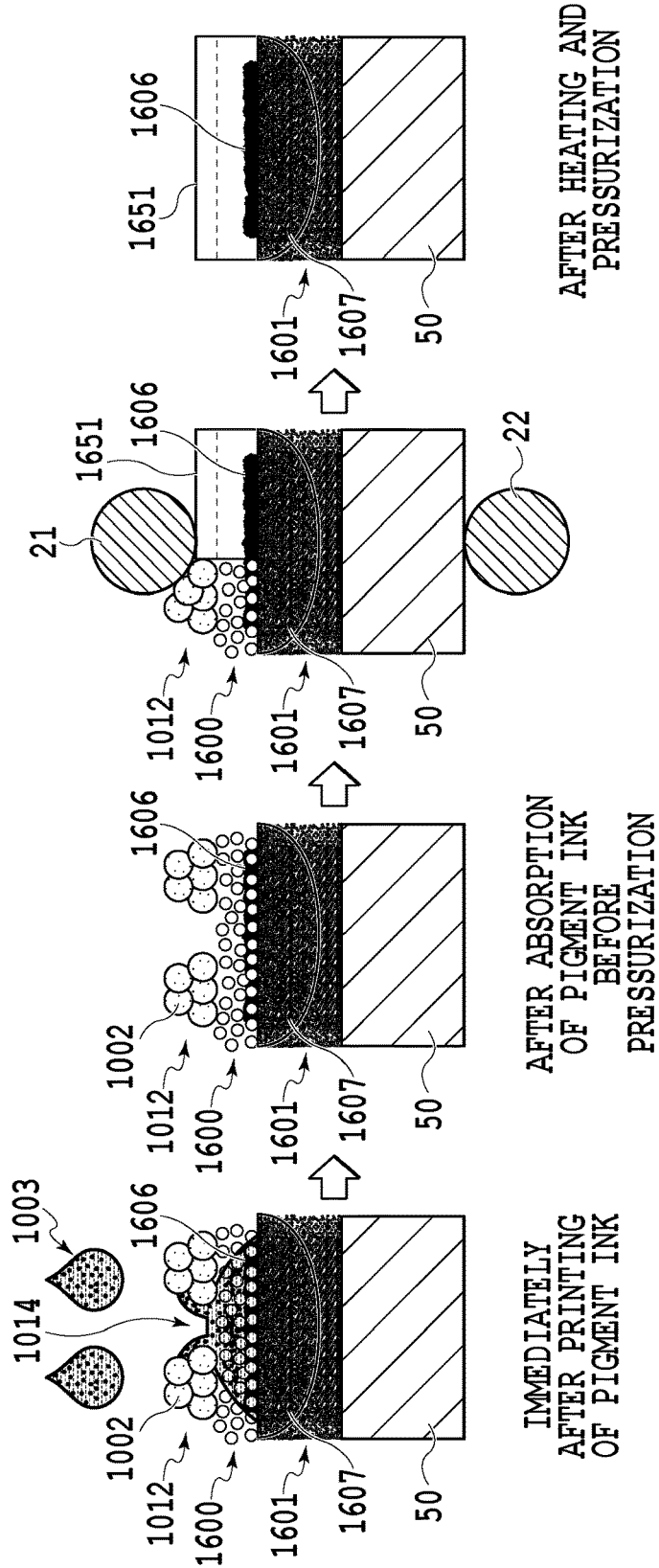
FIG. 2A is a diagram illustrating a pigment ink absorption mechanism for the ink jet print medium provided with a resin layer 1012 in the pigment permeation layer front surface.
FIG. 2B is a diagram illustrating a state after a pigment ink is absorbed and before the ink jet print medium is thermocompression bonded.
FIG. 2C is a diagram illustrating that the ink jet print medium is being thermocompression bonded after absorption of the pigment ink.
FIG. 2D is a diagram illustrating a state after the ink jet print medium is thermocompression bonded after absorption of the pigment ink.

After the pigment image is formed as depicted in FIG. 2B preferably, the pigment permeation layer 1600 of the ink jet print medium may be formed into a molten film (see FIG. 2D) by being thermocompression bonded (heated and pressurized) by a heat roller 21 and a pressurization roller 22 as depicted in FIG. 2C. In a case where the pigment permeation layer 1600 is thermocompression bonded, the pigment ink applied to the pigment permeation layer 1600 needs to sufficiently permeate the pigment permeation layer 1600 and the solvent absorption layer 1601 to inhibit the pigment ink from remaining on the front surface of the pigment permeation layer 1600. In the ink jet print medium of the present embodiment, when the ink applied to the ink receiving layer reaches the interface between the pigment permeation layer 1600 and the solvent absorption layer, quick absorption of the solvent components by the solvent absorption layer 1301 is started as described above. As a result, the viscosity and surface tension of the ink allow the pigment ink remaining on the front surface of the pigment permeation layer to start to permeate the inside the pigment permeation layer at high speed without being broken away. Thus, even though, during the initial period of infiltration through the pigment permeation layer, the ink infiltration is slightly slow due to the large air gaps through which the pigment particles infiltrate and pass, after a portion of the pigment ink reaches the solvent absorption layer, the solvent components of the pigment ink start to be absorbed at high speed due to the strong capillary force of the pores, allowing the succeeding pigment ink in the pigment permeation layer to start to infiltrate at high speed.

Therefore, in the ink jet print medium of the present embodiment, the pigment ink is retained on the front surface of the pigment permeation layer 1600 for a very short time, and all of the applied ink is absorbed into and infiltrates through the pigment permeation layer 1600 in a short time. Therefore, even immediately after ink jet printing, the thermocompression bonding treatment for melting the pigment permeation layer into a molten film can be started without the need for a special drying unit or a time for drying. That is, even in a case where the air gaps in the pigment permeation layer are removed by the thermocompression bonding treatment immediately after the ink is applied, the solvent components of the pigment ink are inhibited from seeping out to the pigment permeation film side because the solvent components have already been absorbed by the solvent absorption layer 1601. Therefore, this inhibits stain on the front surface of the print medium and image degradation resulting from seepage of the solvent components.

Melting of the pigment permeation layer 1600 into a molten film can be achieved utilizing a commercially available laminator as a heating and pressurization unit. In this case, in a case where the solvent components of the pigment ink seep out to the front surface side of the ink jet print medium, the solvent and the like adhere to surfaces of a heating roller and the like provided in the laminator. However, in the print medium in the present embodiment, the ink is inhibited from seeping out to the front surface as described above, preventing a pressurization roller from being stained.

As depicted in FIG. 2A, in the ink jet print medium of the present embodiment, printing with the pigment ink allows the pigment ink 1606 to be densely formed at the bottom interface of the pigment permeation layer 1600 and also allows all of the solvent components 1607 to be absorbed into the solvent absorption layer 1601. As depicted in FIG. 2B, the pigment permeation layer 1600 is formed into a molten film by thermocompression bonding using the heat roller 21 and the pressurization roller 22 as depicted in FIG. 2C. At this time, the air gap structure of the solvent absorption layer 1601 is maintained, and thus, the solvent components are held inside the solvent absorption layer 1601 instead of seeping out from the solvent absorption layer. As depicted in FIG. 2D, the pigment permeation layer 1600 allows a pigment protect film 1650 to be formed by being formed into such a molten film as encloses a pigment image 1606.

The pigment protect film 1650 is formed into a molten film and can thus protect the pigment image as a firm protect film, compared to the pigment permeation layer 1600 having the air gap structure. That is, formation of the pigment protect film 1650 increases the mechanical strength of the pigment image such as scratch resistance and allows prevention of entry of a pollutant gas and a pollutant liquid from the front surface side of the printed material, allowing storage stability of the pigment image to be improved. The pigment image is held at the bottom of the pigment protect film 1650 resulting from formation of the pigment permeation layer 1600 into a molten film, so as to enclose the pigment particles 1606. Thus, the pigment image is firmly protected. Moreover, in a case where the pigment protect film 1650 is formed to be optically transparent and flat, haze is reduced and surface glossiness is improved, enhancing image visibility of the pigment image.

The pigment permeation layer can be formed using a plurality of layers. For example, a first pigment permeation layer may be formed on the front surface of the solvent absorption layer, and a second pigment permeation layer may be formed on the front surface of the first pigment permeation layer to provide a plurality of (in this case, two) pigment permeation layers. The second pigment permeation layer has a larger air gap diameter than the first pigment permeation layer, and both the pigment permeation layers are formed of a material that can be formed into a molten film. The second pigment permeation layer preferably has a smaller film thickness than the first pigment permeation layer.

In the pigment permeation layer, the first pigment permeation layer has a smaller air gap diameter than the second pigment permeation layer and thus has a higher ink absorption speed than the second pigment permeation layer. The higher ink absorption speed of the first pigment permeation layer allows the pigment ink absorbed into and having infiltrated through the air gaps in the second pigment permeation layer to be quickly absorbed by the first pigment permeation layer.

The first and second pigment permeation layers, and resin layer are formed into a molten film and made transparent by being thermocompression bonded to the ink jet print medium. Consequently, the dense, thin-film-like pigment image printed at the bottom of the first pigment permeation layer is covered and protected by the first and second pigment permeation layers, and resin layer formed into a molten film. In other words, the first and second pigment permeation layers, and resin layer function as protect films for the pigment image. As described above, the upper layer of the first pigment permeation layer formed into a molten film is additionally provided with the second pigment permeation layer formed into a molten film to allow prevention of entry of a gas or a liquid through the front surface and improvement of mechanical strength such as scratch resistance.

The first and second pigment permeation layers are formed of a material containing resin particulates that form air gaps in each pigment permeation layer before thermocompression bonding and that are formed into a molten film after thermocompression bonding to function to protect the pigment image. However, a second protect film with another function can be formed using resin particulates with properties different from those of the above-described resin particulates. For example, a resin that further improves planarity when softened and formed into a molten film may be used to allow provision of an image printed material with excellent surface glossiness, or a resin that provides a higher surface hardness after softened and formed into a molten film may be used to allow provision of a printed material with an excellent mechanical strength.

However, a pigment permeation layer with large air gaps has a low ink absorption speed, and thus, the pigment particles, water, and the solvent components are likely to be held inside the second pigment permeation layer for a long time. Thus, the second pigment permeation layer preferably includes as thin a film as possible to the extent that ink is not broken away in the pigment permeation layer, In a case where the second pigment permeation layer includes an excessively thick film, the pigment ink may excessively bleed, resulting in image bleeding, or the print resolution may substantially decrease. As depicted in FIGS. 31A to 31C, the pigment ink infiltrates and diffuses throughout the plurality of pigment permeation layers forming a thick film, spreading the dots. At this time, in a case where pigment ink permeability is isotropic as depicted in FIG. 31A, the dots spread over a range corresponding to the thickness of all of the plurality of pigment permeation layers forming a thick film (see FIG. 31B). When some of the solvent components start to be absorbed into the solvent absorption layer, having a significantly high ink absorption speed, the pigment ink 1690 may be broken inside the second pigment permeation layer 1680, having a low ink absorption speed (see FIG. 31B). The pigment particles 1606 may disperse and be likely to remain (see FIG. 31C). Therefore, the second pigment permeation layer 1680 is preferably formed to be as thick as possible to the extent that the ink is not broken away in the pigment permeation layer. In a case where the pigment permeation layer includes a thin film, enhancement of the protect film function may be limited.

Since the pigment image is formed at the interface between the second pigment permeation layer and the solvent absorption layer, the pigment image is visible via the first pigment permeation layer and the second pigment permeation layer. FIG. 33A is a diagram illustrating an absorption mechanism for ink, the diagram illustrating the ink absorption layer by enlarging. In this case, as depicted in FIG. 33A, the pigment particles 1600 are inhibited from moving around to a portion 1700 below the resin particles forming the air gaps in the second pigment permeation layer 1600, and thus, this area 1704 is a non-image portion inhibited from being printed with the ink and which corresponds to a white point. In a case where the white point is formed, the density of the image may decrease, making a high-definition image difficult to form. In such a case, as depicted in FIG. 33B, a large amount of pigment ink is ejected to increase the amount of ink ejected to the print medium to build up the pigment particles 1606 to the interface with the first pigment permeation layer 1600. In a case where the pigment particles are thus built up to the height 1702 of the second pigment permeation layer 1600 or higher, the pigment particles are built up in an upper portion 1701 of the resin particles where the white point 1700 has occurred. Thus, the white point is eliminated, enabling a dense image to be formed. In a case where the amount of ink ejected is increased, the thickness 1703 of the solvent absorption layer may be increased so as to allow substantially all of the solvent components of the ejected pigment ink to be absorbed by the solvent absorption layer to inhibit the solvent 1607 of the pigment ink from being retained in the pigment permeation layer.

A pigment permeation layer with large air gaps is likely to have an excessively low mechanical strength before the pigment permeation layer is formed into a molten film. This may affect conveying performance, and for example, oily powder may fall onto a print surface during printing of a pigment image. Moreover, resin particulates with a large particle size need to be used in order to form a large air gap diameter. However, depending on a resin material, resin particulates with a large particle size are difficult to form, and the resin material itself is limited, hindering a desired protect film function from being accomplished.

Furthermore, in order to protect an image on the ink receiving layer 53 of the print medium, pieces of thermoplastic resin 1002 may be provided that can be melted by thermocompression bonding and that do not substantially absorb the pigment ink. However, in a case where the above-described thermoplastic resin is provided on the front surface of the solvent absorption layer, included in the ink receiving layer 53 and having the air gaps each smaller than each pigment particle, a white point 1608 may be generated that is a non-image portion in which the color material fails to be attached to an image formed (the non-image portion fails to be printed).

Figure 4:
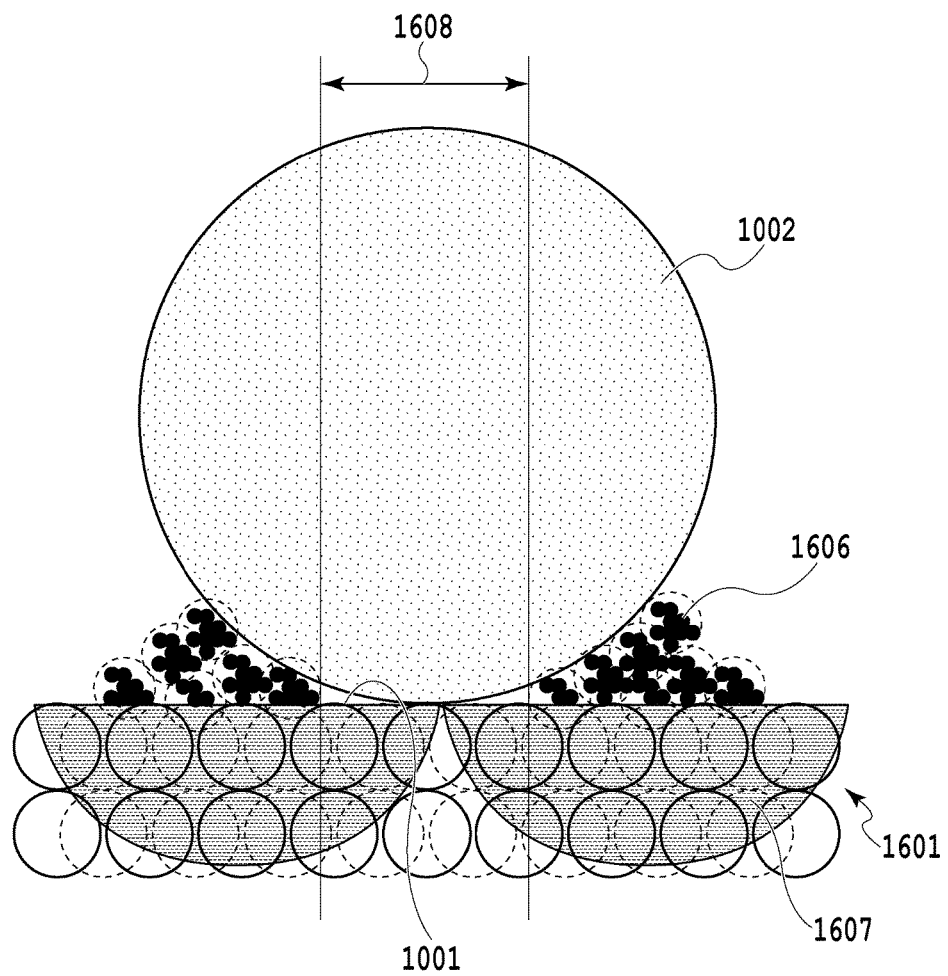
FIG. 4 is a diagram illustrating a non-image portion of the pigment ink in a lower portion of the resin layer 1012 in a single-layer ink receiving layer.

FIG. 4 illustrates an example where the pieces of thermoplastic resin 1002 with the properties as described above are discretely provided as an additional protect film for the pigment image. In this ink jet print medium, the pigment particles 1606 of the pigment ink 1003 are subjected to solid-liquid separation in the portion 1001 where the solvent absorption layer 1601 is exposed, and are inhibited from permeating the inside of the ink receiving layer 53. Thus, the pigment particles 1606 fail to move around to the area 1608 corresponding to a part of the ink receiving layer 53 that is located immediately below a corresponding one of the discretely-disposed particle-like pieces of the non-ink-absorbing thermoplastic resin 1002. The area 1608 is a white point that is a non-image portion precluded from being printed, and formation of the white point reduces the area factor in the print medium, decreasing the image density.

In contrast, in the ink jet print medium 1 of the present embodiment, the resin layer 1012 is formed, as depicted in FIGS. 2A to 2D by discretely placing the pieces of thermoplastic resin 1002 that can be formed into a molten film by thermocompression bonding and that does not substantially absorb the pigment ink, on the front surface of the pigment permeation layer 1600 as a thermoplastic resin portion 1000.

That is, the exposed portion 1001 where the pigment permeation layer 1600 is directly exposed is left like the sea, whereas the thermoplastic resin 1000 is formed like a plurality of islands. In a case where the resin layer 1012 is configured like the sea and islands, the pigment ink droplet 1003 having landed on the resin layer 1012 partly drips onto the exposed portion 1001 of the pigment permeation layer 1600 instead of being absorbed by the pieces of thermoplastic resin 1002 as depicted in FIG. 3A. As a result, all of the droplet 1003 of the pigment ink is quickly drawn into the pigment permeation layer 1600 having the air gap structure and also having a high ink absorption speed.

The pigment permeation layer 1600 has an average pore size larger than the particle size of the pigment particles, which are the color material of the pigment ink, and thus, the pigment particles can also enter the pigment permeation layer 1600. The pigment ink infiltrates and diffuses quickly through the pigment permeation layer 1600, having air gaps each larger than each pigment particle, and is subjected to solid-liquid separation at the interface with the solvent absorption layer 1601, having air gaps each smaller than each pigment particle, so as to be separated into the pigment image 1606 and the solvent components 1607. As depicted in FIG. 3A, in the pigment permeation layer 1600, the pigment ink 1003 diffuses and infiltrates not only in a film thickness direction but also in a film planar direction. Thus, as depicted in FIG. 3B, the pigment ink moves around to areas immediately below the pieces of thermoplastic resin 1002, allowing the pigment image 1606 to be formed at the bottom of the pigment permeation layer, while suppressing a possible white point that corresponds to a non-image portion. That is, due to a capillary effect produced by the air gap absorbing structure of the pigment permeation layer 1600, the pigment ink infiltrates and diffuses into the pigment permeation layer 1600, enabling the pigment particles 1606 to move around to the areas immediately below the pieces of thermoplastic resin 1002, which does not substantially absorb the pigment ink. Thus, the area factor of the ink jet print medium can be improved.

The pigment ink absorbed and having infiltrated into the pigment permeation layer is absorbed while spreading in a film thickness direction and a horizontal direction in accordance with the permeation anisotropy of the pigment permeation layer Design and film production for the pigment permeation layer may be executed such that the permeation anisotropy of the pigment permeation layer allows appropriate control of spread of ink dots, which is the foundation of ink jet print image design. That is, when large ink dots are needed, the permeability is set higher in the film thickness direction than in the horizontal direction. In contrast, when the amount of ink that can be absorbed in increased due to the need for smaller ink dots, adjustment of the film thickness of the pigment permeation layer may be executed in addition to setting of the permeability higher in the film thickness direction than in the horizontal direction.

Film productivity of the pigment permeation layer can also be improved by allowing for isotropic permeation instead of providing permeation anisotropy. In this case, in order to achieve the desired spread of the ink dots, the permeation and diffusion of the whole pigment permeation layer may be controllably regulated based on the film thickness and the like in accordance with the desired amount of ink that can be absorbed. In a case where the pigment permeation layer exhibits isotropic pigment ink permeability, the dots spread over a range substantially corresponding to the thickness of the pigment permeation layer, enabling possible white points to be suppressed. Consequently, the area factor can be increased.

Figure 16:
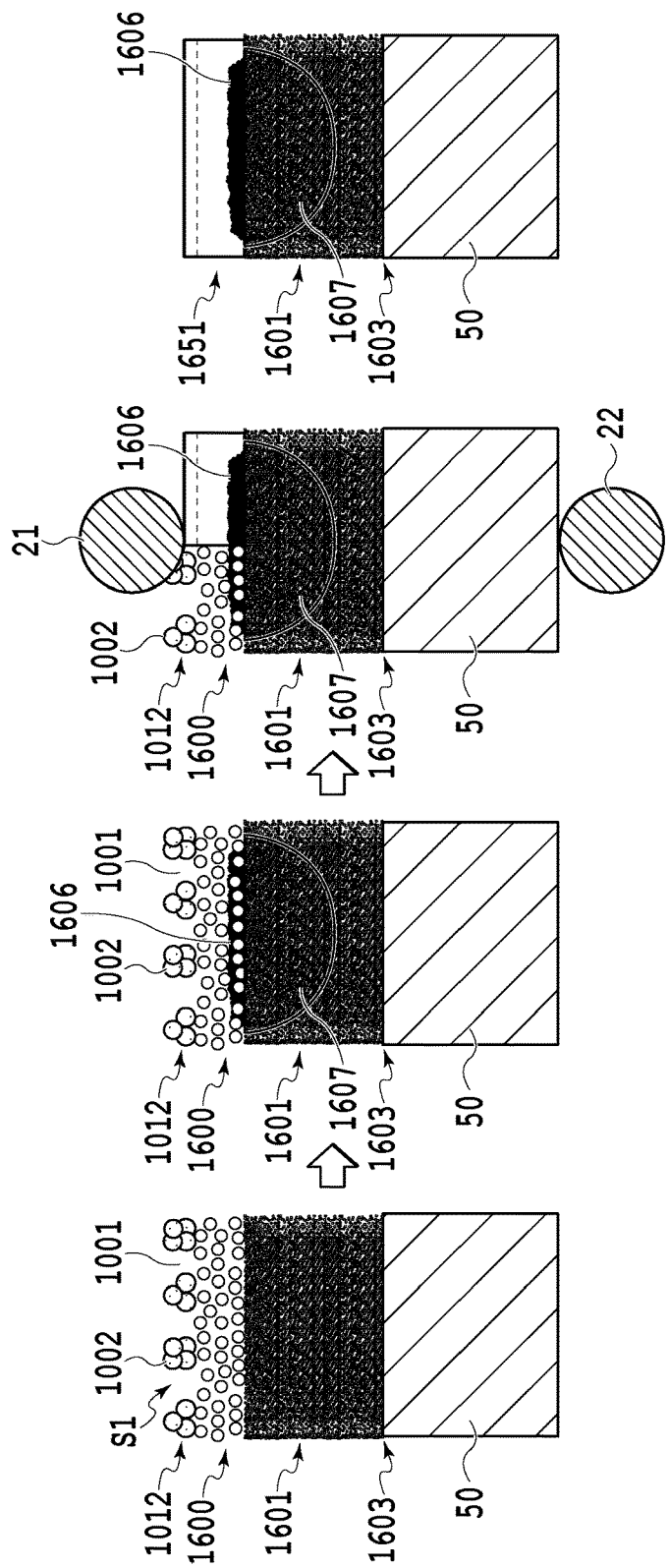
FIGS. 16A to 16D are diagrams illustrating a manufacturing method for a printed material of the present embodiment.

The resin layer 1012 can be formed into a molten film by being thermocompression bonded as depicted in FIG. 16C after formation of the pigment image as depicted in FIG. 16B. The pigment permeation layer 1600 may also be configured so as to be formed into a molten film by thermocompression bonding and may be formed into a molten film simultaneously with formation of the resin layer 1012 into a molten film as depicted in FIG. 16D.

The pigment permeation layer 100 may also be formed into a molten film as follows as depicted in FIG. 29B. With the pigment permeation layer 1600 itself not formed into a molten film but maintaining the air gap structure as depicted in FIG. 29A, the pieces of thermoplastic resin 1002 are softened and melted by thermocompression bonding to permeate the pigment permeation layer 1600 so as to fill the air gap structure (FIG. 29C). As described above, substantially all of the solvent components 1607, which are liquid components of the pigment ink, are absorbed by the solvent absorption layer, with few solvent components 1607 remaining in the pigment permeation layer 1600. Thus, even in a case where the thermoplastic resin 1002 or the pigment permeation layer 1600 itself is thermocompression bonded immediately after image printing and simultaneously formed into a molten film to eliminate the air gaps from the pigment permeation layer 1600, the solvent components are inhibited from seeping out so long as the air gaps in the solvent absorption layer 1601 are maintained. Therefore, the process for melting the pieces of thermoplastic resin 1002 or the pigment permeation layer 1600 into a molten film can be quickly executed without contamination of the surface of the printed material or the heating roller with the solvent.

In the ink jet print medium of the present embodiment, the capillary phenomenon occurring in the air gaps (see FIG. 16A) in then pigment permeation layer 1600 allows the pigment ink to infiltrate and diffuse into the pigment permeation layer 1600, with the pigment particles 1606 also moving to the areas immediately below the pieces of thermoplastic resin 1002. Thus, as depicted in FIG. 16B, the pigment image 1606 is densely formed like a thin film at the bottom interface of the pigment permeation layer 1600, and substantially all of the solvent components 1607 are absorbed into the solvent absorption layer 1601. As depicted in FIG. 16C, since the heat roller 21 and the pressurization roller 22 are used for pressurization and heating, the thermoplastic resin 1002 is melted or the pigment permeation layer 1600 itself is simultaneously melted. Thus, the pigment permeation layer 1600 is formed into a molten film to form a firm enhanced pigment protect film 1651. At this time, since the air gap structure of the solvent absorption layer 1601 is maintained, the solvent components 1607 are held rather than seeping out. As depicted in FIG. 16D, the pigment permeation layer 1600 is formed into a molten film so as to enclose the pigment image 1606 to eliminate the air gap structure. Consequently, the enhanced pigment protect film 1651 is formed.

The enhanced pigment protect film 1651 is the molten film into which both the pigment permeation layer 1600 and the thermoplastic resin 1002 are formed, and can thus protect the pigment image as a protect film that is thicker and firmer than the pigment protect film 1650 that is the molten film into which only of the pigment permeation layer 1600 is formed. That is, this further increases the mechanical strength such as scratch resistance and further improves light resistance of the pigment image with respect to stimulant light from the front surface of the ink jet printed material. Furthermore, the pigment image 1606 is held at the bottom of the enhanced pigment protect film 1651 so as to enclose the pigment particles. Thus, the pigment image 1606 is firmly held. Moreover, when the enhanced pigment protect film 1651 is optically transparent and flat, haze is reduced and surface glossiness is improved, thus enhancing the image visibility of the pigment image 1606.

As described above, in the ink jet print medium in the present embodiment, the pieces of thermoplastic resin 1002 that can be melted by thermocompression bonding are discretely arranged on the front surface of the thin-film pigment permeation layer 1600 as the thermoplastic resin portions 1000. Consequently, the resin layer 1012 can be stacked without generation of a white point, and the resin layer 1012 can also be formed using a thermoplastic resin that absorbs no pigment ink. Therefore, a thermoplastic resin with any of various shapes like pieces of a film and particles is widely applicable as the resin layer 1012. The resin layer 1012 absorbs substantially no pigment ink and is unlikely to cause image bleeding or a reduction in resolution, thus allowing a protect film with a sufficient thickness to be formed. That is, when the thermoplastic resin that absorbs no pigment ink and that can be melted is discreetly arranged on the front surface of the thin-film pigment permeation layer through which the pigment ink infiltrates and diffuses appropriately controllably, the absorptivity of the pigment permeation layer is sufficiently maintained even with provision of the resin layer 1012 with a thickness equivalent to the diameter of a droplet of the pigment ink. Therefore, when the pigment permeation layer 1600 and the resin layer 1012 with a sufficient thickness are formed into a molten film by thermocompression bonding after the pigment image is formed at the bottom of the pigment permeation layer 1600, a high-quality and -definition image printed material with excellent storage stability is obtained. However, the resin layer 1012 needs to avoid having a large thickness enough to preclude some of the droplets of the pigment ink having landed on the thermoplastic resin absorbing substantially no ink from quickly reaching the front surface of the pigment permeation layer 1600 with a quick absorbing capability even in a case where the droplets are deformed by landing impact. That is, it is not preferable to set the thickness of the resin layer 1012 significantly larger than the size of each droplet of the pigment ink obtained during ink jet printing because the setting reduces the ink absorptivity of the ink jet print medium.

On the other hand, the sea-and-island-like resin layer 1012 can be formed to be sufficiently thick regardless of the absorptivity of the pigment ink, and may thus contain various resin materials. For example, a surface texture improvement material 1653 that improves the surface texture of the printed material is applied to the resin layer 1012 to allow improvement of texture of the front surfaces of the ink jet print medium and the printed material. For example, stickiness of the front surface of the printed material, fingerprints remaining on the front surface, and the like can be suppressed. Similarly, the functionality can further be enhanced by adding an optical function improvement material such as a UV absorber, a coloring material, a light shielding material, or a light emitting material (fluorescence, phosphorescence, and luminescence).

The ink jet print medium of the present invention can be configured such that the thermocompression bonding treatment is executed after formation of the pigment image to form the solvent absorption layer 1601 into a molten film as depicted in FIGS. 32A to 32D. That is, the solvent absorption layer 1601 of the air gap absorption type with the air gaps formed therein may be configured by using a binder resin to couple together resin particulates that are likely to be melted and deformed by thermocompression bonding. However, as described above, immediately after ink jet printing is performed using the pigment ink, the ink jet print medium is in a state where substantially all of the solvent components 1607, which are liquid components of the pigment ink, have been absorbed by the solvent absorption layer 1601. Thus, even in a case where the resin particulates in the solvent absorption layer 1601 are softened and melted to eliminate the air gap structure, the solvent components 1607 are desirably inhibited from seeping out from the solvent absorption layer 1601.

A method for inhibiting seepage of the solvent components may be, for example, setting a time needed to vaporize volatile solvent components absorbed by the solvent absorption layer 1601 or providing a drying step or a drying apparatus configured to positively vaporize the solvent components. Among the solvent components of the pigment ink, a typical main component is a volatile solvent such as water or alcohol and can be sufficiently dried even after the solvent component is absorbed by the solvent absorption layer. However, a very small amount of nonvolatile solvent may be used as the solvent components of the pigment ink. Thus, the ink jet print medium is preferably configured so that, even in a case where resin particulates forming the air gaps in the solvent absorption layer 1601 are formed into a molten film by being softened and melted by thermocompression bonding, a small amount of nonvolatile solvent contained in the pigment ink can be held.

As depicted in FIG. 32D, the solvent absorption layer 1660 formed into a transparent film by being softened and melted also functions as a firm protect film for the pigment image 1606 formed on the pigment permeation layer 1600. Thus, compared to a solvent absorption layer maintaining the air gap structure, the solvent absorption layer 1601 can be prevented from being degraded by contamination resulting from entry of a pollutant liquid or a toxic gas through an end face of the printed material or the like, thus allowing long-term storage stability to be further improved.

As depicted in FIGS. 32A to 32D, the substrate 50 of the ink jet print medium may be transparent so that an inverted image 1606 formed (FIG. 32B) can be viewed in a direction indicated by an arrow 1649 (from the substrate 50 side). In this case, the pigment permeation layer 1600 and the resin layer 1012 serve as protect layers for a back surface of the image to allow the substrate itself to function as a surface protect layer for the thick film of the pigment image. In this case, in a case where the solvent absorption layer 1601 is formed into a molten film (see FIG. 32D) by being softened and melted by thermocompression bonding as depicted in FIG. 32C, a decrease in transparency can be suppressed that results from scattering of light in the air gaps in the solvent absorption layer 1601 and at the interface of the resin particles. This enables an increase in the visibility, from the solvent absorption layer 1601 side, of the pigment image formed at the bottom of the pigment permeation layer 1600 like a dense thin film.

Further function improvement can be achieved by, for example, adding an optical function enhancement material 1656 such as a coloring material or a light emitting material (fluorescence, phosphorescence, luminescence) to the resin layer 1012, serving as the back surface protect layer for the pigment image, to improve the visibility of the pigment image.

Figure 5A:
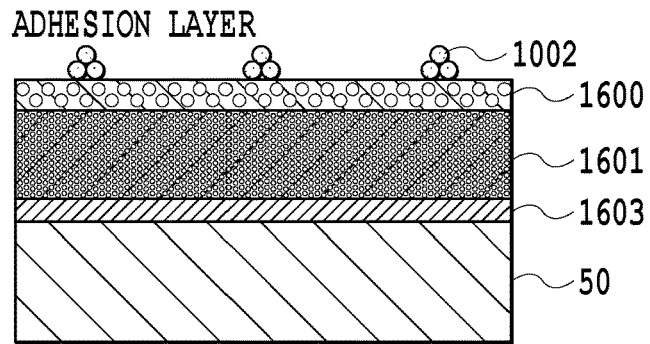
FIGS. 5A to 5D are cross-sectional views of an ink jet print medium with a plurality of pigment permeation layers or a plurality of solvent absorption layers or an adhesion layer.
Figure 5B:
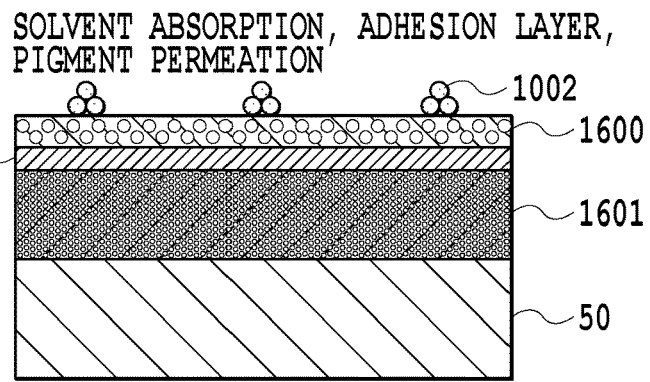
Figure 5C:
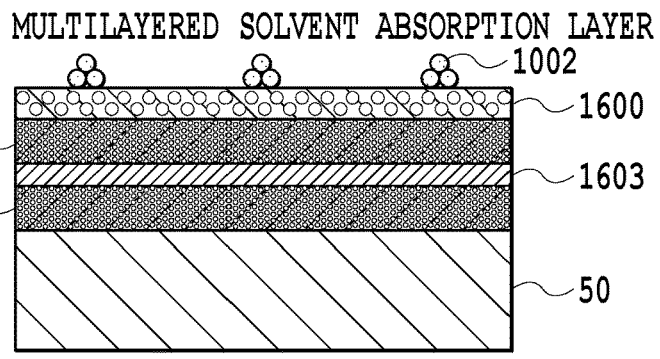

As depicted in FIG. 5C, the solvent absorption layer 1601 can be divided into a plurality of layers that are stacked. In this case, the resultant solvent absorption layers 1601 each have the basic functions of an ink receiving layer of the air gap absorption type and have a sequentially increasing ink absorption speed from the pigment permeation layer 1600 side toward the substrate 50 side. The lowermost solvent absorption layer with the highest ink absorption speed (the solvent absorption layer closest to the substrate 50) is full when substantially all of the solvent components of the placed pigment ink are absorbed. The lowermost solvent absorption layer thus needs a sufficient ink absorption capacity.

In the ink jet print medium in the present embodiment, the heat seal layer 1200 that exhibits a bonding capability when subjected to the thermocompression bonding treatment can be provided on a back surface of the substrate as depicted in FIG. 10A to 10D. As described above, the ink jet print medium may be configured so that the pigment permeation layer 1600 or the resin layer 1012 can be formed into a molten film by the thermocompression bonding treatment. After the pigment image 1606 is printed at the bottom of the pigment permeation layer 1600, the heat seal layer 1200 on the back surface of the substrate and the pigment permeation layer 1600 or the resin layer 1012 in the front surface can be utilized as heat seal layers in the front and back of the ink jet printed material. Thus, the ink jet print medium can also be utilized for packaging sheets. The ink jet print medium in the present embodiment can also be utilized as a packing material by being used to package a packaging target housing a content.

As described above, the ink jet print medium of the present embodiment allows inhibition of a decrease in the scratch resistance of the image and degradation of image quality (a decrease in density and image bleeding), which are conventional problems involved in printing with the pigment ink, which is excellent in weatherability such as water resistance, light resistance, and ozone resistance. That is, the ink jet print medium in the present embodiment allows printing of an image excellent in scratch resistance and enables formation of a high-definition and -density image while suppressing a decrease in image density and image bleeding.

The ink jet print medium in the present embodiment is particularly effective for indoor and outdoor advertisement applications such as POP displays and prices in the fields of sign & display and graphic arts that need high-level durability of images. That is, the related art needs special pre-processing and post-processing such as a step of aligning and laminating laminate films together while executing an air release process and a step of cutting off end faces. In contrast, when the ink jet print medium of the present embodiment is used, a firm protect film can be formed simply by directly thermocompression bonding the printed material using a laminator, allowing an ink jet print medium with excellent storage stability to be produced using a simple step. The substrate, the solvent absorption layer and the pigment permeation layer serving as ink receiving layers, and the sea-and-island-like resin layer are each configured to definitely provide either basic functions for ink jet printing such as reception and absorption of the pigment ink or functions utilized after formation into a molten film such as functions to improve storage stability and visibility. Thus, function addition design is facilitated in which an additional function is added to each layer according to the intended purpose.

As depicted in FIGS. 5A and 5B, an adhesion layer 1603 configured to improve adhesion between the layers may be provided at any of the interfaces between the layers with a material and a film production method for each layer taken into account. Consequently, inadvertent peel-off can be prevented. However, if capillary permeation of the pigment ink is needed between the layers, the adhesion layer 1603 needs to be formed into a very thin film using, for example, a material determined taking hydrophilicity into account so as not to hinder movement of the pigment ink based on the capillary phenomenon.

The ink jet print medium 1 enables an image to be viewed via the substrate 50 and the solvent absorption layer 1601 or via the pigment permeation layer according to the intended purpose. For example, when the image is viewed via the substrate 50 and the solvent absorption layer 1601, an inverted image is printed on the print medium 1. In this case, the substrate 50, which includes a thick film, and the solvent absorption layer 1601, which is excellent in strength, cover the pigment image printed at the bottom of the pigment permeation layer 1600, and thus also act as a firm protect layer for the pigment ink. However, the substrate 50 and the solvent absorption layer 1601 need to be optically transparent. In particular, preferably, the solvent absorption layer 1601 has a high ink absorption speed and is excellent in optical transparency. To achieve this, the air gap structure of the solvent absorption layer 1601 may have an average pore size significantly smaller than the wavelength of visible light Alternatively, the solvent absorption layer may be configured using a material than can be formed into a molten film by being pressurized and heated so that, after formation of a pigment image, the solvent components absorbed by the solvent absorption layer are sufficiently dried and formed into a molten film and made transparent along with the pigment permeation layer 1600 and the resin layer 1012.

In contrast, when the image is viewed via the pigment permeation layer 1600, a normal image is printed on the ink jet print medium. In such a case, the pigment permeation layer 1600 serves as a protect layer for the pigment image printed at the bottom of the pigment permeation layer 1600. In this case, the substrate 50 and the solvent absorption layer 1601 are desirably formed to be opaque or white in order to reduce optical transparency. In particular, the solvent absorption layer 1601 may have an average pore size equivalent to or larger than the wavelength of visible light. Alternatively, optical function layers serving as a white masking layer and a fluorescence, phosphorescence, and luminescence layer may be provided between the substrate 50 and the solvent absorption layer 1601.

Figure 34A:
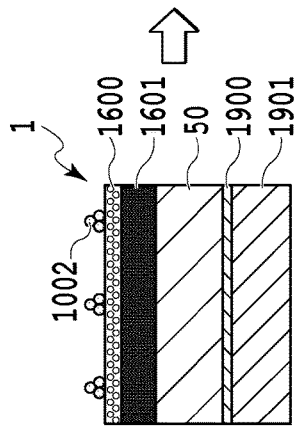
FIGS. 34A to 34F are diagrams illustrating a manufacturing method for a printed material including an ink jet print medium with a tacky layer.
Figure 34B:
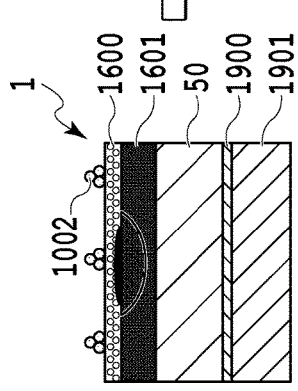
Figure 34C:
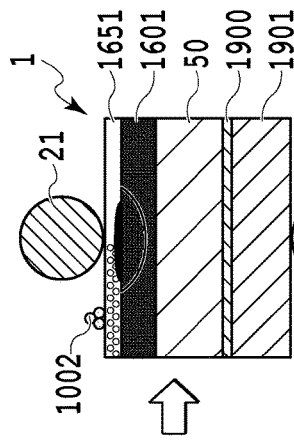
Figure 34D:
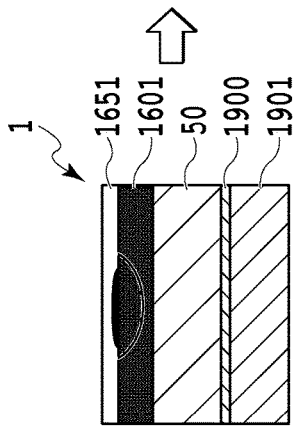
Figure 34E:
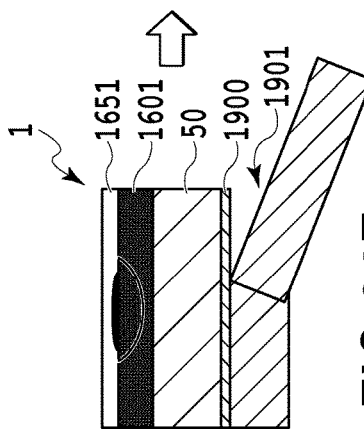
Figure 34F:
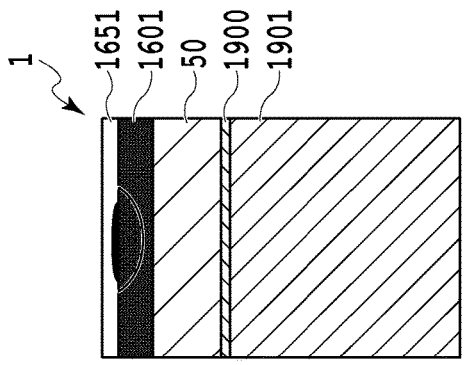

The print medium 1 of the present embodiment, a tacky layer 1900 and a release sheet 1901 may be provided on the back surface of the substrate 50 as shown in FIG. 34A. As depicted in FIG. 34B, after formation of the pigment image, the pigment permeation layer and resin layer are formed into a molten film (FIG. 34D) by the thermocompression bonding treatment (FIG. 34C), the release sheet is then released (FIG. 34E), and the tacky layer and an image support are laminated together (FIG. 34F). Consequently, the printed print medium (printed material) can be applied to various image supports. In the present example, when the pigment permeation layer and resin layer are formed into a molten film by thermocompression bonding (FIG. 34C), heat generated by the heat roller 21 is transmitted to the tacky layer 1900 via the pigment permeation layer 1600, the solvent absorption layer 1601, and the substrate 50. At this time, heating is provided to the extent that a tackifer in the tacky layer is inhibited from being melted such that a shearing force exerted, by the pressurization rolls 21, 22, on the tacky layer 1900 between the release sheet 1901 and the substrate 50 is prevented from exceeding a tacky force exerted between the release sheet 1901 and the substrate 50. Consequently, the temperature of the tacky layer can be kept low in spite of the heating in the thermocompression bonding treatment to enable suppression of thermal degradation of the tacky layer 1900, allowing an appropriate tackiness to be maintained. In the ink jet print medium in the present example is effective when used for labels and when the ink jet print medium in the present embodiment is applied to the image support for sign and display applications.

Each of the components of the ink jet print medium 1 in the present embodiment will be more specifically described.
(1.2 Substrate)

The substrate has a function to serve as a conveying layer during image printing when an ink jet print image is formed, to restrain the ink jet print medium 1 from being curled to allow the ink jet print medium 1 to be appropriately conveyed. To allow the substrate 50 to be more appropriately conveyed, a well-known conveyance assist layer configured to suppress slippage and the like may be provided on the back surface of the substrate 50. An adhesion layer 1602 (see FIGS. 5A to 5D) may be applied to the front surface of the substrate 50. In this case, the adhesion layer 1603 may be provided with any other function, for example, a functional layer such as a pre-image layer. A heat seal layer or the like may also be provided that enables thermal bonding to the pigment permeation layer 1600. A tacky layer and a release sheet may be provided on the back surface of the substrate as depicted in FIGS. 34A to 34F.

The substrate 50 may be pre-provided with a pre-image layer such as a colored image or a hologram image by a general-purpose drawing technique such as gravure printing or laser processing. As the substrate 50, a transparent substrate, an opaque substrate, a colored substrate, or the like may be selected as needed. A substrate may be selected that is suitable for a direction in which the pigment image is viewed and for the intended purpose. White printing may be applied exclusively to a part of the transparent substrate 50 as a pre-image layer to provide a partially white layer. The partially white layer is suitable for powder package applications among other packaging material applications. That is, the partially white layer improves the visibility of a color image formed on the partially white layer. A part of the substrate that has no white layer is a transparent film, which allows the packaged content to be viewed and checked, allowing medication errors to be prevented.

The substrate 50 in the ink jet print medium is enabled to have a mechanical strength or the protect function of a physical back-surface protect film serving as a water resistant layer or a UV or ozone protect layer. The substrate 50 can also be utilized as an optical functional layer serving as a white masking layer or a fluorescence, phosphorescence, and luminescence layer.
(1.2.1 Material of the Subject)

The ink jet print medium of the present invention can be used not only for operational or industrial applications in the fields of sign and display and graphic arts but also for various intended purposes such as personal printing applications for photographs, business cards, postcards, and the like. For such intended purposes, a rolled print medium is desirably used when image printing is performed at high speed and when a large-sized image is printed. The ink jet print medium can be more appropriately conveyed by setting the thickness of the substrate 50 preferably to 5 µm or more and 100 µm or less and more preferably to 15 µm or more and 50 µm or less.

In contrast, for the substrate 50 for a cut sheet or a plate-like ink jet print medium, the substrate 50 that is excellent in mechanical strength and hardness is preferably used as a conveying layer in view of its curling resistance and sheet feeding capability. The thickness of the substrate 50 is set preferably to 3 µm or more and 300 µm or less and more preferably to 50 µm or more and 150 µm or less. However, the thickness of the substrate 50 may be determined as needed taking the conveying capability and the material strength into account, and is not particularly limited. In short, appropriate conveying capability may be maintained according to the intended purpose.

A preferable material for the substrate 50 is often polyethylene terephthalate (PET) in view of its mechanical properties and thermal properties. However, a resin forming the substrate 50 may be selected as needed according to the intended purpose of the ink jet print medium, and may be any of various materials listed below.

Examples of the material of the resin film forming the substrate 50 include polyester resins such as polyethylene terephthalate, polybutylene terephthalate, and a polyethylene terephthalate/isophthalate copolymer; polyolefin resins such as polyethylene, polypropylene, and polymethylpentene; polyethylene fluoride-based resins such as polyvinyl fluoride, polyvinylidene fluoride, polytetrafluoroethylene, and an ethylene-tetrafluoroethylene copolymer; aliphatic polyamide resins such as nylon 6 and nylon 6,6; vinyl polymer resins such as polyvinyl chloride, a vinyl chloride/vinyl acetate copolymer, an ethylene/vinyl acetate copolymer, an ethylene/vinyl alcohol copolymer, a polyvinyl alcohol, and vinylon; cellulose-based resins such as cellulose triacetate and cellophane; acrylic-based resins such as polymethyl methacrylate, polyethyl methacrylate, polyethyl acrylate, and polybutyl acrylate; and any other synthetic resin such as polystyrene, polycarbonate, polyarylate, or polyimide, for example, a polyamide-based resin. An example of a commercially available material is Microtron manufacture by Torei Industries, Inc.

One type of resin film may be solely used or two or more types of resin films may be combined or stacked. Besides, glass, a metal plate, or wood may be used. A resin may be used to which a filler such as silica, alumina, or graphite is added to improve heat conductivity. Well-known fillers other than those described above may be used.

Among the above-described materials, given high-speed printing, the polyamide-based resin may be preferably used due to its high heat conductivity and excellent strength and dimensional stability. For example, among commercially available materials, Microtron (trade name) manufacture by Torei Industries, Inc. is preferably used. Given low-speed printing, polyethylene terephthalate or the like is preferably used due to its low price and excellent strength and dimensional stability.

The substrate 50 may be based on paper. The type of the paper is not particularly limited. Examples of the paper contained in the paper-based substrate may include capacitor paper, glassine paper, parchment paper, paper with a high sizing degree, synthetic paper (polyolefin-based or polystyrene-based), high-quality paper, art paper, coat paper, cast-coated paper, wall paper, backing paper, synthetic-resin or emulsion impregnated paper, synthetic-rubber-latex impregnated paper, synthetic resin-containing paper, paperboards, cellulose fiber paper, and cellulose nanofibers. Besides, the substrate 50 may be a magnet sheet including a synthetic rubber sheet containing a thin-plate-like magnetic substance. The use of the magnetic sheet for the substrate allows the ink jet print medium to be easily attached to equipment installed in a kitchen such as a metallic refrigerator.

The ink jet print medium of the present invention may be used as a packaging film for various gifts, packages for medical products and medicines, PTP packages, blister packages, and the like. In such a case, a heat seal layer may be provided in a surface opposite to a surface of the substrate 50 that contacts the ink receiving layer 1601. If the substrate is used as a packaging film, among the above-described materials, a resin film containing the polypropylene-based resin is preferably used as the substrate 50. For the packaging film, it is desirable to prevent burrs generated in the ink receiving layer at a tear resulting from unwrapping, peel-off of the ink receiving layer 53 from the substrate 50, breakage of the ink receiving layer resulting from folding, and the like. In this regard, it is especially preferable to use the polyolefin for the substrate 50 the polypropylene-based resin has a high affinity for the water-soluble resin contained in the ink receiving layer. Thus, when a resin film containing the polypropylene-based resin is used as the substrate 50, the substrate 50 and the ink receiving layer can be more appropriately bonded together. Crystalline polypropylene (homopolypropylene) or a copolymer or a terpolymer of the polypropylene resin copolymerized with ethylene, butene, pentene, hexene, or the like may also be used as the polypropylene-based resin so long as these materials can provide a certain degree of rigidity.

The transparency of the substrate 50 is not particularly limited and may be selected as needed according to the direction in which the image is viewed and the intended purposed. For example, when the pigment image formed at the bottom of the pigment permeation layer like a dense thin film is viewed from the pigment permeation layer 1600 side, the substrate 50 may contain a white pigment of metal or resin particulates with a large particle size, hollow resin particulates, or the like which are likely to scatter visible light, so as to function as a background masking layer. When luminescent particles are added to the substrate, the substrate can be utilized as a fluorescence, phosphorescence, and luminescence layer to further improve image visibility. In a case where the solvent absorption layer or the substrate is provided with a function to serve as a background masking layer, the solvent absorption layer need not be transparent, and thus, design specialized for liquid absorption capabilities can be achieved, such as high-speed absorption and large-volume absorption of the solvent components of the pigment ink, which are the original functions of the solvent absorption layer. Therefore, in a case where the solvent absorption layer or the substrate is provided with a function to serve as a background masking layer, the ink absorption capability, which is the basic function of the ink jet print medium of the present invention, can be further improved, allowing formation of an image that has a higher definition and higher quality and that is excellent in visibility. On the other hand, for example, when the pigment image formed at the bottom of the pigment permeation layer like a dense thin film is viewed from the substrate side, a highly transparent substrate may be used. In such a case, the solvent absorption layer also needs to be transparent, and thus, the solvent absorption layer 1601 may be softened and formed into a molten film to avoid a decrease in transparency resulting from light scattering in the air gaps in the solvent absorption layer 1601 and at the interface of the resin particles.

(1.2.2 Pre-Print Layer)

In order to improve designability of the printed material, the substrate 50 may be provided with a pre-print layer on which an image has been printed. An auxiliary image (pre-print) may be printed on the substrate 50. White printing may be applied to a part of the substrate to form a partially white layer. Applying the partially white layer to the substrate 50 allows improvement of visibility of the color image formed on the partially white layer. The pre-print layer may be pre-printed on the substrate by a well-known printing method such as gravure printing. An optical additional image layer such as a hologram layer may be additionally provided on the substrate by laser writing or the like.

(1.2.3 Sticking Layer and Peeling Sheet)

When the print medium 1 of the present embodiment is applied to the image support for sign and display applications, label applications, and the like, a tacky layer 1900 and a release sheet 1901 may be provided as depicted in FIG. 34A. As depicted in FIG. 34B, after formation of the pigment image (B), the substrate can be applied to various image supports by melting the pigment permeation layer 1600 into a molten film (FIG. 34D) by the thermocompression bonding treatment (FIG. 34C), peeling off the release sheet (FIG. 34E), and laminating the tacky layer and the image support together (FIG. 34F). A tackifier material forming the tacky layer is not particularly limited, and any tackifier material may be preferably used that can be bonded to the image support by being subjected to a slight pressure. The release sheet may include a substrate coated with a release agent. A substrate of the release sheet 901 may be similar to the substrate of the above-described ink jet print medium. On the other hand, examples of the release agent include silicone-based materials such as silicone wax and silicone resin which are represented by waxes such as silicone wax; fluorine-based materials such as fluorine resin; and polyethylene resin.

(1.2.4 Heat Seal Layer)

Figure 6A:
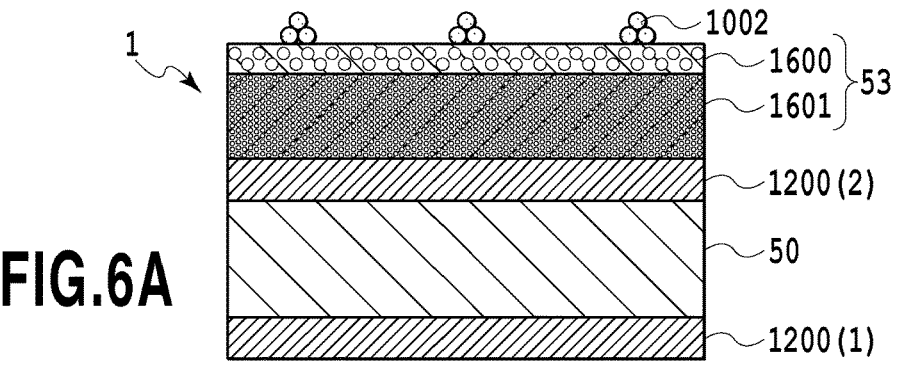
FIGS. 6A to 6D are diagrams illustrating a layer configuration in a case where the ink jet print medium is used as a packaging material.

When the print medium 1 of the present embodiment is used as a packaging material, the substrate 50 may include a heat seal layer in one surface or both surfaces of the substrate 50. As depicted in FIG. 6A, a configuration in which the substrate 50 includes the heat seal layer will be described. The substrate 50 includes a heat seal layer 1200 (1) that is provided in a surface thereof (a lower surface in FIG. 6A) opposite to the ink absorption layer 53 side surface and that is excellent in bonding capability. A heat seal layer 1200(2) between the substrate 50 and the solvent absorption layer 1601 need not necessarily be provided but acts as the adhesion layer 1603. The print medium 1 is configured by providing the solvent absorption layer 1601 of the air gap absorption type on the substrate 50 and providing the pigment permeation layer 1600 on the front surface of the solvent absorption layer 1601.

Figure 6B:
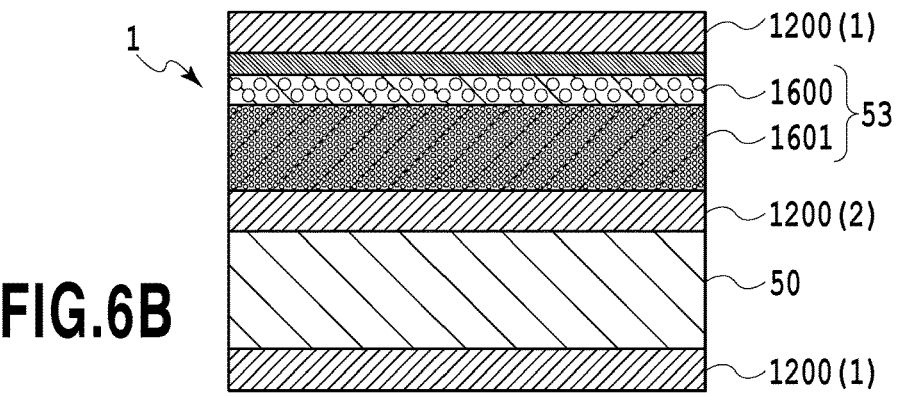
Figure 6C:
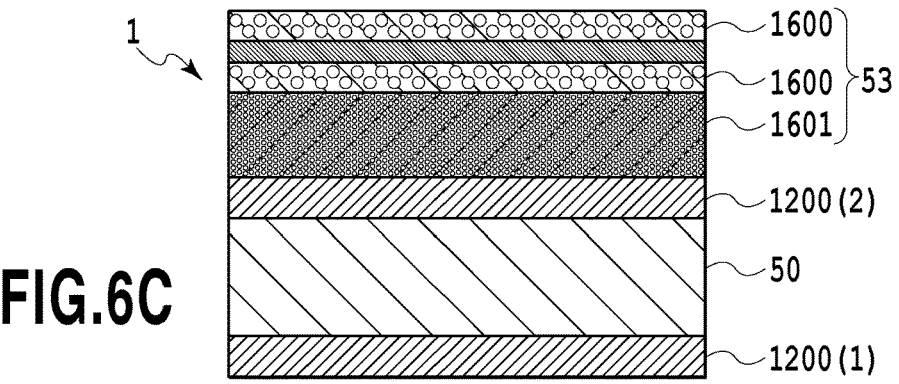
Figure 6D:
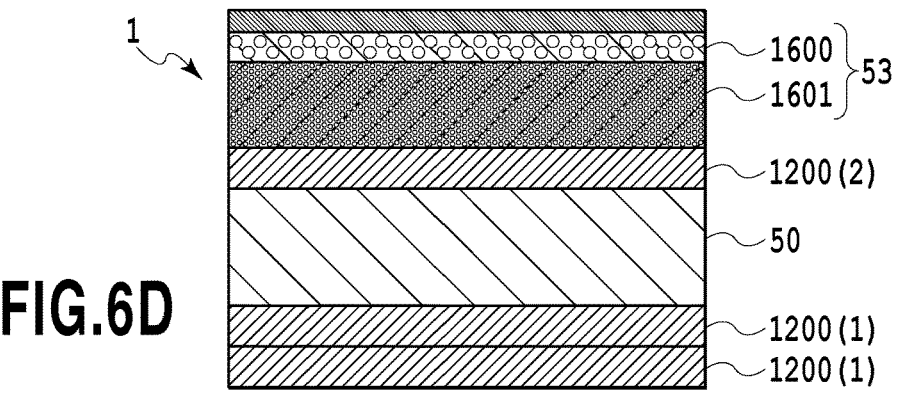

The print medium 1 can be folded back and bonded to the heat seal layer 1200(1) via the pigment permeation layer 1600. For example, the heat seal layer 1200(1) can be bonded to the pigment permeation layer 1600 as depicted in FIG. 6B, and another pigment permeation layer 1600 can be bonded to the pigment permeation layer 1600 as depicted in FIG. 6C. Alternatively, another heat seal layer 1200(1) can be bonded to the heat seal layer 1200(1) as depicted in FIG. 6D. The resin layer 1012 may be provided on the front surface of the pigment permeation layer as a front-side heat seal layer 1200. The front-side heat seal layer and the back-side heat seal layer may be utilized as the front and back heat seal layers.

A heat sealable resin material forming the heat seal layer is preferably at least one of the polyethylene-based resin and the polypropylene-based resin. Examples of the polyethylene-based resin include HDPE, LDPE, and L•LDPE. On the other hand, examples of the polypropylene-based resin include a propylene-α-olefin copolymer and a mixture thereof. In this case, in view of heat sealability, film transparency, and damage resistance, the content of constitution units derived from α-olefin is suitably 3 to 50 mole %. The resin may be either a random copolymer or a block copolymer, but the random copolymer is preferable. Examples of the above-described α-olefin include ethylene, 1-butene, 1-pentene, 1-hexene, 1-heptene, 1-octene, 1-nonene, 1-decene, 4-methyl-1-pentene which have a carbon number of 2 to 10. Two or more types of such α-olefin may be used.

Among the above-described heat sealable resin materials, the propylene-based resin is preferable because the resin can be bonded at relatively low temperature. The heat sealable resin material preferably has a lower melting point than the polypropylene-based resin or the like which may form the substrate. As such a material, the following are preferably used: an ethylene butene-1 copolymer, an ethylene-propylene-butene-1 copolymer, an ethylene-acrylate copolymer, an ionomer resulting from crosslinking of ethylene-acrylate copolymer molecules with metal ions, a polybutene-1, a butene-ethylene copolymer, a propylene-ethylene copolymer, a propylene-butene-1 copolymer, a propylene-pentene copolymer, a mixture of two or more of these materials, and a mixture of polypropylene with any of the above-described materials. No restriction is imposed on the material of the heat seal so long as the bonding capability can be achieved according to the intended purpose or use.

The print medium 1 configured as described above may preferably be used for applications such as a packaging material used to package a box. When used as a packaging material, the substrate 50 functions not only as a protect layer for ink jet print images but also as a protect layer that protects a box when a package used to package the box is manufactured. The heat seal layer 1200(2) may also be provided between the substrate 50 and the solvent absorption layer 1601. In this case, since the component material of the heat seal layer 1200(2) has an affinity for the pigment permeation layer 1600 and the solvent absorption layer 1601, it is possible to improve the bonding between the heat seal layer 1200(2) and the pigment permeation layer 1600 and between the heat seal the solvent absorption layer 1601. Thus, folding resistance of the substrate 50 can be improved when the substrate 50 is used as a packaging material.

(1.2.4.1 Example Use as a Package)

Figure 11A:
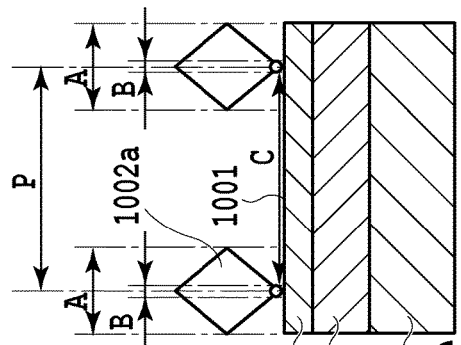
FIGS. 11A to 11E are diagrams illustrating a relation between the shape of each piece of thermoplastic resin 1002 and an exposed portion 1001 of the ink receiving layer.
Figure 11B:
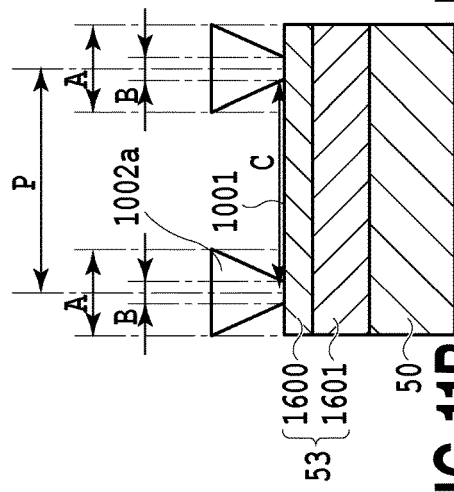
Figure 11C:
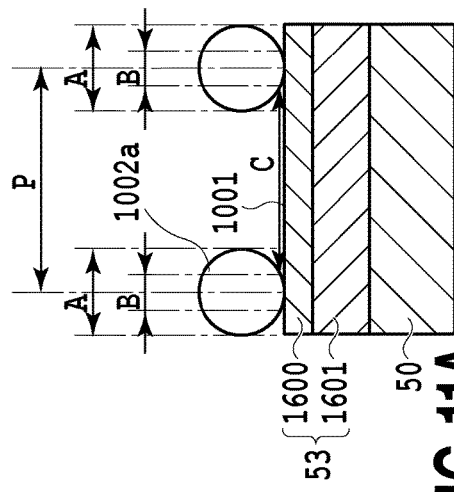

Now, FIGS. 11A to 11C illustrate an example where the print medium in the present embodiment is used as a package.

(Caramel Wrap)

Figure 7A:
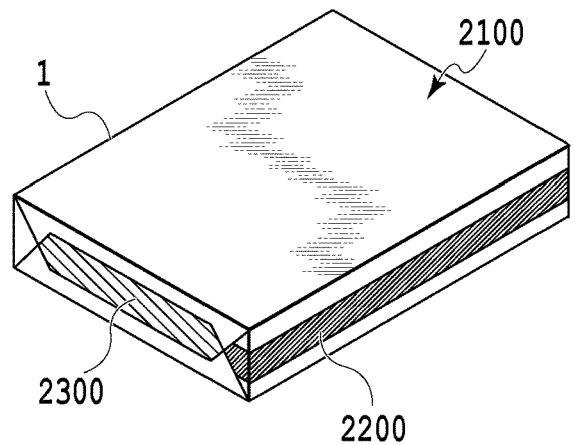
FIGS. 7A to 7C are perspective views schematically illustrating an example of a package including the ink jet print medium.

FIG. 7A is a perspective view schematically depicting an example of a package. A package 2100 in FIG. 7A is a package target caramel-wrapped in the print medium 1. A front surface of the package 2100 may be either the pigment permeation layer 1600 or the heat seal layer 1200(1) depending on the intended purpose. Overlap portions 2200 and 2300 are portions where the pigment permeation layer 1600 and the heat seal layer 1200(1) are bonded together. The package 2100 is produced by thermocompression bonding the overlap portions 2200 and 2300 between the where the pigment permeation layer 1600 and the heat seal layer 1200(1) overlap each other.

Figure 7B:
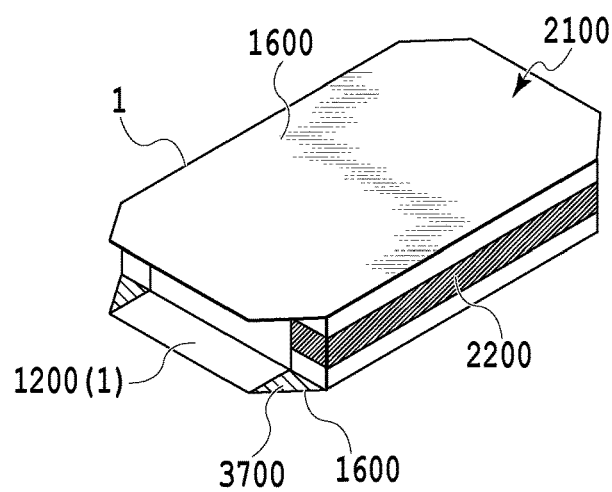
Figure 7C:
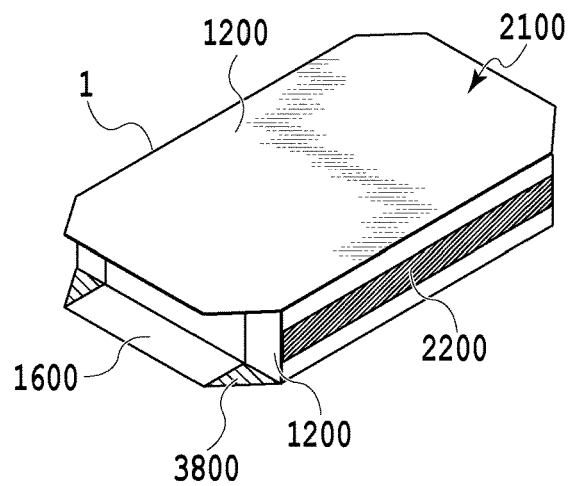

FIG. 7B is a diagram illustrating an example of production of the package 2100. FIG. 7C is a diagram illustrating another example of production of the package 2100. In the package 2100 depicted in FIG. 7B, the pigment permeation layer 1600 is positioned on the front surface of the pigment permeation layer 1600. Thus, after the package 2100 is produced, an image can be printed on the front surface of the package 2100. In FIG. 7C, the heat seal layer 1200(1) is positioned on the front surface of the package 2100. Thus, an image can be printed before the package 2100 is formed. During a process of forming the package 2100, the pigment permeation layers 1600 contact each other in the overlap portion 3700 in FIG. 7B, and the heat seal layers 1200(1) contact each other in the overlap portion in FIG. 7C. In this manner, the heat seal layer 1200(1) provided in one of the surfaces of the substrate 50 allows the heat seal layers 1200(1) to be bonded together.

As described above, in the package 2100 in FIG. 7A, an appropriate bonding state is established in the overlap portions 2200 and 2300, thus allowing prevention of floating in the overlap portions resulting from inappropriate bonding.

In the package depicted in FIG. 7B, the pigment permeation layers 1600 contact each other in triangular overlap portions 3700, allowing the pigment permeation layers 1600 to be thermally bonded to each other. Thus, subsequent thermal bonding (thermal bonding between the pigment permeation layer 1600 and the heat seal layer 1200 and thermal bonding between the heat seal layers 1200) can be accurately achieved in fold-back trapezoidal portions and the like, allowing the package to be produced neatly and stably.

In the package 2100 depicted in FIG. 7C, the heat seal layers 1200 contact each other in a triangular overlap portion 3800, allowing the heat seal layers 1200 to be thermally bonded to each other. Thus, subsequent thermal bonding (thermal bonding between the heat seal layer 1200 and the pigment permeation layer 1600 and thermal bonding between the pigment permeation layer 1600) can be accurately achieved in fold-back trapezoidal portions and the like, allowing the package to be produced neatly and stably.

(Butt Seaming)

Figure 8:
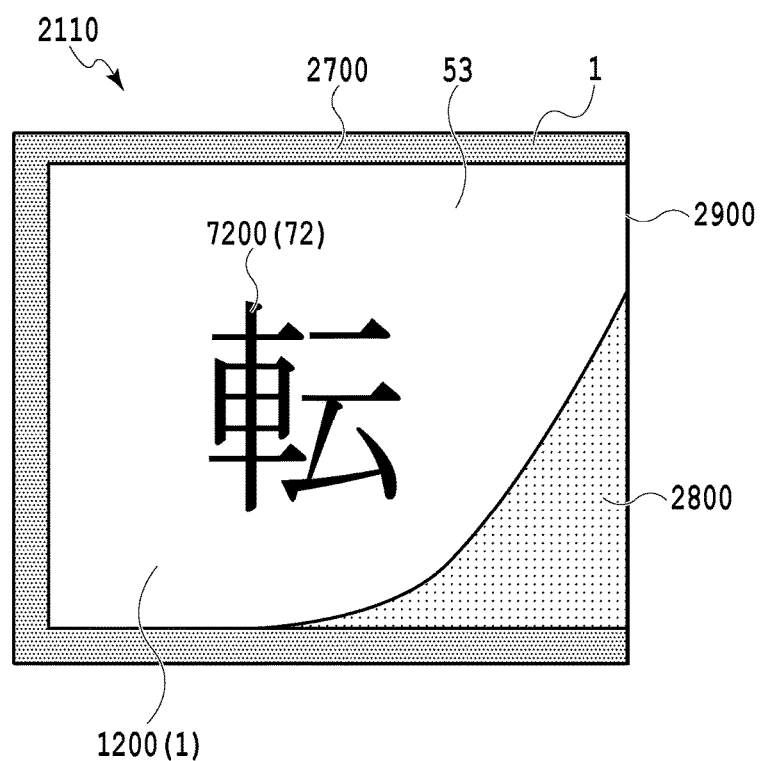
FIG. 8 is a plan view schematically illustrating another example of the package including the ink jet print medium.

FIG. 8 is a top view schematically illustrating a package 2110 that is another example of the package. The package 2110 in the present example is a bag-type package. In the bag-type package 2110, the ink jet print medium is folded back at a folding portion 2900 such that the pigment permeation layer is positioned in an inner surface, whereas the heat seal layer 1200(1) is positioned in an outer surface. The package 2110 is produced by thermocompression bonding (butt seaming) an overlap portion 2700 where the pigment permeation layers 1600 overlap each other to bond the pigment permeation layers 1600 together. In this case, an inverted image is printed in the pigment permeation layer 1600 positioned in an ink jet print surface of the print medium 1, that is, in the inner surface of the package 2110. To suppress peel-off of the print surface due to contact between the ink jet print surface of the ink jet print medium and the content and fall-off of the ink receiving layer 53 (fall-off of oily powder), all of the front surface of the pigment permeation layer 1600 is preferably formed into a molten film for protection.

If the content is powder 2800, peel-off of the print surface and fall-off of the ink receiving layer 53 (fall-off of oily powder) need to be more reliably suppressed. In such a case, the ink jet print medium is folded back at the folding portion 2900 such that the heat seal layer 1200(1) is positioned in the inner surface, whereas the pigment permeation layer is positioned in the outer surface. The package 2110 may be produced by thermocompression bonding (butt seaming) the overlap portion 2700 where the heat seal layers 1200(1) overlap each other. In this case, after the package 2110 is produced, a normal image 72 is printed on the pigment permeation layer 1600 on the outer surface side. When, as a printing method for the normal image 72, an ink jet method is adopted that enables the image to be printed in a non-contact manner, possible thermal damage to the content can be reduced. Unlike a thermal transfer method, the ink jet method enable the image to be printed after sealing of the content (powder 2800), preferably allowing free selection of the type of the image, a print position, and the like. To suppress peel-off of the print surface resulting from rubbing, the printed image can be protected by a protect film by thermally treating the print surface to the extent the content is inhibited from being thermally damaged to form the pigment permeation layer 1600 into a molten film.

(1.3 Solvent Absorption Layer)

The solvent absorption layer 1601 in the ink jet print medium 1 in the present embodiment is a layer that receives and absorbs the water components and solvent components of the pigment ink applied in the ink jet printing system. As depicted in FIG. 6A, the pigment ink 1003 infiltrating and diffusing through the thin-film pigment permeation layer 1600 quickly reaches the interface between the pigment permeation layer 1600 and the solvent absorption layer 1601. Since the pigment permeation layer 1600 is configured to have an average pore size larger than the particle size of the pigment particles, the pigment ink, containing the pigment, infiltrates and diffuses through the thin-film pigment permeation layer 1600. However, the pigment particles 1606 fail to permeate the solvent absorption layer 1601 with an average pore size smaller than the particle size of the pigment particles 1606, resulting in formation of a dense thin-film-like pigment image at the pigment permeation layer 1600-side interface. The solvent components 1607 having permeated the pigment permeation layer 1600 are absorbed by the solvent absorption layer 1601 configured to have a higher ink absorption speed than the pigment permeation layer 1600. As a result, substantially none of the solvent components 1607 remain on the pigment permeation layer 1600 side, and substantially all of the solvent components 1607 are absorbed by the thick-film solvent absorption layer 1601 (see FIG. 6B). To allow all of the solvent components 1607 to be quickly absorbed by the solvent absorption layer 1601, the solvent absorption layer 1601 is preferably used that is of the air gap absorption type having a significantly high ink absorption speed and a sufficient absorption capacity. In the solvent absorption layer 1601, air gaps each smaller than each pigment particle may be formed. For example, in a case where the air gap structure is formed using particulates sufficiently smaller than a visible light wavelength (approximately 380 nm to 780 nm) and a binder, the air gaps can be configured using the particulates sufficiently smaller than the visible light wavelength. This enables suppression of haze degradation resulting from scattering of visible light in the air gap structure and at the surfaces of the particulates, providing excellent image visibility. Furthermore, as depicted in FIG. 5C, the solvent absorption layer 1601 may be divided into a plurality of layers 1601 in order to increase the ink absorption capacity while enhancing the transparency of the solvent absorption layer 1601. In this case, the adhesion layer 1603 may be effectively interposed between the plurality of solvent absorption layers 1601. In a case where the solvent absorption layer is formed into a plurality of layers, the solvent absorption layer 1601 are preferably configured such that each solvent absorption layer has the basic functions of an ink receiving layer of the air gap absorption type and such that the ink absorption speed of each of the plurality of solvent absorption layers sequentially increases toward the substrate 50 side.

The ink receiving layer of the air gap absorption type may have air gaps through which the pigment ink is quickly absorbed by the capillary phenomenon based on the porous structure. The receiving layer of the air gap absorption type may be formed of, for example, diatomaceous earth, a sponge, microfibers, a water absorptive polymer, a set of resin particles and water-soluble resin, or a set of inorganic particulates and water-soluble resin. The solvent absorption layer 1601 of the air gap absorption type is preferably configured to contain inorganic particulates and a water-soluble resin such that the fine air gap structure receives the ink. In the ink receiving layer of the air gap absorption type formed of the inorganic particulates and the water-soluble resin, air gaps into which the ink is absorbed are formed at gaps resulting from binding of the particles with the resin. A large amount of ink can be absorbed into the air gaps. The air gaps between the inorganic particulates bound together with the water-soluble resin are substantially evenly arranged all over the ink receiving layer to allow substantially isotropic permeation of the ink.

In the ink receiving layer of the air gap absorption type, in a case where the air gap structure of the ink receiving layer is broken during thermocompression bonding intended to form the pigment permeation layer 1600 into a molten film, the liquid components of the ink may seep out to the pigment permeation layer. In a case where the liquid components of the ink are subjected to bumping to generate an air layer or the like between the solvent absorption layer 1601 and the pigment permeation layer 1600, the pigment permeation layer 1600 may be hindered from being formed into a molten film. However, in the ink receiving layer provided with air gaps by binding the inorganic particles with a binder of the water-soluble resin, the air gap structure is unlikely to be destroyed in spite of pressure or heat and can be substantially wholly maintained after thermocompression bonding, due to the very hard material of the inorganic particulates. So long as the air gap structure is maintained in spite of heat during thermocompression bonding, even in a case where the liquid components of the ink are subjected to bumping in the individual air gaps to generate vapors, the vapors generated can be sealed in the respective air gaps. This enables suppression of formation of an air layer on the bonding surface, allowing the pigment permeation layer 1600 to be appropriately formed into a molten film. Thus, the water and nonvolatile solvent, which are main solvents of the ink, are restrained from seeping out to the front surface. Even after ink jet printing with the pigment ink, a reverse flow of the solvent to the pigment permeation layer 1600 can be reduced. Therefore, the thermocompression bonding step can be quickly executed on the image support without the need to wait until the solvent absorbed into the solvent absorption layer dries. As a result, the enormous amounts of energy and time needed to dry the solvent components are reduced, allowing the pigment permeation layer and the resin layer to be efficiently formed into a molten film using a simple step. The ink receiving layer of the air gap absorption type formed of the inorganic particulates and the water-soluble resin can be produced without the need for a special orientation treatment or the like, and thus has appropriate productivity.

The inventor's examinations indicate that the solvent absorption layer 1601 of the air gap absorption type formed of the inorganic particulates and the water-soluble resin had an air gap capacity of 0.1 cm³/g to approximately 3.0 cm³/g. In a case where a pore volume is less than 1 cm3/g, sufficient ink absorption performance may fail to be delivered and the ink may overflow, with an unabsorbed ink solvent remaining in the pigment permeation layer 1600. For a pore volume of more than 3.0 cm³/g, the solvent absorption layer 1601 has a reduced strength, and cracking and falloff of oily powder are likely to occur in the solvent absorption layer 1601. In a case where the solvent absorption layer 1601 of the air gap absorption type formed of the inorganic particulates and the water-soluble resin had the above-described air gap volume, the ink receiving layer had a porosity of approximately 60% to 90%. In a case where the solvent absorption layer 1601 had a porosity of 60% or less, in some cases, a sufficient ink absorption capacity failed to be achieved and the ink overflowed, with an unabsorbed ink solvent remaining in the pigment permeation layer 1600. For a porosity of more than 90%, the solvent absorption layer 1601 may have a reduced strength, and cracking and falloff of oily powder may be likely to occur in the solvent absorption layer 1601.

The inventor's examinations indicate that, for the solvent absorption layer 1601 of the air gap absorption type formed of the inorganic particulates and the water-soluble resin, the average of the pore sizes (average pore size) was approximately 5 nm to 100 nm. For an average pore size of less than 5 nm, a sufficient ink absorption capacity may fail to be achieved and the ink may overflow, with an unabsorbed ink solvent remaining in the pigment permeation layer 1600. For an average pore size of 100 nm or more, the pigment particles may fail to be subjected to sufficient solid-liquid separation at the interface with the pigment permeation layer 1600 and infiltrate and diffuse through the solvent absorption layer 1601. Then, the image may be insufficiently colored and exhibit an insufficient resolution, and the solvent absorption layer 1601 may have a reduced strength, with cracking and falloff of oily powder likely to occur in the solvent absorption layer 1601. An appropriate air gap structure was obtained using inorganic particulates with a primary particle size of 5 nm to 100 nm and an aggregate, secondary particle size of 20 nm to 500 nm. To achieve appropriate and stable ink solvent absorptivity and pigment solid-liquid separability and to provide an optically higher transparency, inorganic particulates may preferably be used that have a primary particle size of 10 nm to 40 nm and an aggregate, secondary particle size of 50 nm to 200 nm. In general, the pigment particles have an average particle size of approximately 40 nm to 110 nm, and thus, in a case where the pigment ink containing pigment particles with a small particle size is used, the average pore size of the solvent absorption layer 1601 may preferably be adjusted to 10 nm to 40 nm. The solvent absorption layer 1601 exhibited an appropriate ink solvent absorptivity when having a thickness of 10 µm to 50 µm. However, in a case where a high-visibility, -density, and -definition image needs to be printed, the thickness of the solvent absorption layer 1601 is preferably adjusted to 15 µm to 30 µm.

In the present invention, the gap capacity, the porosity, and the pore size of each air gap can be calculated using a BET method. The "BET method" is a measuring method for the surface area of powder based on gas phase adsorption, and involves measuring the total surface area of a 1-g sample based on an adsorption isotherm. A pore volume is the volume of a pore with a radius of 0.7 nm to 100 nm calculated based on a BJH method using a nitrogen desorption isotherm. An average pore radius is a radius corresponding to a half of the cumulated value of the pore volume corresponding to a pore radius of 0.7 nm to 100 nm in a cumulated pore volume distribution curve determined based on the BJH method using a nitrogen desorption isotherm. In the present invention, the average pore size is a value calculated by doubling the average particle radius. The porosity is the ratio of the pore volume to the total pore volume. Nitrogen gas is normally often used as an adsorption gas, and a method is most often used in which the adsorption amount is measured based on a variation in the pressure or volume of the adsorption target gas. The BET method (Brunauer, Emmett, and Teller Equation) is known as a method for representing an isotherm of multi-molecular adsorption, and is widely used to determine a specific surface area.

The solvent absorption layer 1601 in the ink receiving layer of the air gap absorption type can be formed using resin particles other than the inorganic particulates. For example, a solvent absorption layer provided with air gaps can be formed by using resin particulates having a thermocompression bonding temperature higher than a molten film formation temperature Tg at which the resin particles forming the pigment permeation layer 1600 and thermoplastic resin forming the resin layer are formed into a molten film so that the solvent absorption layer is unlikely to be melted and deformed at the time of thermocompression bonding, and binding the resin particulates together with a binder resin. In a case where the air gap structure is formed using, among the resin particulates, resin particulates for which the molten film formation temperature Tg is higher than the thermocompression bonding temperature, the particle structure is maintained in spite of heat during thermocompression bonding. Thus, the resin particles are inhibited from being melted and collapsed by heat during thermocompression bonding. In many of the resin particulate types in which the resin particles forming the pigment permeation layer 1600 have a high molten film formation temperature Tg, the particle structure forming the resin particulates is rigid, and the particles are relatively hard. Thus, the air gaps are inhibited from being collapsed by pressure. In a case where the solvent absorption layer 1601 is formed using resin particulates with a high molten film formation temperature Tg, the thermocompression bonding step inhibits the main solvent such as water and the nonvolatile solvent from seeping out while flowing back with respect to the pigment permeation, allowing the pigment permeation layer 1600 and resin layer to be appropriately formed into a molten film.

In contrast, the solvent absorption layer 1601 of the air gap absorption type in the ink jet print medium can be configured by using a binder resin to bind resin particulates likely to be melted and deformed during thermocompression bonding. The main solvent components, which are the solvent components of the pigment ink except for the nonvolatile solvent, are typically formed using a volatile solvent such as water or alcohol as a solvent. The main solvent components can be dried even after being absorbed by the solvent absorption layer 1601.

FIG. 32A illustrates that ink jet printing with the pigment ink has been performed on the ink jet print medium 1 having the pigment permeation layer 1600 and the solvent absorption layer 1601 configured using resin particulates likely to be melted and deformed during thermocompression bonding, with the solvent absorbed by the solvent absorption layer 1601. In this state, the ink jet print medium 1 is sufficiently dried until substantially no solvent components remain in the solvent absorption layer, and then, the resin particles in the solvent absorption layer are softened and melted as depicted in FIG. 32B. This allows avoidance of a reverse flow, to the pigment permeation layer, of a very small amount of nonvolatile solvent remaining in the solvent absorption layer 1601. That is, in a case where the solvent absorption layer 1601 is sufficiently dried, and then, the pigment permeation layer 1600 is thermocompression bonded using the heating roller 21 as depicted in FIG. 32C, the pigment permeation layer 1600 and the solvent absorption layer 1601 are melted and integrated together. Consequently, the solvent absorption layer 1660 formed in to a transparent film is obtained, and the small amount of nonvolatile solvent 1607 contained in the pigment ink is held in the solvent absorption layer 1660 formed in to a transparent film (see FIG. 32D). Therefore, the small amount of nonvolatile solvent 1607 remaining in the solvent absorption layer 1601 is inhibited from flowing back to the pigment permeation layer 1600. The molten film 1665 of the pigment permeation layer 1600 is formed in an appropriate state where the molten film 1665 contains no nonvolatile solvent 1607.

The solvent absorption layer 1601 is formed into a molten film by being softened and melted, allowing avoidance of a decrease in transparency resulting from light scattering in the air gaps in the solvent absorption layer 1601 and at the interface of the resin particles. Thus, when the ink jet print medium is used such that the pigment image formed like a dense thin film at the bottom of the pigment permeation layer is viewed from the solvent absorption layer side, the visibility of the image formed is significantly higher than in a case the solvent absorption layer maintains the air gap structure.

The solvent absorption layer 1660 formed into a transparent film by being softened and melted functions as a protect film for the pigment image 1606 formed on the pigment permeation layer 1600. Thus, compared to a solvent absorption layer maintaining the air gap structure, the solvent absorption layer 1601 can be prevented from being degraded by contamination resulting from entry of a pollutant liquid or a toxic gas through the end face of the printed material or the like, and can have its mechanical strength such as its scratch resistance improved, thus allowing long-term storage stability to be further improved.

On the other hand, image visibility from the pigment permeation layer 1600 side is important depending on the intended purpose. In this case, the solvent absorption layer 1601 or the substrate 50 positioned opposite to the pigment image formed like a dense thin film at the interface can be utilized as a background masking layer that masks a background portion of the pigment image while forming a desired background. That is, unlike in a case where the solvent absorption layer 1601 or the substrate 50 needs to be highly transparent, in a case where image visibility from the pigment permeation layer side is needed, the solvent absorption layer 1601 or the substrate 50 is preferably colored in white or made translucent, with the image background formed using a white masking layer.

Such a background masking layer may be formed by, for example, adding a white pigment to the substrate 50 or forming a white resin layer on the substrate 50. Alternatively, a metal film or the like may be additionally provided on the substrate 50 to form a light scattering layer that may be utilized as a background masking layer. In a case where the solvent absorption layer 1601 is utilized as a background masking layer, the solvent absorption layer 1601 may be provided with metal or resin particulates with a large particle size, hollow resin particulates, or the like which are likely to scatter visible light, in addition to particulates with a small particle size that allow smaller air gaps to be formed in the solvent absorption layer 1601. Luminescent particles such as phosphor particulates are added to the substrate 50 or the solvent absorption layer 1601, which is thus utilized as a fluorescent, phosphorescent, and luminescent layer, enabling image visibility to be further improved. In a case where the solvent absorption layer or the substrate is provided with a function to serve as a background masking layer, the solvent absorption layer need not be transparent, and thus, design specialized for liquid absorption capabilities can be achieved, such as high-speed absorption and large-volume absorption of the solvent components of the pigment ink, which are the original functions of the solvent absorption layer. Therefore, in a case where the solvent absorption layer or the substrate is provided with a function to serve as a background masking layer, the ink absorption capability, which is the basic function of the ink jet print medium of the present invention, can be further improved, allowing formation of an image that has a higher definition and higher quality and that is excellent in visibility.

(1.4 Pigment Permeation Layer)

Figure 5D:
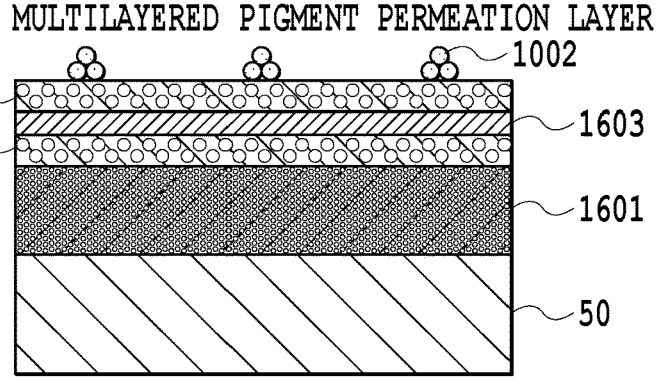

The pigment permeation layer 1600 is a layer that absorbs the pigment of the pigment ink applied in the ink jet printing system, through permeation and diffusion. The pigment permeation layer 1600 is configured to achieve a sufficient ink absorption speed so that, when a droplet of the pigment ink contacts the pigment permeation layer 1600, substantially all of the droplet is quickly drawn into the pigment permeation layer 1600. In a case where the ink absorption speed of the pigment permeation layer 1600 is lower than an ink drying speed, the ink on the front surface of the pigment permeation layer 1600 may be dried and thickened before the ink is absorbed. Thus, a portion of the pigment ink may remain on the front surface. In this case, the image formed offers reduced scratch resistance. Therefore, importantly, the ink absorption speed of the pigment permeation layer 1600 is sufficiently higher than the ink drying speed. When a portion of the pigment ink absorbed and having infiltrated through the front surface of the pigment permeation layer reaches the interface of the solvent absorption layer, the solvent components of the pigment ink start to be absorbed at a higher speed due to the stronger capillary force of the solvent absorption layer having the significantly small air gap diameter. Thus, the pigment ink in the pigment permeation layer infiltrates at a quickly increased speed. When the solvent absorption layer starts to absorb the solvent components at high speed, the pigment ink remaining in the bonding layer and the pigment permeation layer starts to infiltrate at high speed without being broken away due to the viscosity and surface tension of the ink resulting from a low flow resistance of the pigment permeation layer having the large air gap diameter. Thus, in the ink jet print medium of the present invention, even in a case where the pigment permeation layer has a large air gap structure enough to allow the pigment particles to infiltrate and pass through, the time for which the pigment ink infiltrates through and is retained in the pigment permeation layer can be reduced due to the strong capillary force of the solvent absorption layer having the significantly small air gap diameter. Thus, in a case where the pigment permeation layer is formed into a molten film by being pressurized and heated, the pigment ink can be hindered from remaining in the pigment permeation layer and the solvent components can be hindered from remaining in a proximate pigment permeation layer. Consequently, the pigment permeation layer can be appropriately formed into a molten film. The pigment permeation layer 1600 is configured to have an average pore size larger than the particle size of the pigment particles. The pigment ink, containing the pigment, infiltrates and diffuses into the thin-film pigment permeation layer 1600. However, the pigment particles fail to permeate the solvent absorption layer 1601 with an average pore size smaller than the particle size of the pigment particles. Only the solvent components are sequentially absorbed by the solvent absorption layer 1601 configured to have a higher ink absorption speed than the pigment permeation layer 1600 while forming a pigment image like a dense thin film at the pigment permeation layer 1600-side interface. As a result, substantially all of the solvent components are absorbed by the solvent absorption layer 1601 instead of remaining on the pigment permeation layer 1600 side. That is, for the pigment ink printed on the ink jet print medium of the present invention, the pigment particles, which are a color material, are formed into a dense thin-film-like image at the interface with the solvent absorption layer 1601 located in the pigment permeation layer 1600, with substantially all of the solvent components absorbed by the solvent absorption layer 1601. To provide such ink absorption properties, the ink receiving layer of the air gap absorption type including a thin film and having a high ink absorption speed is used as the pigment permeation layer 1600 of the ink jet print medium in the present embodiment. As depicted in FIG. 5D, the pigment permeation layer may be divided into a plurality of layers 1600 that can be sequentially formed. In this case, the pigment permeation layers 1600 are preferably configured such that each pigment permeation layer 1600 has the basic functions of an ink receiving layer of the air gap absorption type and an air gap structure that enables permeation and diffusion of the pigment particles and such that the ink absorption speed of each of the plurality of pigment permeation layers sequentially increases toward the substrate 50 side.

For the basic configuration and the material, the pigment permeation layer 1600, which is an ink receiving layer of the air gap absorption type, is configured to absorb the ink based on the capillary phenomenon in the porous structure of the air gaps between the particulates that are bound together with the resin, like the solvent absorption layer 1601. The pigment permeation layer 1600, containing the pigment particles, needs to have air gaps configured to quickly absorb the pigment ink and to allow quick permeation and diffusion of the pigment ink. The ink absorbed through the front surface of the pigment permeation layer 1600 sequentially permeates the inside of the pigment permeation layer 1600 and is absorbed while spreading in the film thickness direction and in the horizontal direction according to the permeation anisotropy of the pigment permeation layer 1600. The permeation anisotropy of the pigment permeation layer 1600 is designed to allow appropriate control of the spread of the ink dots, which significantly affect the quality of the ink jet print image. That is, in a case where slightly larger ink dots need to be formed, the pigment permeation layer 1600 may be configured to exhibit higher permeability in the horizontal direction (along the front surface of the ink receiving layer) than in the film thickness direction and to have a larger thickness. In contrast, in a case where a high-resolution image needs to be formed using small ink dots, the pigment permeation layer 1600 may be configured to exhibit higher permeability in the film thickness direction than in the horizontal direction and to have a further reduced thickness. In a case where the pigment permeation layer 1600 need not be provided with permeation anisotropy, the pigment permeation layer 1600 may be configured to allow the ink to infiltrate isotropically in order to improve the film productivity of the pigment permeation layer 1600. In this case, the permeability of the whole pigment permeation layer 1600 may be controlled so as to obtain the desired spread of the ink dots, and the film thickness and the like of the pigment permeation layer 1600 may be adjusted according to the desired amount of ink absorbed.

On the other hand, the air gap pore size of the pigment permeation layer 1600 may be significantly larger than the average particle size of the pigment, and the air gaps in the pigment permeation layer 1600 may be filled with the nonvolatile solvent, which corresponds to liquid components of the ink, to some degree. In such a case, image bleeding (color material migration) may be induced depending on storage conditions for the printed material. Thus, for storage stability, importantly, the solvent absorption layer 1601 is set to have a significantly higher ink absorption speed than the pigment permeation layer 1600 so as to allow substantially all of the solvent components of the pigment ink to be quickly absorbed by the solvent absorption layer 1601 instead of remaining in the pigment permeation layer 1600.

The pigment permeation layer 1600 in the present embodiment is formed using the pigment permeation layer 1600 of the air gap type that can be formed into a molten film. The pigment permeation layer 1600 that can be formed into a molten film is formed into a film by the above-described thermocompression bonding treatment so as to enclose the dense image formed at the bottom of the pigment permeation layer 1600. Thus, the pigment color material can be perfectly immobilized, and the fixation between the pigment permeation layer 1600 and the pigment color material can be firmly maintained. In other words, the pigment permeation layer formed into a molten film functions as a firm protect film for the image to improve the scratch resistance of the image. In the pigment permeation layer 1600, the pigment color material is kept dispersed. Thus, an image formed by complicating light paths using reflected light from the pigment color material and reflected light from the pigment permeation layer 1600 gives a massive impression as in oil painting.

In general, in a case where an image is formed on an ink jet print medium with a surface gloss using the pigment ink, the pigment color material covers the front surface of the print medium, thus losing the glossiness of a printed part. This may lead to gloss unevenness between the printed part and a non-printed part. In a case where the ink jet print medium is configured to allow the pigment ink to permeate the inside of the ink receiving layer as in the case of Japanese Patent Laid-Open No. H07-237348 (1995), the ink receiving layer needs to be provided with pores each larger than the particle size of the pigment ink. In a case where the pores are each formed to be larger than the particle size of the pigment color material in order to allow the pigment color material to permeate the inside of the ink receiving layer, the average particle size of the inorganic particulates allowing the air gap structure to be formed needs to be larger than the particle size of the pigment color material. A countless number of recesses and protrusions where the inorganic particulates remain exposed are present on the front surface of the ink receiving layer. In this case, in a part of the front surface of the ink receiving layer formed of inorganic particulates with a large average particle size, larger recesses and protrusions are present on the surface. Therefore, in a case where inorganic particulates with a large average particle size are used, smoothness of the front surface of the ink receiving layer is impaired, and thus, the glossiness of the front surface may be degraded, inhibiting a high-quality image from being obtained. As described above, in a case where the image is formed using the pigment ink, providing the front surface of the printed image with glossiness is difficult.

In contrast, in the present embodiment, the pigment permeation layer 1600 is formed into a molten film so as to enclose the dense image formed at the bottom of the pigment permeation layer 1600, and is thus transparent. Thus, a part of the image printed using the pigment ink can also be provided with glossiness, allowing suppression of a difference in glossiness between the non-printed part and the printed part.

In the present embodiment, in a case where the pigment permeation layer 1600 is formed into a molten film, the ink jet print medium with the image formed thereon is conveyed between the heated heat roller and the pressurization roller. At this time, the fine recesses and protrusions present on the front surface of the heat roll may be transferred to the front surface of the pigment permeation layer formed into a molten film. Then, the surface glossiness of the pigment permeation layer formed into a molten film may decrease, reducing the image visibility of the pigment image. Thus, a roller 1800 subjected to mirror finishing or the like so as to exhibit high smoothness is effectively used. That is, in a case where the print medium is conveyed while being sandwiched between the smoothened heating roller and the pressurization roller to transfer the smooth mirror surface of the heating roller to the pigment permeation layer, the surface glossiness is improved, allowing the image visibility of the pigment image to be enhanced. Based on the surface state of the roller surface of the heating roller, the gloss of the pigment permeation layer can be optionally regulated to the optimal state according to the intended purpose. For example, the front surface of the pigment permeation layer can be smoothened using the roller with enhanced smoothness as depicted. Thus, the pigment permeation layer can be formed to give highly glossy impression. In a case where a heating roller subjected to satin finishing or embossing is used or a heating roller 1801 is used that is provided with a recessed and protruding structure on the surface thereof so as to have a structural latent image, a recessed and protruding image is transferred to the front surface of the pigment permeation layer. Thus, the surface gloss of the pigment permeation layer can be made matte, or in recess-and-protrusion-shaped structural images can be formed on the front surface of the pigment permeation layer.

Furthermore, a surface texture regulation sheet with high smoothness may be used and a smooth surface of the surface texture regulation sheet may be laid on top of the pigment permeation layer. The surface texture regulation sheet and the pigment permeation layer are provided between the heating roller and the pressurization roller to transfer the smooth surface state of the surface texture regulation sheet to the pigment permeation layer. As described above, transfer of the surface state of the surface texture regulation sheet improves the surface glossiness of the ink jet print medium, allowing the image visibility of the pigment image to be enhanced. That is, the use of the surface texture regulation sheet allows the gloss of the pigment permeation layer to be optionally regulated to the optimal condition according to the intended purpose.

For example, the use of the smooth surface texture regulation sheet allows the smooth surface of the surface texture regulation sheet to be transferred to the pigment permeation layer, enabling the pigment permeation layer to be formed to give highly glossy impression. Furthermore, in a case where a surface texture regulation sheet subjected to satin finishing or embossing is used, the recessed and protruding image formed on the surface texture regulation sheet is transferred to the front surface of the pigment permeation layer. Thus, the gloss of the pigment permeation layer can be made matte. Moreover, in a case where the recessed and protruding structure may be pre-provided on a front surface of the surface texture regulation sheet to form the structural latent images, the recess-and-protrusion-shaped structural latent images can be formed on the front surface of the pigment permeation layer. The structural latent images function as hologram images, allowing security of the printed material to be improved.

The pigment permeation layer 1600 that can be formed into a molten film in the present embodiment is in the state of particles forming air gaps before thermocompression bonding and is formed of particulates that are formed into a molten film and a water-soluble resin after the thermocompression bonding.

The particulates are preferably formed of a resin material (resin particulates). The resin particulates function to form air gaps that receive the color material, in the ink receiving layer. The resin particulates can preferably be easily controllably switched between a particle state and a film state based on the molten film formation temperature Tg. That is, in the present embodiment, the molten film formation temperature Tg may be higher than a drying temperature for manufacturing of the ink jet print medium and lower than a heating temperature for thermocompression bonding.

The inventor's examinations indicate that the molten film formation temperature Tg is approximately 30° C. to 120° C. At a molten film formation temperature Tg of 30° C. or lower, when the ink jet print medium is stored at room temperature, the pigment permeation layer 1600 may be formed into a molten film. At a molten film formation temperature Tg of 120° C. or higher, a large amount of heat is needed for thermocompression bonding. Therefore, in a case where an ink jet print medium is configured that is suitable for production of a glossy printed material, the pigment permeation layer may be configured so as to maintain the particle state and thus the air gap structure before thermocompression bonding and such that the resin particles are formed into a molten film after the thermocompression bonding.

In the ink jet print medium in the present embodiment, for the pigment permeation layer 1600 of the air gap absorption type formed of the resin particulates and the water-soluble resin, the average of the pore sizes (average pore size) is approximately 50 nm to 200 nm. In general, the pigment particles have an average particle size of approximately 40 nm to 110 nm, and thus, when a pigment ink containing pigment particles with a large particle size is used, the average pore size of the pigment permeation layer 1600 may preferably be adjusted to 120 nm to 180 nm. For an average pore size of less than 50 nm, the pigment particles may be subjected to solid-liquid separation and accumulated on the front surface of the pigment permeation layer 1600 without infiltrating and diffusing sufficiently into the pigment permeation layer 1600, reducing the scratch resistance of the image. For an average pore size of 200 nm or more, the pigment permeation layer 1600 has a reduced strength and may be likely to suffer cracking and falloff of oily powder.

As the size of the air gaps increases, the capillary force of the air gaps decreases to reduce the ink absorption speed during drawing of the pigment ink into the pigment permeation layer 1600. A reduced ink absorption speed may cause the pigment ink to be retained in the pigment permeation layer 1600, resulting in image bleeding and degraded image quality. For the resin particulates, an appropriate air gap structure was obtained by setting the primary particle size to approximately 50 nm to 200 nm and setting the aggregate secondary particle size to approximately 250 nm to 1 μm. To achieve more appropriate stable ink absorptivity and pigment permeability, the resin particulates may preferably have a primary particle size of 100 nm to 150 nm and an aggregate secondary particle size of 500 nm to 800 nm.

In a case where the pigment permeation layer 1600 had a thickness of 1 μm to 10 μm, appropriate pigment permeability and pigment diffusibility were achieved. In a case where the pigment permeation layer 1600 is thinner than 1 μm, not all of the printed pigment can be housed in the pigment permeation layer 1600, and the pigment may overflow the front surface to reduce the scratch resistance of the image. On the other hand, in a case where the pigment permeation layer 1600 has a thickness of more than 10 μm, the image visibility may decrease. That is, since the pigment permeation layer 1600 is formed of inorganic particulates with a large particle size in order to make each of the air gaps in the pigment permeation layer 1600 sufficiently larger than each pigment particle, in a case where the pigment permeation layer 1600 has a thickness of more than 10 μm, the transparency of the pigment permeation layer 1600 may decrease to reduce the image visibility. When the pigment permeation layer 1600 has a thickness of more than 10 μm, the pigment permeation layer 1600 has a reduced ink absorption speed, resulting in a slightly longer time needed for the ink to reach the solvent absorption layer 1601. As a result, the time for which the solvent of the pigment ink is retained inside the pigment permeation layer 1600 may increase to cause excessive permeation and diffusion of the pigment, leading to image bleeding. The pigment particles, which are a color material, are more likely to disperse widely and remain inside the pigment permeation layer 1600. This may inhibit formation of a dense thin-film-like pigment image at the bottom of the pigment permeation layer 1600, degrading the image coloring capability. Thus, in a case where a high-visibility, -density, and -definition image needs to be printed, an ink jet print medium in which the thickness of the pigment permeation layer 1600 is adjusted to 2 μm to 8 μm is desirably used.

(1.5 Description of the Material of the Ink Receiving Layer of the Air Gap Absorption Type)

Constituent materials of the ink receiving layer of the air gap absorption type used as the solvent absorption layer 1601 or the pigment permeation layer 1600 will be described below. Constituent materials of the ink receiving layer 53 containing inorganic particulates or resin particulates and a water-soluble resin will be specifically described.

(1.5.1 Inorganic Particulates)

The inorganic particulates are particulates formed of an inorganic material. The inorganic particulates have a function to form air gaps that receive the color material, in the ink receiving layer.

The type of the inorganic material forming the inorganic particulates is not particularly limited. However, the inorganic material preferably has a high ink absorptivity and an excellent coloring capability and enables high-quality images to be formed. Examples of the inorganic material include calcium carbonate, magnesium carbonate, kaolin, clay, talc, hydrotalcite, aluminum silicate, calcium silicate, magnesium silicate, diatomaceous earth, alumina, colliodal alumina, aluminum hydroxide, an alumina hydrate of boehmite structure, an alumina hydrate of pseudo-boehmite structure, lithopone (a mixture of barium sulfate and zinc sulfide), and zeolite.

Among the inorganic particulates of any of these inorganic materials, alumina particulates are preferable which are at least one type of material selected from a group consisting of alumina and alumina hydrates. Examples of the alumina hydrate include an alumina hydrate of boehmite structure and an alumina hydrate of pseudo-boehmite structure. The alumina, the alumina hydrate of a boehmite structure, and the alumina hydrate of pseudo-boehmite structure are preferable in that these materials allow enhancement of the transparency of the ink receiving layer, the print density of images, and the visibility of structural latent images.

The inorganic particulates preferably have the average particle size thereof precisely controlled. Reducing the average particle size of the inorganic particulates allows suppression of light scattering and improvement of transparency of the ink receiving layer. For example, viewing an image from the substrate 50 side needs sufficient transparency and a certain degree of transparency of the ink receiving layer itself. Thus, inorganic particulates with a small average particle size are effectively used for the ink receiving layer. A reduced average particle size of the inorganic particulates reduces the air gap diameter of the ink receiving layer and thus the ink absorption capacity and therefore needs a sufficient increase in the thickness of the ink receiving layer.

On the other hand, increasing the average particle size of the inorganic particulates in the ink receiving layer enables an increase in the air gap diameter of the ink receiving layer. Therefore, the ink receiving layer has the transparency thereof reduced by light scattering caused by the inorganic particulates, and thus, in a case where printed information needs to be masked, the particle size of the inorganic particulates is effectively increased. On the other hand, in a case where the inorganic particulates have an increased particle size, the ink receiving layer has a reduced strength. In such a case, to provide the ink receiving layer with an appropriate strength, the amount of binder of the water-soluble resin allowing the inorganic particulates to be immobilized may be increased. Thus, the average particle size of the inorganic particulates may be selected as needed according to the intended purposes of the ink jet print medium and the printed material with the absorptivity and transparency of the ink receiving layer taken into account. One type of inorganic particulates may be solely used or a mixture of two or more types of inorganic particulates may be used. The "two or more" means inorganic particulates with different average particle sizes, different polydispersion indices, or the like in addition to inorganic particulates with different materials.

(1.5.2 Resin Particles)

The resin particulates are particulates formed of a resin material. The resin particulates function to form air gaps that receive the color material, in the ink receiving layer. The type of the resin material forming the resin particulates is not particularly limited. However, the resin material preferably has a high ink absorption capacity, provides a high coloring capability, and enables high-quality images to be formed. Examples of a preferable material for the emulsion E1 include resins such as an acrylic-based resin, a vinyl acetate resin, a vinyl chloride resin, an ethylene/vinyl acetate copolymer resin, a polyamide resin, a polyester resin, a urethane resin, and a polyolefin resin, and copolymer resins thereof.

(1.5.3 Water-Soluble Resin)

The water-soluble resin is a resin that adequately mixes with water or that has a solubility of 1 (g/10 g) or more with respect to water, at 25° C. For the air gap absorption type, the water-soluble resin functions as a binder that binds the inorganic particulates together. Examples of the water-soluble resin include starch, gelatin, casein, and modified materials thereof; cellulose derivatives such as methylcellulose, carboxymethylcellulose, and hydroxyethylcellulose; polyvinyl alcohols (completely saponified polyvinyl alcohol, partially saponified polyvinyl alcohol, low saponified polyvinyl alcohol, or the like) and modified resins thereof (cation modified resin, anion modified resin, modified resin, and the like); and resins such as urine-based resin, melamine-based resin, epoxy-based resin, epichlorohydrin-based resin, polyurethane-based resin, polyethyleneimine-based resin, polyamide-based resin, polyvinyl pyrrolidone-based resin, polyvinyl butyral-based resin, poly (meth) acrylic acid or copolymer resin thereof, acrylamid-based resin, maleic anhydride-based copolymer resin, and polyester-based resin.

Among the water-soluble resins, saponified polyvinyl alcohol is preferable which is obtained by hydrolyzing (saponifying) polyvinyl alcohol, particularly polyvinyl acetate. The ink receiving layer preferably a composition containing polyvinyl alcohol with a degree of saponification of 70 mol % to 100 mol %. The saponification means the percentage of the amount by mole of a hydroxyl group relative to the total amount by mole of an acetate group and the hydroxyl group.

Setting the degree of saponification preferably to 70 mol % or more and more preferably to 86 mol % or more allows the ink receiving layer to be provided with the appropriate hardness and flexibility. This allows improvement of the adhesion between the substrate 50 and the ink receiving layer and enables further suppression of problems such as peel-off of the ink receiving layer from the substrate 50 due to insufficient adhesion. The viscosity of a coating liquid containing the inorganic particulates and polyvinyl alcohol can be reduced. Therefore, application of the coating liquid to the substrate 50 is facilitated, allowing the productivity of the ink jet print medium to be improved.

On the other hand, in a case where the degree of saponification is set preferably to 100 mol % or less and more preferably to 90 mol % or less, the ink receiving layer can be provided with appropriate flexibility and hydrophilicity, enhancing ink absorptivity. Therefore, high-quality image can be printed on the pigment permeation layer 1600.

Examples of the saponified polyvinyl alcohol having a degree of saponification falling within the appropriate range of values include completely saponified polyvinyl alcohol (a degree of saponification of 98 mol % to 99 mol %), partially saponified polyvinyl alcohol (a degree of saponification of 87 mol % to 89 mol %), and low-saponification polyvinyl alcohol (a degree of saponification of 78 mol % to 82 mol %). In particular, partially saponified polyvinyl alcohol is preferable.

The ink receiving layer is preferably a composition containing polyvinyl alcohol with a weight-average degree of polymerization of 2,000 to 5,000. In a case where the weight-average degree of polymerization is set preferably to 2,000 or more and more preferably to 3,000 or more, the ink receiving layer can be provided with appropriate flexibility and the strength of the bonding between the substrate 50 and the ink receiving layer can be improved. This further allows suppression of peel-off of the ink receiving layer from the transparent protective layer due to insufficient adhesive strength.

In a case where a weight-average degree of polymerization is set preferably to 5,000 or less and more preferably to 4,500 or less, the coating liquid containing the inorganic particulates and the polyvinyl alcohol may have a reduced viscosity. Reducing the viscosity of the coating liquid facilitate application of the protect layer, allowing the productivity of ink jet to be improved. Furthermore, the pores in the ink receiving layer can be prevented from being filled with the ink and can thus be maintained in an appropriate opening state, enhancing ink absorptivity. Therefore, a high-quality image can be printed on the ink receiving layer. The values of the weight-average degree of polymerization are calculated in compliance with a test method for polyvinyl alcohol having a degree of saponification of about 70 (mol %) or more.

One type of water-soluble resin may be used alone or two or more types of water-soluble resins may be mixed together. "Two or more types" of water-soluble resins include water-soluble resins with different characteristics such as different degrees of saponification or different degrees of weight-average degrees of polymerization. The amount of the water-soluble resin is preferably 3.3 pts.wt. to 20 pts.wt. relative to 100 pts.wt. inorganic particulates. In a case where the amount of the water-soluble resin is preferably 3.3 pts.wt. or more and more preferably 5 pts.wt. or more, an ink receiving layer with an appropriate strength can be formed in which the air gaps are inhibited from being collapsed by pressure or heat.

On the other hand, in a case where the amount of the water-soluble resin is preferably 20 pts.wt. or less and more preferably 15 pts.wt. or less, an optimal amount of binder is provided for the air gaps in the ink receiving layer. Thus, the ink can be appropriately absorbed, and the air gaps between the inorganic particulates bound together with the water-soluble resin can be substantially uniformly arranged throughout the ink receiving layer 53, allowing substantially isotropic permeation of the ink. In a case where the amount of the water-soluble resin is 3.3 pts.wt. or less, only a small amount of binder binding the inorganic particulates together is provided. Thus, the ink receiving layer is weakened, possibly causing fissuring and falloff of oily powder in the ink receiving layer. This is not preferable. In a case where the amount of water-soluble resin is 30 pts.wt. or more, an excessive amount of water-soluble resin is provided, and the air gaps in the ink receiving layer may be filled with the water-soluble resin, affecting the ink absorptivity. This is not preferable.

(1.5.4 Material of the Contact Layer)

The adhesion layer 1603 may be provided as needed at a boundary surface between any two of the substrate 50 layer, the solvent absorption layer 1601, a plurality of the solvent absorption layers 1601, the pigment permeation layer 1600, and a plurality of the pigment permeation layers 1600 (see FIG. 5A to FIG. 5D). The provision of the adhesion layer 1603 allows prevention of falloff of oily powder in the ink receiving layer. The type of an adhesive primer forming the adhesion layer is not particularly limited. However, for the adhesive primer, a material is preferably selected that has an affinity for the water-soluble resins forming the substrate 50 layer and the solvent absorption layer 1601, a large number of the solvent absorption layers 1601, the pigment permeation layer 1600, or a large number of pigment permeation layers 1600.

Such a material may be formed using, for example, a thermoplastic synthetic resin, a natural resin, rubber, or wax. More specifically, examples of the material include cellulose derivatives such as ethyl cellulose and cellulose acetate propionate, styrene-based resins such as polystyrene and poly α-methyl sytrene, acrylic resins such as polymethyl methacrylate and polyethyl acrylate, vinyl-based resins such as polyvinyl chloride, polyvinyl acetate, a vinyl chloride-vinyl acetate copolymer, polyvinyl butyral, and polyvinyl acetal, synthetic resins such as a polyester resin, a polyamide resin, an epoxy resin, a polyurethane resin, an ionomer, an ethylene acrylate copolymer, and an ethylene-ester acrylate copolymer, and derivatives of natural resins and synthetic rubber such as rosin, a rosin-modified maleic resin, ester gum, polyisobutylene rubber, butyl rubber, styrene butadiene rubber, butadiene acrylonitrile rubber, a polyamide resin, and polychlorinated olefin which are used as tackifiers.

In a case where the ink jet print medium of the present invention is used as a packing material, polyethylene, polypropyrene, or the like may be used. In a case where the adhesion layer 1603 is additionally provided at the boundary surface between the solvent absorption layer 1601 and the pigment permeation layer 1600 or at the interface between the large number of solvent absorption layers 1601 and between the large number of pigment permeation layers 1600, the thickness of the adhesion layer 1603 may be reduced without inappropriately varying the ink absorption speed of each layer. Specifically, the thickness of the peel-off layer that provides an appropriate adhesion function and avoids inappropriate variation of the ink absorption speed is preferably 0.1 µm or more and 10 µm or less, more preferably 0.1 µm or more and 1 µm or less in a dry state. The adhesion layer 1603 may contain a white pigment or a fluorescent, phosphorescent, and luminescent layer in order to improve the visibility of the image formed on the pigment permeation layer 1600.

A method for improving the adhesion of the substrate and the layers forming the ink jet print medium may be, besides the use of the adhesion layer, execution of a surface modification treatment on the surfaces of the substrate and the layers. For example, a corona discharge treatment or a plasma discharge treatment is pre-executed on the surface the adhesion of which is to be improved, or the surface is coated with an organic solvent such as IPA or acetone to increase the roughness of the surface, enhancing the adhesion of the surface. Such a surface treatment is executed on the front surfaces of the substrate 50 layer, the constituent material of the protect layer, and the solvent absorption layer 1601, a large number of the solvent absorption layers 1601A, the pigment permeation layer 1600, or a large number of pigment permeation layers 1600A to enable the adhesion of each layer to be improved.

(1.6 Resin Layer 1012)

In the ink jet print medium 1 of the present embodiment, the resin layer 1012 can be formed by discretely providing the pieces of thermoplastic resin 1002 such that the front surface of the pigment permeation layer 1600 is directly exposed from a part of the resin layer 1012 (see FIG. 1) as needed. Formation of the resin layer 1012 allows further improvement of the scratch resistance of the pigment permeation layer 1600.

The resin layer 1012 is configured such that the pieces of thermoplastic resin 1002 are discretely provided such that the front surface of the pigment permeation layer 1600, which corresponds to the front side of the ink receiving layer 53, is directly exposed from a part of the resin layer 1012. This configuration is hereinafter referred to as a "sea and island structure" or a "sea-and-island-like resin layer 1012" An aggregate of pieces of thermoplastic resin 1002 discretely provided in the resin layer 1012 is described as an "thermoplastic resin portion 1000" or an "island portion". An area where the front surface of the pigment permeation layer 1600 is discretely exposed is described as an "exposed portion (of the pigment permeation layer 1600)". A bypass portion of the resin layer 1012 that includes no thermoplastic resin 1002 may be described as a "sea portion" or a "bypass portion". Therefore, a lower portion of the sea portion (bypass portion) is the exposed portion 1001 of the pigment permeation layer 1600.

In the ink jet print medium 1, the ink receiving layer 53 of the air gap absorption type is disposed on the front surface of the substrate 50, and the resin layer 1012 containing the pieces of thermoplastic resin 1002 is disposed on the front surface of the pigment permeation layer 1600, which is an ink receiving layer located on the front surface of the ink receiving layer 53, as depicted in FIG. 1. The pieces of thermoplastic resin 1002 absorb substantially no ink or absorbs the ink at a low ink absorption speed. On the other hand, the two or more ink receiving layers 53 of the air gap absorption type each have significantly higher ink absorptivity and a higher ink absorption speed than the pieces of thermoplastic resin 1002. Since the pieces of thermoplastic resin 1002 are discretely provided on the front surface of the pigment permeation layer 1600, the resin layer 1012 includes island portions 1000 serving as the thermoplastic resin portions 1000, each of which is an aggregate of pieces of thermoplastic resin 1002, and a sea portion 1014 serving as the bypass portion and including no thermoplastic resin 1002. A part of the front surface of the pigment permeation layer 1600 that corresponds to the sea portion 1014 forms the exposed portion 1001 in which the front surface of the pigment permeation layer 1600 is directly exposed. A portion of the ink having landed on the resin layer 1012 comes into quick contact with the exposed portion 1001 of the pigment permeation layer 1600 via the sea portion 1014 in a bypassing manner, substantially with no intervention of the thermoplastic resin 1002, as depicted in FIGS. 5A and 5B. The ink is then absorbed into the exposed portion 1001 so as to be drawn into the exposed portion 1001.

(1.6.1 Magnitude Relation Between the Thermoplastic Resin 1002 and Ink Droplets)

In a case where each of the pieces of thermoplastic resin 1002 or each aggregate of pieces of thermoplastic resin 1002 in the resin layer 1012 is sufficiently smaller than the size of the ink droplet of the pigment ink, a portion of each ink droplet 1003 comes into direct contact with the pigment permeation layer 1600 exposed like the sea. Thus, the ink droplet is quickly absorbed by the pigment permeation layer 1600 as described above.

Figure 9:
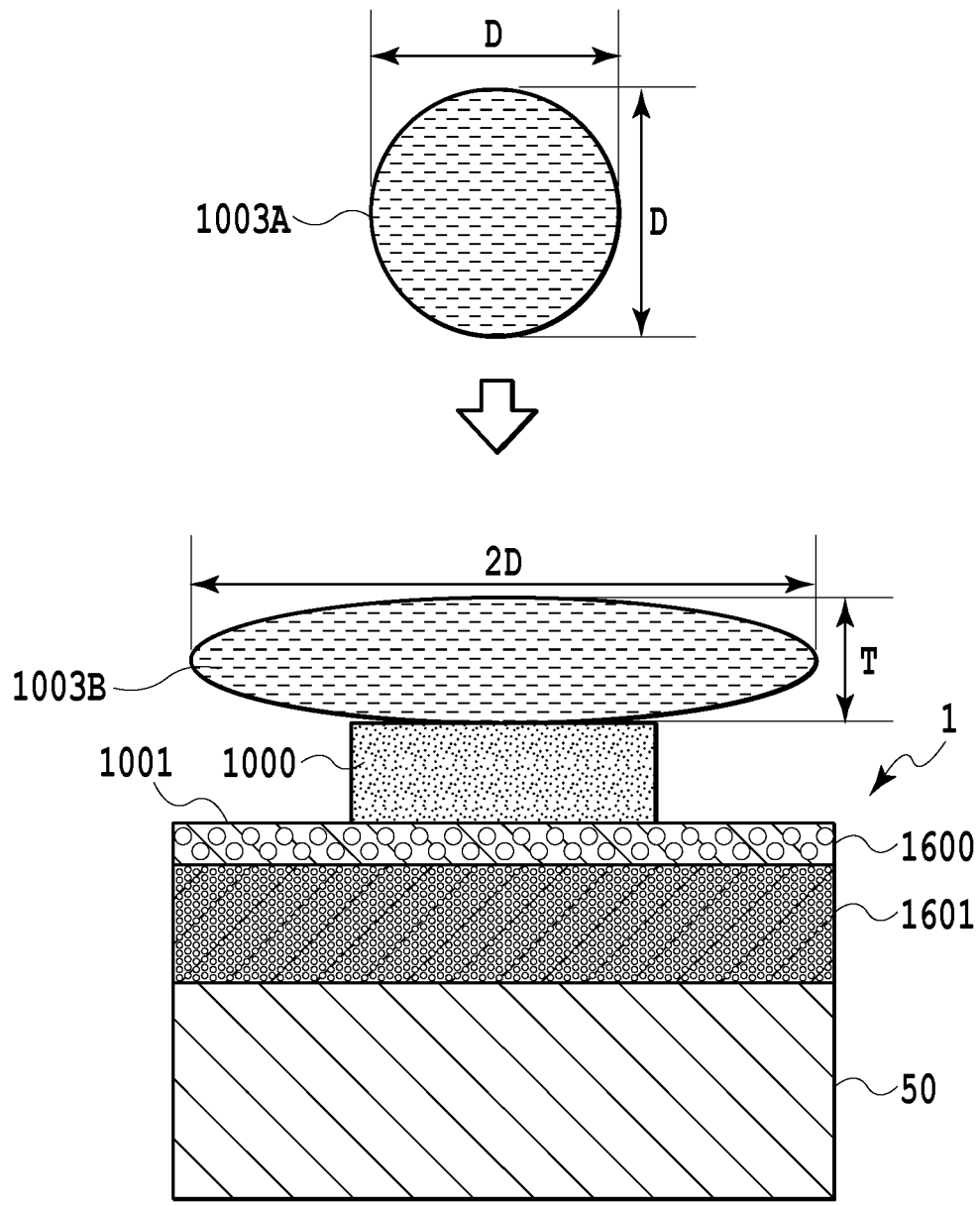
FIG. 9 is a diagram illustrating the state of an ink droplet before landing and the state of the ink droplet at the time of landing.
Figure 10A:
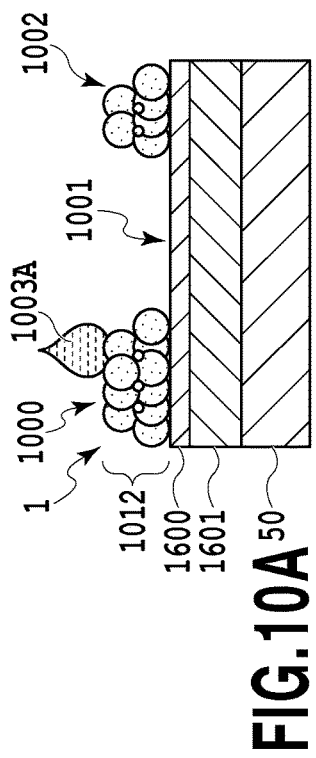
FIGS. 10A to 10F are diagrams illustrating an absorption mechanism for ink in the ink jet print medium of the present invention.
Figure 10B:
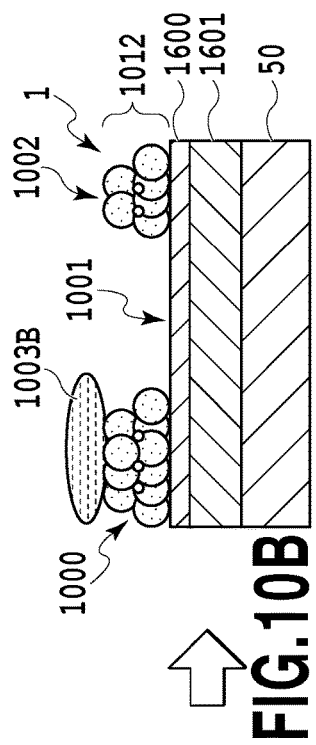
Figure 10C:
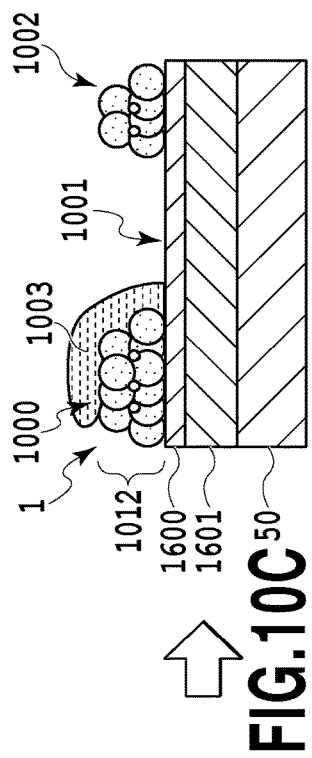
Figure 10D:
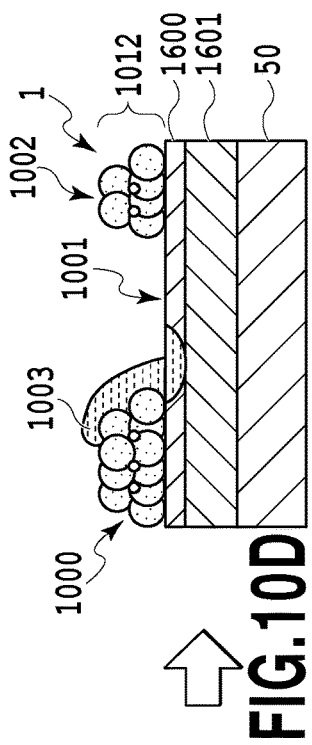
Figure 10E:
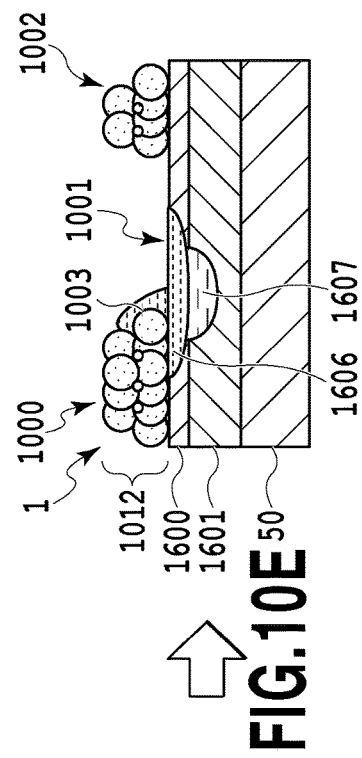
Figure 10F:
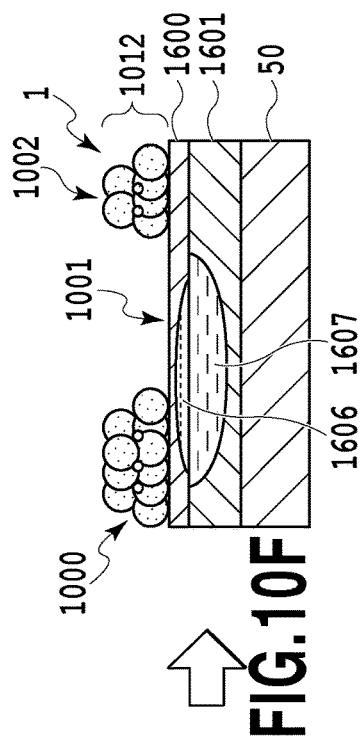

On the other hand, the area of each of the pieces of thermoplastic resin 1002 or the thermoplastic resin portion 1000, which is an aggregate of pieces of thermoplastic resin 1002, may be set equivalent to the diameter of the ink droplet 1003. In this case, a portion of the ink droplet 1003 having landed in the vicinity of the center of the thermoplastic resin portion 1000 included in the resin layer 1012 may fail to contact the exposed portion 1001 of the ink receiving layer 1601 immediately after the landing. However, even in that case, the ink droplet 1003 is subjected to landing deformation and expansion within a time of the order of microseconds to milliseconds as a result of landing impact, and thus, before absorption by the resin layer 1012, the portion of the ink droplet 1003 deformed as a result of landing impact comes into contact with the exposed portion 1001 of the ink receiving layer 53 via the bypass portion 1014, and is absorbed. As depicted in FIG. 9, in ink jet printing, an ink droplet 1003A of a common pigment ink is known to fly at high speed and land at the thermoplastic resin portion 1000 and to spread, as a result of the landing impact, to an ink 1003B shaped like a cylinder having a diameter 2D that is double the diameter D of the ink droplet 1003A and a height T that is approximately one-sixth of the height of the ink droplet 1003A.

FIGS. 10A to 14F are diagrams illustrating a mechanism in which the ink droplet 1003 having landed in the vicinity of the upper portion of the thermoplastic resin portion 1000 is absorbed. As depicted in FIG. 10B, the ink droplet 1003B having landed on and spread over the thermoplastic resin portion 1000 in the resin layer 1012 protrudes out from the thermoplastic resin portion 1000. A portion of the protruding ink 1003 passes through the space (bypass portion 1014) between the thermoplastic resin portions 1000 in a bypassing manner and droops onto the exposed portion 1001 of the pigment permeation layer 1600 as depicted in FIG. 10C. A portion of the drooping ink 1003 can come into direct contact with the exposed portion 1001 of the pigment permeation layer 1600 without passing through the inside of the thermoplastic resin portion 1000. The surface tension and the viscosity of an ink 1003 for ink jet printing are appropriately controlled. Thus, as depicted in FIGS. 10D, 10E, and 10F, when a portion of the ink 1003B that has contacted the exposed portion 1001 starts to be absorbed by the pigment permeation layer 1600, which has a high ink absorption speed, the remaining portion of the ink 1003B that is continuous with the above-described portion starts to be drawn into the pigment permeation layer 1600 without being broken away. In other words, the remaining portion of the ink 1003B that is continuous with the portion of the ink 1003B that has contacted the exposed portion 1001 is drawn into the pigment permeation layer 1600 while sequentially passing through the outside of the thermoplastic resin portion 1000 in a bypassing manner. The ink having thus contacted the pigment permeation layer 1600 permeates the inside of the layered pigment permeation layer 1600. As described above, the ink 1003A having landed on the thermoplastic resin portion 1002 is drawn and quickly absorbed into the exposed portion 1001 of the pigment permeation layer 1600 of the air gap absorption type with a high ink absorption speed substantially without being absorbed by the thermoplastic resin portion 1000. Thus, the ink droplet 1003A having landed in the vicinity of the upper portion of the thermoplastic resin portion 1000 is unlikely to remain on or inside the pigment permeation layer 1600.

In a case where the area of each of the pieces of thermoplastic resin 1002 or the aggregate of pieces of thermoplastic resin 1002 (thermoplastic resin portion 1000) is set larger than the size of the ink droplet, even the ink 1003B deformed and spread as a result of the landing impact may fail to come into contact with the exposed portion 1001 of the pigment permeation layer 1600 via the bypass portion 1000. In this case, the ink remaining in the thermoplastic resin portion 1000 may make appropriate image formation difficult and reduce the scratch resistance of the image 1606. Therefore, each of the pieces of thermoplastic resin 1002 or the aggregate of pieces of thermoplastic resin 1002 (thermoplastic resin portion 1000) is preferably not significantly larger than the ink droplet 1003 of the pigment used for ink jet printing and is more preferably smaller than the size of the ink droplet 1003.

The inventor's examinations indicate, in a case where a portion of the ink 1003 remained on or inside the surface of the thermoplastic resin portion 1000, then in some cases, the remaining ink stood out of the surface of the pieces of thermoplastic resin 1002 and was formed into a film in a case where the pieces of thermoplastic resin 1002 were formed into a molten film using a thermocompression bonding treatment described below. In this case, the image portion formed into a film on the surface of the pieces of thermoplastic resin 1002 was exposed to reduce the scratch resistance of the image in the printed material. In a case where a portion of the ink remained on the front surface of or inside the thermoplastic resin portion 1000, then in some cases, some of the components of the remaining ink 1003 vaporized to form a vapor layer or the like in a case where the pieces of thermoplastic resin 1002 were formed into a molten film during thermocompression bonding. Then, the pieces of thermoplastic resin 1002 were inappropriately formed into a molten film. In the ink jet print medium 1 of the present embodiment, as described above, substantially no ink 1003 remains on the front surface of or inside the pigment permeation layer 1600, with substantially all of the liquid components of the pigment ink quickly absorbed by the solvent absorption layer 1601. Thus, even in a case where the thermocompression bonding treatment is executed immediately after ink jet printing, the pigment permeation layer 1600 and the resin layer 1012 are unlikely to be inappropriately formed into a molten film. This allows the image on the printed material to be provided with appropriate scratch resistance.

(1.6.2 Shape of the Thermoplastic Resin 1002)

In a structure where the resin layer 1012 is provided on the pigment permeation layer 1600 and the pieces of thermoplastic resin 1002 in the resin layer 1012 are discretely provided, a white point may occur at a part of the pigment image formed on the pigment permeation layer 1600 which part is located immediately below the corresponding pieces of thermoplastic resin 1002 and which corresponds to a non-image portion. To suppress a possible white point, preferably, the area of the pigment permeation layer 1600 is maximized and the distance between the exposed portions 1001 is reduced to set a small value for the area where the lower portion of the particle-like pieces of thermoplastic resin 1002 contacts the front layer of the pigment permeation layer 1600. On the other hand, to obtain appropriate scratch resistance, preferably, each of the discretely arranged thermoplastic resin portions 1000 is formed using a sufficient number of particle-like pieces of thermoplastic resin 1002 and the thermoplastic resin portions 1000 are provided in proximity to one another, to facilitate formation of the particle-like pieces of thermoplastic resin 1002 into a molten film.

Figure 11D:
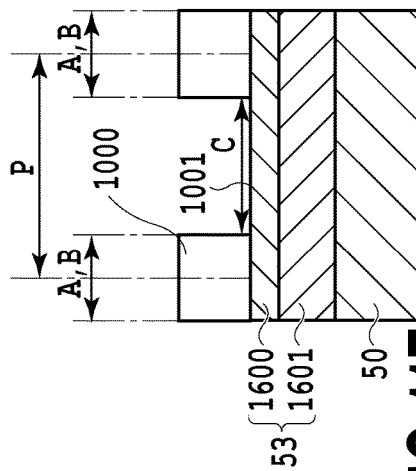
Figure 11E:
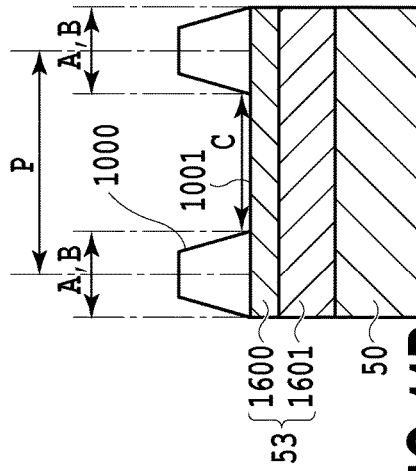

Thus, in the present embodiment, particle-shaped pieces of thermoplastic resin 1002 are used in order to suppress a possible white point and to facilitate formation of the pieces of thermoplastic resin 1002 into a molten film. That is, the use of particle-shaped pieces of thermoplastic resin 1002 enables a sufficient volume of the thermoplastic resin 1002 to be obtained in a middle layer or an upper layer of the resin layer 1012 while minimizing the area of contact with pigment permeation layer 1600 in a lower layer of the resin layer 1012. For example, the pieces of thermoplastic resin 1002 mainly formed of spherical particulates as depicted in FIG. 11A may be used or the thermoplastic resin 1002 mainly formed of polyhedral particulates 1002 as depicted in FIGS. 11B and 11C may be used. The use of the pieces of thermoplastic resin 1002 as described above enables the exposed portion 1001 of the pigment permeation layer 1600 of the air gap absorption type to be provided with a large area to achieve appropriate ink absorptivity, and allows appropriate protect performance to be delivered. In terms of the film productivity of the ink jet print medium, spherical particles (FIG. 11A) that do not need a special orientation treatment or the like is preferably used as the pieces of thermoplastic resin 1002. Like the spherical particulates 1002, polyhedral particulates may also preferably be used. As depicted in FIGS. 11D and 11E, film-like pieces of thermoplastic resin 1002 may be discretely provided.

(1.6.3 Particle Size of the Thermoplastic Resin 1002)

In a case where, during the film production process for the ink jet print medium 1, the pieces of thermoplastic resin 1002 enter the air gaps in the pigment permeation layer 1600, which are thus filled with the pieces of thermoplastic resin 1002, the ink absorptivity of the pigment permeation layer 1600 may decrease significantly. Thus, in a case where the particle-like pieces of thermoplastic resin 1002 are used, the average particle size of the particle-like pieces of thermoplastic resin 1002 and the average pore size of the pigment permeation layer 1600 are preferably set so as to inhibit the average particle size from being smaller than the air gap diameter of the pigment permeation layer 1600.

On the other hand, as described above, to inhibit the ink from remaining on the thermoplastic resin portion 1000, the ink having landed on the resin layer 1012 needs to be drawn and absorbed into the exposed portion 1001 of the pigment permeation layer 1600 without being broken away. Thus, the average particle size of the pieces of thermoplastic resin 1002 is preferably set smaller than the diameter of the expected ink droplet 1003A.

Specifically, the average particle size of the pieces of thermoplastic resin 1002 is preferably set more than 100 nm and less than 5 μm. Setting the average particle size of the pieces of thermoplastic resin 1002 to more than 100 nm makes the particle size of the pieces of thermoplastic resin 1002 sufficiently larger than the air gap diameter of the pigment permeation layer 1600 of the air gap absorption type, thus hindering the pieces of thermoplastic resin 1002 from entering the air gaps in the pigment permeation layer 1600. However, in a case where the pieces of thermoplastic resin 1002 are likely to be aggregated into the coating liquid, even in a case where thermoplastic resin 1002 particles with an average particle size of 100 nm or less are used, the particles may be aggregated during film production to form secondary particles large enough to avoid filling the air gaps in the pigment permeation layer 1600. Therefore, in such a case, the average particle size may be less than 100 nm, and the average particle size of the pieces of thermoplastic resin 1002 may be adjusted as needed to avoid filling the air gaps in the pigment permeation layer 1600, in accordance with the properties of the pieces of thermoplastic resin 1002. In a case where larger air gaps are formed in the pigment permeation layer 1600 on the assumption that larger pigment particles are provided, the pieces of thermoplastic resin 1002 with a larger average particle size of 150 nm or more are more preferably used. In a case where the thermoplastic resin portion 1000 is formed of an aggregate of particles 1002a of the thermoplastic resin 1002, the thermoplastic resin 1002 containing particulates with an average particle size of 2 μm or less is preferably used in order to allow each of the island-like thermoplastic resin portions 1000 to be formed like a film with a smaller area.

Figure 12:
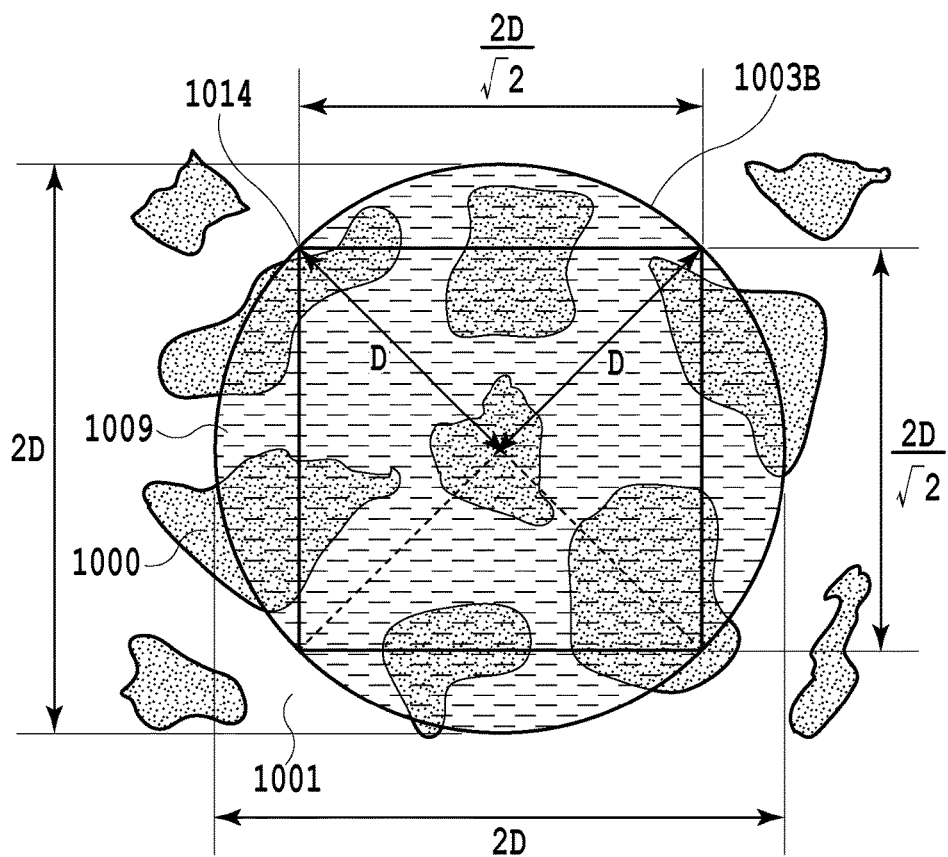
FIG. 12 is a plan view illustrating a relation between island portions and a sea portion formed on the front surface of the ink jet print medium and an ink droplet spread by the impact of landing.

To allow all of the pigment ink printed via the resin layer 1012 of the thermoplastic resin portion 1000 to be absorbed by the pigment permeation layer 1600 side without remaining in the resin layer 1012, it is important to dispose the exposed portions 1001 of the pigment permeation layer 1600, which serve as base points for ink absorption, at appropriate intervals. Thus, at least one bypass portion (sea portion) 1014, that is, at least one exposed portion 1001 of the pigment permeation layer 1600, which has a high ink absorption speed, may be present in one pixel for expected ink jet printing. FIG. 12 depicts the ink droplet 1003B with a diameter 2D to which the diameter D of the ink droplet is doubled as a result of landing impact, the diameter D being large enough to provide a sufficient image density with respect to one pixel for expected ink jet printing. As depicted in FIG. 12, the ink droplet 1003B with the diameter 2D contains the sea portion 1014 surrounded by the island portions 100 discretely formed of film-like pieces of thermoplastic resin 1002. Similarly, FIG. 13A and FIG. 13B illustrate that several particle-shaped pieces of thermoplastic resin 1002 are bound together to form each of the discretely arranged island-like pieces of thermoplastic resin 1002, so that the sea portion, where the pigment permeation layer 1600 is directly exposed, is located below the ink droplets spread as a result of landing impact. Consequently, the pigment ink is quickly absorbed by the pigment permeation layer 1600 and the solvent absorption layer 1601 instead of remaining on the island-like thermoplastic resin portions 1000, thus inhibiting inappropriate protect performance. Since one or more sea portions are present in one pixel, the ink having landed (see FIG. 13A) is absorbed into the pigment permeation layer 1600 and infiltrates and diffuses through the pigment permeation layer 1600 without being significantly displaced from a predetermined image (see FIG. 13B). Thus, the pigment particles diffuse and infiltrate to the areas immediately below the pieces of thermoplastic resin 1002 to allow a possible white point to be suppressed and to allow the pigment particles are subjected to solid-liquid separation and separated from the solvent components at the interface with the solvent absorption layer 1601, forming a dense thin-film-like pigment image. As a result, the image exhibits appropriate print properties. Depending on the ink jet image printing system, one pixel may be printed using a plurality of ink droplets, and each ink droplet may be smaller than one pixel. In this case, the number of sea portions present in one pixel may be correspondingly increased.

(1.6.5 Other Configurations of the Thermoplastic Resin)
(1.6.5.1 Particle-Shaped Pieces of the Thermoplastic Resin)

The thermoplastic resin 1002 is not limited to one type but a plurality of type of thermoplastic resins 1002 may be used. However, importantly, at least the pieces of thermoplastic resin 1002 in contact with the pigment permeation layer 1600 hold a substantially particulate shape. Since the pieces of thermoplastic resin 1002 in contact with the pigment permeation layer 1600 hold a substantially particulate shape, the ink color material more easily moves around to below the pieces of thermoplastic resin 1002, improving the image print properties of ink jet printing.

For example, a plurality of types of thermoplastic resins 1002 with different particle sizes may be used. The particle size is in relation to the volume of each piece of thermoplastic resin 1002. The volume of each piece of thermoplastic resin 1002 increases consistently with the particle size, enabling an increase in the height of the island portion of the pieces of thermoplastic resin 1002. This allows scratch resistance performance to be improved. Therefore, relatively hard particles may be selected for the pieces of thermoplastic resin 1002 with a large particle size, and the pieces of thermoplastic resin 1002 with a small particle size may be used as a binder used to bind large particle size pieces of thermoplastic resin 1002 together and to bind the pieces of thermoplastic resin 1002 with a large particle size to the pigment permeation layer 1600. In a case where the pieces of thermoplastic resin 1002 with a small particle size are used as a binder, the resin layer 1012 can be formed into a molten film with the air gap structure between the pieces of thermoplastic resin 1002 with a large particle size substantially maintained.

Figure 18:
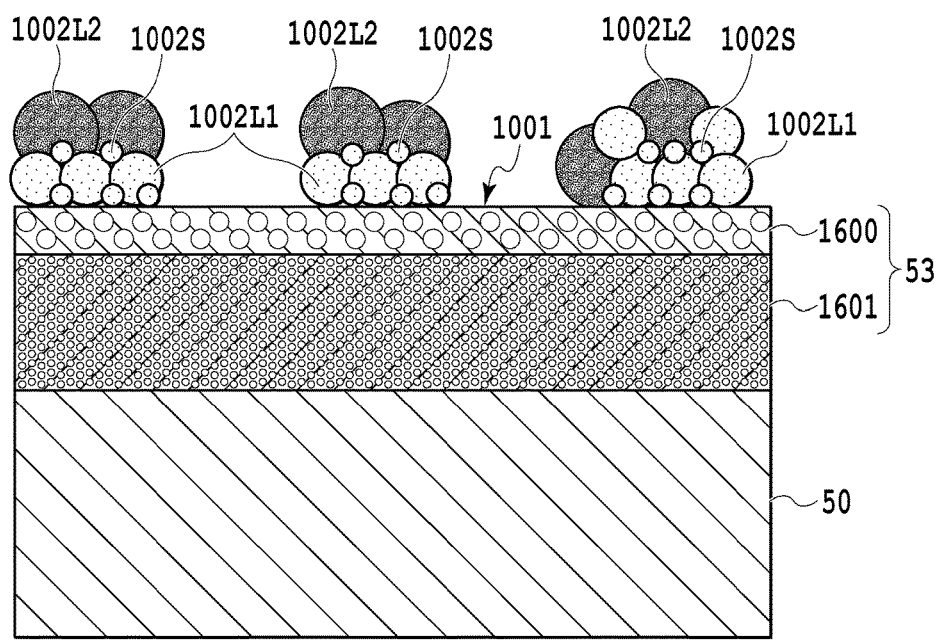
FIG. 18 is a cross-sectional view of an ink jet print medium including a plurality of types of thermoplastic resins 1002.

To provide appropriate scratch resistance performance, a plurality of types of thermoplastic resins may be used. For example, a plurality of thermoplastic resin 1002 materials may be used in terms of weatherability of the printed material taken into account based on the intended purpose. For example, as depicted in FIG. 18, a plurality of resin materials may be used such as a thermoplastic resin 1002S having a small particle size to act as a binder for the resin layer 1012, a thermoplastic resin 1002L1 having a large particle size and that is difficult to release even with a polar solvent, and a thermoplastic resin 1002L2 having a large particle size and that is difficult to release even with a nonpolar solvent.

Figure 19:
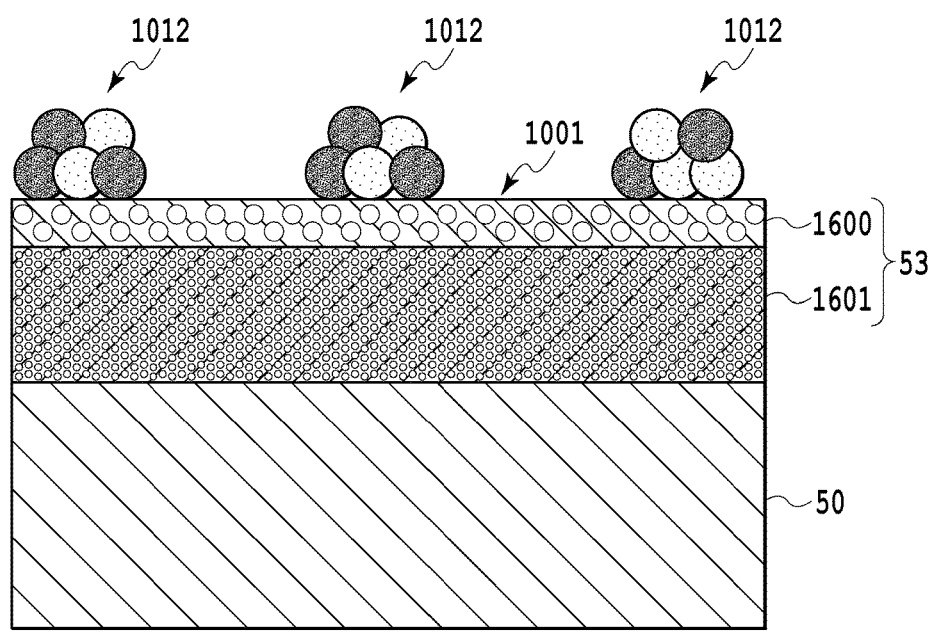
FIG. 19 is a cross-sectional view of an ink jet print medium including a plurality of types of thermoplastic resins 1002 of respective materials.

A single resin layer 1012 or a plurality of resin layers 1012 may be provided. For example, as depicted in FIG. 19, a plurality of resin layers 1012 are separately provided with the protect function such that one of the resin layers is configured to easily come into close contact with the pigment permeation layer 1600, whereas another resin layer is configured to be excellent in image protect performance. In a case where the ink jet print medium of the present invention is heated at a temperature equal to or higher than a film formation temperature over a sufficient time, the resin layer 1012 can be formed into a molten film to further improve the protect performance of the pigment image.

(1.6.5.2 Amount (Volume) of the Thermoplastic Resin)

The volume of the thermoplastic resin may be adjusted according to the intended purpose. For example, in a case where high protect performance is needed, the volume of the thermoplastic resin preferably allows the thermoplastic resin softened and melted after thermocompression bonding to absorb the recesses and protrusions of the pigment permeation layer to turn into a molten film.

(1.6.5.3 Film-Like Pieces of the Thermoplastic Resin)

Figure 15:
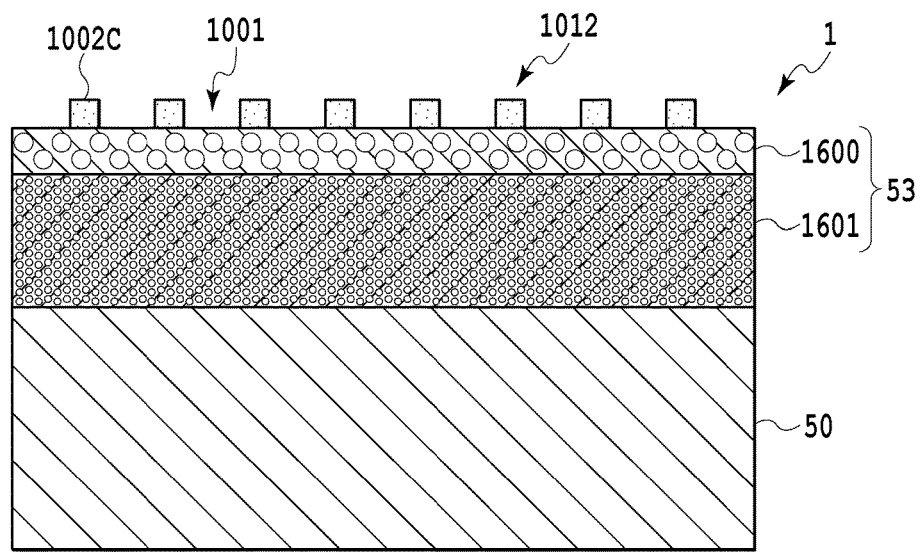
FIG. 15 is a cross-sectional view of an ink jet print medium including film-like pieces of thermoplastic resin 1002.

On the other hand, the ink jet print medium of the present invention allows the pigment ink to infiltrate and diffuse through the pigment permeation layer, and thus not limited to particle-shaped pieces of thermoplastic resin. For example, the sea-and-island-like resin layer 1012 can be formed using film-like pieces of thermoplastic resin 1002C as depicted in FIG. 15. That is, in the case of the pigment permeation layer 1600 through which the pigment ink, containing the pigment, infiltrates and diffuses isotropically, the pigment ink moves around to the areas immediately below the pieces of thermoplastic resin 1002 so long as the range of the movement is equivalent to the thickness of the pigment permeation layer 1600. This allows suppression of a possible non-image portion (white point). Therefore, film-like pieces of thermoplastic resin 1002 discretely arranged like islands may each have a planar size equivalent to or smaller than the thickness of the pigment permeation layer 1600.

In FIG. 15, film-like pieces of thermoplastic resin 1002 each of which has a size slightly smaller than the film thickness of the pigment permeation layer 1600 are discretely arranged on the front surface of the pigment permeation layer 1600 such that film-like thermoplastic resin portion 1000 each of which has a size slightly larger than the film thickness of the pigment permeation layer 1600 have an area ratio of 50% or less with respect to the area of the front layer of the pigment permeation layer 1600. The thickness of the solvent absorption layer 1601 is set equivalent to or larger than the size of an ink droplet of the expected pigment ink. The thickness of the pigment permeation layer 1600 is set smaller than the thickness of the solvent absorption layer 1601 and is thus equivalent to or smaller than the size of the ink droplet.

On the other hand, the size of each thermoplastic resin portion 1000 is equivalent to or smaller than the thickness of the pigment permeation layer 1600. Therefore, the size of the thermoplastic resin portion 1000 is equivalent to or smaller than the size of the ink droplet. The landing impact causes the size of each ink droplet to be approximately doubled in the horizontal direction, and thus, even in a case where the thermoplastic resin portion 1000 is equivalent in size to the ink droplet, the ink droplet having landed on the thermoplastic resin portion 1000 is deformed as a result of the landing impact to sufficiently protrude out from the thermoplastic resin portion 1000 and droop onto the exposed portion 1001 of the pigment permeation layer 1600. The pigment ink having partly contacted the pigment permeation layer 1600 is wholly drawn quickly into the pigment permeation layer 1600 of the air gap absorption type, with no pigment ink remaining on the pieces of thermoplastic resin 1002C. Inside the pigment permeation layer 1600, the pigment ink infiltrates and diffuses toward the solvent absorption layer 1601, which has a higher ink absorption speed. At the same time, the pigment ink infiltrates and diffuses into parts of the pigment permeation layer 1600 that are located immediately below the thermoplastic resin 1000, and the pigment, which is a color material, moves around even to the areas immediately below the film-like pieces of thermoplastic resin 1002C. This allows suppression of a possible white point corresponding to a non-image portion.

(1.6.5.4 Thickness of the Resin Layer)

In a case where the ink having landed is independently drawn and absorbed by the exposed portion 1001 of the pigment permeation layer 1600, when a portion of the ink having landed and spread protrudes out from the thermoplastic resin portion 1000 and droops onto the exposed portion 1001 of the pigment permeation layer 1600, the thickness of the resin layer 1012 is preferably controlled so as not to break the ink away. That is, with the viscosity and surface tension of the ink taken into account, the thickness of the resin layer 1012 is preferably controlled so as to inhibit the ink on the resin layer 1012 and the ink in contact with the exposed portion 1001 of the pigment permeation layer 1600 from being broken away. It is important to adjust the thickness of the resin layer 1012 so as to achieve appropriate visibility and scratch resistance performance. For appropriate scratch resistance performance, the thickness of the resin layer 1012 needs to be adjusted to the degree that the surface recesses and protrusions of the image support can be absorbed when the resin layer 1012 is softened and formed into a molten film. That is, the thickness of each piece of thermoplastic resin 1002 may be determined as needed according to the intended use.

For example, a case is assumed where the pigment, which is a color material, is subjected to solid-liquid separation at the interface between the pigment permeation layer 1600 and the solvent absorption layer 1601 such that all of the pigment remains at the bottom of the pigment permeation layer 1600. For the mass concentration of solids such as the pigment in an aqueous ink that can be stably ejected by in jet printing, the pigment in the ink has a concentration of approximately 5%. In such a case, the thickness of the resin layer 1012 is set to approximately three-hundredths to half of the thickness of the solvent absorption layer 1601. This inhibits the pigment particles from protruding up above the height of each piece of thermoplastic resin 1002. Therefore, the pigment particles received in the pigment permeation layer 1600 are inhibited from overflowing to degrade the scratch resistance performance, allowing a protect film to be properly formed. A sufficient amount of thermoplastic resin 1002 melted during heat transfer allows a thicker protect film to be formed using the molten pigment permeation layer 1600 and the molten thermoplastic resin 1002, thus allowing much higher protect performance to be delivered.

(1.6.5.5 Area of the Thermoplastic Resin Portion and Area of the Exposed Portion)

In the present invention, the area of the exposed portion of the pigment permeation layer is preferably 50% or more of the total area of the pigment permeation layer. For the area of the exposed portion of the pigment permeation layer, the ratio (area ratio) of the exposed portion to the entire front surface of the pigment permeation layer may be adjusted with the viscosity, surface tension, permeation anisotropy, and the like of the ink taken into account to set the area factor to approximately 100%. For example, as is known, in a case where the ink substantially isotropically permeates the inside of the pigment permeation layer, a spread rate of the aqueous ink that can be stably ejected by the ink jet system is doubled, and when the ink droplet lands and infiltrates, the diameter of the ink droplet is approximately doubled. The ink having infiltrated substantially isotropically spreads by approximately 25% in the horizontal direction in the pigment permeation layer. Thus, in a case where the area ratio of the exposed portion of the pigment permeation layer is 50% or more, an area factor of approximately 100% can be achieved to provide a dense image with no blown-out highlights.

Now, a method for measuring the area of the exposed portion will be described. A cross section of the ink jet print medium is observed using a scanning electron microscope (SEM), to measure the size of that part of each thermoplastic resin particle 1002 which is in contact with the pigment permeation layer 1600. At this time, the average value of the sizes of 100 thermoplastic resin particles in contact with the pigment permeation layer 1600 is calculated, and based on the average value, that area of a part of one thermoplastic resin particle which is in contact with the pigment permeation layer 1600 is calculated. Then, based on an SEM projection from the print surface, the number of the thermoplastic resin particles in contact with the pigment permeation layer 1600 is calculated, and the total area of those parts of the pieces of the thermoplastic resin 1002 which are in contact with the pigment permeation layer 1600 is determined. The area of the exposed portion 1001 of the pigment permeation layer 1600, which has no thermoplastic resin 1002 on the front surface, (exposed portion 1001 area) can be calculated by subtracting the total area of those parts of the pieces of thermoplastic resin 1002 which are in contact with the pigment permeation layer 1600 from the total area of the measurement range. Based on the SEM projection from the print surface, the area of the thermoplastic resin portion 1000 (bonding portion area) can be checked.

(1.6.5.6 Material of the Thermoplastic Resin)

In the ink jet print medium 1 of the present embodiment, the solvent absorption layer 1601 and pigment permeation layer 1600, which are of the air gap absorption type, are provided on the substrate 50, and the pieces of thermoplastic resin 1002 of the resin layer 1012 are discretely provided on the front surface of the pigment permeation layer 1600, as described above. Thus, the front surface of the pigment permeation layer 1600 is configured such that the directly exposed portion 1001 remains on the front surface. The thermoplastic resin 1002 of the resin layer 1012 is preferably a thermoplastic resin that absorbs substantially no ink or absorbs the ink at a low absorption speed.

A portion of the ink having landed on the resin layer 1012 passes through the space between the thermoplastic resin portions 1000 of the resin layer 1012 in a bypassing manner to come into direct contact with the exposed portion 1001 of the pigment permeation layer 1600. When the ink having contacted the exposed portion 1001 starts to be absorbed by the pigment permeation layer 1600, the remaining portion of the ink that is continuous with the above-described portion starts to be drawn into the pigment permeation the layer 1600 without being broken away. That is, the ink comes into quick contact with the exposed portion 1001 of the pigment permeation layer 1600 substantially without intervention of the pieces of thermoplastic resin 1002. Then, around the point of contact with the exposed portion 1001, the ink is drawn and absorbed into the sea portion of the pigment permeation layer 1600, which has a high ink absorption speed. Therefore, the ink is unlikely to remain on the front surface of and inside the thermoplastic resin portion 1000. As described above, the pieces of thermoplastic resin 1002 are not directly related to ink absorption, and thus, the material of the pieces of thermoplastic resin 1002 may be selected regardless of the ink, with focus placed on the scratch resistance performance. In a case where the ink jet print medium is used as a packaging material, the material is selected with focus placed on the bonding to with the heat seal layer. The material of the thermoplastic resin is not particularly limited.

Preferred examples of the material of the thermoplastic resin include resins such as an acrylic-based resin, a vinyl acetate resin, a vinyl chloride resin, an ethylene/vinyl acetate copolymer resin, a polyamide resin, a polyester resin, a urethane-based resin, and a polyolefin resin, or a copolymer resin of any of these resins. Among these resins, the acrylic resin and the urethane resin are preferably used because the resins deliver excellent protect performance, enable a film to be formed at relatively low temperature during the thermocompression bonding step, exhibit high transparency in the form of a coating film, and also appropriately bond to a heat seal agent on the back surface in a case where the ink jet print medium is used as a packaging material. One type of thermoplastic resin 1002 or a plurality of types of thermoplastic resins 1002 may be selected.

Figure 14:
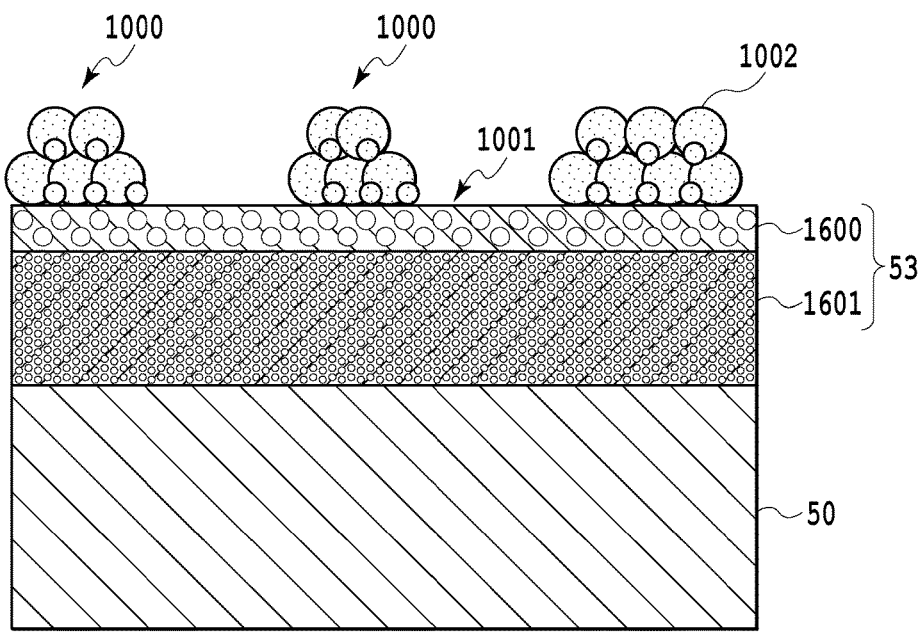
FIG. 14 is a cross-sectional view of an ink jet print medium including pieces of thermoplastic resin 1002 with a different particle size.

Like the pieces of thermoplastic resin 1002 in FIG. 14, pieces of thermoplastic resin 1002(1) that are excellent in protect performance for the pigment image and pieces of thermoplastic resin 1002(2) that are excellent in adhesion to the pigment permeation layer 1600 may be selected, and the optimal pieces of thermoplastic resin may be selected according to the intended purpose.

The color and transparency of the pieces of thermoplastic resin 1002 may be determined according to the intended use of the ink jet print medium. The thermoplastic resin 1002 may be transparent, translucent, or opaque or may be colored. For example, in a case where the pigment image is made visible both from the substrate 50 side and from the thermoplastic resin side, the resin layer 1012 may be transparent. In a case where the pigment image is made visible only from the substrate 50 side, the resin layer may be colored to provide a background color. For example, the resin layer 1012 may be colored so as to provide a white background color in order to improve the image visibility of the printed pigment image. In that case, the particle size of the pieces of thermoplastic resin 1002 may be set larger than the wavelength of visible light or a white pigment or the like may be added to the pieces of thermoplastic resin 1002 of the resin layer 1012. In a case where the print contents are made visible from the thermoplastic resin side, the thermoplastic resin 1002 is preferably adequately formed into a molten film to provide a high transparency.

(2. Manufacturing Method for the Ink Jet Print Medium)

The substrate can be manufactured by a well-known method, and a heat seal layer may be formed on both surfaces or one surface of the substrate according to the intended purpose. The substrate has a thickness of 5 µm to 300 µm according to the intended purpose. As a material preferable in view of mechanical properties and thermal properties, a polyethylene terephthalate (PET) film may be used. As a packaging material, a polypropylene film may be used.

(2.1 Formation Method for the Substrate)

Before the ink receiving layer 53 is provided on the substrate 50, the adhesion layer 1603 may be provided on the substrate 50 using a well-known coater in order to enhance the adhesion between the ink receiving layer 53 and the substrate 50.

The contact layer 1603 is formed by coating the substrate 50 with a composition containing the above-described contact layer 1603 using roll coating, rod bar coating, spray coating, air knife coating, slot die coating, or the like and drying the composition. The particle concentration of a release agent in the coating liquid may be determined as needed with coatability with the coating liquid and the like taken into account and is not particularly limited. However, in view of a coating speed and the uniformity of the film, the particle concentration is preferably 0.1 wt % or more and 5 wt % or less with respect to the total weight of the coating liquid. The amount of coating liquid applied is preferably 0.1 $g/m^2$ or more and 1 $g/m^2$ or less in terms of solid content. In a case where the amount of coating liquid applied is 0.1 g/m2 or more and preferably 1 $g/m^2$ or less, appropriate adhesion can be maintained between the solvent absorption layer 1601 and the substrate 50.

The substrate 50 may be subjected to surface modification. Surface modification may be executed in which the front surface of the substrate 50 is roughened to improve wettability of the substrate 50 to enhance the coatability of the solvent absorption layer 1601. A method for the surface modification is not particularly limited. For example, the method may involve pre-executing a corona discharge treatment or a plasma discharge treatment or coating the front surface of the substrate 50 with an organic solvent such as IPA or acetone. These surface treatments allow the adhesion between the substrate 50 and the solvent absorption layer 1601 to be improved to increase the strengths of the substrate 50 and the solvent absorption layer 1601. This allows the solvent absorption layer 1601 to be prevented from peeling off from the substrate 50.

In a case where the tacky layer and the release sheet are provided on the back surface of the substrate 50, the tacky layer may be pre-provided on the release sheet, which is then laminated on the substrate 50. A possible alternative method is to coat the back surface of the substrate 50 with a composition containing a tackifier material forming the above-described tacky layer using roll coating, rod bar coating, spray coating, air knife coating, slot die coating, or the like, to dry the composition, and subsequently to laminate the release sheet to the substrate 50. In this case, the concentration of the tackifier material in the coating liquid may be determined as needed with the coatability of the coating liquid and the like taken into account and is not particularly limited. However, the concentration is preferably 0.1 wt % or more and 5 wt % or less with respect to the total weight of the coating liquid in view of the coating speed and film evenness. The amount of coating liquid applied is preferably 0.1 $g/m^2$ or more and 1 $g/m^2$ or less in terms of solid content. In a case where the amount of coating liquid applied is 0.1 $g/m^2$ or more and preferably 1 $g/m^2$ or less, an appropriate bonding capability can be maintained between the solvent absorption layer 1601 and the substrate 50.

On the other hand, in a case where the heat seal layer is provided on both surfaces or one surface of the substrate 50, the heat seal layer may be formed by laminating a heat sealing resin material to the substrate 50 by dry lamination, extrusion lamination, or the like. Available methods for forming a heat seal layer by extrusion lamination includes (i) extrusion lamination involving applying an anchoring agent such as an organic titanate-based agent, polyethyleneimine, a urethane-based agent, or a polyester-based agent to the substrate, melting and extrusion-molding PP, EVA, an ionomer, or the like into a film form, and thus forming a heat seal layer on the surface of the substrate to which the anchor agent has been applied; and (ii) coextrusion lamination involving using two or more extruders to melt a resin serving as a substrate and a resin serving as a heat seal layer and to join the resins together inside a die or at an opening of the die.

(2.2 Formation Method for the Solvent Absorption Layer 1601)

The solvent absorption layer 1601 may be formed by preparing a coating liquid by mixing at least the inorganic particulates or resin particulates and the water-soluble resin with an appropriate medium and coating the front surface of the substrate 50 with the coating liquid. According to the intended purpose, the coating liquid may contain another additive, for example, surfactant, a pigment dispersant, a thickener, a defoamer, an ink fixative, a dot regulator, a colorant, fluorescent whitening agent, an antioxidant, an ultraviolet absorber, a preservative, or a pH regulator. The particle concentration of the inorganic particulates or resin particulates in the coating liquid may be determined as needed with the coatability of the coating liquid and the like taken into account and is not particularly limited. However, the particle concentration is preferably 10 wt % or more and 30 wt % or less with respect to the total weight of the coating liquid in view of the coating speed and film evenness.

The solvent absorption layer 1601 can be formed by coating the front surface of the above-described substrate 50 with the above-described coating liquid. After the coating, the coating liquid is dried as needed.

For the coating, a well-known coating method may be used. Examples of the well-known coating method include blade coating, air knife coating, curtain coating, slot die coating, bar coating, gravure coating, and roll coating.

The amount of coating liquid applied is preferably 10 $g/m^2$ or more and 40 $g/m^2$ or less in terms of solid content. In a case where the amount of coating liquid applied is 10 $g/m^2$ or more and preferably 15 $g/m^2$ or more, the solvent absorption layer 1601 can be formed that is excellent in absorbing the solvent components in the ink. On the other hand, in a case where the amount of coating liquid applied is 40 $g/m^2$ or less and preferably 20 $g/m^2$ or less, the ink jet print medium is unlikely to be curled when the coating layer is dried. In a case where the adhesion layer 1603 for the pigment permeation layer 1600 and the solvent absorption layer 1601 is provided, the adhesion layer 1603 can be formed by preparing a coating liquid containing a mixture of an adhesion agent and an appropriate medium, coating the front surface of the solvent absorption layer 1601 with the coating liquid, and drying the coating liquid. A surfactant may be added to the coating liquid as needed. In a case where the adhesion layer 1603 is applied using a coating liquid for particle-like pieces of an adhesion agent, the front surface of the solvent absorption layer 1601 may be treated with water or soaking water to fill the air gaps in the solvent absorption layer 1601 with the liquid so as to inhibit fine adhesion agent particles from entering the air gaps in the solvent absorption layer 1601 before the adhesion agent is applied.

(2.3 Formation Method for the Pigment Permeation Layer)

The pigment permeation layer 1600 can be formed by preparing a coating liquid by mixing at least the resin particulates and the water-soluble resin with an appropriate medium, coating the front surface of the solvent absorption layer 1601 with the coating liquid, and drying the coating liquid. In a case where the front surface of the solvent absorption layer 1601 is coated with a coating liquid for formation of the pigment permeation layer 1600, the water-soluble resin permeates the air gaps in the solvent absorption layer 1601 along with the moisture of a coating liquid for the pigment permeation layer 1600, thus possibly filling the air gaps with the water-soluble resin. Although the pigment permeation layer 1600 is formed of resin particles each larger than each air gap in the solvent absorption layer 1601, the coating liquid may contain resin particulates having a particle size smaller than the size of each air gap in a case where a particle size distribution is not sharp and particulate cutting is insufficient. In this case, the air gaps in the solvent absorption layer 1601 may be filled.

In the solvent absorption layer 1601 in the ink jet print medium 1 of the present embodiment, the air gaps are important because a high ink absorption speed needs to be achieved to allow the moisture and solvent components in the ink to be substantially wholly or quickly absorbed by the solvent absorption layer 1601. Air bubbles may be generated during a process in which the moisture of the coating liquid for the pigment permeation layer 1600 permeates the air gaps in the solvent absorption layer 1601 and is replaced with air remaining in the air gaps in the solvent absorption layer 1601. The air bubbles are discharged via the coating liquid for the pigment permeation layer 1600. At this time, in a case where the air bubbles are trapped in the coating liquid for the pigment permeation layer 1600 and remain on a coating surface, the coating may be inappropriate. In such a case, the front surface of the solvent absorption layer 1601 may be treated with dampening water or soaking water to fill the air gaps in the solvent absorption layer 1601 with the liquid before the coating liquid for the pigment permeation layer 1600 is applied. Since the air gaps in the solvent absorption layer 1601 is filled with the dampening water or soaking water, the air bubbles present in the air gaps in the solvent absorption layer 1601 can be discharged to the outside before the coating liquid for formation of the pigment permeation layer 1600 is applied. Before application of the coating liquid for formation of the pigment permeation layer 1600, the water-soluble resin and fine resin particulates can be prevented from entering the air gaps.

The particle concentration of the resin particulates in the coating liquid may be determined as needed with the coatability of the coating liquid and the like taken into account and is not particularly limited. However, in view of the coating speed and the uniformity of the film, the particle concentration is preferably 10 wt % or more and 30 wt % or less with respect to the total weight of the coating liquid. The amount of coating liquid applied is preferably 1 $g/m^2$ or more and 10 $g/m^2$ or less in terms of solid content. In a case where the amount of coating liquid applied is 1 $g/m^2$ or more and preferably 10 $g/m^2$ or less, appropriate pigment permeability and diffusibility can be exhibited.

A coating method may be equivalent to the coating method described in connection with the formation method for the solvent absorption layer 1601. For formation of the pigment permeation layer 1600 that can be formed into a molten film, the drying temperature after application of the coating liquid for the pigment permeation layer 1600 is strictly controlled. That is, the drying temperature during formation of the pigment permeation layer 1600 may be set lower than the molten film formation temperature Tg for the resin particulates forming the pigment permeation layer 1600 so that the resin particulates maintain the particle state to form an air gap structure. It should be noted that in a case where the resin particulates are heated and dried at a temperature equal to or higher than the molten film formation temperature during formation of the pigment permeation layer 1600, the resin particulates are in a film production state, precluding the air gap structure from being formed. A higher drying temperature during formation of the pigment permeation layer 1600 increases the ink absorption speed. Thus, in view of productivity, the drying temperature during formation of the pigment permeation layer 1600 is as high as possible.

(2.4 Formation of the Resin Layer)

In the ink jet print medium 1 of the present embodiment, the solvent absorption layer 1601 and pigment permeation layer 1600, each of which is an ink receiving layer of the air gap absorption type, are provided on the substrate 50, and the front surface of each of the solvent absorption layer 1601 and the pigment permeation layer 1600 is coated with a coating liquid intended to form the resin layer 1012 containing the pieces of thermoplastic resin 1002. In this case, the pieces of thermoplastic resin 1002 are provided like islands (discretely) on the front surface of the pigment permeation layer 1600 such that the front surface of the pigment permeation layer 1600 is exposed in the exposed portion 1001 in the form of the sea portion.

The concentration of the thermoplastic resin in the coating liquid may be determined as needed with the coatability of the coating liquid and the like taken into account and is not particularly limited. The concentration of the thermoplastic resin in the coating liquid may be determined as needed with the coatability of the coating liquid, discreteness of the thermoplastic resin portion 1000, and the like taken into account. However, in view of the coating speed and the uniformity of the film the concentration is preferably 2 wt % or more and 40 wt % or less.

As a coating method, gravure coating is preferably used because the pieces of thermoplastic resin 1002 need to be discretely provided on the front surface of the pigment permeation layer 1600 of the air gap absorption type. In that case, the number of groove lines in a gravure roll is preferably 200, more preferably 300, and much more preferably 600. More groove lines allow the exposed portion 1001 of the pigment permeation layer 1600 of the air gap absorption type to be more easily formed in one pixel of an image resulting from ink jet printing. More groove lines reduce the distance between the islands to allow a slight flow of the pieces of thermoplastic resin 1002 to bind the islands together to form a film. Thus, the time needed to form a molten film during thermocompression bonding is reduced. In a case where the front surface of the pigment permeation layer 1600 formed on the substrate 50 is coated with the resin layer 1012 using the coating liquid for the particle-shaped pieces of thermoplastic resin 1002, it is necessary to avoid entry of the pieces of thermoplastic resin 1002 into the air gaps in the pigment permeation layer 1600. The pieces of thermoplastic resin 1002 are larger than each of the air gaps in the pigment permeation layer 1600. However, in a case where the pieces of thermoplastic resin 1002 are secondary aggregates or the particle size distribution is not sharp and the particulate cutting is insufficient, the coating liquid may contain resin particulates having a particle size smaller than the size of each air gap.

In the pigment permeation layer 1600 in the ink jet print medium 1 of the present embodiment, the air gaps are important because a high ink absorption speed needs to be achieved to allow the pigment ink to be quickly absorbed by the pigment permeation layer 1600 substantially without remaining in the resin layer 1012. Thus, fine pieces of thermoplastic resin 1002 can be prevented from entering the air gaps in the pigment permeation layer 1600 by pretreating the air gaps with dampening water or the like to fill the air gaps in pigment permeation layer 1600 with the liquid and then applying a coating liquid for the thermoplastic resin 1002.

The thermoplastic resin 1002 is formed of a material that is softened and formed into a molten film in a case where the material is heated by thermocompression bonding, and sufficient attention needs to be paid to a drying step following coating with the resin layer 1012. That is, the resin layer 1012 is preferably dried at the film formation temperature at which the pieces of thermoplastic resin 1002 are softened and melted, or lower, or at a glass transition temperature or lower. Of course, so long as the exposed portion 1001 of the pigment permeation layer 1600 enables maintenance of an air gap structure compatible with the ink jet printing with the pigment ink, no problem is posed even in a case where, during the drying step, the pieces of thermoplastic resin 1002 are melted and softened and partly flows. Therefore, preferably, the temperature at which the pieces of thermoplastic resin 1002 are softened and formed into a molten film is pre-measured so as to allow a drying temperature to be set at which excellent productivity can be achieved with the sea-and-island structure maintained in the resin layer 1012.

The thermoplastic resin 1002 may contain a plurality of types of particles such that one type of particles function as a binder to bind the thermoplastic resin remaining in the form of particles, whereas another type of particles function to improve the bonding to the water-soluble resin. In such a case, the pieces of thermoplastic resin 1002 are preferably dried at the film formation temperature of the pieces of thermoplastic resin 1002 functioning as a binder, or higher, and at the film formation temperature of the pieces of thermoplastic resin 1002 remaining in the form of particles, or lower. As described above, both the ink jet print properties and the protect performance can be achieved by selecting the drying temperature as needed according to the properties of the pieces of thermoplastic resin 1002.

Moisture vaporizes from the thermoplastic resin coating liquid during the coating process, and thus, the thermoplastic resin coating liquid has an increased concentration during coating and film formation. Thus, before drying, the thermoplastic resin particles forming the thermoplastic resin coating liquid are dispersed substantially in the form of unitary particles, but in a case where the thermoplastic resin coating liquid has an increased concentration, the dispersion of the thermoplastic resin particles is likely to be disrupted. As a result, the thermoplastic resin particles collide against and merge with one another, and a plurality of particles is aggregated. The thermoplastic resin coating liquid is formed into a molten film with aggregates each of a plurality of particles as described above, allowing the particles of thermoplastic resin 1002 of the resin layer 1012 to be discretely provided on the front surface of the pigment permeation layer 1600. Therefore, in a case where unitary particles of thermoplastic resin 1002 are discretely provided, the concentration of the undried coating liquid for the thermoplastic resin 1002 may be reduced. In a case where aggregates each of a plurality of particles of thermoplastic resin 1002 are discretely provided, the concentration of the undried coating liquid for the thermoplastic resin 1002 may be increased.

As described above, the discrete state of the pieces of thermoplastic resin 1002 of the resin layer 1012 during film formation can be regulated by adjusting the concentration of the undried thermoplastic resin coating liquid as needed. The discrete state of the particles of thermoplastic resin 1002 of the resin layer 1012 can be controlled according to the intended purposes of the ink jet print medium and the printed material. In a case where the unitary particles of thermoplastic resin 1002 are discretely provided, each of the discretely disposed particles of thermoplastic resin 1002 has a low strength, leading to degraded scratch resistance performance. On the other hand, in a case where aggregates each of a plurality of particles of thermoplastic resin 1002 are discretely provided, each of the discretely disposed aggregates of particles of thermoplastic resin 1002 has a high strength, allowing the scratch resistance performance to be improved.

Bonding films of thermoplastic resin 1002 may be discretely provided like islands on a surface of a transfer roller or a transfer film and compressed against and transferred to the front surface of the pigment permeation layer 1600. A discrete pattern of the thermoplastic resin formed on the surface of the transfer roller or the transfer film can be transferred directly to the pigment permeation layer 1600. Thus, the discrete state of the pieces of thermoplastic resin 1002 formed on the front surface of the pigment permeation layer 1600 can be optionally controlled. This method eliminates the need to take into account the infiltration of the thermoplastic resin 1002 through the air gaps in the pigment permeation layer 1600. Thus, the resin layer 1012 can be discretely formed on the front surface of the pigment permeation layer 1600 without the need for a special treatment for the pigment permeation layer 1600 such as application of dampening water.

Moreover, a coating liquid for the adhesion layer 1603, a coating liquid for the solvent absorption layer 1601, a coating liquid for the pigment permeation layer 1600, and a coating liquid for the resin layer 1012 may be applied onto the substrate 50 at the same time using a slide die coater, a slot die coater, or a curtain coater to form the adhesion layer 1603, the solvent absorption layer 1601, the pigment permeation layer 1600, and the resin layer 1012 at the same time. The above-described method appropriately adjusts the viscosity and surface tension of each of the coating liquids for the adhesion layer 1603, the solvent absorption layer 1601, the pigment permeation layer 1600, and the resin layer 1012 to allow film production without mixing the coating liquids during the drying process. That is, the solvent absorption layer 1601 and the pigment permeation layer 1600 can be formed without filling the air gaps in the solvent absorption layer 1601 or the pigment permeation layer, with the pieces of thermoplastic resin 1002 of the resin layer 1012 discretely provided on the pigment permeation layer 1600.

(3. Manufacturing Method for the Printed Material)

(3.1 Image Printing Step Based on the Ink Jet System)

First, an image printing method for the ink jet print medium 1 of the present embodiment will be described. The present embodiment uses the ink jet print medium 1 (see FIG. 1) having, on the substrate 50, the solvent absorption layer 1601 and the pigment permeation layer 1600, which form the ink receiving layer 53 of the air gap absorption type. The pigment image 1606 can be formed in the pigment permeation layer 1600 as depicted in FIGS. 2A and 2B by printing the ink jet print medium 1 based on the ink jet printing system using the pigment ink. The pigment permeation layer 1600 is thermocompression bonded as needed using the heating roller 21 (see FIG. 2C) and formed into a molten film such that the pigment image is enclosed by the pigment permeation layer (see FIG. 2D) to allow a firm pigment protect film 1650 to be formed. A thermocompression bonding unit other than the heating roller 21 may be used to form the pigment permeation layer 1600 into a molten film.

The above-described ink jet printing system is a system that prints an image by ejecting ink (ink droplets) to an ink jet print surface of an ink jet print medium through a plurality of nozzles formed in a print head. The type of the ink jet printing system is not particularly limited, and either a thermal ink jet system or a piezoelectric system may be used. In the thermal ink jet system, heat energy based on a driving pulse is applied to the ink in the nozzles to generate air bubbles in the ink as a result of film boiling such that the air bubbles allow ink droplets to be ejected through the nozzles. The thermal ink jet printing method preferably allows a high-resolution and high-quality image to be printed at high speed.

An ink jet printing apparatus can print a very appropriate stable image without the need to bring a print head into contact with the front surface of the pigment permeation layer 1600 of the present invention. A serial scan system prints an image by repeating an operation in which the print head moves in a main scanning direction while ejecting the ink and an operation in which the print medium is conveyed in a direction crossing (for example, orthogonal to) the main scanning direction. Such a serial scan system can reduce the size of each ink droplet ejected from the print head to facilitate printing of a high-quality image.

As a printer of such a serial scan type, either a well-known small-sized ink jet printer or a large-format printer may be used so long as the printer uses the pigment ink for printing. The serial scan system enables the pigment ink to land on the same print area a plurality of times at predetermined time intervals by the respective scans of the print area by the print head (divided overlapping scans). Even in this case, since the pigment permeation layer 1600 of the air gap absorption type has a sufficiently high ink absorption speed compared to the vaporization speed of the pigment ink, the ink is unlikely to remain on the pigment permeation layer 1600 or the pieces of thermoplastic resin 1002, and high scratch resistance performance can be maintained.

On the other hand, a full line system uses an elongate multi-nozzle head including an integrated plurality of nozzles each including an ink ejection port and an ink channel. An image is printed by ejecting the ink from the multi-nozzle head, while continuously conveying the print medium in a direction crossing (for example, orthogonal to) an arrangement direction of the ejection ports. A printer of such a full line type can print a high-resolution and high-quality image at high speed. In a case where an image is printed on the ink jet print medium, either an inverted image or a normal image may be printed according to the direction in which the image is viewed. The image may be selected according to the intended use.

(3.1.1 Pigment Ink)

In the ink jet print medium of the present embodiment, the pigment permeation layer 1600 through which the pigment particles can infiltrate and diffuse is used to form a dense pigment image at the bottom of the pigment permeation layer 1600 to allow substantially all of the water components and solvent components of the pigment ink to permeate the solvent absorption layer 1601. Consequently, both the ink jet print properties and the protect performance can be achieved. In view of the storage stability and durability of print images that can be utilized for various intended purposes, the pigment ink is preferably used for the ink jet print medium of the present embodiment.

For an aqueous pigment ink, 60 to 80% of the ink components are water components serving as the solvent, 20% to 30% of the ink components are the other solvent components, and 1% to 10% of the ink components are pigment components. In the aqueous pigment ink, substantially all of the solvent components are water-soluble, non-volatile, and inactive components (low reactivity) and are thus formed of components that are less stimulating to human bodies. Therefore, this inhibits the solvent components from continuously volatilizing for a long time or inhibits active components from remaining non-reacted. Thus, compared to a solvent ink mainly formed of a volatile solvent and a UV ink containing (highly reactive) monomers containing active components, the aqueous pigment ink is very safe and is particularly preferably used.

In the pigment ink, the absorption state thereof varies according to the average particle size of the pigment color material of the ink and the average pore size of each of the pigment permeation layer 1600 and the solvent absorption layer 1601. That is, an ink jet print medium may be used in which the average pore size of the pigment permeation layer 1600 is larger and the average pore size of the solvent absorption layer is smaller than the average particle size of the expected pigment ink. In general, the average particle size of the pigment particles is approximately 40 nm to 110 nm, and thus, in a case where a pigment ink is used that contains pigment particles with a small particle size allowing a high-definition image to be printed, the average particle size of the pigment particles is approximately 40 nm to 50 nm. On the other hand, in a case where a pigment ink is used that contains inexpensive, stable pigment particles with a large particle size, the average particle size of the pigment particles is approximately 90 nm to 110 nm. Therefore, the average pore sizes of the pigment permeation layer and the solvent absorption layer may be adjusted based on the expected pigment ink. In a case where an ink jet print medium is used in which a combination of the sizes of the air gaps in the ink receiving layers is suitable for the size of the pigment particles, a dense high-definition pigment image can be formed at the interface between the pigment permeation layer 1600 and the solvent absorption layer 1601. Substantially all of the liquid components of the pigment ink, which correspond to the solvent of the pigment ink, are quickly absorbed by the solvent absorption layer 1601 side, and thus, substantially no liquid components remain in the pigment permeation layer 1600. Consequently, immediately after ink jet printing, the thermocompression bonding step can be executed using the heating roller, enabling the pigment permeation layer 1600 to be quickly formed into a molten film to allow the printed material to be promptly manufactured.

The pigment component in the pigment ink may be a self-dispersing pigment with a bond to at least one type of functional group selected from the group consisting of a carbonyl group, a carboxyl group, a hydroxyl group, and a sulfon group, or salt thereof, or a resin-dispersing pigment containing pigment particles peripherally coated with resin. In the ink jet print medium 1 of the present embodiment, appropriate adjustment of the thickness of the pigment permeation layer 1600 allows solid-liquid separation to occur so that all of the pigment color material is housed in the pigment permeation layer 1600, thus inhibiting the color material from overflowing the pigment permeation layer 1600 and from being exposed in the front surface. As described above, the adjustment of the thickness of the pigment permeation layer 1600 allows the pigment permeation layer 1600 to be formed into a film such that the pigment image is enclosed by the pigment permeation layer 1600. Consequently, the pigment color material can be perfectly immobilized, resulting in a firm protect film. Therefore, the ink jet print medium is suitable for the use of a self-dispersing pigment in which the pigment particles themselves have no bonding capability.

The resin-dispersing pigment increases the binding force exerted between the pigment particles separated from the ink medium to allow a firm thin-film-like pigment image to be formed at the bottom of the pigment permeation layer 1600. Substantially all of the solvent of the pigment ink, which corresponds to the liquid components of the pigment ink, is absorbed by the solvent absorption layer 1601, which has a much higher ink absorption speed than the pigment permeation layer 1600, and thus, substantially no moisture of the pigment image remains. Thus, the resin-dispersing pigment particles are brought closer to one another and more firmly bonded together by a dispersing resin applied for pigment dispersion. The dispersing resin has a high affinity for polyvinyl alcohol, which is the water-soluble resin of the ink receiving layer 53. Thus, in a case where the dispersing resin and the water-soluble resin are melted by heat during thermocompression bonding, the resin-dispersing pigment is strongly bonded in the pigment permeation layer 1600.

The resin with which the periphery of the pigment particles is coated is preferably an ester (meth) acrylate-based copolymer having an acid value of 100 to 160 mg KOH/g. An acid value of 100 mg KOH/g or more allows the ink to be more stably ejected in the ink jet printing system that thermally ejects the ink. On the other hand, an acid value of 160 mg KOH/g or less makes the resin hydrophobic relative to the pigment particles, improving the fixability and the bleeding resistance of the ink. Therefore, the resin is suitable for high-speed fixation of the ink and high-speed printing.

The acid value refers to the amount (mg) of KOH needed to neutralize 1 g of resin and may be an indicator of hydrophilicity of the resin. The acid value in this case may be calculated from the composition ratio of monomers contained in the resin dispersant. As a specific method for measuring the acid value of the resin dispersion element, Titrino (manufactured by Metrohm) may be used which determines the acid value by potentiometric titration.

(3.1.2 Permeability and Diffusibility of the Pigment Ink)

In the present invention, the surface tension and viscosity of the ink for ink jet printing are appropriately controlled such that, when the ink in contact with the exposed portion 1001 on the front surface of the pigment permeation layer 1600 starts to be absorbed by the pigment permeation layer 1600, the ink is drawn into the pigment permeation layer 1600. Such an ink preferably has a viscosity η of 1.5 mPa·s to 10 mPa·s, more preferably 1.6 mPa·s to 5.0 mPa·s, and particularly preferably 1.7 mPa·s to 3.5 mPa·s.

On the other hand, the ink preferably has a surface tension γ of 25 mN/m to 45 mN/m. That is, the surface tension and viscosity of the ink may be controlled such that the ink having landed on and contacted the front surface of the pigment permeation layer 1600 is quickly absorbed by the pigment permeation layer 1600. The surface tension and viscosity of the ink may also be controlled such that the ink having permeated the pigment permeation layer 1600 infiltrates and diffuses into the thin-film pigment permeation layer 1600 and such that, for the pigment ink, the pigment ink, containing the pigment, infiltrates and diffuses into the thin-film pigment permeation layer 1600. The appropriate adjustment of the ink viscosity within the above-described range allows the pigment ink to permeate the inside of the pigment permeation layer 1600 while spreading and diffusing in the film thickness direction and the horizontal direction according to the permeation anisotropy of the pigment permeation layer 1600. Consequently, appropriate dots are formed, enabling high-definition image printing.

When the pigment ink having passed through the pigment permeation layer 1600 reaches the interface with the solvent absorption layer 1601, the pigment components, water components, and solvent components of the pigment ink are subjected to solid-liquid separation to form a dense thin-film-like pigment image at the pigment permeation layer 1600-side interface. When the image is formed, only the solvent components 1607 are absorbed by the solvent absorption layer 1601, allowing a dense image to be formed. The appropriate adjustment of the ink density within the above-described range improves flowability of the ink during ink ejection, enhancing an ink feeding capability and thus stability of ink ejection. The adjustment of the surface tension of the ink within the above-described range allows meniscus at ink ejection ports to be maintained during ink ejection. Even in a case where the sea-and-island-like resin layer 1012 is provided on the front surface of the pigment permeation layer 1600, the adjustment of the surface tension and viscosity of the ink within the above-described ranges allows the ink to be inhibited from being broken away on the front surface of the resin layer 1012 when a portion of the ink having landed on the print surface of the ink jet print medium 1 protrudes out from the protect enhancing portion and droops onto the exposed portion 1001 of the ink receiving layer 1601. The surface tension and viscosity of the ink may further be controlled such that a portion of the ink passes through the spaces between the thermoplastic resin portions 1000, comes into contact with the exposed portion 1001 on the front surface of the ink receiving layer, and is then drawn and absorbed into the ink receiving layer.

The viscosity of the ink means a value measured at 25° C. in accordance with a method for measuring the viscosity, kinetic viscosity, viscosity×concentration, and apparent viscosity of liquid by using a capillary viscometer, a falling-ball viscometer, a rotating viscometer, and a vibratory viscometer using an E viscometer (for example, "RE-80L Viscometer" manufactured by TOKI SANGYO CO., LTD.). The viscosity of the ink may be adjusted based on the type and amount of a surfactant, the type and amount of a water-soluble organic solvent, and the like. The surface tension of the ink means a value measured at 25° C. by a plate method using a platinum plate and an automatic surface tensiometer (for example, "CBVP-Z" manufactured by Kyowa Interface Science Co., Ltd.). The surface tension of the ink can be adjusted based on the amount of surfactant added, the type and content of a water-soluble organic solvent, and the like.

(3.1.3 Pigment Concentration)

In the present embodiment, the concentration of the color material in the ink is not particularly specified. However, the concentration is preferably 5% or more and 10% or less and more preferably 1% or more and 5% or less. Setting the color material concentration within this range allows both the visibility and scratch resistance performance of the image to be achieved. In particular, to allow substantially all of the pigment particles having permeated the inside of the pigment permeation layer 1600 to be housed inside the pigment permeation layer 1600, the color material concentration needs to be strictly controlled. That is, the pigment concentration is preferably set as high as possible to the extent that the pigment particles is inhibited from overflowing as a result of filling of the air gaps in the pigment permeation layer 1600 with the pigment particles and to the extent that the visibility of the image can be improved. In short, the air gap capacity of the pigment permeation layer 1600 may be adjusted according to the pigment concentration and the print density so as to allow the pigment to be received in the pigment permeation layer 1600. That is, in a case where the pigment concentration of the ink is raised to increase the pigment concentration and the print density, the air gap capacity may be increased to allow all of the pigment particles to be housed inside the air gaps. The controllable adjustment of the ink concentration within the above-described range allows the ink viscosity to be optimally controlled to improve the flowability of the ink during ink ejection. Thus, the ink can be more appropriately fed to the nozzles in the print head, and the ink can be more stably ejected.

(3.1.4 White Ink)

In the present invention, ink jet printing may be executed on at least a part of the pigment permeation layer using white ink (ink in white) after or before printing of any image. In a case where the pigment permeation layer is printed with white ink so as to provide a background for the printed image, a masking capability is improved to allow the visibility of the image to be enhanced. The composition of the white ink may be the composition of any white ink normally used for the ink jet printing method. A well-known material may be applied as the white pigment, and examples of the white pigment include an inorganic white pigment, an organic white pigment, and white hollow polymer particulates. In a case where the average particle size of the white pigment particles of the white ink is larger than the average pore size of the pigment permeation layer, white pigment components, water components, and solvent components are subjected to solid-liquid separation on the front surface of the pigment permeation layer. In a case where the thermoplastic resin portion (island portion) has a sufficient height in the resin layer, thermocompression bonding allows the white ink pigment components to be coated with the resin layer, with no pigment of the white ink remaining on the front surface. Thus, appropriate scratch resistance performance can be delivered.

(3.2 Thermocompression Bonding Step)

For the pigment permeation layer 1600 of the ink jet print medium 1 in the present embodiment, thermocompression bonding after image formation allows the pigment permeation layer 1600 to be formed into a film so as to enclose the pigment image, enabling the pigment color material to be perfectly immobilized as depicted in FIGS. 16A to 16D. Thus, a firm protect film can be formed. In a case where the printed material is produced, first, a normal image or an inverted image is printed on the front surface of the pigment permeation layer 1600 in the ink jet print medium 1 of the present embodiment according to the direction in which the image is viewed. Then, a printed material is obtained by melting the resin particulates of the pigment permeation layer 1600 into a molten film (self-melted) by thermocompression bonding.

In the thermocompression bonding step, the pigment permeation layer 1600 can be heated and formed into a molten film without the need for any special drying treatment so long as the solvent absorption layer 1601 contains a sufficient amount of moisture. That is, substantially no liquid components of the pigment ink, which correspond to the solvent of the pigment ink, remain in the pigment permeation layer 1600, and substantially all of the liquid components are absorbed and held by the solvent absorption layer 1601. The air gap structure of the solvent absorption layer 1601 is unlikely to be destroyed during the thermocompression bonding and can be held even after the thermocompression bonding. Therefore, even in a case where the resin particulates of the pigment permeation layer 1600 are formed into a molten film, the solvent absorption layer 1601 can internally hold the absorbed ink. Even in a case where vapor is held inside the solvent absorption layer 1601, the vapor is sealed inside the solvent absorption layer 1601, and thus, the pigment permeation layer 1600 can be formed into a molten film even in a case where the solvent absorption layer 1601 contains a sufficient amount of water. Examples of preferred heating apparatuses in the present invention include apparatuses including a heating fan, a heating belt, or a thermal transfer head. However, the present invention is not limited to these apparatuses.

(3.2.1 Compressive Bonding Using the Heat Roller)

In the present invention, the resin particulates that are formed into a molten film by heat and pressure are particularly preferably used for the pigment permeation layer. Thus, among the above-described thermocompression bonding methods, thermocompression bonding using both heating and compressive bonding is preferable. An example configuration for such thermocompression bonding may be a configuration including both a heat roller and a pressurization roller. In the present embodiment, the image is formed on the pigment permeation layer 1600 of the ink jet print medium, and then, the ink jet print medium is conveyed between the heated heat roller 21 and the pressurization roller 22. Then, the pigment permeation layer 1600 can be formed into a molten film to provide a printed material.

In the present embodiment, in a case where the pigment permeation layer 1600 is formed into a molten film, it is important to control the heat and pressure during thermocompression bonding so as to maintain the air gap structure of the solvent absorption layer 1601 even after the thermocompression bonding. As depicted in FIG. 2C, the pigment permeation layer 1600 is formed into a molten film by being pressurized and heated by the heat roller 21 and the pressurization roller 22. However, the solvent components 1607 of the pigment ink absorbed by the solvent absorption layer 1601 remain held by the air gap structure. With the air gap structure maintained, even in a case where the liquid components of the ink are subjected to bumping in the air gaps to generate vapor, the vapor can be sealed in each air gap. As a result, no air layer or the like is formed in the pigment permeation layer 1600, and the pigment permeation layer 1600 can be appropriately formed into a molten film. In a case where thermocompression bonding is executed, the solvent absorption layer 1601 maintains the air gap structure to suppress collapse of the air gaps caused by pressure and melting of the air gaps caused by heating. Thus, the non-volatile solvent, which corresponds to the liquid components of the ink, is restrained from seeping out to the pigment permeation layer 1600, facilitating formation of the pigment permeation layer into a molten film.

The temperature of the thermocompression bonding is preferably controllably adjusted to at least the temperature at which the resin particulates of the pigment permeation layer are formed into a molten film. In a case where the temperature is controllably adjusted to at least the temperature at which the resin particulates of the pigment permeation layer are formed into a molten film, the pigment permeation layer 1600 is formed into a molten film so as to enclose the pigment image. As a result, the pigment particles can be perfectly immobilized, enabling a firm protect film to be formed. In a case where the ink jet print medium 1 is used in which the pieces of thermoplastic resin 1002 are discretely disposed on the front surface of the pigment permeation layer 1600, the thermocompression bonding temperature is controllably adjusted to at least the temperature at which the pieces of thermoplastic resin 1002 are formed into a molten film. In a case where the thermocompression bonding temperature is controllably adjusted to at least the temperature at which the pieces of thermoplastic resin 1002 are formed into a film, the discretely disposed pieces of thermoplastic resin 1002 are integrated into a molten film so as to enclose the pigment image. Consequently, the pigment particles can be perfectly immobilized to allow a firmer protect film to be formed.

Importantly, the thermocompression bonding temperature is also controlled so as to maintain the air gap structure even after the thermocompression bonding without collapsing the air gap structure of the solvent absorption layer more significantly than necessary. That is, the thermocompression bonding is preferably executed at the melting temperature of the components forming the air gaps, or lower, so as to inhibit a situation where the air gaps are melted by heating to cause the nonvolatile solvent, which corresponds to the liquid components of the ink, to seep out to the front surface. The thermocompression bonding temperature is preferably equal to or lower than the boiling point of the solvent components, particularly the boiling point of water, so as to inhibit the water and solvent components of the ink from being subjected to bumping or vaporization in the individual air gaps.

The pressure of the thermocompression bonding is preferably set to 0.5 kg/cm or more and 7.0 kg/cm or less. Setting the pressure of the thermocompression bonding to 0.5 kg/cm or more allows the pigment permeation layer to be formed into a film so as to enclose the pigment image, perfectly immobilizing the pigment particles to enable a firm protect film to be formed. On the other hand, setting the pressure of the thermocompression bonding to 7.0 kg/cm or less allows the thermocompression bonding to be achieved with the air gaps maintained and without collapsing the air gap structure of the solvent absorption layer more significantly than necessary. Consequently, the nonvolatile solvent of the ink, which corresponds to the liquid components of the ink, can be restrained from seeping out to the front surface, allowing the pigment permeation layer to be appropriately formed into a molten film.

The pressurization roller 22 for the pigment permeation layer 1600 is preferably a silicone roller. The silicone roller has a low affinity for pigment layer and thus hinders the front surface of the pigment permeation layer 1600 from being bonded to the heat roller 21 when the pigment permeation layer 1600 passes between the heat roller 21 and the pressurization roller 22.

(4. Packaging and Thermocompression Bonding of a Heat Sealable Print Sheet)

In a case where the ink jet print medium of the present embodiment is used as a packaging film, a sealed portion can be formed by heat sealing. Examples of applicable methods in this case include heat sealing in which a hot plate heated to a given temperature is compressively bonded to a target surface, impulse sealing, thermal fusion sealing, impulse fusion sealing, melt sealing, high-frequency sealing, and ultrasonic sealing.

In this case, the temperature of the thermocompression bonding is preferably controllably adjusted to 60° C. higher and more preferably to 60° C. or higher and 160° C. or lower. Setting the temperature of the thermocompression bonding to 60° C. or higher allows bonding of the heat seal layer and the pigment permeation layer 1600 and bonding of the heat seal layers. On the other hand, setting the temperature of the thermocompression bonding to 160° C. or lower allows avoidance of thermal deformation of the substrate 50 caused by excessive heat. Deformation of a packaged article can be prevented by short-time heating within the above-described temperature range. The heat seal layer can further be prevented from sticking to the packaged article.

(4.1 Unsealing of the Package)

A catch portion can be formed on a part of the package by slitting up the part. When a user pinches and pulls the catch portion by the hand, a tear is formed starting at the catch portion. Consequently, the package can be easily unsealed. In the heat sealable print sheet in the present embodiment, the solvent absorption layer 1601 and the substrate 50 can be appropriately bonded together, preventing possible burrs at the tear and peel-off of the solvent absorption layer 1601 from the substrate 50. For accurate unsealing, a catch core portion with a high strength may be provided in the catch portion.

(5. Manufacturing Apparatus for the Printed Material)

A manufacturing apparatus that manufactures a printed material using the above-described ink jet print medium will be described. As an apparatus that prints an image on the print medium of the present invention, either a well-known small-sized ink jet printer or a large-format printer may be used so long as the printer uses the pigment ink for printing. As an apparatus that bonds and transfers the print medium to the image support and releases the substrate as needed, any well-known laminator may be used, such as D-10 manufactured by DYNIC CORPORATION or LPD3223 CLIVIA manufactured by FUJITEX. The laminator may include a pair of heat rollers 21 and a pair of pressurization roller 22 such that, when the image support and a transfer material pass between the rollers, the pigment permeation layer of the print medium is thermocompression bonded to the image support. The manufacturing apparatus may include a feeding unit that feeds the print medium to a printing unit, the printing unit that prints an image using the ink jet printing system or the like, a thermocompression bonding unit, a peeling unit that peels off the substrate, and a discharge unit that discharges and accumulates printed materials with pigment images transferred thereto; all of the units are integrated together. As such an integral apparatus, for example, an apparatus described in Japanese Patent No. 05944947 may be used. The manufacturing apparatus may include a packaged article supply unit 12 that supplies a packaged article 11, and a packaging unit that packages the packaged article 11 using the ink jet print medium 1 with the heat seal layer. The packaging unit 7 packages the packaged article 11 using the ink jet print medium with the heat seal layer and thermocompression bonds the pigment permeation layer 1600 and the heat seal layer together and the heat seal layers together. Consequently, the pigment permeation and receiving layer and the heat seal layer are firmly bonded together, and the heat seal layers are firmly bonded together, producing a package. The temperature of the thermocompression bonding may be controllably adjusted to 60° C. or higher and 160° C. or lower. The thermocompression bonding at this temperature allows prevention of deformation of the substrate 50 and the packaged article 11 or damage to the content caused by excessive heat and enables the heat seal layer to be prevented from sticking to the packaged article 11.

(6. Printed Material)

To manufacture a printed material using the ink jet print medium 1 with the resin layer 1012 provided on the front surface of the pigment permeation layer 1600, first, the ink is applied to the print surface S1 (see FIG. 1) of the ink jet print medium 1 by the print head to print an image. At this time, a portion of the pigment ink passes through the space between the thermoplastic resin portions 1000 of the resin layer 1012 in a bypassing manner to come into contact with the exposed portion 1001 of the pigment permeation layer 1600, which has a high ink absorption speed. Consequently, the ink is drawn and absorbed into the pigment permeation layer 1600 without passing through the pigment permeation layer 1600 (see FIG. 2A). Subsequently, when the pigment ink diffuses and infiltrates through the pigment permeation layer 1600 to reach the interface with the solvent absorption layer 1601, solid-liquid separation occurs at the interface between the solvent absorption layer 1601, which has the air gaps each smaller than each pigment particle, and the pigment permeation layer 1600 to form a dense thin-film-like pigment image 1606 at the interface. Substantially all of the solvent components are absorbed by the solvent absorption layer 1601 side to allow a printed material to be provided (see FIG. 2B).

Then, the first manufacturing apparatus 25 is used to thermocompression bond the discretely disposed pieces of thermoplastic resin 1002 and the pigment permeation layer 1600 in the printed material as needed (see FIG. 2C) to provide a printed material including the resultant enhanced pigment protect film 1651 serving as a protect layer (see FIG. 2D). Since the resin layer 1012 and the pigment permeation layer 1600 are formed into a molten film, the pigment particles 1606 can be enclosed by the resultant enhanced pigment protect film 1651, enabling a significantly firm protect film to be formed. In a case where a printed material is produced with the resin layer completely formed in to a film, liquids such as water and chemicals and gases such as ozone can be more reliably restrained from entering the printed material, allowing improvement not only of water resistance and chemical resistance but also of weatherability. In a case where a functional material contained in the sea-and-island-like resin layer 1012 is used as masking particles, the thermoplastic resin 1002 layer is formed into a film and the masking particles spread all over the film. This enables the masking capability to be further improved and allows improvement of the visibility of the image obtained in a case where the image is viewed from the substrate 50 side.

(6.1 Image Printed Material with the Surface Improvement Agent Provided in the Resin Layer 1012 in a Sea and Island Form)

Figure 17:
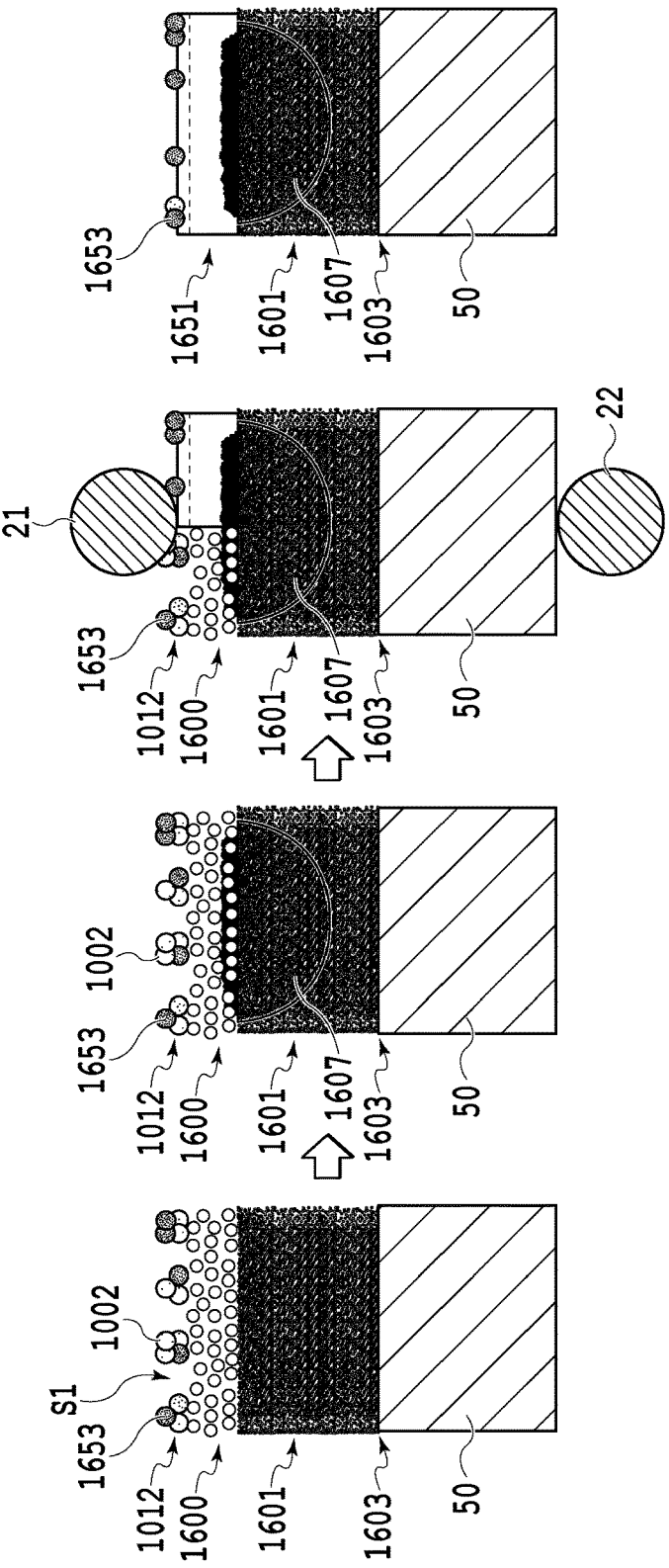
FIGS. 17A to 17D are cross-sectional views illustrating a manufacturing method for a printed material produced using an ink jet print medium including a surface texture improvement agent.

Then, production of a printed material will be described that includes the ink jet print medium 1 provided with the resin layer 1012 containing the surface texture improvement agent 1653. First, the ink is applied to the print surface S1 (see FIG. 17A) of the above-described ink jet print medium 1 by the print head 20 to print an image on the print surface S1 (FIG. 17B). Then, the manufacturing apparatus 1 is used to thermocompression bond the pigment permeation layer 1600 (see FIG. 17C) to form the pigment permeation layer 1600 and the resin layer 1012 into a molten film. Consequently, a printed material (FIG. 17D) is obtained in which the surface texture improvement agent 1653 is provided on the enhanced pigment protect film 1651 in a sea and island form.

Even in a case where the resin layer 1012 and the pigment permeation layer 1600 are formed into a molten film by thermocompression bonding such that the molten film encloses the pigment particles 1606 forming the image, the surface texture improvement agent 1653 is not formed into a molten film. That is, the surface texture improvement agent 1653 remains in the particle state and in the sea and island form on the front surface of the enhanced pigment protect film 1651. In this case, a portion of the surface texture improvement agent 1653 is embedded in the pigment permeation layer 1600 formed into a molten film and the protect enhancing layer 1651, and thus, the surface texture improvement agent 1653 is firmly immobilized. Therefore, the sea-and-island-like surface texture improvement agent allows fine recesses and protrusions to be formed on the front surface of the printed material. Consequently, the surface texture of the printed material can be improved, for example, the feel of the printed material is improved or a matte surface with gloss suppressed is formed.

(6.2 Image Printed Material with the Solvent Absorption Layer Formed into a Molten Film)

Now, production of a printed material will be described that includes the ink jet print medium including the solvent absorption layer formed of the resin particulates that are easily melted and deformed during thermocompression bonding. To produce the printed material, first, the ink is applied to the print surface (FIG. 32A) of the ink jet print medium by the print head to print an image. Then, the ink jet print medium with the image printed thereon (see FIG. 32B) is thermocompression bonded as depicted in FIG. 32C to form the pigment permeation layer 1600 and the solvent absorption layer 1601 into a molten film. The pigment permeation layer 1600 and the solvent absorption layer 1601 are thus integrated together to provide a printed material (FIG. 32D). At this time, desirably, a step or a time for sufficiently drying the volatile solvent components absorbed by the solvent absorption layer 1601 is provided or a drying apparatus is used to sufficiently dry the solvent absorption layer 1601 until substantially no solvent components remain in the solvent absorption layer 1601. Sufficient drying of the solvent components allows suppression of a reverse flow, to the pigment permeation layer 1600, of a slight amount of nonvolatile solvent remaining in spite of softening and melting of the resin particulates of the solvent absorption layer 1601. Therefore, in a case where thermocompression bonding follows sufficient drying of the solvent components of the solvent absorption layer 1601, the solvent absorption layer 1670 integrated with the pigment permeation layer 1600 enables a small amount of nonvolatile solvent contained in the pigment ink to be held in the solvent absorption layer 1601.

In a case where the pigment permeation layer 1600 and the solvent absorption layer 1601 are formed into a molten film and the pigment particles are enclosed in the solvent absorption layer 1601 formed into the film as described above, a possible decrease in transparency can be suppressed that results from light scattering in the air gaps in the solvent absorption layer and at the interface of the resin particulates. This allows improvement of the visibility, from the solvent absorption layer side, of a dense thin-film-like pigment image formed at the bottom of the pigment permeation layer.

(6.3 Print Material Including the Ink Jet Print Medium with the Solvent Absorption Layer and Pigment Permeation Layer of the Air Gap Absorption Type Provided on the Substrate with the Heat Seal Layer)

Now, production of a printed material will be described that includes the ink jet print medium including the ink receiving layer that is provided on the print surface side of the substrate and that includes the solvent absorption layer and the pigment permeation layer, and the heat seal layer provided on the surface (back surface) of the substrate that is opposite to the surface (front surface) with the ink receiving layer formed thereon. To produce a printed material, first, an image is formed on the front surface of the ink jet print medium 1 using the pigment ink. The pigment permeation layer 1600 is formed of a material that can be formed into a molten film by being pressurized and heated.

Specific Examples of the First Embodiment

The constituent materials of the resin particulates forming the pigment permeation layer 1600 and the water-soluble resin (in PVA, a vinyl acetate group contributing to the bonding capability) have a high affinity of the constituent material of the heat seal layer 1200. Thus, the pigment permeation layer 1650 of the printed material formed into a molten film can be thermally bonded. That is, the heat seal layers 1200 can be thermally bonded together, the heat seal layer 1200 and the pigment permeation layer 1600 can be thermally bonded together, and the pigment permeation layers 1600 can be bonded together. Therefore, the heat seal layer 1200 on the back surface of the substrate 50 and the pigment permeation layer 1600 or the resin layer 1012 on the front surface side can be utilized as the heat seal layers on the front and back sides of the printed material and utilized for a packaging sheet and the like. That is, in a case where a packaged article accommodating a content is packaged in the ink jet print medium of the present invention, the ink jet print medium can be utilized as a packaging material.

Specific Examples of the First Embodiment

Specific examples of the present invention will be described below. However, the present invention is not limited by the examples described below. In the description below, "pts" and "%" refer to mass standards unless otherwise specified.
(Preparation of a Water Solution of Polyvinyl Alcohol 1)
Polyvinyl alcohol (trade name "PVA123", manufactured by KURARAY CO., LTD.) was dissolved into ion exchange water to prepare a water solution of polyvinyl alcohol with a solid content of 8%. The polyvinyl alcohol had a weight-average degree of polymerization of 2,300 and a degree of saponification of 98 to 99 mol %.
(Preparation of a Solvent Absorbing Layer Coating Liquid 1)
One hundred pts.wt. water solution of silica (trade name "SNOWTEX ST-OL" (solid content ($SiO_2$) concentration: 20%, average primary particle size: 40 nm) manufactured by NISSAN CHEMICAL INDUSTRIES LTD.) was mixed with 25 pts.wt. water solution of polyvinyl alcohol 1 using a static mixer to prepare a solvent absorption layer coating liquid 1.
(Preparation of a Solvent Absorbing Layer Coating Liquid 2)
One hundred pts.wt. water solution of silica (trade name "SNOWTEX O" (solid content ($SiO_2$) concentration: 20%, average primary particle size: 10 nm) manufactured by NISSAN CHEMICAL INDUSTRIES LTD.) were mixed with 50 pts.wt. water solution of polyvinyl alcohol 1 using the static mixer to prepare a solvent absorption layer coating liquid 2.
(Preparation of a Solvent Absorbing Layer Coating Liquid 3)
A stirrer, a reflux condenser, a thermometer, and a nitrogen gas introduction pipe were installed on a first glass reaction container. The following were fed into the container: 6 g Aqualon RN-30 (manufactured by DKS Co., Ltd.) as a nonionic emulsifier, 6 g Aqualon HS-30 (manufactured by DKS Co., Ltd.) as an anionic emulsifier, 100.0 g methyl methacrylate, 20.0 g ethyl acrylate, 10.0 g 2-hydroxyethyl acrylate, 5.0 g methacrylic acid, and 275 g water. The solution was stirred to prepare a mixture with a total amount of 427.0 g. Then, 36 g of the mixture was extracted and transferred to a similar second reaction container, where the mixture was emulsified at 73° C. for 40 minutes with nitrogen gas introduced into the second reaction container. Then, as a polymerization initiator, 17 g ammonium peroxodisulfate was dissolved into 36 g water and thus added to the emulsifier. Subsequently, the remaining amount of the mixture was extracted from the first reaction container and gradually dripped into the second reaction container over 100 minutes for polymerization at 73° C. Once the dripping of the remaining amount of the mixture ended, the mixture was continuously stirred at 73° C. for 80 minutes and thus synthesized into a water solution of emulsion 1 (Tg: 78° C., resin solid content: 35%). The dispersed particles had an average primary particle size of 10 nm. Then, 43.75 pts.wt. water solution of polyvinyl alcohol 1 was added to 100 pts.wt. water solution of emulsion, and the solutions were mixed using the static mixer to prepare a solvent absorption layer coating liquid 3.
(Preparation of a Solvent Absorbing Layer Coating Liquid 4)
One hundred pts.wt. water solution of silica (trade name "SNOWTEX MP2040" (solid content ($SiO_2$) concentration: 40%, average primary particle size: 200 nm) manufactured by NISSAN CHEMICAL INDUSTRIES LTD.) were mixed with 200 pts.wt. water solution of polyvinyl alcohol 1 using the static mixer to prepare a solvent absorption layer coating liquid 4.
(Preparation of a Pigment Permeation Layer Coating Liquid 1)
As is the case with the water solution of emulsion 1, a water solution of emulsion 2 having a solid content concentration of 20%, an average primary particle size of 180 nm, and Tg of 78° C. was obtained by suspension polymerization. Aqualon RN-30 (manufactured by DKS Co., Ltd.) as a nonionic emulsifier and Aqualon HS-30 (manufactured by DKS Co., Ltd.) as an anionic emulsifier were not used. Then, 25 pts.wt. water solution of polyvinyl alcohol 1 was added to 100 pts.wt. water solution of emulsion 2, and the solutions were mixed using the static mixer to prepare a pigment permeation layer coating liquid 1.
(Preparation of a Pigment Permeation Layer Coating Liquid 2)
As is the case with the water solution of emulsion 2, a water solution of emulsion 3 having a solid content concentration of 20%, an average primary particle size of 120 nm, and Tg of 78° C. was obtained by suspension polymerization. Then, 25 pts.wt. water solution of polyvinyl alcohol 1 was added to 100 pts.wt. water solution of emulsion 3, and the solutions were mixed using the static mixer to prepare a pigment permeation layer coating liquid 1.

(Preparation of a Pigment Permeation Layer Coating Liquid 3)

An water solution of emulsion 4 (Tg: 101° C., resin solid content: 20.0%) was obtained by synthesis as is the case with the water solution of emulsion 2 except for the use of 13.0 g methyl methacrylate, 5.0 g ethyl acrylate, and 5.0 g methacrylic acid. The dispersed particles had an average particle size of 120 nm. Then, 25 pts.wt. water solution of polyvinyl alcohol 1 was added to 100 pts.wt. water solution of emulsion 4, and the solutions were mixed using the static mixer to prepare a pigment permeation layer coating liquid 3.

(Preparation of a Resin Layer Coating Liquid 1)

Ten pts.wt. DXA4081 manufactured by VANORA (solid content concentration: 50%, average particle size: 300 nm) was added to 40 pts.wt. ion exchange water to prepare a resin layer coating liquid 1. The VANORA resin contained in the resin layer coating liquid had a film formation temperature of 80° C.

(Preparation of a Resin Layer Coating Liquid 2)

An water solution of emulsion 5 (Tg: 40° C., resin solid content: 47.0%) was obtained by synthesis as is the case with the water solution of emulsion 2 except for the use of 55 g 2-hydroxyethylhexyl acrylate, 30.0 g methyl acrylate, 50.0 g methyl methacrylate, and 10.0 g acrylic acid. The dispersed particles had an average particle size of 130 nm.

Five pts.wt. DXA4081 manufactured by VANORA (solid content concentration: 50%, average secondary particle size: 300 nm) and 15 pts.wt. water solution of emulsion 5 were added to 40 pts.wt. ion exchange water to prepare a resin layer coating liquid 2.

(Preparation of a Resin Layer Coating Liquid 3)

Ten pts.wt. DXA4081 manufactured by VANORA (solid content concentration: 50%, average secondary particle size: 300 nm) and 10 pts.wt. Bondic 1640 (solid content concentration: 50%) manufactured by DIC were added to 40 pts.wt. ion exchange water to prepare a resin layer coating liquid 3. The VANORA resin contained in the resin layer coating liquid 2 had a film formation temperature of 80° C., and the Bondic 1640 resin contained in the resin layer coating liquid 3 has a film formation temperature of 180° C.

(Preparation of a Resin Layer Coating Liquid 4)

Five pts.wt. DXA4081 manufactured by VANORA (solid content concentration: 50%, average secondary particle size: 300 nm) and 10 pts.wt. water solution of hollow resin particles (trade name: "SX8022-04EM", solid content concentration: 28.2%) manufactured by JSR Corporation and serving as white pigment particles were added to 30 pts.wt. ion exchange water to prepare a resin layer coating liquid 4.

(Preparation of a Resin Layer Coating Liquid 5)

Ten pts.wt. DXA4081 manufactured by VANORA (solid content concentration: 50%, average secondary particle size: 300 nm), 10 pts.wt. water solution of hollow resin particles (trade name: "SX8022-04EM", solid content concentration: 28.2%) manufactured by JSR Corporation and serving as white pigment particles, and 5 pts.wt. N phosphorescent Luminova BGL-300OFF manufactured by Nemoto & Co., Ltd. And serving as phosphorescent and luminescent particles 1617 were added to 30 pts.wt. ion exchange water to prepare a resin layer coating liquid 5.

(Substrate 1)

As a substrate 1, a white PET substrate (trade name: "Melinex"; thickness: 125 μm; manufactured by Teijin Dupont Films Japan Limited) was used. The substrate was coated with Vylonal MD-1985 manufactured by TOYOBO CO., LTD., which was then dried to form an adhesion layer on the substrate as a functional layer. A gravure coater was used for the coating, the coating speed was 5 m/min., and the amount of resin applied as measured after drying was 0.5 g/m2. The drying temperature was 60° C.

(Substrate 2)

As a substrate 2, a PET substrate (trade name: "Tetoron G2"; thickness: 100 μm; manufactured by Teijin Dupont Films Japan Limited) was used. The substrate was coated with Vylonal MD-1985 manufactured by TOYOBO CO., LTD., which was then dried to form an adhesion layer on the substrate as a functional layer. A gravure coater was used for the coating, the coating speed was 5 m/min., and the amount of resin applied as measured after drying was 0.5 g/m2. The drying temperature was 60° C.

(Substrate 3)

As a substrate 3, a sheet having a thickness of 25 μm and including polypropylene-based heat seal layers formed on the respective surfaces of a polypropylene-based substrate (trade name "ALPHAN BDH-224" manufactured by Oji F-Tex Co., Ltd.) was used.

(Substrate 4)

A tacky layer and a release sheet were provided on a back surface of the substrate 1 with the adhesion layer formed on the white PET substrate to prepare a substrate 4. For the tacky layer, a sticky bonding layer coating liquid prepared by mixing 10 pts.wt. Boncoat W-386 (solid content concentration: 50%) manufactured by DIC with 90 pts.wt. The back surface of the substrate 1 was coated with ion exchange water so as to form a tacky layer on the back surface. A gravure coater was used for the coating, the coating speed was 5 m/min., and the amount of resin applied as measured after drying was 0.5 g/m2. The drying temperature was 60° C. Then, as the release sheet, a release sheet manufactured by Sumika-kakoushi Co., Ltd. (trade name: "SL type"; 150 μm) was laminated on the back surface of the substrate to prepare a substrate 4.

(Preparation of a Large-Particle-Size Pigment Ink 1)

(Synthesis of a (Meth) Acrylic Ester-Based Copolymer)

One thousand pts.wt. methyl ethyl ketone was fed into a reaction container equipped with a stirrer, a dripper, a temperature sensor, and a reflux apparatus having a nitrogen feeder at the top thereof. With the methyl ethyl ketone stirred, the content of the reaction container was substituted with nitrogen. With the inside of the reaction container maintained in a nitrogen atmosphere, the temperature in the reaction container was raised to 80° C. A mixed solution was dripped over four hours using the dripper, the mixed solution being a mixture of 63 pts.wt. methacrylate 2-hydroxyethyl, 141 pts.wt. methacrylic acid, 417 pts.wt. styrene, 188 pts.wt. benzyl methacrylate, 25 pts.wt. glycidyl methacrylate, 33 pts.wt polymerization modifier (trade name "BLEMMER TGL" manufactured by NOF Corporation), and 67 pts.wt. peroxy-2-ethylhexanoic acid-t-butyl. When the dripping ended, the reaction was allowed to last at the same temperature for 10 hours to prepare a solution of an ester (meth) acrylate copolymer (A-1) (resin content: 45.4%) having an acid value of 110 mgKOH/g, a glass transition temperature (Tg) 89° C., and a weight average molecular weight of 8,000.

(Preparation of an Aqueous Pigment Dispersion Element)

One thousand pts.wt. phthalocyanine-based blue pigment, the solution of the ester (meth)acrylate copolymer (A-1) obtained by the above-described synthesis, 25% water solution of potassium hydroxide, and water were fed into a mixing tank with a cooling function and stirred and mixed to prepare a mixed solution. The amount of the ester (meth) acrylate copolymer (A-1) was 40% of the amount of the phthalocyanine-based blue pigment in nonvolatile content.

The amount of the 25% water solution of potassium hydroxide was such that the ester (meth) acrylate copolymer (A-1) was neutralized 100%. The amount of the water was such that the nonvolatile content of the resultant mixed solution was 27%. The resultant mixed solution was passed through a disperser filled with zirconia beads with a diameter of 0.3 mm so as to disperse for four hours in accordance with a circulation method. The temperature of a dispersion liquid was maintained at 40° C. or lower.

After the dispersion liquid was extracted from the mixing tank, a channel between the mixing tank and the disperser was cleaned with 10,000 pts.wt. water, and a cleaning solution and the dispersion liquid were mixed to prepare a diluted dispersion liquid. The resultant diluted dispersion liquid was placed in a distillator, and a total amount of the methyl ethyl ketone and a portion of the water were distilled away to provide a concentrated dispersion liquid. The concentrated dispersion liquid was allowed to cool down to room temperature, and with the concentrated dispersion liquid being stirred, 2% chlorine acid was dropped into the liquid. When the pH of the concentrated dispersion liquid was adjusted to 4.5, a Buchner funnel was used to filter solids. The solids were then washed in water. The resultant solids (cake) were placed in the container, water was added to the solids, and a dispersing stirrer was used to re-disperse the solids. The pH of the solids was adjusted to 9.5 using a water solution of potassium hydroxide. Subsequently, a centrifugal separator was used to remove coarse particles at 6,000 G over 30 minutes. The nonvolatile contents were then regulated to provide an aqueous pigment dispersion element 1 with an average secondary particle size of 90 nm (aqueous cyan pigment dispersion element (pigment content: 14%, acid value: 110)).

An aqueous black pigment dispersion element 1 with an average secondary particle size of 91 nm, an aqueous magenta pigment dispersion element 1 with an average secondary particle size of 93 nm, or an aqueous yellow pigment dispersion element 1 with an average secondary particle size of 90 nm were obtained as is the case with the aqueous cyan pigment dispersion element except that the phthalocyanine-based blue pigment was changed to a carbon black-based black pigment, a quinacridone-based magenta pigment, or a diazo-based yellow pigment.

(Preparation of a Large-Particle-Size Pigment Ink 2)
(Preparation of an Aqueous Pigment Dispersion Element 2)

For the pigment ink, 100 g commercially available carbon black "45L" (secondary particle size: 40 nm; DBP oil absorption amount: 45 ml/100 g; manufactured by Mitsubishi Chemical Corporation) was well mixed into 1,000 ml water, and the mixture was slightly dispersed. Then, 300 g sodium hypochlorite (effective chlorate concentration: 12%) was dropped into the mixture, and the mixture was stirred at 100° C. to 104° C. for 10 hours for wet oxidation. The resultant slurry was filtered using Qualitative Filter Paper No. 2 (manufactured by Toyo Roshi Kaisha, Ltd.), and the slurry was then washed in water until surface modified carbon black particles leaked from the slurry. The wet cake was re-dispersed in five kiloliters of water and desalinated using a reverse osmosis membrane until an electric conductivity decreased to 2 mS. An aqueous cyan pigment dispersion element 2 with an average secondary particle size of 42 nm, an aqueous magenta pigment dispersion element 2 with an average secondary particle size of 45 nm, or an aqueous yellow pigment dispersion element 2 with an average secondary particle size of 48 nm were obtained as is the case with the aqueous carbon black pigment dispersion element except that the carbon black-based black pigment was changed to the phthalocyanine-based blue pigment, the quinacridone-based magenta pigment, or the diazo-based yellow pigment.

[Preparation of the Ink]

In order to provide the composition illustrated in Table 1 (total: 100 pts.wt.), the aqueous pigment dispersion element 1, the aqueous pigment dispersion element 2, and the components were fed into the container and stirred for 30 minutes or longer using a propeller stirrer. Subsequently, the mixture was filtered using a filter with a pore size of 0.2 μm (manufactured by NIHON PALL LTD.) to prepare the pigment ink. "AE-100" in Table 1 indicates acetylene glycol 10 mol ethylene oxide additive (trade name "ACETYLENOL E100" manufactured by Kawaken Fine Chemicals Co., Ltd.). Table 1 indicates the average secondary particle sizes of the above-described pigment inks.

TABLE 1

|  | pigment ink 1 | | | | pigment ink 2 | | | |
| --- | --- | --- | --- | --- | --- | --- | --- | --- |
|  | Bk | C | M | Y | Bk | C | M | Y |
| particle size | 90 | 91 | 93 | 90 | 40 | 42 | 45 | 48 |
| pigment (pts. wt.) | 5 | 5 | 5 | 5 | 5 | 5 | 5 | 5 |
| glycerin (pts. wt.) | 7 | 7 | 7 | 7 | 7 | 7 | 7 | 7 |
| triethylene glycol (pts. wr.) | 5 | 5 | 5 | 5 | 5 | 5 | 5 | 5 |
| ethylene urine (pts. wt.) | 12 | 12 | 12 | 12 | 12 | 12 | 12 | 12 |
| AE-100 | 0.5 | 0.5 | 0.5 | 0.5 | 0.5 | 0.5 | 0.5 | 0.5 |
| pure water | remaining parts | remaining parts | remaining parts | remaining parts | remaining parts | remaining parts | remaining parts | remaining parts |

(Manufacture of the Ink Jet Print Medium 1)

Example 1

First, the front surface of the substrate 1 was coated with the solvent absorption layer coating liquid 1, which was then dried to form a thick-film solvent absorption layer on the substrate. The die coater was used for the coating, the coating speed was 5 m/min., and the amount of coating liquid applied as measured after drying was 40 g/m2. The drying temperature was 60° C. The thickness of the solvent absorption layer was 40 µm. Subsequently, with the front surface of the solvent absorption layer subjected to a dampening water treatment, the front surface of the solvent absorption layer was coated with the pigment permeation layer coating liquid 1, which was then dried to form a thin-film pigment permeation layer. The die coater was used for the coating, the coating speed was 5 m/min., and the amount of coating liquid applied as measured after drying was 5 g/m2. The drying temperature was 60° C. As described above, the ink jet print medium 1 was manufactured in which the substrate, the adhesion layer, the solvent absorption layer, and the pigment permeation layer were sequentially laminated (FIG. 20A).

The ink jet print medium 1 was cut and machined in a cut sheet form so as to be easily conveyed and printed by the ink jet printing apparatus. The pore size of the air gaps in the pigment permeation layer of the resultant ink jet print medium 1 was measured using the BET method. The pore size of the air gaps in the pigment permeation layer of the resultant ink jet print medium 1 was 180 nm. On the other hand, the pore size of the air gaps in the solvent absorption layer of the ink jet print medium 1 was 40 nm.

As is the case with a print medium 1-1 (print medium 1-1 in FT004070), a cross section of the print medium was observed using the SEM, and the size of that part of each thermoplastic resin particle which was in contact with the pigment permeation layer was measured. At this time, the average value of the sizes of 100 thermoplastic resin particles in contact with the pigment permeation layer was calculated, and based on the average value, the area of that part of one bonding material particle which was in contact with the pigment permeation layer was calculated. Then, based on an SEM projection from the print surface of the print medium, the number of the thermoplastic resin particles in contact with the pigment permeation layer was calculated, and the total area of those parts of the thermoplastic resin particles which were in contact with the pigment permeation layer was determined. The area of the exposed portion of the pigment permeation layer, which had no thermoplastic resin on the front surface, (exposed portion area) was calculated by subtracting the total area of those parts of the pieces of thermoplastic resin which were in contact with the pigment permeation layer from the total area of the measurement range. Based on the SEM projection from the print surface, the area of the thermoplastic resin portion as viewed from the print surface side of the print medium (thermoplastic resin portion area) was checked. As a result, the contact area of those parts of the pieces of thermoplastic resin which were in contact with the pigment permeation layer was smaller than the area of the thermoplastic resin portion, and the area of the exposed portion was 75% of the total area of the pigment permeation layer.

A normal image was printed on the resultant ink jet print medium 1 (FIG. 20A) with the resin-dispersing pigment ink 1 using the first manufacturing apparatus 25. Thus, the printed material 1 in Example 1 (FIG. 20B) was obtained.

In Example 1, the ink jet print medium includes the solvent absorption layer that is provided on the substrate and that is excellent in the capability of absorbing the ink solvent and the pigment permeation layer that is also provided on the substrate and that is excellent in pigment permeability. In the ink jet print medium 1, the solvent absorption layer 1601 is formed to include a thick film using inorganic particulates with a small particle size as depicted in FIG. 20A, thus providing a high solvent absorptivity. The solvent absorption layer 1601 has a firm air gap structure including inorganic particulates and a water-soluble resin. On the other hand, the inorganic particulates in the pigment permeation layer 1600 are larger in particle size than the inorganic particulates in the solvent absorption layer 1601, providing the pigment particles with permeability. The thin film of the pigment permeation layer 1600 allows a pigment image to be formed at the bottom of the pigment permeation layer so as to produce an excellent color.

The ink absorption speed of each of the pigment permeation layer 1600 and the solvent absorption layer 1601, which speed is related to the reception of the ink, is set to increase in order toward the substrate layer side. The average pore size of the pigment permeation layer 1600 is set larger than the average secondary particle size of the pigment particles, and the average pore size of the solvent absorption layer 1601 is smaller than the average secondary particle size of the pigment particles. As depicted FIG. 20B, the pigment ink is subjected to solid-liquid separation at the boundary between the pigment permeation layer 1600 and the solvent absorption layer 1601 so as to be separated into the pigment particles and the solvent components. That is, in the present example, the average secondary particle size of the pigment particles in the pigment ink is adjusted to 90 nm to 110 nm, the pore size of the pigment permeation layer is adjusted to 120 nm to 180 nm, and the pore size of the solvent absorption layer 1601 is adjusted to 10 nm to 40 nm.

The moment the pigment ink ejected from the printing unit 6 of the first printing apparatus 25 and having landed on the front surface of the pigment permeation layer came into contact with the pigment permeation layer, the ink was instantaneously drawn into the pigment permeation layer. The ink drawn into the pigment permeation layer permeated the inside of the pigment permeation layer substantially isotropically. Consequently, an image was successfully printed so as to have an appropriate area factor and a sufficient image density all over the surface of the transfer material.

Subsequently, the ink having permeated the thin pigment permeation layer and come into contact the solvent absorption layer is instantaneously drawn into the solvent absorption layer. At this time, as depicted in FIG. 20B, since the average pore size of the solvent absorption layer is smaller than the average secondary particle size of the pigment, the pigment ink was subjected to solid-liquid separation at the bottom of the pigment permeation layer to form the pigment into a dense thin-film-like image at the bottom of the pigment permeation layer. Thus, the image had an appropriate saturation. The pigment permeation layer 1600 was formed of a thin film, and thus, before the dots spread excessively, the pigment ink reached the solvent absorption layer, with the pigment particles subjected to solid-liquid separation at the bottom of the pigment permeation layer 1600. Consequently, the dots were controllably adjusted to an appropriate dot diameter, and a dense thin-film-like pigment image was formed. Thus, no image bleeding was observed even in high-resolution images. The solvent 1607 of the ink subjected to solid-liquid separation was substantially completely absorbed by the thickly formed solvent absorption layer 1601 instead of remaining on the pigment permeation layer 1600.

As described above, for the ink jet print medium 1, the pigment particles were subjected to solid-liquid separation and separated from the solvent components at the interface with the solvent absorption layer, with a dense thin-film-like pigment image formed at the bottom of the pigment permeation layer. Thus, the pigment permeation layer itself served as a protect layer for the pigment image to successfully improve the scratch resistance of the printed material.

That is, the ink jet print medium 1 eliminated the need to execute a special treatment step such as a laminate step on the printed material printed with the pigment ink, and was successfully suitably used for indoor and outdoor advertisement applications such as POP displays and prices in the fields of sign & display and graphic arts that need high-level durability of images.

Example 2-1

The printed material 1 in Example 1 depicted in FIG. 21A was conveyed between the heat roller and the pressurization roller in the thermocompression bonding unit of the first manufacturing apparatus and thus thermocompression bonded to provide a printed material 2-1 in Example 2-1 (see FIG. 21B). In the thermocompression bonding, a PET substrate (trade name: "Tetoron G2"; thickness: 25 μm; manufactured by Teijin Dupont Films Japan Limited) was laid on top of the printed material 1 in Example 1 as a smooth surface texture regulation sheet. The printed material was then conveyed between the heat roller and the pressurization roller in the thermocompression bonding unit. At this time, for the heat roller, the heating temperature was 140° C., the pressure was 3.9 Kg/cm, and the conveyance speed was 50 mm/sec. Surface observation with the SEM indicated that the pigment permeation layer of the printed material 2-1 had been formed into a film.

In Example 2-1, the pigment permeation layer of the printed material 1 in Example 1 (FIG. 21A) is configured to be formed into a molten film by being pressurized and heated. As described in Example 1, a dense thin-film-like pigment image is formed at the bottom of the pigment permeation layer 1600, and substantially all of the liquid components 1607 of the pigment ink, which correspond to the solvent of the pigment ink, are absorbed and held by the solvent absorption layer 1601. The solvent absorption layer 1601 is a firm air gap structure including inorganic particulates and a water-soluble resin and that is maintained in spite of thermocompression bonding. Thus, the solvent components are held inside the solvent absorption layer 1601 without seeping out from the solvent absorption layer 1601, and substantially no solvent components remain on the front surface of the pigment permeation layer 1600. Therefore, the thermocompression bonding treatment can be applied even immediately after an ink jet image is printed. The application of the thermocompression bonding treatment allows the resin particulates forming the pigment permeation layer 1600 to be heated to the molten film formation temperature Tg or higher so as to be formed into a molten film to enclose the pigment image 1606, forming a pigment protect image 1650, as depicted in FIG. 21B.

Thus, since the pigment protect film 1650 is a molten film, Example 2-1, compared to Example 1, successfully protected the pigment image by the action of the firm protect film. That is, Example 2-1 improved the mechanical strength such as scratch resistance performance, and enabled prevention of entry of a pollutant gas and a pollutant liquid into the printed material through the front surface thereof, allowing storage stability of the pigment image to be improved. Furthermore, the pigment image is held at the bottom of the pigment protect film 1650 that is the molten film into which the pigment permeation layer 1600 has been formed such that the pigment particles are enclosed. Thus, the pigment image is firmly held. Since the pigment protect film 1650 is the molten film, the pigment permeation layer formed into a film has no air gaps and is a substantially optically transparent layer. This inhibits haze degradation and successfully improved surface glossiness and the image visibility of the pigment image 1606.

In a variation of Example 2-1, a printed material in the variation of Example 2-1 was produced as is the case with Example 2-1 except for the use of the substrate 4 instead of the substrate 1 in Example 2-1. The printed material had the functions of the printed material in Example 1. The tackifier material was inhibited from being degraded in spite of the thermocompression bonding. Even in a case where the release paper on the back surface of the printed material was released and a foaming panel (image support) was applied to the back surface, exhibition of an appropriate bonding capability was confirmed.

Example 2-2

First, the front surface of the substrate 1 was coated with the solvent absorption layer coating liquid 1, which was then to form a thick-film solvent absorption layer on the substrate. The die coater was used for the coating, the coating speed was 5 m/min., and the amount of coating liquid applied as measured after drying was 25 g/m2. The drying temperature was 60° C. The solvent absorption layer had a thickness of 25 μm. Subsequently, with the front surface of the solvent absorption layer subjected to the dampening water treatment, the front surface of the solvent absorption layer was coated with the pigment permeation layer coating liquid 2, which was then dried to form a first thin-film pigment permeation layer. The die coater was used to apply the first pigment permeation layer, the coating speed was 5 m/min., and the amount of coating liquid applied as measured after drying was 3 g/m2. The drying temperature was 60° C. Moreover, with the front surface of the solvent absorption layer subjected to the dampening water treatment, the front surface of the solvent absorption layer was coated with the pigment permeation layer coating liquid 1, which was then dried to form a second thin-film pigment permeation layer. The die coater was used to apply the second pigment permeation layer, the coating speed was 5 m/min., and the amount of coating liquid applied as measured after drying was 3 g/m2. The drying temperature was 60° C. As described above, the ink jet print medium 2-2 was manufactured in which the substrate 50, the adhesion layer 1603, the solvent absorption layer 1600, and the second pigment permeation layer 1680 were sequentially laminated (see FIG. 30A).

The pore size of the air gaps in the first pigment permeation layer 1600 of the ink jet print medium 2-2 was 180 nm, and the pore size of the air gaps in the second pigment permeation layer 1680 was 120 nm. On the other hand, the pore size of the air gaps in the solvent absorption layer 1601 of the ink jet print medium 1 was 40 nm.

A normal image was printed on the resultant ink jet print medium 2-2 (see FIG. 30A) with the resin-dispersing pigment ink 1 using the first manufacturing apparatus 25 as is the case with Example 1. Thus, a printed material (see FIG. 30B) was obtained.

The printed material 1 depicted in FIG. 30B was conveyed between the heat roller 21 and the pressurization roller 22 in the thermocompression bonding unit 29 of the first manufacturing apparatus 25 and thus thermocompression bonded to provide a printed material 2-2 in Example 2-2 (FIG. 30C). In the thermocompression bonding, a PET substrate (trade name: "Tetoron G2"; thickness: 25 µm; manufactured by Teijin Dupont Films Japan Limited) was laid on top of the printed material depicted in FIG. 30B as a smooth surface texture regulation sheet. The printed material was then conveyed between the heat roller and the pressurization roller in the thermocompression bonding unit. At this time, for the heat roller 21, the heating temperature was 140° C., the pressure was 3.9 Kg/cm, and the conveyance speed was 50 mm/sec. Surface observation with the SEM indicated that the first pigment permeation layer 1600 and the second pigment permeation layer 1680 in the printed material 2-2 had been formed into a film.

In Example 2-2, the two pigment permeation layers 1600, 1680 form a pigment permeation layer. The second pigment permeation layer 1680 is laminated on the front surface of the first pigment permeation layer 1600 and is configured to have a larger air gap diameter than the first pigment permeation layer 1600. Like the first pigment permeation layer 1600, the second pigment permeation layer 1680 is configured to be formed into a molten film by being pressurized and heated.

The pigment ink ejected from the printing unit of the first printing apparatus and having landed on the front surface of the pigment permeation layer permeates the second pigment permeation layer 1680, and the pigment ink having permeated the air gaps in the second pigment permeation layer 1680 is quickly absorbed into the first pigment permeation layer 1600. At this time, the pigment ink permeates the inside of the first pigment permeation layer substantially isotropically, and thus, an image was successfully printed so as to have an appropriate area factor and a sufficient image density all over the surface of the transfer material. The pigment ink is subjected to solid-liquid separation at the bottom of the first pigment permeation layer 1600, and substantially all of the liquid components 1607, which correspond to the solvent of the pigment ink, are absorbed and held by the solvent absorption layer 1601, with a dense thin-film-like image formed at the bottom of the first pigment permeation layer. Thus, the image had an appropriate saturation. The first pigment permeation layer 1600 and the second pigment permeation layer 1680 are formed of thin films, and thus, before the dots spread excessively, the pigment ink reaches the solvent absorption layer, with the pigment particles subjected to solid-liquid separation at the bottom of the first pigment permeation layer 1600. Consequently, the dots were controllably adjusted to an appropriate dot diameter, and a dense thin-film-like pigment image was formed. Thus, no image bleeding was observed even in high-resolution images. The second pigment permeation layer 1680 also served as a transparent protect film configured to protect the dense thin-film-like pigment image printed at the bottom of the first pigment permeation layer 1600, successfully improving the scratch resistance of the printed material.

The ink jet print medium 2-2 has the second pigment permeation layer 1680. Thus, for printing, a large amount of pigment ink can be ejected to the ink jet print medium 2-2 to build up the pigment particles higher than the first pigment permeation layer 1600. Such printing avoids forming a white point and has been determined to enable formation of an image that is denser than an image printed on the ink jet print medium in Example 1 by ejecting the pigment ink to the medium.

As is the case with Example 2-1, the thermocompression bonding treatment allowed the first pigment permeation layer 1600 to be formed into a molten film so as to enclose the pigment image 1606. At this time, the second pigment permeation layer 1680 formed into a molten film was additionally provided on the uppermost layer of the pigment permeation layer 1600 also formed into a molten film, as a second protect film. This successfully prevented entry of a gas or a liquid through the front surface and improved the mechanical strength such as scratch resistance. Since the first pigment permeation layer 1600 and the second pigment permeation layer 1680 are formed into a molten film, the pigment permeation layer 1650 into which the first and second pigment permeation layers 1600 and 1680 are integrated is a substantially optically transparent layer having no air gap structure and forming a flat film. This inhibited haze degradation and improved surface glossiness and the visibility of the pigment image 1606.

Example 3-1

Figure 22A:
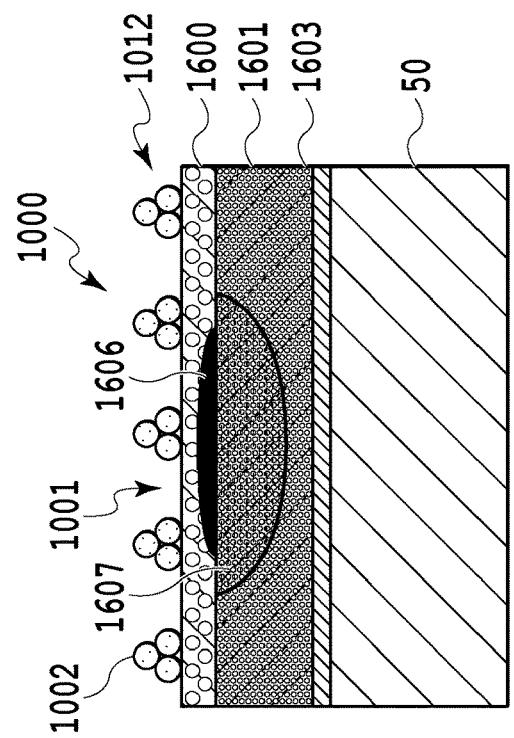
FIG. 22A and FIG. 22B are diagrams illustrating an ink jet print medium and a manufacturing method for a printed material in Example 3-1.

After the front surface of the substrate 1 was coated with the solvent absorption layer coating liquid 2, the coating liquid was dried to form a thick-film solvent absorption layer on the substrate 1 via an adhesion layer. The die coater was used for the coating, the coating speed was 5 m/min., and the amount of coating liquid applied as measured after drying was 40 g/m$^2$. The drying temperature was 60° C. The thickness of the solvent absorption layer was 40 µm. Subsequently, with the front surface of the solvent absorption layer subjected to the dampening water treatment, the front surface of the solvent absorption layer was coated with the pigment permeation layer coating liquid 1, which was then dried to form a thin-film pigment permeation layer 1600. The die coater was used for the coating, the coating speed was 5 m/min., and the amount of coating liquid applied as measured after drying was 5 g/m$^2$. The drying temperature was 60° C. The front surface of the pigment permeation layer 1600 was coated with the resin layer coating liquid 1, which was then dried to form a resin layer 1012 on the front surface of the pigment permeation layer 1600 of the pigment ink provided on the substrate 50. For the resin layer 1012, the pieces of thermoplastic resin 1002 were discretely provided on the front surface of the pigment permeation layer 1600 to form the resin layer 1012 such that the front surface of the pigment permeation layer 1600 was directly exposed in a part of the resin layer 1012. Thus, an ink jet print medium 3-1 (see FIG. 22A) was produced. The gravure coater was used to apply the resin layer coating liquid 1 for the solvent absorption layer 1601, and the coating speed was 5 m/min. The drying temperature was 60° C. The number of groove lines in the gravure roll was 200. The resin layer 1012 formed like islands had a thickness of 1.24 µm. The air gaps in the solvent absorption layer 1601 of the ink jet print medium 3-1 had a pore size of 10 nm. The air gaps in the pigment permeation layer 1600 of the ink jet print medium 3-1 had a pore size of 180 nm.

A cross section of the ink jet print medium 3-1 was observed using the SEM, and the size of that part of each thermoplastic resin particle which was in contact with the pigment permeation layer was measured. At this time, the average value of the sizes of 100 pieces of thermoplastic resin 1002 in contact with the pigment permeation layer 1600 was calculated, and based on the average value, the area of that part of one particle of thermoplastic resin 1002 which was in contact with the pigment permeation layer 1600 was calculated. Then, based on an SEM projection from the print surface, the number of the pieces of thermoplastic resin 1002 in contact with the pigment permeation layer 1600 was calculated, and the total area of those parts of the pieces of thermoplastic resin 1002 which were in contact with the pigment permeation layer 1600 was determined. The area of the exposed portion 1001 of the pigment permeation layer 1600, which had no thermoplastic resin on the front surface, (exposed portion 1001 area) was calculated by subtracting the total area of those parts of the pieces of thermoplastic resin 1002 which were in contact with the pigment permeation layer 1600 from the total area of the measurement range. Based on the SEM projection from the print surface side, the area of the thermoplastic resin portion 1000 as directly viewed (bonding portion area) was checked. As a result, the contact area was smaller than the thermoplastic resin portion 1000 area, and the exposed portion 1001 area was 75% of the total area of the pigment permeation layer 1600.

An image was printed on the ink jet print medium 3-1 resulting from the above-described step with the pigment ink 1 using the first manufacturing apparatus 25 as is the case with Example 1. Thus, a printed material 3-1 in Example 3-1 (see FIG. 22B) was obtained.

Figure 22B:
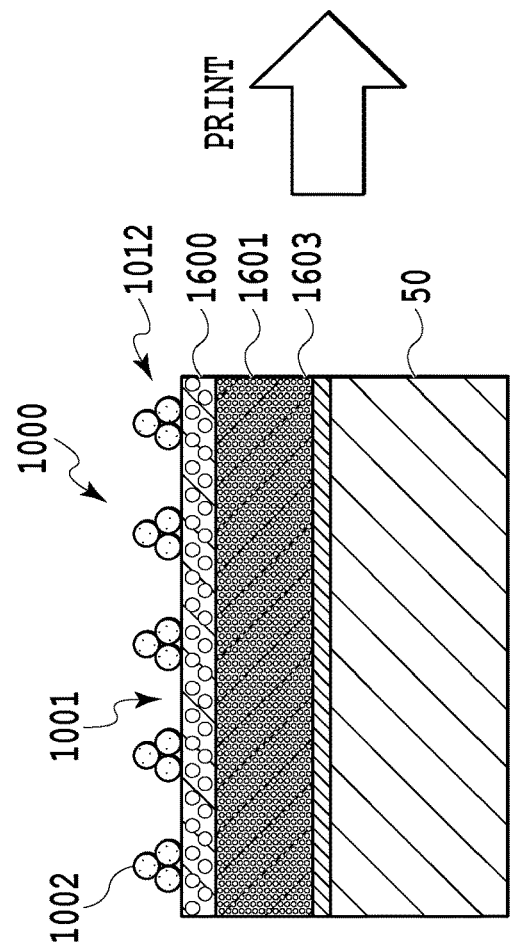

In the ink jet print medium 3-1 (see FIG. 22A), the pieces of thermoplastic resin 1002, which have an inferior ink absorptivity, are discretely provided on the front surface of the pigment permeation layer 1600 to form the resin layer 1012 such that the front surface of the pigment permeation layer 1600 is directly exposed in the portion 1001 of the resin layer 1012. The ink absorption speed of each of the resin layer 1012, the pigment permeation layer 1600 and the solvent absorption layer 1601, which speed is related to the reception of the ink, is set to increase in order toward the substrate layer side. The pigment ink lands from the resin layer 1012 side. When a portion of a droplet of the pigment ink comes into contact with the exposed portion 1001 where the pigment permeation layer 1600 is directly exposed, all of the droplet of the pigment ink is quickly drawn into the pigment permeation layer 1600, which has a high ink absorption speed in the air gap structure and which has the air gaps each larger than each pigment particle. As depicted in FIG. 22B, the pigment ink infiltrates and diffuses quickly into the pigment permeation layer 1600 with the air gaps each larger than each pigment particle, but is subjected to solid-liquid separation at the interface with the solvent absorption layer 1601 with the air gaps each smaller than each pigment particle and separated into the pigment image 1606 and the solvent components 1607. Therefore, the pigment is formed into a dense thin-film-like image at the bottom of the pigment permeation layer 1600, and thus, the image had an appropriate saturation. The pigment permeation layer 1600 is thinly formed, and thus, before the dots spread excessively, the pigment ink reaches the solvent absorption layer 1601, with the pigment particles subjected to solid-liquid separation at the bottom of the pigment permeation layer 1600. Consequently, the dots were controllably adjusted to the appropriate dot diameter, and a dense thin-film-like pigment image was formed. Thus, no image bleeding was observed even in high-resolution images.

In the pigment permeation layer 1600, the pigment ink diffuses and infiltrates not only in the film thickness direction but also in the film planar direction. Therefore, with the pigment ink moving around to the area immediately below the pieces of thermoplastic resin 1002 to suppress a possible white point that is a non-image portion, the pigment image 1606 can be formed at the bottom of the pigment permeation layer 1600. Thus, a high-resolution image can be formed.

In addition to the pigment permeation layer 1600, the resin layer 1012 functions as a protect film, allowing the scratch resistance performance to be improved. The solvent of the pigment ink was substantially wholly absorbed by the thickly provided solvent absorption layer 1601 instead of remaining in the pigment permeation layer 1600.

Example 3-2

The printed material 3-1 in Example 3-1 depicted in FIG. 23A was conveyed between the heat roller 21 and the pressurization roller 22 in the thermocompression bonding unit of the first manufacturing apparatus and thus thermocompression bonded to provide a printed material 3-2 in Example 3-2 (see FIG. 23B). In the thermocompression bonding, a PET substrate (trade name: "Tetoron G2"; thickness: 25 μm; manufactured by Teijin Dupont Films Japan Limited) was laid on top of the printed material depicted in FIG. 23A as a smooth surface texture regulation sheet. The printed material was then conveyed between the heat roller and the pressurization roller in the thermocompression bonding unit. At this time, for the heat roller 21, the heating temperature was 140° C., the pressure was 3.9 Kg/cm, and the conveyance speed was 50 mm/sec. Surface observation with the SEM indicated that the pigment permeation layer 1600 and the resin layer 1012 in the printed material 3-2 had been formed into a film.

In Example 3-2, the pigment permeation layer 1600 of the printed material in Example 3-1 (see FIG. 23A) is configured to be formed into a molten film by thermocompression bonding, along with the thermoplastic resin 1002.

As is the case with Example 2-1, substantially all of the solvent components of the pigment ink, which are the liquid components of the pigment ink, are absorbed by the solvent absorption layer 1601, and the air gap structure of the solvent absorption layer 1601 is also maintained by thermocompression bonding. Thus, the solvent components are continuously held inside the solvent absorption layer 1601 without seeping out from the solvent absorption layer 1601. Therefore, the thermocompression bonding treatment was successfully applied even immediately after ink jet printing. As depicted in FIG. 23B, the resin particulates included in the pigment permeation layer 1600 can be formed into a molten film by being heated to the molten film formation temperature Tg or higher by thermocompression bonding. Thus, the pigment permeation layer 1600, along with the thermoplastic resin 1002, is formed into a molten film so as to enclose the pigment image 1606 to eliminate the air gap structure, allowing the enhanced pigment protect film 1651 to be formed.

Consequently, the enhanced pigment protect film 1651 is the molten film into which both the thermoplastic resin 1002 and the pigment permeation layer 1600 are formed, and is thus thicker and firmer than the pigment protect film 1650 that is the molten film into which only the pigment permeation layer 1600 is formed. Thus, the pigment image was successfully more firmly protected. That is, this further increased the mechanical strength such as scratch resistance and successfully further improved the light resistance of the pigment image with respect to stimulant light from the front surface of the ink jet printed material. Furthermore, the pigment particles are held at the bottom of the enhanced pigment protect film 1651 so as to be enclosed, thus allowing the pigment image 1606 to be firmly held. In a case where the pigment permeation layer and the resin layer 1012 are integrally formed into a molten film, the resultant enhanced pigment protect film 1651 is a substantially optically transparent layer forming a flat film. This reduced haze and successfully improved surface glossiness and the visibility of the pigment image 1606.

Example 3-3

An ink jet print medium 3-3 was obtained as is the case with Example 1 except for the use of the pigment permeation layer coating liquid 3 instead of the pigment permeation layer coating liquid 1, the use of the resin layer coating liquid 2 instead of the resin layer coating liquid 1, and setting of the drying temperature during manufacture of the ink jet print medium to 35° C. The air gaps in the pigment permeation layer of the ink jet print medium 3-3 had a pore size of 120 nm. On the other hand, the air gaps in the solvent absorption layer of the ink jet print medium 3-3 had a pore size of 40 nm. Then, an image was printed with the resin-dispersing pigment ink 1 using the first manufacturing apparatus 25 as is the case with Example 1. Thus, a printed material depicted in FIG. 24A was obtained. The printed material depicted in FIG. 24A was conveyed between the heat roller and the pressurization roller in the thermocompression bonding unit of the first manufacturing apparatus and thus thermocompression bonded to provide a printed material 3-3 in Example 3-3 (see FIG. 24B). In the thermocompression bonding, a PET substrate (trade name: "Tetoron G2"; thickness: 25 μm; manufactured by Teijin Dupont Films Japan Limited) was laid on top of the printed material depicted in FIG. 24A as a smooth surface texture regulation sheet. The printed material was then conveyed between the heat roller and the pressurization roller in the thermocompression bonding unit. At this time, for the heat roller 21, the heating temperature was 95° C., the pressure was 3.9 Kg/cm, and the conveyance speed was 50 mm/sec. Surface observation with the SEM indicated that, with the pigment permeation layer of the printed material 3-3 not formed into a molten film but maintaining the air gap structure, the thermoplastic resin had been formed into a molten film so as to fill the air gap structure.

Example 3-3 is different from Example 3-2 in that the pigment permeation layer 1600 of the printed material 3-3 is not formed into a molten film by thermocompression bonding but that the thermoplastic resin 1002 softened and melted by the thermocompression bonding is formed into a film so as to fill the air gap structure. That is, the molten film formation temperature of the resin particulates forming the pigment permeation layer is higher than the heating temperature of the heat roller, and thus, the air gap structure of the pigment permeation layer 1600 is maintained as depicted in FIG. 24B. On the other hand, the molten film formation temperature of the thermoplastic resin particles 1002 is low, and thus, thermocompression bonding allows the thermoplastic resin particles to be softened and melted to flow and permeate the pigment permeation layer 1600. The thermoplastic resin particles are thus formed into a film so as to fill the air gaps in the pigment permeation layer 1600. Consequently, the pigment image 1606 is held at the bottom of the enhanced pigment protect film 1651 formed into a molten film such that the pigment particles are enclosed.

Therefore, like Example 3-2, Example 3-3 allowed formation of the firm protect film protecting the pigment image, and allowed improvement of the mechanical strength such as scratch resistance performance and of the light resistance of the pigment image with respect to stimulant light from the front surface of the ink jet printed material. The resin layer 1012 is formed into a film so as to fill the air gaps in the pigment permeation layer, and thus, the protect film covering the front surface of the printed material is a substantially transparent flattened film. This reduced haze and successfully improved surface glossiness and thus the visibility of the pigment image.

Example 3-4

An ink jet print medium 3-4 was produced as is the case with Example 3-1 except for the use of the resin layer coating liquid 3 instead of the resin layer coating liquid 1, and an image was printed on the ink jet print medium 3-4 with the pigment ink 1 to provide a printed material depicted in FIG. 25A. Then, the printed material depicted in FIG. 25A was thermocompression bonded as is the case with Example 3-2 to provide a printed material 3-4 in Example 3-4 depicted in FIG. 25B. Surface observation with the SEM indicated that a part of the resin layer remained in the particle state instead of being formed into a film.

Example 3-4 is different from Example 3-2 in that the thermoplastic resin 1002 of the resin layer 1012 contains the surface texture improvement agent 1653 that is not formed into a molten film in spite of pressurization and heating as depicted in FIG. 25A. That is, as depicted in FIG. 25B, the surface texture improvement agent 1653 has a molten film formation temperature higher than the heating temperature of the heat roller, and was thus not formed into a molten film in spite of the thermocompression bonding treatment but remained in the particle state. That is, even in a case where the pigment permeation layer 1600 and the resin layer 1012 are integrally formed into a molten film such that the pigment particles are enclosed by the resultant enhanced pigment protect film 1651, the surface texture improvement agent is not formed into a molten film in spite of pressurization and heating. Thus, the surface texture improvement agent 1653 remained in the particle state and in the sea and island form on the front surface of the enhanced pigment protect film 1651. Some of the surface texture improvement agent particles were embedded in the enhanced pigment protect film 1651 and firmly immobilized by the enhanced pigment protect film 1651. Therefore, the printed material 3-4 had its surface texture improved by the surface texture improvement agent. Furthermore, the enhanced pigment protect film 1651 is transparent, and thus, the image visibility was improved. In addition, the surface texture improvement agent allows recesses and protrusions to remain on the front surface, enabling the gloss of the front surface to be suppressed to form a matte front surface. Thus, the front surface was successfully provided with high-level texture.

Since Example 3-3 is similar to Example 3-2 except that the resin layer 1012 of the ink jet print medium contains the surface texture improvement agent 1653, Example 3-3 provided the firm protect film allowing the pigment image to be protected, and allowed improvement of the mechanical strength such as scratch resistance performance and of the light resistance of the pigment image with respect to stimulant light from the front surface of the ink jet printed material.

Example 4-1

An ink jet print medium 4-1 was obtained as is the case with Example 3-1 except for the use of the pigment permeation layer 2 instead of the pigment permeation layer 1 in Example 1 and the use of the solvent absorption layer coating liquid 3 instead of the solvent absorption layer coating liquid 1. The air gaps in the pigment permeation layer of the ink jet print medium 4-1 had a pore size of 120 nm, and the air gaps in the solvent absorption layer had a pore size of 10 nm. An image was printed on the ink jet print medium 4-1 using the pigment ink 2 instead of the pigment ink 1 in Example 1 and was sufficiently dried to provide a printed material depicted in FIG. 26A. The printed material depicted in FIG. 26A was thermocompression bonded using the heat roller heated to 140° C. Thus, a printed material 4-1 in Example 4-1 depicted in FIG. 26B was obtained. In the thermocompression bonding, a PET substrate (trade name: "Tetoron G2"; thickness: 25 µm; manufactured by Teijin Dupont Films Japan Limited) was laid on top of the printed material depicted in FIG. 26A as a smooth surface texture regulation sheet. The printed material was then conveyed between the heat roller and the pressurization roller in the thermocompression bonding unit. Surface observation with the SEM indicated that the pigment permeation layer and the solvent absorption layer had been formed into a film.

The ink jet print medium 4-1 is different from Example 1 in several respects.

First, ink jet printing is performed using a high-image-quality pigment ink containing pigment particles with a small particle size. Second, the pigment permeation layer 1600 has a slightly smaller air gap diameter in accordance with the pigment particles with the small particle size. Third, the inorganic particulates forming the solvent absorption layer 1601 have a significantly reduced average particle size in accordance with the pigment particles with the small particle size, thus allowing the optimal ink absorption speed to be maintained.

Example 4-1 is also different from Example 2-1 in that the solvent absorption layer 1601 depicted in FIG. 26A is formed into a molten film by being pressurized and heated as depicted in FIG. 26B. That is, the solvent absorption layer 1601 of the air gap absorption type is formed in which the air gaps are formed by using a binder resin to bind resin particulates that are likely to be melted and deformed by being pressurized and heated as is the case with the pigment permeation layer 1600. Since the pores in the solvent absorption layer 1601 are similar to the pores in Example 1, immediately after ink jet printing is performed using the pigment ink, the ink having passed through the pigment permeation layer 1600 has been subjected to solid-liquid separation at the interface between the pigment permeation layer 1600 and the solvent absorption layer 1601, and the pigment particles have formed a dense thin-film-like image at the bottom of the pigment permeation layer, whereas substantially all of the solvent components, which are the liquid components of the pigment ink, have been absorbed by the solvent absorption layer 1601. Therefore, after ink jet printing using the pigment ink, the volatile solvent components absorbed by the solvent absorption layer 1601 are sufficiently dried so as to inhibit the solvent components to seep out even in a case where the resin particulates of the solvent absorption layer 1601 are softened and melted to eliminate the air gap structure, as depicted in FIG. 26A. As depicted in FIG. 26B, thermocompression bonding allows not only the pigment permeation layer 1600 but also the solvent absorption layer 1601 to be integrally formed into a molten film. Thus, the solvent absorption layer 1601 formed into a transparent film by being softened and melted functions as a firm protect film 1655 for the pigment image 1606 formed on the pigment permeation layer 1600. Thus, compared to a solvent absorption layer that maintains the air gap structure, the above-described solvent absorption layer 1601 allows prevention of contamination resulting from, for example, a pollutant liquid or a toxic gas flowing through the end face of the image printed material or the like, thus allowing the long-term storage stability to be further improved.

Example 4-2

An ink jet print medium 4-2 (see FIG. 27A) was obtained by changing the substrate 1 in Example 4-1 to the substrate 2 and coating and drying the resin layer coating liquid 4 on the front surface of the pigment permeation layer of the ink jet print medium 4-1. The air gaps in the pigment permeation layer of the ink jet print medium 4-2 had a pore size of 120 nm. On the other hand, the air gaps in the solvent absorption layer of the ink jet print medium 4-2 had a pore size of 10 nm. The results of measurement similar to the measurement in Example 2-1 indicated that the area of the exposed portion of the pigment permeation layer of the manufactured print medium was 75% of the total area of the pigment permeation layer.

An inverted image 1606 was printed on the resultant ink jet print medium 4-2 (see FIG. 27A) with the resin-dispersing pigment ink 2 using the above-described first manufacturing apparatus 25 and was sufficiently dried to provide a printed material depicted in FIG. 27B. As the printing unit 6 of the first manufacturing apparatus 25, a pigment ink jet printer equipped with a serial head (trade name "PIXUS PRO-1"; manufactured by Canon Inc.) was used. The above-described pigment ink 2 was installed in the printer, and an inverted image was printed in a Kirei mode (ejection volume: 4 pl; resolution: 1,200 dpi; color printing). The printed material depicted in FIG. 27B was conveyed between the heat roller 21 and the pressurization roller 22 in the thermocompression bonding unit of the first manufacturing apparatus 25 and thus thermocompression bonded to provide a printed material 4-2 in Example 4-2 (see FIG. 27C). At this time, for the heat roller 21, the heating temperature was 95° C., the pressure was 3.9 Kg/cm, and the conveyance speed was 50 mm/sec. Surface observation with the SEM indicated that the pigment permeation layer 1600 and the resin layer 1012 in the printed material 4-2 had been formed into a film and that the solvent absorption layer had also been formed into a film.

The printed material 4-2 in Example 4-2 is different from the printed material 4-1 in Example 4-1 in several respects because the substrate 50 is used as a firm protect layer for the printed pigment image to make the image 1606 visible from the substrate 50 side. First, the substrate 50 is thick and transparent. Second, ink jet printing is performed using a high-image-quality pigment ink containing pigment particles with a small particle size. The pigment permeation layer 1600 has a slightly smaller air gap diameter in accordance with the pigment particles with the small particle size. Third, the inorganic particulates forming the solvent absorption layer 1601 have a very small average particle size, and thus, the air gap diameter is set sufficiently smaller than the size of visible light so as to allow substantially all of the visible light to pass through, resulting in a very high transparency of the solvent absorption layer. Fourth, as depicted in FIG. 27C, all of the pigment permeation layer 1600, the resin layer 1012, and the solvent absorption layer 1601 are formed into a molten film by being pressurized and heated. In this case, the resin layer 1012 contains a white pigment, and thus, the solvent absorption layer 1601 and the pigment permeation layer 1600 were integrally formed into a molten film by thermocompression bonding to allow the resultant enhanced pigment protect film 1651 to function as a masking layer.

As depicted in FIG. 27C, the substrate 50 forms a transparent thick layer, providing an excellent image visibility. The substrate 50 further functions as a very firm protect film, and thus, the pigment image was successfully firmly protected. On the other hand, the pigment permeation layer 1600 and the resin layer 1012 functioned as a protect film for the back surface of the image. That is, Example 4-2 significantly improved the mechanical strength such as scratch resistance performance, and also successfully improved the light resistance of the pigment image with respect to stimulant light.

Furthermore, the average air gap diameter of the solvent absorption layer 1601 is controllably adjusted to a very small value of appropriately 10 nm, which is sufficiently smaller than the size of visible light. This significantly reduced haze and significantly increased the transparency, leading to an excellent image visibility. As depicted in FIG. 27C, the resin particulates of the solvent absorption layer are softened and melted by thermocompression bonding to eliminate the air gap structure, thus forming the solvent absorption layer 1601 into a transparent film. This further successfully enhanced the image visibility. Therefore, in a case where the inverted image of the printed material 4-2 was viewed in the direction of arrow 1649 via the substrate 50, the adhesion layer 1603, and the solvent absorption layer 1601 as depicted in FIG. 27C, the image density was very appropriate.

As depicted in FIG. 27C, in Example 4-2, the solvent absorption layer 1601, the pigment permeation layer 1600, and the resin layer 1012 are formed into a molten film so as to enclose the pigment image 1606. Thus, in a case where the resin layer 1012 contains a white pigment 1656, an enhanced pigment protect film 1651 serves as a background masking layer, and the image is formed with a white scattering layer as a background. Therefore, the image viewed via the substrate, the adhesion layer, and the solvent absorption layer has a high contrast, and thus, a high visibility was successfully achieved. Furthermore, the pigment permeation layer 1600 and the resin layer 1012 serve as a protect layer for the image back surface, allowing the durability and storage stability of the printed material 4-2 to be improved.

Moreover, the solvent absorption layer 1601 softened and melted and thus formed into a transparent film functions as a firm protect film for the pigment image 1606 formed on the pigment permeation layer 1600. Thus, compared to a solvent absorption layer that maintains the air gap structure, the above-described solvent absorption layer 1601 allows prevention of contamination resulting from, for example, a pollutant liquid or a toxic gas flowing through the end face of the image printed material or the like, thus allowing the long-term storage stability to be further improved.

Example 4-3

An ink jet print medium 4-3 and a printed material 4-3 were obtained as is the case with Example 4-2 except for the use of the resin layer coating liquid 5 instead of the resin layer coating liquid 4 in Example 4-2. Example 4-3 is different from Example 4-2 in that the resin layer 1012 is a white fluorescent protect layer containing white particles and fluorescent particles. The ink jet print medium 4-3 maintains functions similar to the functions described in Example 4-2. The enhanced pigment protect film 1651 has a white fluorescent function and thus serves as a background masking layer to improve the visibility of the pigment image. Moreover, the fluorescent particles contained in the white fluorescent protect layer emit light, and thus, the image visibility in a dark room was further successfully improved. Light emitted from the white fluorescent protect layer is more likely to pass through the solvent absorption layer, and thus, further improved visibility of the pigment image was confirmed.

Example 5

An ink jet print medium 5 (see FIG. 28A) was obtained as is the case with Example 1 except for the use of the substrate 3 instead of the substrate 1 in Example 1, the use of the value of 10 g/m$^2$ instead of the value of 40 g/m$^2$ for the amount of solvent absorption layer coating liquid applied as measured after drying in Example 1, the use of the pigment permeation layer 2 instead of the pigment permeation layer 1, the use of a second manufacturing apparatus 30, and the use of the roll-like ink jet print medium 5 instead of the cut sheet-like ink jet print medium 1. The pore size of the air gaps in the pigment permeation layer of the ink jet print medium 5 was 120 nm. On the other hand, the pore size of the air gaps in the solvent absorption layer of the ink jet print medium 5 was 40 nm.

Subsequently, an image was printed on the ink jet print medium 5 to provide a printed material depicted in FIG. 35B. The printed material depicted in FIG. 28B was then thermocompression bonded using the heat roller heated 100° C. Thus, a printed material 5 in Example 5 (see FIG. 28C) was obtained. Surface observation with the SEM indicated that the pigment permeation layer had been formed into a film.

The ink jet print medium 5 (FIG. 28A) has the heat seal layer 1200 on the back surface of the substrate 50 and is suitable for a packing material. The configuration of the ink jet print medium 5 except for the substrate is similar to the configuration in Example 1, and thus, the basic functions of the ink jet print medium 5 are similar to the basic functions in Example 1. Therefore, high-resolution and high-density ink jet printing allowed a high-density high-definition thin-film-like normal pigment image to be formed at the bottom of the pigment permeation layer as depicted in FIG. 28B. Thermocompression bonding allows the pigment permeation layer 1600 to be formed into the pigment protect film 1650 as depicted in FIG. 28C. Thus, the function to protect the pigment image was further enhanced to exhibit particularly appropriate scratch resistance performance. Furthermore, during the thermocompression bonding, the pigment permeation layer 1600 is softened and formed into a molten film so as to enclose the pigment image on the uppermost layer, forming a flat print surface. This inhibited unwanted light scattering and improved surface glossiness, achieving much higher image quality.

In the ink jet print medium 5 (FIG. 28A), the constituent materials of the resin particulates forming the pigment permeation layer 1600 and the water-soluble resin (in PVA, the vinyl acetate group contributing to the bonding capability) have SP values close to the SP value of the constituent material of the heat seal layer 1200. Thus, the pigment permeation layer 1600 and the heat seal layer 1200 were successfully thermally bonded together. The pigment permeation layers were successfully thermally bonded together. The heat seal layers were successfully thermally bonded together. The heat seal layer 1200 provided between the substrate 50 and the solvent absorption layer 1601 acts as the adhesion layer 1603. The water-soluble resin (in PVA, the vinyl acetate group contributing to the bonding capability) forming the solvent absorption layer 1601 has an SP value close to the SP value of the constituent material of the adhesion layer 1603. This improves the adhesion between the substrate 50 and the solvent absorption layer 1601. Therefore, in particular, in a case where the ink jet print medium was used as a packaging material, at the time of unsealing, the ink receiving layer was inhibited from remaining at a tear as burrs or peeling off from the substrate forming the packaging film, or in a case where the ink jet print medium was folded at an acute angle, the ink receiving layer was inhibited from falling off from the substrate or being broken at the fold, and exhibited appropriate folding performance.

Comparative Example 1

An ink jet print medium 6 and a printed material 6 in Comparative Example 1 were obtained as is the case with Example 1 except for the use of the solvent absorption layer coating liquid 1 instead of the pigment permeation layer coating liquid 1 forming the pigment permeation layer in Example 1 and the use of the pigment permeation layer coating liquid 1 instead of the solvent absorption layer coating liquid 1 forming the solvent absorption layer.

In Comparative Example 1, the pore size of the pigment permeation layer is smaller than the average secondary particle size of the pigment ink. Thus, the pigment particle-like pieces of the pigment ink failed to permeate the inside of the pigment permeation layer and was subjected to solid-liquid separation on the front surface of the pigment permeation layer, with the color material remaining on the front surface. Therefore, the printed material exhibited very low scratch resistance.

Comparative Example 2

An ink jet print medium 7 and a printed material 7 in Comparative Example 2 were obtained as is the case with Example 1 except for the use of a solvent absorption layer coating liquid 6 instead of the solvent absorption layer 1 in Example 1.

In Comparative Example 2, the air gaps in the solvent absorption layer are each formed to be larger than each of the pores in the pigment permeation layer. The pores in the pigment permeation layer are each larger than the average secondary particle size of the pigment ink. Thus, after permeating the inside of the pigment permeation layer, the pigment particle-like pieces of the pigment ink further permeated the solvent absorption layer and dispersed widely, leading to a reduced image density. In Comparative Example 2, the solvent absorption layer has a lower ink absorption speed than the pigment permeation layer. Thus, the solvent of the pigment ink was retained inside the pigment permeation layer for a longer duration to cause excessive permeation and diffusion of the pigment, resulting in image bleeding.

(Scratch Resistance Performance)

The print surfaces (color material receiving layer) of the ink jet print media in Examples or Comparative Examples were evaluated for scratch resistance performance in a case where the print surface was printed with a solid 100% image using a black ink. The print surface was rubbed 30 times with sulfonic paper using a Gakushin tester to apply a load of a 500-g weight. For the evaluation, the optical density of the black ink image was measured using an optical reflective densitometer (trade name: "RD-918"; manufactured by GretagMacbeth), and a residual OD ratio was calculated in accordance with Equation (1). The results are illustrated in Table 2 and Table 3.

$$\text{Residual OD ratio} = (\text{OD after tests}/\text{OD before tests}) \times 100\% \quad \text{Equation (1)}$$

◇: the residual OD ratio is 99% or more.
⊙: the residual OD ratio is 97% or more and less than 99%.
○: the OD residual ratio is 90% or more and less than 97%.
Δ: the OD residual ratio is 80% or more and less than 90%.
x: the OD) residual ratio is less than 80%.

(Image Properties (Image Bleeding, Image Density))

The print surfaces (color material receiving layer) of printed materials including the ink jet print media in Examples or Comparative Examples printed with BK solid 100% images were evaluated for image properties (image bleeding, image density). For the evaluation, the print surfaces were visually checked. The results are illustrated in Table 2 and Table 3.

○: the imaged density if 1.5 or more and no bleeding occurs. Δ: the image density is 1.0 or more and 1.5 or less or slight image bleeding occurs. x: the image density is 1.0 or less or image bleeding occurs.

(Storage Stability (Water Resistance Tests))

Printed portions of printed materials including ink jet print media in Examples or Comparative Examples printed with BK solid 100% images were evaluated for long-term storage stability by being immersed in water for 48 hours. The results are illustrated in Table 2 and Table 3.

○: water does not permeate the ink receiving layer of the ink jet print medium. Δ: water slightly permeates the ink receiving layer of the ink jet print medium, and the image slightly bleeds but is legible. x: water permeates the ink receiving layer of the ink receiving layer, and the image bleeds and is illegible.

TABLE 2

| | Example 1 | Example 2-1 | Example 2-2 | Example 3-1 | Example 3-2 | Example 3-3 | Example 3-4 |
|---|---|---|---|---|---|---|---|
| ink jet print medium | ink jet print medium 1 | ink jet print medium 2-1 | ink jet print medium 2-2 | ink jet print medium 3-1 | ink jet print medium 3-2 | ink jet print medium 3-3 | ink jet print medium 3-4 |
| printed Material | printed material 1 | printed Material 2-1 | printed Material 2-2 | printed Material 3-1 | Printed Material 3-2 | printed Material 3-3 | printed Material 3-4 |
| substrate | white PET | white PET | white PET | white PET | white PET | white PET | white PET |
| pore size of solvent absorption layer (nm) | 40 | 40 | 40 | 10 | 10 | 10 | 40 |

TABLE 2-continued

|  | Example 1 | Example 2-1 | Example 2-2 | Example 3-1 | Example 3-2 | Example 3-3 | Example 3-4 |
|---|---|---|---|---|---|---|---|
| pore size of pigment permeation layer (nm) | 180 | 180 | first pigment permeation layer 180 second pigment permeation layer 120 | 180 | 180 | 180 | 180 |
| sea-and-island-like protect film enhancing layer | — | — | — | provided | provided | provided | provided |
| heating treatment for pigment permeation layer | not executed | executed | executed | not executed | executed | executed | executed |
| scratch resistance performance | Δ | ⊙ | ⊙ | ○ | ◇ | ◇ | ◇ |
| print properties | Δ | ○ | ○ | Δ | ○ | ○ | ○ |
| long-term storage stability | Δ | Δ | Δ | Δ | Δ | Δ | Δ |

TABLE 3

|  | Example 4-1-1 | Example 4-2 | Example 4-3 | Example 5 | Comparative Example 1 | Comparative Example 2 |
|---|---|---|---|---|---|---|
| ink jet print medium | ink jet print medium 4-1 | ink jet print medium 4-2 | ink jet print medium 4-3 | ink jet print medium 5 | ink jet print medium 6 | ink jet print medium 7 |
| printed Material | printed Material 4-1 | printed Material 4-2 | printed Material 4-3 | printed material 5 | printed material 6 | printed material 7 |
| substrate | white PET | transparent PET | transparent PET | OPP | white PET | white PET |
| pore size of solvent absorption layer (nm) | 10 | 10 | 10 | 40 | 120 | 200 |
| pore size of pigment permeation layer (nm) | 120 | 120 | 120 | 120 | 10 | 120 |
| sea-and-island-like protect film enhancing layer | — | provided | provided | — | — | — |
| heating treatment for pigment permeation layer | executed | executed | executed | executed | not executed | not executed |
| scratch resistance performance | ⊙ | ◇ | ◇ | ⊙ | X | ○ |
| print properties | ○ | ○ | ○ | ○ | ○ | X |
| long-term storage stability | ○ | ○ | ○ | Δ | X | X |

Second Embodiment

First, a second embodiment of the present invention will be described in brief. In the second embodiment, items different from the first embodiment are mainly described.
(Outline of the Present Invention)

Figure 35:
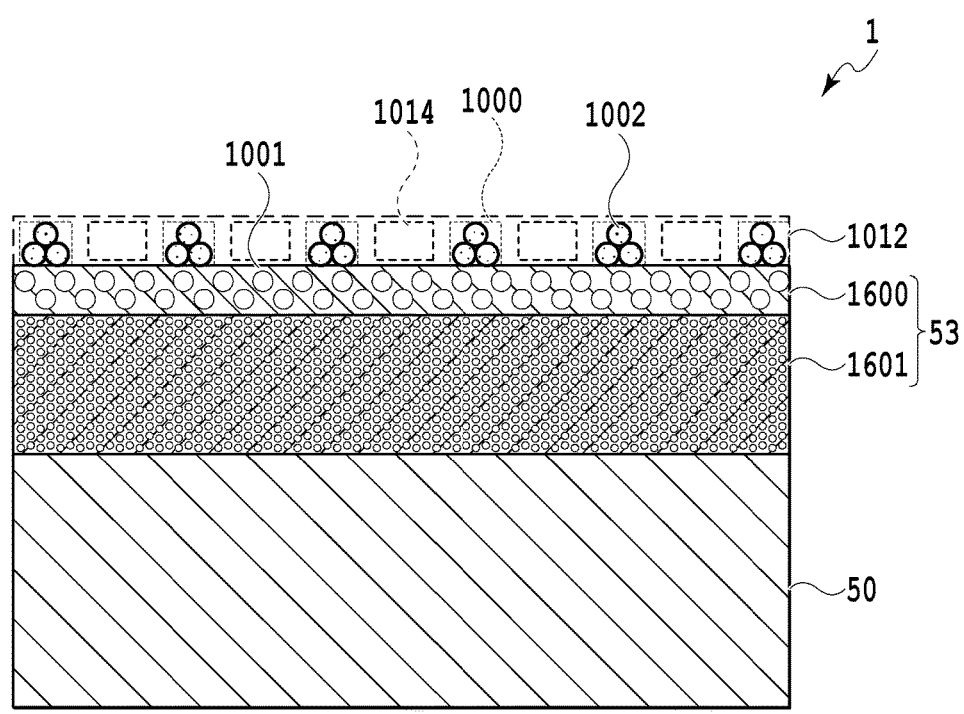
FIG. 35 is a cross-sectional view of a print medium according to a second embodiment of the present invention.
Figure 36:
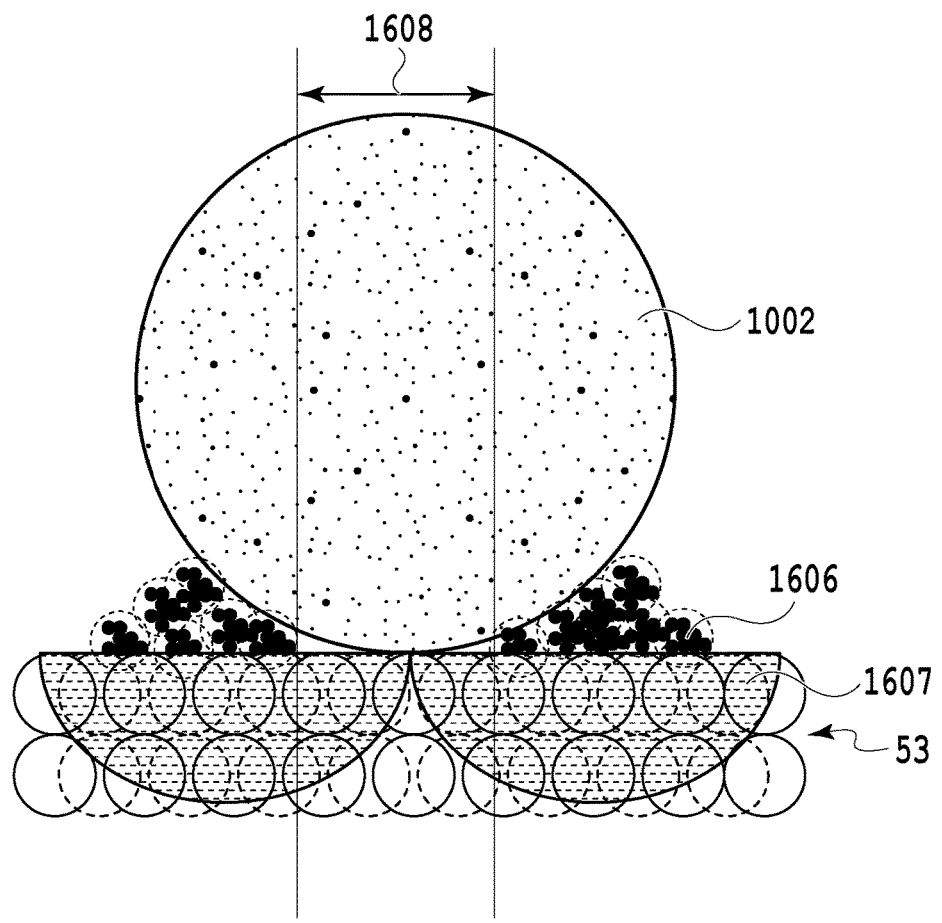
FIG. 36 is a diagram illustrating a white point that is likely to occur in an ink receiving layer with a single-layer structure.

In a print medium 1 of the present invention, two or more ink receiving layers 53 and a resin layer 1012 are sequentially provided as depicted in FIG. 35. The ink receiving layer 53 closer to the substrate is a thick-film solvent absorption layer 1601 of an air gap absorption type that is excellent in absorption of solvent components of a pigment ink. The ink receiving layer 53 closer to the resin layer is a thin-film pigment permeation layer 1600 of the air gap absorption type that is excellent in permeation of pigment components and the solvent components of the pigment ink. The resin layer 1012 is formed of pieces of thermoplastic resin 1002 discretely provided so as to include an exposed portion 1001 where a front surface of the pigment permeation layer 1600 is exposed.

As depicted in FIG. 2A, a pigment ink 1003 applied via the resin layer 1012 diffuses and infiltrates quickly throughout the pigment permeation layer 1600. Consequently, printing with an excellent area factor can be achieved. As depicted in FIG. 3B, the pigment ink 1003 is subjected to solid-liquid separation at an interface between the pigment permeation layer 1600 that can be permeated by the pigment components and the solvent components and the solvent absorption layer 1601 that can absorb the solvent components. The pigment particles, which correspond to a color material, form a dense thin-film-like pigment image 1606 at the bottom of the pigment permeation layer 1600.

Figure 37:
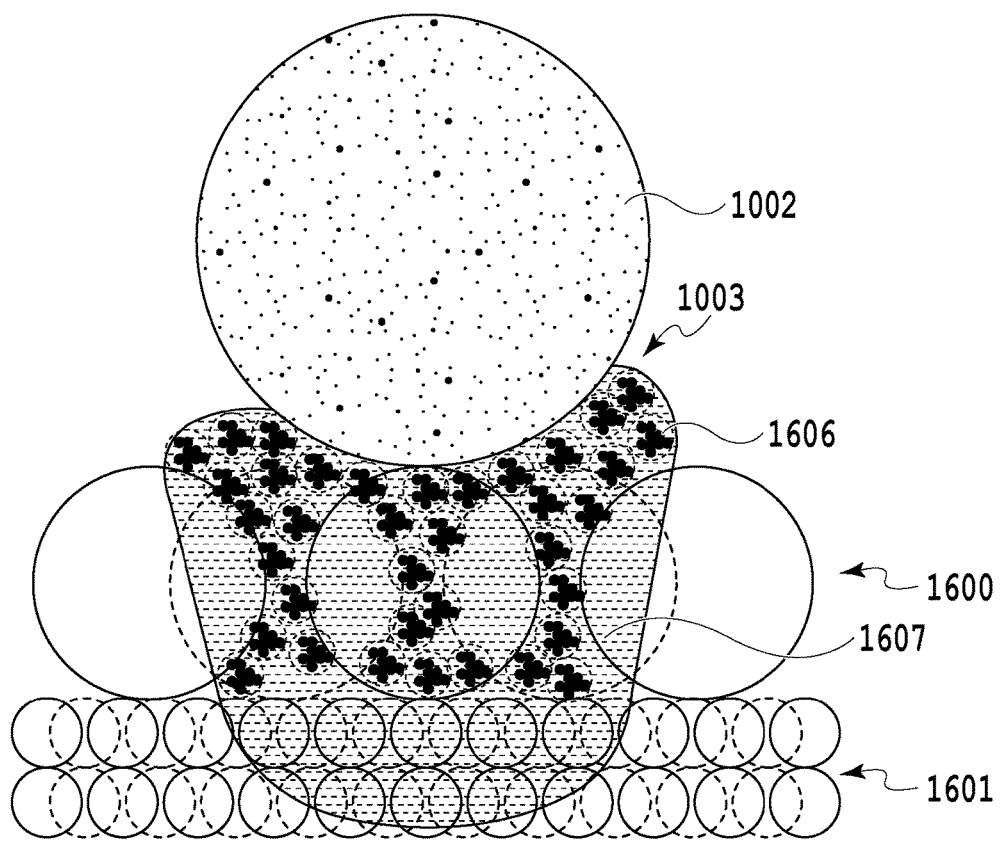
FIG. 37 is a diagram illustrating an absorption process for a pigment ink in the ink receiving layer with the two-layer structure.
Figure 38:
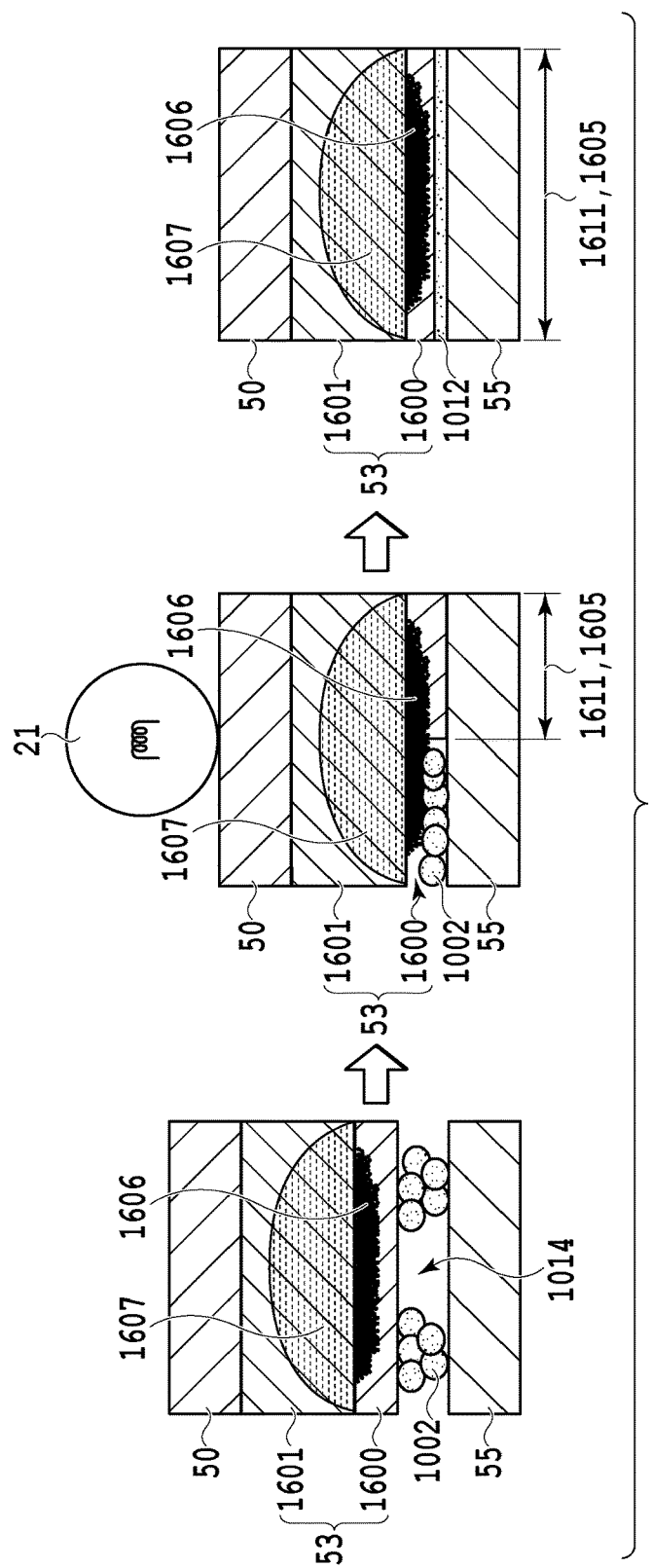
FIG. 38 is a diagram illustrating a transfer step for the print medium.

The resin layer 1012 is configured in a sea and island form in which the pieces of thermoplastic resin 1002 are discretely arranged in the resin layer. The pigment permeation layer 1600, which is exposed to a sea portion, has a higher ink absorption speed (permeation speed) than the pieces of thermoplastic resin 1002 that are island portions. Thus, as in FIGS. 10A to 10F for the above-described embodiment, when a portion of the pigment ink 1003 comes into contact with the exposed portion 1001 of the pigment permeation layer 1600, the pigment ink 1003 is quickly drawn into the pigment permeation layer 1600. The pigment ink 1003 can move around to an area immediately below the pieces of thermoplastic resin 1002 due to the capillary effect of the pigment permeation layer 1600 of the air gap absorption structure as depicted in FIG. 37. Thus, the area factor can be improved. The pigment ink 1003 having permeated the inside of the pigment permeation layer 1600 is absorbed while spreading in the film thickness direction and the horizontal direction according to the permeation anisotropy of the pigment permeation layer 1600. In a case where the pigment ink infiltrates isotropically in the pigment permeation layer 1600, the dots spread over a range substantially corresponding to the thickness of the pigment permeation layer 1600. This allows the area factor to be improved.

Figure 53:
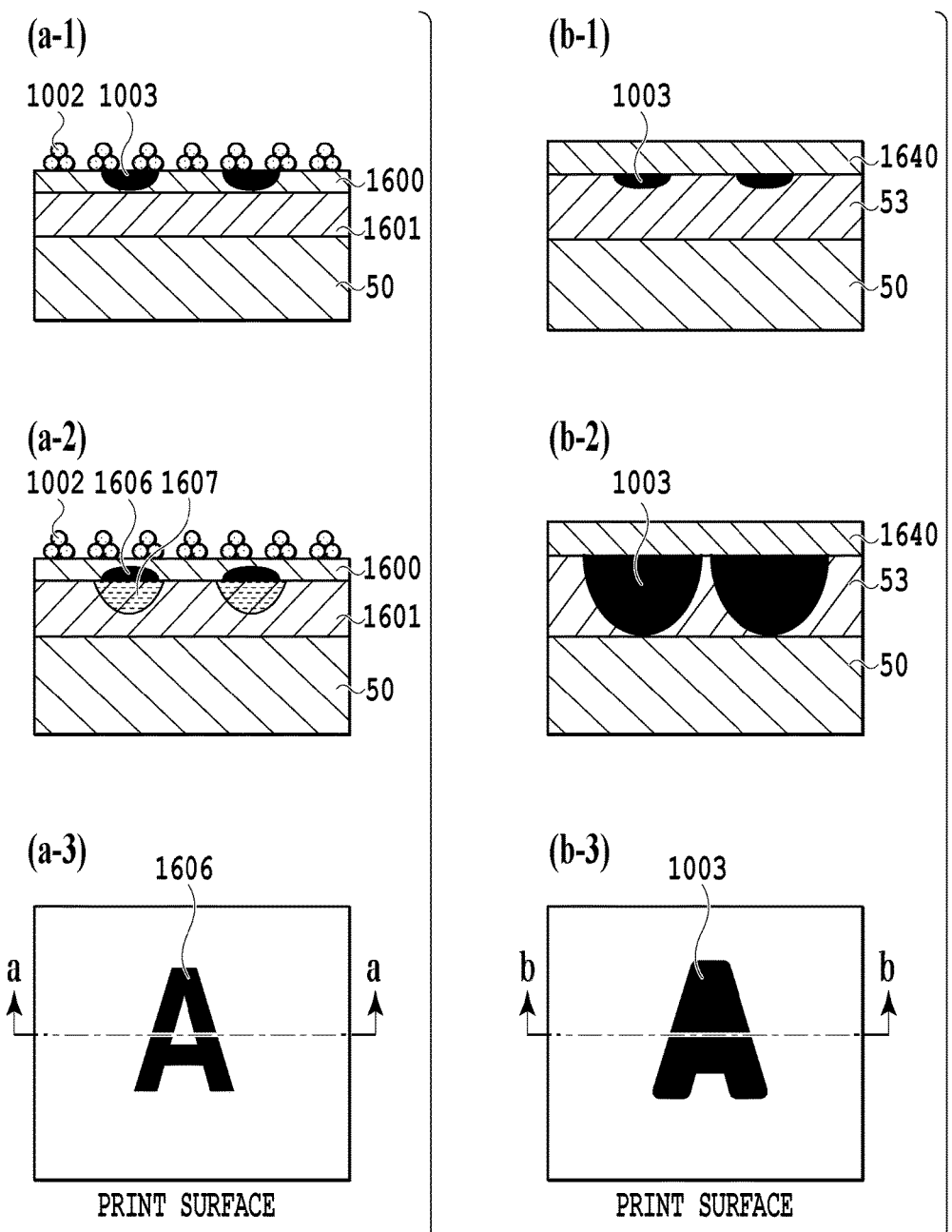
FIG. 53A and FIG. 53B are diagrams illustrating a relation between print properties and the degree of permeation and diffusion of the pigment ink in the print medium.

Appropriate control of the spread of the pigment ink 1003 in the pigment permeation layer 1600 enables image bleeding and a decrease in print resolution to be made unlikely, allowing provision of a print medium that is excellent in image print properties, as shown in FIG. 53A. In FIG. 53A, a part (a-3) is a plan view of a print surface of the print medium, and parts (a-1) and (3-2) are cross-sectional views taken along line a-a in the part (a-3). The pigment ink 1003 applied as depicted in the part (a-1) is absorbed as depicted in the part (a-2).

Each of the air gaps in the solvent absorption layer 1601 is smaller than each of the air gaps in the pigment permeation layer 1600, and the solvent absorption layer 1601 has an ink absorption speed than the pigment permeation layer 1600. Therefore, as depicted in FIG. 3B, the pigment components of the pigment ink 1003 are absorbed by the bottom of the thin-film pigment permeation layer 1600, and substantially all of the solvent components 1607 are absorbed by the solvent absorption layer 1601.

That is, in the print medium of the present invention, the pigment permeation layer with the air gap structure has a sufficiently larger air gap diameter than the pigment particles and thus has a weaker capillary force and a slightly lower ink absorption speed than the pigment particles. However, after applied to the front surface of the pigment permeation layer via the resin layer, the pigment ink, containing the pigment particles, smoothly infiltrates and is absorbed into the pigment permeation layer due to a low channel resistance. On the other hand, the air gap structure of the solvent absorption layer is configured to have pores each of which is sufficiently smaller than each pigment particle, and thus produces a significantly strong capillary force and has a significantly high ink absorption speed. The solvent absorption layer has air gaps each of which is smaller than each pigment particle and thus offers a high channel resistance, and thus, the pigment particles are subjected to solid-liquid separation on the front surface of the solvent absorption layer, with only the solvent components of the pigment ink quickly absorbed by the solvent absorption layer. That is, after the pigment ink is absorbed and infiltrates through the front surface of the pigment permeation layer via the resin layer, when a portion of the pigment ink reaches the interface between the pigment permeation layer and the solvent absorption layer, the solvent components of the pigment ink start to be absorbed at high speed due to the significantly strong capillary force. A permeation speed of the pigment ink in the pigment permeation layer is also quickly increased. Therefore, when the pigment particles are subjected to solid-liquid separation at the bottom of the pigment permeation layer, the pigment ink has been flowing at high speed. Thus, while being compressed, the pigment particles form a dense thin-film-like pigment image. The pigment particles, which correspond to the color material, are densely accumulated to form a pigment image, and thus, the pigment image is excellent in light absorption and is excellently colored.

The solvent absorption layer has a sufficient thickness to absorb all of the solvent components, which are the main components of the pigment ink, so as to provide a large absorption capacity. Thus, the pigment permeation layer may have an air gap capacity enough to house all of the pigment components, and can be configured as a thin layer. When absorbed and infiltrating into the air gaps in the pigment permeation layer, the pigment ink applied to the front surface of the pigment permeation layer via the resin layer also diffuses in the planar direction. The range of the diffusion is substantially equivalent to the film thickness of the thin-film pigment permeation layer. The range of the diffusion of the pigment ink in the thin-film pigment permeation layer is very small compared to the range of the diffusion in the thick-film solvent absorption layer where the pigment ink infiltrates and diffuses throughout the solvent absorption layer. Thus, a high print resolution can be achieved. In a case where the pigment image is designed, adjacent pigment dots (dots formed of the pigment of the pigment ink) are laid on top of each other such that the pixels corresponding to the pigment dots are filled with the pigment dots. Therefore, the film thickness of the pigment permeation layer may be adjusted in accordance with the amount of bleeding from desired pigment dots. As described above, the print medium of the present invention includes at least two ink receiving layers having separate functions so that the pigment ink is subjected to solid-liquid separation, and the solvent absorption layer has a sufficient thickness to absorb all of the solvent components, which are the main components of the pigment ink, so as to provide a large absorption capacity. Therefore, a high-density and -definition pigment image can be formed at the bottom of the thin-film pigment permeation layer with no concern for image bleeding in the ink receiving layer.

For the pigment particles, which are the color material components of the pigment ink 1003, a number of particulates each of several tens of nanometers aggregate to form secondary particles each of approximately several tens to 100 nanometers, which disperse in the ink. Therefore, the pigment permeation layer 1600 is formed using particulates with a slightly large particle size, so as to have an air gap diameter larger than the secondary particle size of the pigment. Consequently, the pigment particles pass through the pores of the air gaps in the pigment permeation layer 1600 and quickly reach the interface between the pigment permeation layer 1600 and the solvent absorption layer 1601. In a case where the resin layer 1012 is formed where the particle-shaped pieces of thermoplastic resin 1002 are arranged in an island form, the size of the particle-shaped pieces of thermoplastic resin 1002 is further increased so that each of the air gaps in the resin layer 1012 is larger than each of the air gaps in the pigment permeation layer 1600. Consequently, a portion of the pigment having entered the air gaps in the resin layer is drawn into the pigment permeation layer 1600 so long as the portion is continuous with the ink that is in contact with the pigment permeation layer 1600.

As described above, after the pigment ink is absorbed and infiltrates through the front surface of the pigment permeation layer via the resin layer, when a portion of the pigment ink reaches the interface between the pigment permeation layer and the solvent absorption layer, the solvent components of the pigment ink start to be absorbed at high speed due to the significantly strong capillary force. The permeation speed of the pigment ink in the pigment permeation layer is also quickly increased. When the quick absorption of the solvent components by the solvent absorption layer starts, since the pigment permeation layer offers only a low flow resistance, the pigment ink remaining in the pigment permeation layer and in the resin layer is quickly drawn and absorbed into the solvent absorption layer without being broken way due to the viscosity and surface tension of the pigment ink.

In an initial stage of the permeation when the pigment ink starts to slightly slowly permeate the pigment permeation layer including the air gaps through which the pigment particles are allowed to pass, a portion of the pigment ink reaches the solvent absorption layer to allow the remaining portion of the pigment ink in the resin, layer and in the pigment permeation layer to start permeating the respective layers at high speed due to the strong capillary force of the solvent absorption layer. Therefore, in the print medium of the present invention, the strong capillary force of the solvent absorption layer with the small air gaps enables a reduction in the time for which the pigment ink is retained in the resin layer and in the pigment permeation layer. This, for example, reduces the likelihood that the pigment ink remains in the resin layer that is formed into a molten film by being pressurized and heated and the likelihood that the solvent components of the pigment ink remain in the pigment permeation layer located in proximity to the resin layer. As described below, in a case where the resin layer is utilized as a bonding layer to perform transfer to various supports via the resin layer, the capability of transferring the print medium to the image support based on pressurization and heating of the resin layer is improved. Substantially all of the solvent components of the pigment ink are quickly absorbed by the solvent absorption layer with a film thickness with which the air gap structure is maintained in spite of pressurization and heating. Thus, even immediately after an image is printed with the pigment ink, the print medium can be appropriately transferred to the image support without the need for a special drying unit and time. That is, the thick-film solvent absorption layer, which has the highest ink absorption speed and a large ink absorption capacity, absorbs and holds substantially all of the solvent components of the pigment ink while maintaining the air gap structure. Consequently, even in a case where the print medium is bonded to the image support immediately after printing of the image, it is unlikely that the bonding capability is degraded as a result of reflux or seepage of the solvent components.

The print medium 1 of the present invention, a white point (non-image portion) is unlikely to occur immediately below the pieces of thermoplastic resin 1002, and a dense pigment image 1606 can be formed all over the pigment permeation layer 1600. Furthermore, the pigment is concentrated in the form of a thin film at the bottom of the pigment permeation layer 1600, allowing formation of a high-definition and -density pigment image 1606 that is excellent in visibility. Moreover, substantially no liquid components of the pigment ink, which correspond to the solvent of the pigment ink, remain, and thus, in a case where the resin layer is utilized as a bonding layer to perform transfer to various supports via the resin layer, the print medium 1 can be bonded (transferred) to the image support by pressurization, heating, or both pressurization and hearing even immediately after printing of the pigment ink 1606.

The print medium of the present invention can be transferred to various supports via the resin layer utilizing the resin layer as a bonding layer. The pigment permeation layer on which the pigment image excellent in weatherability is formed is bonded (transferred) to the image support to allow manufacture of a printed material having a front surface exhibiting excellent scratch resistance performance. The substrate can be peeled-off so as to leave a part or all of the solvent absorption layer or a number of layers of the layered substrate, and the remaining layers can be allowed to function as protect layers for the pigment image or the like. In a case where a number of layers of the substrate are transferred to the image support side as particular functional layers, a peel-off layer may be provided to allow stable inter-layer peel-off.

As depicted in FIG. 50A, FIG. 50B, FIG. 50C, FIG. 50D, and FIG. 51, the peel-off layer 1603 is provided at an interface between the layers forming the print medium 1 as needed to allow the image to be provided with functions according to the intended purpose of the printed material. An adhesion layer 1602 configured to prevent inadvertent inter-layer peel-off during transfer to improve adhesion may be provided at the interface between the layers forming the print medium 1 with the materials and film production methods for the layers taken into account. However, in a case where the pigment ink needs to infiltrates at a position between such a peel-off layer and such an adhesion layer, the peel-off layer and the adhesion layer need to be configured in the form of a very thin film or a sea and islands, using a material selected with hydrophilicity taken into account so as to inhibit movement of the pigment ink based on the capillary phenomenon from being obstructed.

For example, an image is printed on the print medium of the present invention based on the ink jet system using the pigment ink, the print medium is transferred to the image support, and then, the substrate is peeled-off with the solvent absorption layer left, providing a printed material. Then, the uppermost surface of the printed material may be a solvent absorption layer. In this case, an image can be additionally printed on the printed material based on the ink jet printing system or the like. A printed material may be produced using a print medium including a pigment permeation layer, a solvent absorption layer, a pigment permeation layer, a sea-and-island-like resin layer sequentially formed on a substrate, with the pigment permeation layer left on the upper most layer of the printed material. An image excellent in scratch resistance performance may be additionally printed on the pigment permeation layer using the pigment ink.

Figure 51:
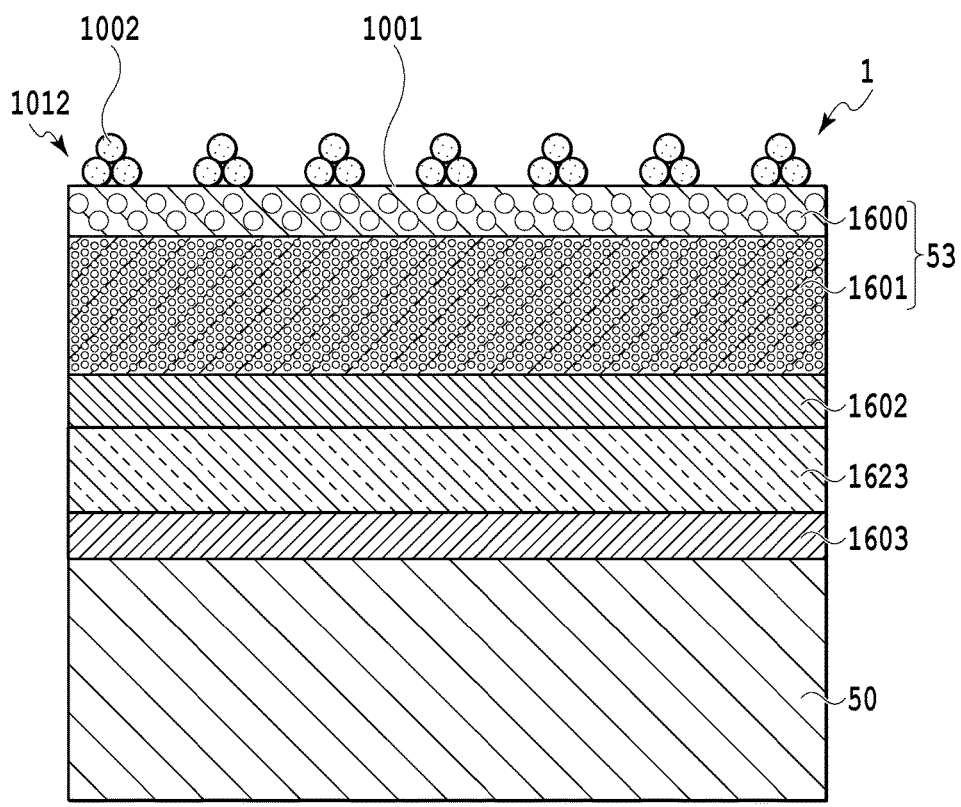
FIG. 51 is a cross-sectional view illustrating another example of a print medium including a peel-off layer.

A solvent absorption layer having an average pore size significantly smaller than the size of visible light has a high ink absorption speed and is excellent in optical transparency. Thus, the solvent absorption layer may be adequately utilized as a protect layer for outdoor use. For outdoor use under harsh conditions, the peel-off layer 1603, a protect layer 1623, and the adhesion layer 1602 may be provided to allow the protect layer 1623 to be transferred to the image support in addition to the thick-film solvent absorption layer 1601, as depicted in FIG. 51. Consequently, the thick-film solvent absorption layer 1601 and the protect layer 1623 cover the pigment image printed at the bottom of the pigment permeation layer 1600.

The protect layer and the solvent absorption layer may be provided with a function to serve as a white background masking layer, a function to serve as a pre-image layer on which an image is pre-printed, or the like.

Figure 54:
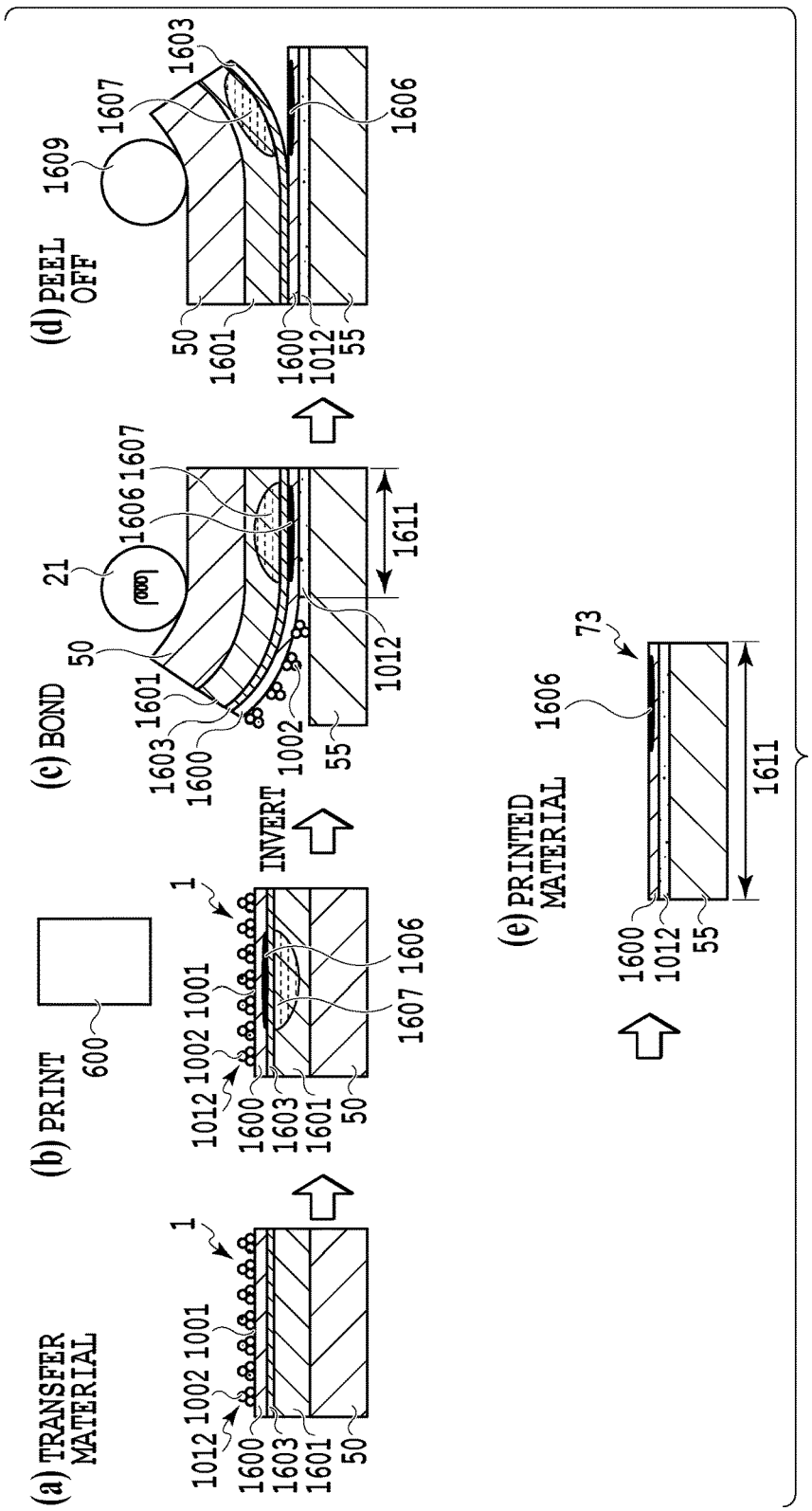
FIG. 54 is a diagram illustrating a manufacturing method for a printed material including a print medium provided with a very-thin-film-like peel-off layer.

For applications such as indoor photographs and interior goods which do not need excessive storage stability or weatherability, a very-thin-film-like peel-off layer 1603 may be provided between the pigment permeation layer and the solvent absorption layer so as not to significantly impair the permeability of the ink as depicted in FIG. 54. In this case, the thick-film solvent absorption layer 1601 is peeled off along with the substrate 50, inhibiting the protect layer and the thick-film solvent absorption layer from optically affecting the image. The pigment permeation layer 1600 may be formed of a material that is softened and melted into a film during transfer when the material is pressurized and heated so that, during transfer, the pigment permeation layer 1600 may be brought into a film state 1611 during transfer so as to enclose the pigment image 1606 as depicted in FIG. 54.

Each of the solvent absorption layer and the pigment permeation layer may be separated into a plurality of layers such that each of the layers has basic functions as an ink receiving layer of the air gap absorption type and that the ink absorption speed sequentially increases from the resin layer side toward the substrate side. The solvent absorption layer in parts (a) to (e) of FIG. 46 includes a thick layer (first solvent absorption layer) 1601 and a thin layer (second solvent absorption layer) 1655 that are positioned via the peel-off layer 1603.

The resin layer may additionally be provided with an optical function so as to serve as a white background layer, a luminescent layer, or the like to enable the visibility of the pigment image to be improved. The resin layer may be formed by discretely providing film-like pieces of thermoplastic resin formed like pieces of tacky film or the like, in a sea and island form.

A second embodiment of the present invention will be described based on the drawings.

[1. Print Medium]

The present invention provides a print medium including at least two ink receiving layers provided on a substrate and a resin layer provided on a front surface of the ink receiving layers. Each of the ink receiving layers is of an air gap absorption type. A resin layer is formed on the front surface of the ink receiving layer located on a front surface side of the print medium (the ink receiving layer on a far side with respect to the substrate) by discretely providing pieces of thermoplastic resin on the front surface of the ink receiving layer such that the front surface of the ink receiving layer is directly exposed from a part of the resin layer. A solvent absorption layer that is the ink receiving layer located on a near side with respect to the substrate is a thick-film ink receiving layer of the air gap absorption type having a relatively small average pore size so as to allow only solvent components of a pigment ink to be absorbed while inhibiting pigment components of the pigment ink from infiltrating through. On the other hand, the ink receiving layer on the far side with respect to the substrate, in other words, the ink receiving layer on a near side with respect to the resin layer is a thin-film ink receiving layer of the air gap absorption type serving as a pigment permeation layer and having a relatively large average pore size so as to allow all of the pigment ink containing pigment particles to infiltrate and diffuse. As described above, the ink receiving layer includes at least two layers. The print medium of the present invention can be transferred to various supports via the resin layer by utilizing the resin layer as a bonding layer.

(1-1. Substrate)

Figure 56:
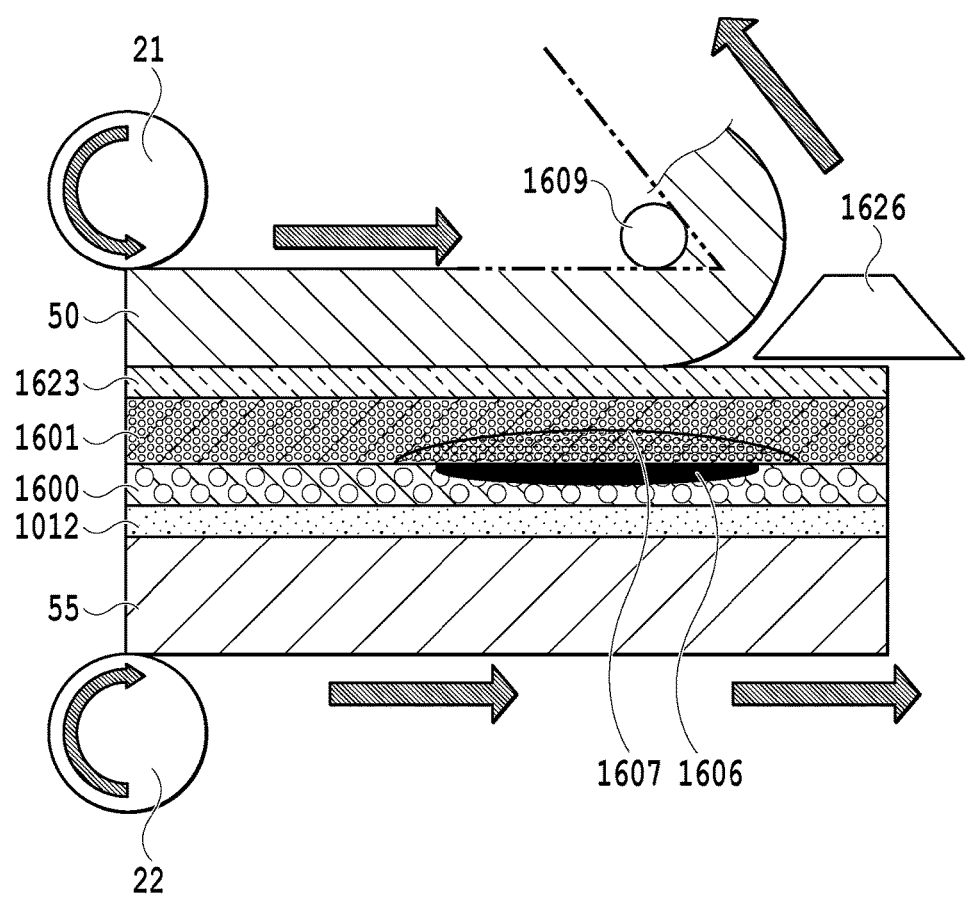
FIG. 56 is a cross-sectional view of the print medium and the image support during peel-off of a substrate.

The print medium 1 of the present embodiment includes the substrate 50 as depicted in FIG. 56. The substrate 50 is a sheet serving as a support for the solvent absorption layer 1601 and the pigment permeation layer 1600 as the ink receiving layer 53, and the resin layer 1012 with pieces of thermoplastic resin discretely provided on the front surface of the pigment permeation layer 1600. The substrate 50 functions as a conveying layer that suppresses curling of the print medium 1 and that allows the print medium 1 to be appropriately conveyed, during ink jet printing and in a case where the substrate 50 is bonded to the image support. To allow the substrate 50 to be more appropriately conveyed, a well-known conveyance assist layer that improves a sliding capability may be provided on a back surface side.

The substrate 50 may be provided with other functions including functional layers such as a protect layer, pre-print layer, and a magnet sheet layer, and transfer control layers such as a peel-off layer and an adhesion layer. For example, in a case where the resin layer 1012 is formed into a molten film to transfer the pigment permeation layer 1600 with an image printed thereon with the pigment ink to the image support as described below, a peel-off layer and an adhesion layer may be provided to control peel-off and adhesion between the substrate 50 side and the pigment permeation layer 1600 side such as peel-off between the substrate 50 and the protect layer or peel-off and adhesion between the substrate 50 and the solvent absorption layer 1601. That is, in a case where the substrate 50 and the solvent absorption layer 1601 are peeled off from each other to use the solvent absorption layer 1601 as the front surface of the image support after image transfer, the image support may be utilized as a support for conveyance to enable secondary ink jet printing to be performed on the image support. Alternatively, a releasable protect layer may be provided on the substrate 50 side so as to function as a protect layer for the image by leaving the protect layer on the image support side along with the solvent absorption layer 1601 after transfer to the image support. In a case where a pre-print layer including a protrusion and recess-shaped structural latent image is pre-provided at the interface on the substrate 50 side to be peeled off, the protrusion and recess-shaped structural latent image can also be transferred at the time of transfer to the image support. Like such a structural latent image, the front surface of the protect layer or the solvent absorption layer 1601 may be provided with a gloss layer, a matte layer, or a desired surface roughness that provides a texture felt when a user touches the print medium by the hand. The protect layer may also be provided with a pre-print layer such as a colored image or a hologram image by a general-purpose drawing unit for gravure printing or laser machining.

As described below, the substrate 50 itself may be left as a protect layer at the time of transfer to the image support to enable storage stability of the image. In a case where an inverted image is printed from the resin layer 1012 side by ink jet printing using the pigment ink and transferred to an opaque image support, the pigment image 1606 at the bottom of the pigment permeation layer 1600 (see FIG. 3A) is viewed via the substrate 50 or the solvent absorption layer 1601 as a protect layer. To improve the visibility of the image, the optical transparency of the solvent absorption layer 1601 or the protect layer itself may be increased. On the other hand, in a case where a normal image is printed from the resin layer 1012 side using the pigment ink and transferred to the transparent image support, it is necessary to improve the visibility of the pigment image 1606 at the bottom of the pigment permeation layer 1600 as viewed via the transparent pigment permeation layer 1600, resin layer 1012, and image support. The substrate 50 or the solvent absorption layer 1601, which serves as a protect layer, may be a white layer or an opaque layer utilized as a background layer for the pigment image 1606 to further enable the visibility of the image.

The substrate in the print medium of the present invention and the protect layer, which is a part of the substrate, may have, besides the function for mechanical strength, functions to serve as a water resistance layer, a physical back surface protect film, or a UV (ultraviolet) and ozone protect layer. As described below, the substrate and the protect layer, which is a part of the substrate, may be utilized as an optical functional layer such as a white masking layer or a luminescent layer that stores and emits fluorescent (phosphorescent) light.

(1-1-1. Material of the Substrate)

The print medium of the present invention may be used in the fields of various security cards such as ID cards, employee ID cards, and credit cards, in the fields of delivered public documents such as my number cards and passports, and in the fields of pharmacology and pathology for embedding cassettes. In such applications, in a case where a rolled print medium is conveyed on a roll-to-roll basis in order to allow image printing and transfer to be achieved at high speed, the thickness of the substrate may be set to 5 μm or more and more preferably to 15 μm or more to enable the print medium to be more appropriately conveyed or set to 100 μm or less and more preferably to 50 μm or less to achieve more appropriate heat transfer. On the other hand, for the substrate for cut sheet- and plate-like print media, a thick substrate that is excellent in mechanical strength is preferably used as a conveyance layer in view of curl resistance, supply performance, and the like. In this case, the thickness of the substrate may be set to 30 μm or more and more preferably to 50 μm or more. In a case where the print medium in the present invention is heated during image transfer, the print medium is heated mainly from the substrate side. Thus, the thickness of the substrate may be set to 300 μm or less and more preferably to 150 μm or less to enable appropriate heat transfer to be achieved in a case where the print medium is heated and bonded to the image support after ink jet printing. As described above, the thickness of the substrate may be determined as needed in view of conveyance performance and material strength. Appropriate conveyance performance and an appropriate heat transfer capability may be maintained according to the form and intended purpose of the print medium.

In view of mechanical properties and thermal properties, a preferred material for the substrate may be polyethylene terephthalate (PET). The resin forming the substrate may be selected according to the intended purpose of the print medium. Various materials as listed below may be used without limitation. For example, as the resin film included in the substrate, a substrate similar to the substrate of the first embodiment may be used.

(1-2. Protect Layer)

For the print medium, the resin layer may be utilized as a bonding layer so that the print medium can be transferred to the image support to provide a printed material. Furthermore, the print medium may include a protect layer in order to improve the weatherability, friction resistance, chemical resistance, and the like of the image print surface of the printed material to which the print medium has been transferred. Examples of the protect layer include a colored transparent protect layer and a protect layer colored in white or the like, besides a colorless transparent protect layer. The transparent protective layer corresponds to a sheet having a total light transmittance of 50% or more and preferably 90% or more as measured in compliance with a method for obtaining the total light transmittance and total light reflectivity of transparent, translucent, and opaque plastic visible regions of plate-like and film-like plastic. The type of the protect layer is not particularly limited. The protect layer is preferably a sheet or a film formed of a material that is excellent in durability such as weatherability, friction resistance, and chemical resistance and that is compatible with the ink receiving layer.

(1-3. Pre-Print Layer)

To improve security of the printed material, a pre-print layer that is printed with an image and that is not peeled off may be provided on the substrate. An auxiliary image may be printed (preprinting) on the pre-print layer to pre-apply a functional image onto the substrate 50 to allow the security of the printed material 73 to be improved. As the pre-print layer 1637, a layer similar to the pre-print layer of the first embodiment may be used.

For the substrate of the print medium in the present invention, all or a part of the substrate may or may not be peeled off. In a case where a part of the substrate is left in the printed material, the part may be provided with various functions.

(1-4. Image Support)

In the print medium of the present invention, the resin layer may be utilized as a bonding layer to allow the print medium to be transferred to the image supports formed of various materials via the resin layer. The material of the image support is not particularly limited. Examples of the image support include an image support formed using a resin as a constituent material (resin-based support), an image support formed using paper as a constituent material (paper-based support). The resin forming the resin-based support may be selected as needed according to the intended purpose of the image support and is not particularly limited. For example, the material may be similar to the material of the substrate. Examples of the material of the image support include glass, metal, and wood. To achieve appropriate bonding to the image support, a thermoplastic resin that is excellent in bonding capability may be selected as needed according to the material of the image support, and pieces of thermoplastic resin may be discretely formed on the pigment permeation layer.

(1-5. Solvent Absorption Layer)

The solvent absorption layer in the print medium of the present invention is a layer that absorbs the solvent of the pigment ink applied based on the ink jet printing system. An absorption mechanism for ink is similar to the absorption mechanism described in the first embodiment. The layer configuration and the materials of the solvent absorption layer of the second embodiment are similar to those of the solvent absorption layer of the first embodiment.

In the second embodiment, during transfer, the air gap structure of the solvent absorption layer is destroyed to cause the liquid components of the ink to seep out from the front surface of the pigment permeation layer and to turn into a film, or the liquid components of the ink are subjected to bumping to form an air layer or the like on a bonding surface between the pigment permeation layer and the image support, the bonding between the pigment permeation layer and the image support may be hindered. However, in a case where the inorganic particulates are bonded together using the binder of the water-soluble resin, since the inorganic particulates are formed of a very hard material, the air gap structure of the solvent absorption layer, provided with the air gaps, is unlikely to be destroyed in spite of pressure or heat, and can be substantially completely maintained even after bonding. As a result, the solvent absorption layer can hold the absorbed ink inside and seal possible vapor inside. Heat generated during thermocompression bonding serves to maintain the air gap structure so that, even when the liquid components of the ink are subjected to bumping in the individual air gaps to generate vapor, the vapor is sealed in each air gap so as not to form an air layer or the like on the bonding surface. Thus, appropriate bonding can be achieved. Furthermore, during thermocompression bonding, the air gaps are inhibited from being collapsed or being melted on heating, allowing the air gap structure to be substantially completely maintained. This allows appropriate bonding to be achieved without causing the main solvent of the ink such as water and the nonvolatile solvent, which correspond to the liquid components of the ink, to seep out from the front surface.

Furthermore, even immediately after ink jet printing with the pigment ink, a reverse flow, to the resin layer, of the solvents of the ink such as water and the nonvolatile solvent, which correspond to the liquid components of the ink, is suppressed. Thus, a step of transfer to the image support can be quickly executed without the need to wait until the solvent absorbed into the solvent absorption layer is dried. Therefore, the substrate can be peeled off after the print medium is efficiently bonded to the image support using a simple process and without the need for an enormous amount of drying energy and time for drying the solvent components. Thus, appropriate transfer capability can be achieved. The solvent absorption layer of the air gap absorption type formed of the inorganic particulates and the water-soluble resin can be stably produced without any special orientation treatment, leading to appropriate productivity.

An air gap capacity of the solvent absorption layer of the air gap absorption type formed of the inorganic particulates and the water-soluble resin may be set to the similar range of the solvent absorption layer of the first embodiment. The pore volume of the solvent absorption layer may be the same of the solvent absorption layer of the first embodiment. The average of the pore sizes (average pore size) of the solvent absorption layer of the air gap absorption type formed of the inorganic particulates and the water-soluble resin may be set to the similar range of the solvent absorption layer of the first embodiment.

To make the solvent absorption layer of the print medium less likely to be melted or deformed during thermocompression bonding, an ink receiving layer of the air gap absorption type may be formed by using resin particulates having a melt temperature Tg higher than a transfer temperature instead of the inorganic particulates and bonding the resin particles together using a binder resin to form air gaps. In a case where, among the resin particulates, resin particulates having a melting temperature Tg higher than the transfer temperature are used to form the air gap structure, the particle structure is maintained in spite of heat during transfer to inhibit the resin particles from being melted to collapse the air gaps due to the heat during transfer. Resin particulates having a softening and melting temperature higher than the transfer temperature are a high Tg resin. Typically, a molecular structure forming the resin particulates is often rigid and contains relatively hard particles. Thus, the air gaps are inhibited from being collapsed by pressure. Since the air gaps are not collapsed by pressure or heat during the transfer step, the main solvent of the ink such as water and the nonvolatile solvent, which correspond to the liquid components of the ink, are inhibited from flowing reversely and seeping out. Thus, an appropriate bonding capability can be achieved.

Figure 52:
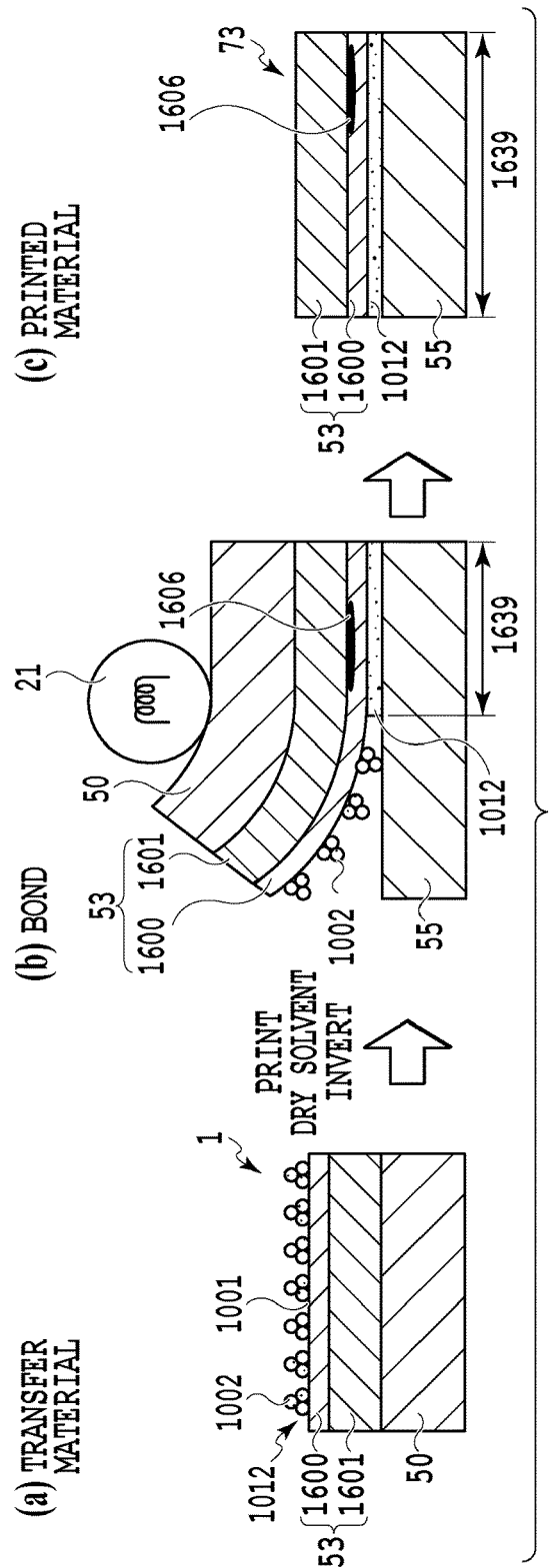
FIG. 52 is a diagram illustrating a manufacturing method for a printed material including a print medium in which a solvent absorption layer is softened and melted into a film.

As the solvent absorption layer 1601 of the print medium 1, an ink receiving layer of the air gap absorption type may also be used that has air gaps formed by using the binder resin to bond resin particulates that are likely to be melted and deformed during thermocompression bonding unlike in the above-described structure. A part (a) of FIG. 52 is a cross-sectional view of the print medium 1 including the solvent absorption layer 1601 as described above. The main solvent components of the pigment ink, that is, the solvent components of the pigment ink other than the nonvolatile solvents, are volatile solvents such as water and alcohol and can be dried even after being absorbed by the solvent absorption layer 1601. Therefore, in a case where a process, a time, and an apparatus are provided that are needed to sufficiently dry volatile solvent components absorbed by the solvent absorption layer 1601 of the print medium after ink jet printing with the pigment ink, this allows suppression of a reverse flow, to the resin layer 1602, of a very small amount of nonvolatile solvent remaining after softening and melting of the resin particulates in the solvent absorption layer. As a result, as depicted in the part (b) of FIG. 52, the print medium 1 can be appropriately bonded to the image support 55.

As described above, the solvent absorption layer 1601 may be configured to be able to hold a small volume of nonvolatile solvent contained in the pigment ink even though the resin particulates forming the air gaps are softened and melted by pressure and heat. The solvent absorption layer 1601 is softened and melted into a film to allow suppression of a decrease in transparency resulting from light scattering in the air gaps in the solvent absorption layer 1601 and at the interface of the pigment particles. As a result, a dense pigment image formed like a thin film at the bottom of the pigment permeation layer 1600 can be more appropriately viewed from the solvent absorption layer 1601. A part 1639 of the solvent absorption layer 1601 that has been softened and melted into a transparent film also functions as a firm protect film for the pigment image 1606 formed on the pigment permeation layer 1600 as in a part (c) of FIG. 52. Therefore, compared to a solvent absorption layer that maintains the air gap structure, the above-described solvent absorption layer allows prevention of contamination with a pollutant liquid, a toxic gas, and the like and allows improvement of the mechanical strength such as scratch resistance and of the long-term storage stability of the printed material 73.

In applications of printed materials such as interior photo plates, a pigment image may be transferred to a transparent image support such as a glass plate or an acrylic plate using a print medium, and the visibility of the image from the image support side may be focused on. In this case, a background layer may be the solvent absorption layer, the protect layer, or the substrate positioned opposite to the bonding surface between the print medium and the image support, with respect to a dense pigment image printed like a thin film at the interface between the pigment permeation layer and the solvent absorption layer That is, the solvent absorption layer, the protect layer, or the substrate is preferably set optically white or translucent so as to serve as a white background layer unlike in applications that need a high transparency.

Figure 62:
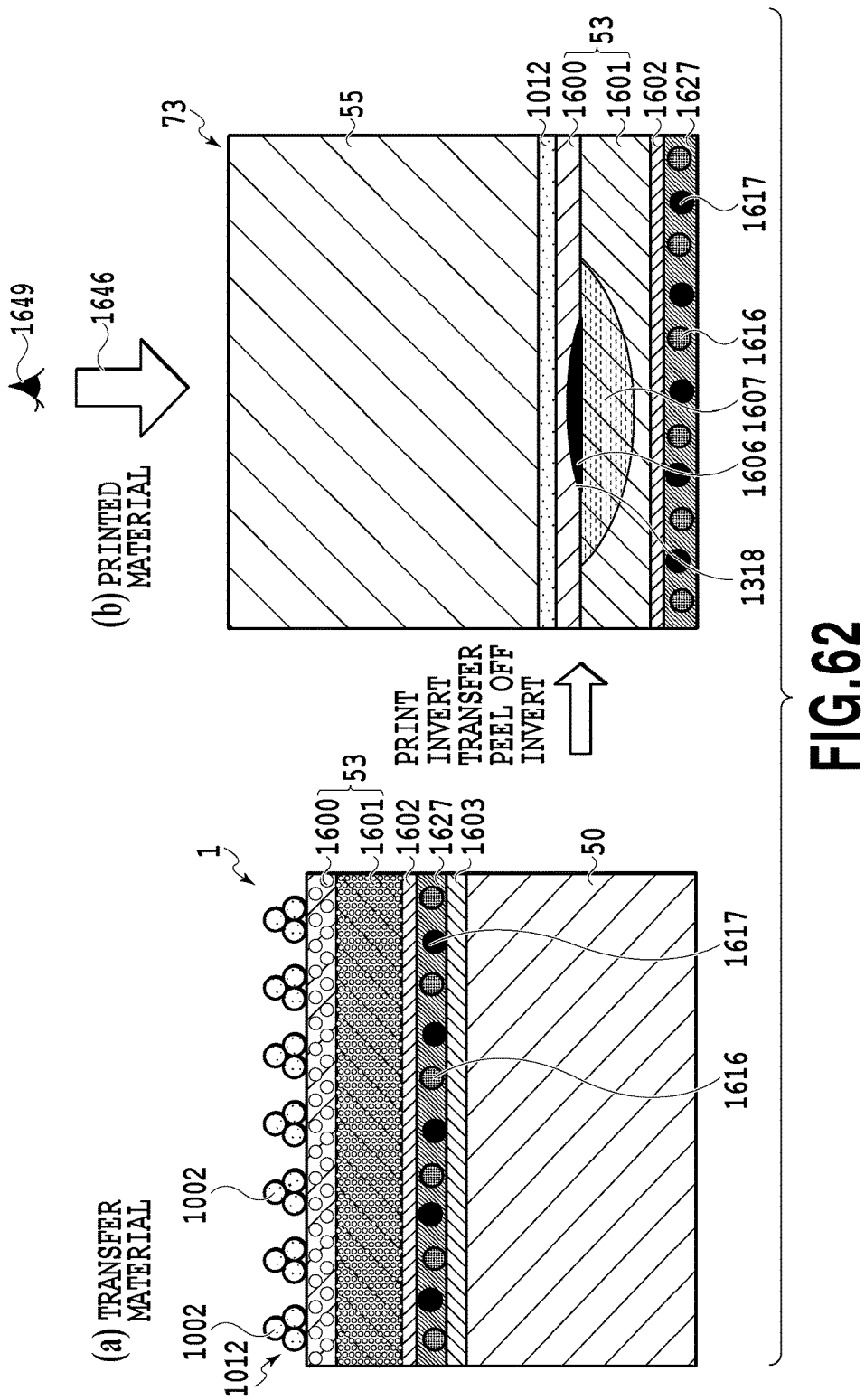
FIG. 62 is a diagram illustrating a manufacturing method for an example of a printed material in which the image support is transparent.
Figure 63:
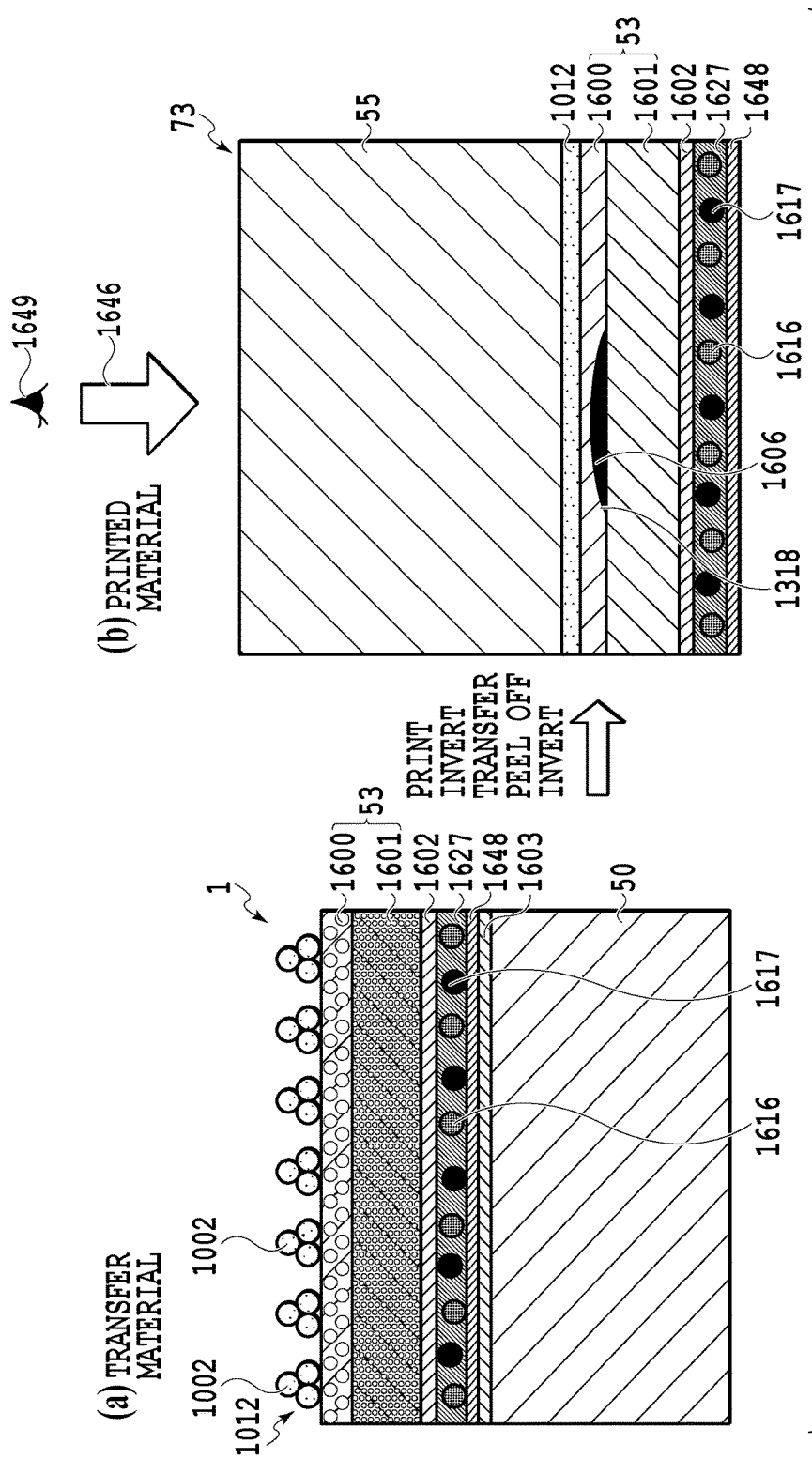
FIG. 63 is a diagram illustrating a manufacturing method for another example of a printed material in which the image support is transparent.

For example, as depicted in FIG. 62 and FIG. 63, a white resin layer containing hollow resin particles (white material) 1616 may be used as a protect layer 1627, or a metal film or a light scattering metal particulates may be added to the protect layer 1627 or the like to form a light scattering layer. In a case where the solvent absorption layer 1601 is used as a background layer, particulates with a small particle size used to form relatively small air gaps may be added to the solvent absorption layer 1601, or metal particulates, resin particulates, or hollow resin particulates that have a large particle size and that are likely to optically scatter visible light may be added to the solvent absorption layer 1601. Luminescent particles 1617 such as fluorescent particulates are added to the protect layer 1627 or the solvent absorption layer 1601 so that the layers are utilized as luminescent layers that store light to produce fluorescence (phosphorescence), allowing the image visibility to be further improved. In applications in which the solvent absorption layer 1601 is used as a background layer, the solvent absorption layer 1601 can be designed with a focus on the liquid absorption properties such as the capability of absorbing the solvent components 1607 of the pigment ink at high speed and the capability of absorbing a large volume of solvent components of the pigment ink, which are the original functions of the solvent absorption layer 1601, without being subjected to constraints related to optical properties such as transparency. As a result, the ink absorptivity of the print medium, which is the basic function thereof, can be further improved, allowing transfer of an image that has a high definition and high image quality and that provides excellent visibility.

(1-6. Pigment Permeation Layer)

The pigment permeation layer 1600 in the print medium 1 is a layer through which the pigment of the pigment ink applied based on the ink jet printing system infiltrates. An absorption mechanism for ink is similar to the absorption mechanism described in the first embodiment. The layer configuration, the materials, and the like of the pigment permeation layer of the first embodiment may be similar to that of the pigment permeation layer of the second embodiment. In the second embodiment, in a case where the ink absorption speed of the pigment permeation layer 1600 is lower than the ink drying speed, the ink on the surface of each piece of thermoplastic resin 1002 is dried and thickened before the ink is absorbed, and a portion of the pigment ink 1003 may remain on the resin layer 1012 to degrade the bonding capability. Therefore, importantly, the ink absorption speed of the pigment permeation layer 1600 is sufficiently higher than the ink drying speed of the thermoplastic resin 1002. Thus, importantly, the speed at which the ink is drawn into the exposed portion of the pigment permeation layer 1600 is set sufficiently high so as to inhibit the ink from remaining on the resin layer 1012.

The pigment ink is absorbed and infiltrates through the front surface of the pigment permeation layer, and when a portion of the pigment ink reaches the interface between the pigment permeation layer and the solvent absorption layer, the solvent components of the pigment ink start to be absorbed at high speed due to the significantly strong capillary force. The permeation speed of the pigment ink in the pigment permeation layer is also quickly increased. Even in a case where the pigment permeation layer has a large air gap structure enough to allow the pigment particles to infiltrate and pass through, the time for which the pigment ink is retained in the resin layer, and in the pigment permeation layer can be shortened by the strong capillary force of the solvent absorption layer with the significantly small air gap structure. Therefore, this hinders the remaining of the pigment ink in the resin layer that is melted into a film by being pressurized and heated and the remaining of the solvent components of the pigment ink in the pigment permeation layer located in proximity to the resin layer, allowing the print medium to be more appropriately transferred to the image support based on pressurization and heating of the resin layer.

The pigment permeation layer 1600 may be divided into a plurality of layers that are sequentially formed. The pigment permeation layer 1600 may be configured to have basic functions as an ink receiving layer of the air gap absorption type and to have an air gap structure through which the pigment particles can infiltrate and diffuse and to be positioned such that the ink absorption speed sequentially increases from the resin layer 1012 side toward the substrate 50 side.

In the print medium of the present invention, the average of the pore sizes (average pore size) of the pigment permeation layer of the air gap absorption type may be set to the similar range of the pigment permeation layer of the first embodiment. However, in a case where the average pore size is 200 nm or more, and where, during transfer, the thermoplastic resin fails to completely cover the air gaps in the front surface of the pigment permeation layer, the transfer capability may be degraded and intra-layer peel-off may occur in the pigment permeation layer. An increase in the size of each air gap may reduce the capillary force of the air gaps, thus decreasing the ink absorption speed associated with drawing of the pigment ink into the pigment permeation layer. Then, the pigment ink may be likely to remain in the resin layer to reduce the bonding capability.

The thickness of the pigment permeation layer can be set to the similar range of the thickness of the pigment permeation layer of the first embodiment. However, in the second embodiment, in a case where the pigment permeation layer is less than 1 µm in thickness, not all of the pigment may be housed in the pigment permeation layer and a portion of the pigment may overflow the pigment permeation layer and migrate to the resin layer side, leading to inappropriate bonding.

A case is assumed where the pigment, which is a color material, is subjected to solid-liquid separation at the interface between the two ink receiving layers (the pigment permeation layer and the solvent absorption layer), with all of the pigment remaining at the bottom of the pigment permeation layer. For the mass concentration of solids such as a pigment in an aqueous ink that can be stably ejected based on the ink jet system, the pigment concentration of the ink is approximately 5%. For example, in a case where the volume of an ink droplet is 2 pl to 4 pl, the solvent absorption layer of the air gap absorption type has a porosity of 80%, and the printed image is colored, preferably the solvent absorption layer has a thickness of approximately 8 µm to 25 µm, the pigment permeation layer has a thickness of 2 µm to 8 µm, and the thermoplastic resin portion has a thickness of approximately 0.3 µm to 8 µm. In this case, with no pigment ink remaining in the resin layer, substantially all of the pigment particles form a dense thin-film-like pigment image at the bottom of the pigment permeation layer and substantially all of the solvent components are absorbed by the solvent absorption layer, leading to an appropriate bonding capability.

(1-7. Material of the Ink Receiving Layer of the Air Gap Absorption Type)

By way of an example of the ink receiving layer of the air gap absorption type used as the solvent absorption layer and the pigment permeation layer, constituent materials of an ink receiving layer containing inorganic particulates or resin particulates and a water-soluble resin will be described.

(1-7-1. Inorganic Particulates)

The inorganic particulates are formed of an inorganic material. The inorganic particulates function to form air gaps in which the color material is contained. As the inorganic particulates, particulates similar to the inorganic particulates of the first embodiment may be used.

For the inorganic particulates, the average particle size is preferably precisely controlled. A reduced average particle size of the inorganic particulates allows light scattering to be suppressed to improve the transparency of the ink receiving layer. For example, in a case where the print medium with the protect layer is used and the image is viewed from the transparent protect layer side, typically the protect layer, which is a part of the substrate, needs to have a sufficient transparency, and the ink receiving layer itself also needs to have a certain degree of transparency. Thus, inorganic particulates with a small average particle size are effectively used for the ink receiving layer. In a case where the inorganic particulates have a reduced average particle size, the ink receiving layer has a reduced air gap diameter and thus a reduced ink absorption capacity, and thus needs to have a sufficiently increased thickness.

On the other hand, in a case where the inorganic particulates in the ink receiving layer have an increased average particle size, the ink receiving layer may have an increased air gap diameter. Thus, in a case where a pigment ink is used, some of the solid components such as the pigment can be allowed to permeate the inside of the ink receiving layer. The transparency of the ink receiving layer is reduced by light scattering caused by the inorganic particulates, and thus, the particle size of the inorganic particulates is effectively further increased in a case where the capability of masking printed information is needed. On the other hand, an increased particle size of the inorganic particulates may reduce the strength of the ink receiving layer. In such a case, to provide the ink receiving layer with an appropriate strength, the amount of binder of water-soluble resin that immobilizes the inorganic particulates may be increased. As described above, the average particle size of the inorganic particulates may be optimally selected according to the intended purposes of the print medium and the printed material, with the absorptivity and transparency of the ink receiving layer taken into account. One type of inorganic particulates may be used alone or two or more types of inorganic particulates may be mixed together. "Two or more types" of inorganic particulates include inorganic particulates of different materials and inorganic particulates with different characteristics such as different average particle sizes or different polydispersity indices.

(1-7-2. Resin Particulates)

The resin particulates are particulates formed of a resin material and have a function to form air gaps that receive the color material in the ink receiving layer. As the resin particulates, particulates similar to the resin particulates of the first embodiment may be used.

(1-7-3. Water-Soluble Resin)

The water-soluble resin is a resin that mixes sufficiently with water at 25° C. or that has a solubility of 1 (g/100 g) with respect to water. As the water-soluble resin, a resin similar to the water-soluble resin of the first embodiment may be used.

Among the water-soluble resins, saponified polyvinyl alcohol is preferable which is obtained by hydrolyzing (saponifying) polyvinyl alcohol, particularly polyvinyl acetate. A polyvinyl acetate group of polyvinyl alcohol contributing to bonding has a high affinity for PVC and PET-G described below. Therefore, when the water-soluble resin and the image support are melted by heat during transfer, compatibility between the water-soluble resin and the image support is enhanced to firmly bond the water-soluble resin to the image support. When PVC or PET-G is used as an image support, the polyvinyl alcohol enables the adhesion (transfer capability) between the image support and the ink receiving layer and is thus particularly preferably used.

The degree of saponification of the ink receiving layer may be set to the similar range of the degree of saponification in the first embodiment.

Setting the degree of saponification preferably to 70 mol % or more and more preferably to 86 mol % or more allows the ink receiving layer to be provided with the appropriate hardness. In particular, in a printed material including the substrate from which the conveyance layer can be peeled off and from which the functional layer such as the protective layer is not peed off, the foil cutting capability of the ink receiving layer during the peeling step is improved, allowing suppression of possible burrs at the ends of the ink receiving layer. Setting the degree of saponification preferably to 100 mol % or less and more preferably to 90 mol % provides the ink receiving layer with appropriate flexibility. In particular, in the printed material including the substrate from which the conveyance layer can be peeled off and from which the functional layer such as the transparent protective layer is not peed off, the strength of the bonding between the protective layer and the ink receiving layer is improved to allow suppression of peel-off of the ink receiving layer from the protective layer due to an insufficient bonding strength.

A weight-average degree of the ink receiving layer may be set to the similar range of the ink receiving layer of the first embodiment.

The ink receiving layer can be provided with appropriate flexibility by setting the weight-average degree of polymerization preferably to 2,000 or more and more preferably to 3,000 or more. Therefore, the foil cutting capability of the receiving layer during the peeling step is improved, allowing suppression of possible burrs at the ends of the ink receiving layer. The ink receiving layer can be provided with appropriate hardness by setting the weight-average degree of polymerization preferably to 5,000 or less and more preferably to 4,500 or less. This improves the strength of the bonding between the protective layer and the ink receiving layer to allow suppression of peel-off of the ink receiving layer from the protective layer due to insufficient adhesive strength. This also enables a reduction in the viscosity of a coating liquid containing inorganic particulates and polyvinyl alcohol. Therefore, the coating liquid can be easily applied to the transparent protective layer, allowing the transfer material to be more effectively and efficiently produced. Furthermore, the pores in the ink receiving layer can be prevented from being filled and can be appropriately kept open, facilitating absorption of ink. Therefore, a high-quality image can be printed on the ink receiving layer. The values of the weight-average degree of polymerization are calculated in compliance with a method described in a test method for polyvinyl alcohol having a degree of saponification of about 70 (mol %) or more.

The amount of the water-soluble resin may be set to the similar range of the water-soluble resin of the first embodiment.

(1-8. Peeling Layer)
(1-8-1. Peeling Layer Material)

Peelability during the transfer step can be controlled by providing the peel-off layer 1603 at the interface between the substrate 50 and the protect layer 1623 as depicted in FIG. 51 or at the interface between the substrate 50 and the solvent absorption layer 1601 as depicted in a part (a) of FIG. 50. As depicted in FIG. 54, in a case where the peel-off layer 1603 is provided at the interface between the solvent absorption layer 1601 and the pigment permeation layer 1600 and the solvent absorption layer 1601 is peeled-off during transfer, the resin layer 1012 and the pigment permeation layer 1600 are transferred to the image support 55, and the solvent absorption layer 1601 is peeled-off along with the substrate 50. In this case, the protect layer 1623 and the thick-film solvent absorption layer 1601 have no optically adverse effect on the image, and thus, the solvent absorption layer 1601 can have its functions improved with a focus on ink absorption properties such as the ink absorption speed and the absorption capacity with no regard to optical properties, flexibility, and foil cutting capability.

(1-8-2. Material of the Peeling Layer)

The type of used for the peel-off layer is not particularly limited. A preferred material is excellent in releasability and is not easily melted by heat generated by a heat roller or a thermal ink jet print head (in particular, a thermal ink jet print head including electrothermal transducing elements (heaters) serving as ejection energy generating elements). The preferred release agent is a release agent having a low affinity for a coupling agent for a layer to be peeled off, such as a material used for the protect layer and a water-soluble resin used for the solvent absorption layer or the pigment permeation layer. The low affinity reduces the compatibility between the release agent and the material of the layer to be peeled off, thus facilitating peel-off, at the interface, of the substrate, the protect layer, the solvent absorption layer, or the pigment permeation layer.

Examples of the material of such a release agent include silicone-based materials such as a silicone wax and a silicone resin which are typified by waxes such as a silicone wax; fluorine-based materials such as a fluorine resin; and a polyethylene resin. Among these materials, the polyethylene-based resin is preferable because the resin exhibits excellent releasability at the temperature Tg at which the resin is melted, or higher, allowing the layers to be easily peeled off by utilizing the heat during transfer. The release agent typically has a water repellency function in addition to the releasing function. Thus, in a case where the peel-off layer is additionally provided at the interface between the solvent absorption layer and the pigment permeation layer, the thickness of the peel-off layer is reduced so as to avoid decreasing the ink absorption speed of the solvent absorption layer. Specifically, the thickness of the peel-off layer that provides an appropriate releasing function while avoiding reducing the ink absorption speed of the solvent absorption layer is 1 µm or more and 10 µm or less and more preferably 0.1 µm or more and 1 µm or less.

In a case where polyethylene-based resin particles, silicone resin-based resin particles, or fluorine-based resin particles are used for the peel-off layer, the average particle size of the resin particles is set larger than the pore size of the solvent absorption layer. The reason is that, in a case where the polyethylene-based resin particles permeate and fill the pores in the solvent absorption layer, the ink absorption speed of the solvent absorption layer is reduced.

(1-9. Adhesion Layer)

Figure 50A:
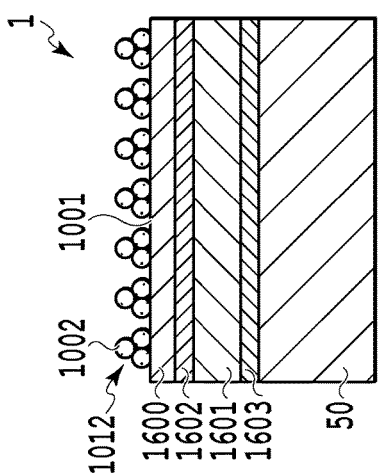
FIGS. 50A to 50D are cross-sectional views illustrating examples of print media each including a peel-off layer.
Figure 50B:
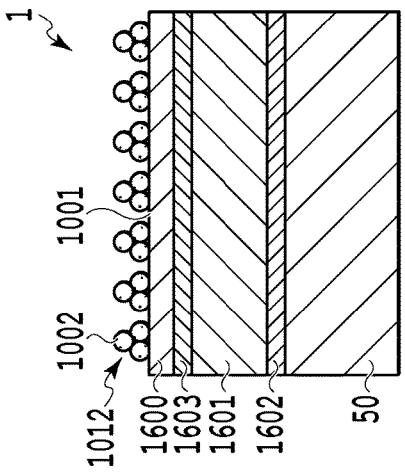
Figure 50C:
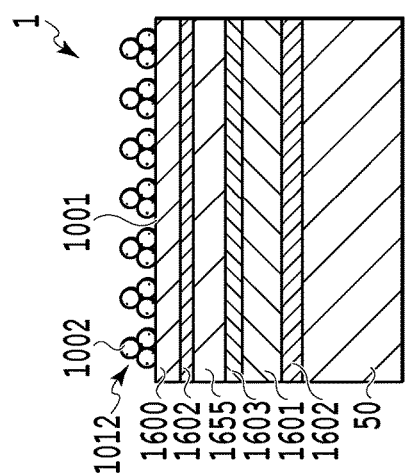
Figure 50D:
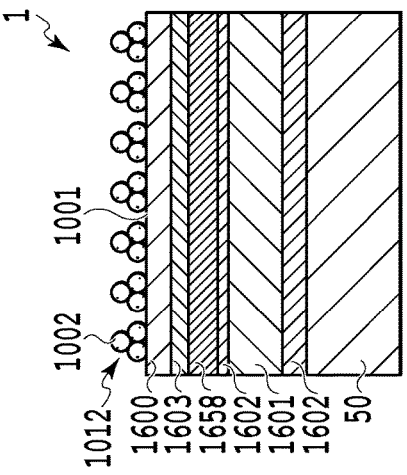

The adhesion layer 1602 may be provided as needed at the interface between the layers in the print medium 1 and at which the peel-off layer 1603 is not provided, as depicted in FIG. 50A, FIG. 50B, FIG. 50C, and FIG. 50D. In FIG. 50A, the adhesion layer 1602 is provided at the interface between the solvent absorption layer 1601 and the pigment permeation layer 1600. In FIG. 50B, the adhesion layer 1602 is provided at the interface between the substrate 50 and the solvent absorption layer 1601. In FIG. 50C, the adhesion layer 1602 is provided at the interface between the substrate 50 and the solvent absorption layer 1601 and at the interface between the second solvent absorption layer 1655 and the pigment permeation layer 1600. In FIG. 50D, the adhesion layer 1602 is provided at the interface between the substrate 50 and the solvent absorption layer 1601 and at the interface between the solvent absorption layer 1601 and the second pigment permeation layer 1658. In a case where the adhesion layer 1602 is provided between the protect layer 1623 and the solvent absorption layer 1601 as depicted in FIG. 51, inadvertent peel-off (inter-layer peel-off) between the protect layer 1623 and the solvent absorption layer 1601 during transfer can be prevented. In a case where the adhesion layer 1602 is provided between the substrate 50 and the solvent absorption layer 1601 as depicted in FIG. 50B, FIG. 50C, and FIG. 50D, the solvent absorption layer 1601 can be peeled off, along with the substrate 50, from the pigment permeation layer 1600 during a peel-off operation following the transfer.

The type of an adhesion agent forming the adhesion layer is not particularly limited. However, as the adhesion agent, a material is preferably selected that has a high affinity for the constituent materials of the substrate and the protect layer, the water-soluble resin forming the solvent absorption layer, the multiple solvent absorption layers, the pigment permeation layer, and the multiple pigment permeation layers. Examples of such a material include a thermoplastic synthetic resin, a natural resin, rubber, and wax. More specific examples of the material include cellulose derivatives such as ethyl cellulose and cellulose acetate propionate; styrene-based resins such as polystyrene and poly α-methylstyrene; acrylic-based resins such as polymethyl methacrylate and polyethyl acrylate; vinyl-based resins such as polyvinyl chloride, polyvinyl acetate, a vinyl chloride-vinyl acetate copolymer, polyvinyl butyral, and polyvinyl acetal; synthetic resins such as a polyester resin, polyamide resin, an epoxy resin, a polyurethane resin, an ionomer, an ethylene acrylate copolymer, and an ethylene-ester acrylate copolymer; and derivatives of natural resins and synthetic rubber such as rosin, rosin modified maleic resin, ester gum, polyisobutylene rubber, butyl rubber, styrene butadiene rubber, butadiene achlironitrile rubber, a polyamide resin, polychlorinated olefin which are used as tackifiers.

In a case where the adhesion layer is additionally provided at the interface between the solvent absorption layer and the pigment permeation layer and in a case where the adhesion layer is additionally provided at each of the interfaces between the multiple solvent absorption layers and the multiple pigment permeation layers, the thickness of the adhesion layer is reduced so as to avoid decreasing the ink absorption speed of the layer forming the interface. Specifically, the thickness of the peel-off layer that provides an appropriate adhesion function while avoiding reducing the ink absorption speed of the solvent absorption layer is 1 µm or more and 10 µm or less and more preferably 0.1 µm or more and 1 µm or less.

A surface modification treatment is an alternative method for improving the adhesion between the overlapping layers in the print medium. That is, a corona discharge treatment or a plasma discharge treatment is executed on the front surface of the substrate, the protect layer, the solvent absorption layer, each of the multiple solvent absorption layers, the pigment permeation layer, or each of the multiple pigment permeation layers, or the front surface is coated with an organic solvent such as IPA or aceton, to roughen the front surface. Then, wettability of the front surface can be improved to enhance the adhesion.

(1-10. Sea-and-Island-Like Resin Layer)

A basic configuration of the resin layer 1012 and an absorption mechanism for ink are similar to the basic configuration of the resin layer 1012 and the absorption mechanism described in the first embodiment. The resin layer of the print medium in the second embodiment of the present invention may also be utilized as a bonding layer, enabling transfer to various supports via the resin layer.

(1-10-1. Magnitude Relation Between a Piece of Thermoplastic Resin and an Ink Droplet)

A magnitude relation between a Piece of thermoplastic resin and an ink droplet is similar to the corresponding magnitude relation in the first embodiment.

In a case where the area of the surface of each piece of thermoplastic resin or an aggregate of pieces of thermoplastic resin (thermoplastic resin portion) is larger than the size of an ink droplet, so that the ink droplet deformed and spread by the landing impact fails to bring a portion thereof into contact with the exposed portion of the pigment permeation layer, the ink may remain in the thermoplastic resin portion. This makes printing of an appropriate image difficult and may be a hindrance to the bonding. Therefore, each piece of thermoplastic resin or an aggregate of pieces of thermoplastic resin (thermoplastic resin portion) is configured not to be significantly larger than an ink droplet of the pigment ink used for the ink jet printing and more preferably configured to be sufficiently smaller than the size of the ink droplet.

The inventor's examinations indicate, in a case where a portion of the ink remained on or inside the surface of the thermoplastic resin portion, then in some cases, the remaining ink stood out of the surface of the pieces of thermoplastic resin and was formed into a film at the interface between the image support and the pieces of thermoplastic resin, leading to inappropriate bonding. In some cases, during heated transfer, a portion of some components of the remaining ink vaporized to form a vapor layer or the like between the image support and the pieces of thermoplastic resin, leading to inappropriate bonding. In the print medium of the present embodiment, as described above, substantially no ink remains on the front surface of or inside the thermoplastic resin portion, with substantially all of the liquid components of the pigment ink quickly absorbed by the solvent absorption layer. Thus, even in a case where heated transfer is executed immediately after ink jet printing, bonding is unlikely to be hindered, resulting in an appropriate bonding capability.

(1-10-2. Shape of the Pieces of Thermoplastic Resin)

A shape of the pieces of thermoplastic resin is similar to the corresponding shape in the first embodiment. To achieve appropriate bonding, a sufficient number of pieces of thermoplastic resin are preferably arranged so as to be easily bonded together into a film when softened and melted.

It is possible to use pieces of thermoplastic resin generally shaped like particles or polyhedrons. The use of such pieces of thermoplastic resin enables the ink absorptivity to be maximized and also enables the appropriate bonding to be achieved, while maximizing the area of the exposed portion of the pigment permeation layer of the air gap absorption type. In view of film productivity of the print medium, spherical particle-shaped pieces of thermoplastic resin are preferable that need no special orientation treatment or the like. Like such a particle shape, a high-order polyhedron may be preferably used. In the print medium of the present invention, a pigment permeation layer through which pigment particles can infiltrate and diffuse is provided below the resin layer, and thus, a white point is unlikely to occur immediately below the pieces of thermoplastic resin. Alternatively, film-like pieces of thermoplastic resin may be discretely provided.

(1-10-3. Particle Size of the Thermoplastic Resin)

A particle size of the thermoplastic resin is similar to the p corresponding article size in the first embodiment. In a case where the bonding portion is formed of aggregates of particles of thermoplastic resin, particles of thermoplastic resin with an average particle size of 2 µm or less are preferably used so as to facilitate a reduction in the area of each of the island-like thermoplastic resin portions.

(1-10-4. Intervals Between the Pieces of Thermoplastic Resins)

Intervals between the pieces of thermoplastic resins is similar to the corresponding intervals in the first embodiment. By locating at least one exposed portion 1001 in one pixel 1007, the pigment ink 1003 does not remain on the island portions 1000 (thermoplastic resin portions) 1000 but is quickly absorbed by the pigment permeation layer 1600 and the solvent absorption layer 1601, inhibiting possible inappropriate bonding.

(1-10-5. Other Configurations of the Thermoplastic Resin)

For example, pieces of thermoplastic resin 1002 with different particle sizes may be used. The magnitude of the particle size is related to the volume of the pieces of thermoplastic resin. An increased particle size increases the volume of the pieces of thermoplastic resin 1002 and the contact area between the image support and the pieces of thermoplastic resin, allowing the bonding capability to be improved. Therefore, pieces of thermoplastic resin with a large particle size may be highly compatible with the image support, and pieces of thermoplastic resin with a small particle size may serve as a binder between pieces of thermoplastic resin with a large particle size and between the pigment permeation layer 1600 and pieces of thermoplastic resin with a large particle size. When pieces of thermoplastic resin with a small particle size are used as a binder, a resin layer can be formed with the structure of the air gaps among the particles of thermoplastic resin with a large particle size substantially maintained.

For an appropriate bonding capability, the resin layer may be configured using a plurality of types of thermoplastic resin particles. For example, in view of weatherability according to the intended purpose of the printed material, thermoplastic resins of a plurality of materials may be used. Specifically, resins of a plurality of types of materials may be used, such as pieces of thermoplastic resin with a small particle size that serve as a binder for the resin layer, pieces of thermoplastic resin with a large particle size that make the layer unlikely to peel off even with a polar solvent, and pieces of thermoplastic resin with a large particle size that make the layer unlikely to peel off even with a nonpolar solvent. As pieces of thermoplastic resin with a large particle size, a plurality of types of resins of materials that exhibit an excellent bonding capability for a particular image support. In a case where the print medium is bonded to an image support with a front surface formed of rough paper, an adhesive may be used that has an appropriate cushioning capability that allows the print medium to adhere to the rough surface. A single resin layer or a plurality of resin layers may be provided. For example, the bonding function may be separately allocated to the layer 1002A that is likely to bond to the pigment permeation layer and to the layer that is likely to bond to the image support. The resin layer can be softened and melted by pressurizing and heating the thermoplastic resin at a temperature equal to or higher than the film formation temperature for the thermoplastic resin over a sufficient time.

(1-10-6. Amount (Volume) of Thermoplastic Resin)

The amount of thermoplastic resin may be adjusted according to the print medium and the intended purpose of the print medium. For example, in a case where a high bonding capability is needed, the amount preferably allows the resin layer to be softened and melted into a film so as to absorb recesses and protrusions on the bonding surface between the image support and the pigment permeation layer. On the other hand, for example, in a case where the pigment permeation layer is peeled off from the image support after transfer for reuse, the bonding force provided by the thermoplastic resin may be weak. In this case, the amount of thermoplastic resin may be reduced. The thermoplastic resin can be inhibited from being formed into a film all over the surface between the pigment permeation layer and the image support by adjusting a pressurization force, a heating temperature, a pressurization and heating time, and the like in a case where the thermoplastic resin is softened and melted during transfer based on pressurization and heating. Pieces of thermoplastic resin of a pressure-sensitive tackifier type may be discretely provided on the pigment permeation layer to form an island-like resin layer. In a case where the bonding force is adjusted to a small value, the area of the exposed portion of the pigment permeation layer may be increased to improve the print properties of image printing with the ink.

(1-10-7. Film-Like Pieces of Thermoplastic Resin)

Just like the first embodiment, the pieces of thermoplastic resin are not limited to the particle shape. For example, film-like pieces of thermoplastic resin 1002 may be used to form a sea-and-island-like resin layer 1012. An effect obtained by using the film-like pieces of thermoplastic resin is similar to the corresponding effect in the first embodiment.

(1-10-8. Thickness of the Resin Layer)

A thickness of the resin layer may be set to the similar range of the corresponding thickness in the first embodiment.

Importantly, the thickness of the resin layer is adjusted to achieve appropriate visibility and an appropriate bonding capability. For an appropriate bonding capability, the thickness of the resin layer needs to be adjusted to allow the surface recesses and protrusions of the image support to be absorbed when the resin layer is softened and melted. In a case where the bonding to the image support is inappropriate, the thickness of the resin layer may be increased so as to increase the total amount of thermoplastic resin. Consequently, the thickness of the pieces of thermoplastic resin may be adjusted as needed according to the types of the thermoplastic resin and the image support used.

(1-10-9. Area of the Thermoplastic Resin Portion and Area of the Exposed Portion)

In the present invention, the area of the exposed portion of the pigment permeation layer is preferably 50% or more of the total area of the pigment permeation layer, just like the first embodiment.

(1-10-10. Material of the Thermoplastic Resin)

As it is clear from the above absorption mechanism for ink, the thermoplastic resin is not directly related to the absorption of the ink, and thus, the material of the thermoplastic resin may be selected regardless of the ink and with a focus on the bonding to the image support. Therefore, the print medium of the present invention can be bonded to various image supports. Specifically, according to the material of a particular image support attached to the printed material, a user may select one of well-known adhesives that bonds excellently to a particular image support. For example, as the thermoplastic resin, any of the well-known thermoplastic resins may be selected that bonds excellently to a particular image support such as paper, glass, woods, or metal may be selected, and examples of the thermoplastic resin include PET, PVC, PET-G, acrylic, polycarbonate, POM, ABS, PE, and PP. As a material of the thermoplastic resin, the corresponding material in the first material may be used.

The thermoplastic resin that bonds excellently to a particular image support may be of a stimulation activated type that is made by external stimulation to exhibit the capability of bonding to the particular image support. The stimulation activated thermoplastic resin is not particularly limited but a well-known stimulation activated thermoplastic resin may be used. For example, stimulation activated thermoplastic resins may be used for which heat, pressure, water, light, a reactant, or the like is used as an external stimulation. For example, the stimulation activated thermoplastic resin may be a heat-sensitive thermoplastic resin for which heat is used as external stimulation and which contains, as a main component, thermoplastic resin that is melted to exhibit the capability of bonding to the image support in a case where the thermoplastic resin is heated at the glass transition temperature thereof or higher. The stimulation activated thermoplastic resin may be a pressure-sensitive thermoplastic resin for which pressure is used as external stimulation and which can be bonded to the image support simply by applying a slight pressure to the thermoplastic resin at normal temperature for a short time. The stimulation activated thermoplastic resin may be a water activation thermoplastic resin, that is, a remoistening thermoplastic resin, for which water is used as external stimulation and which is made to exhibit the bonding capability by applying water to the thermoplastic resin in a dry state. However, in a case where the water activation thermoplastic resin is used, water adheres to the bonding surface in a case where the print medium is bonded to the image support. Thus, the color material of the ink preferably offers water resistance and may be, for example, a waterproof dye and more preferably a pigment.

The color and transparency of the thermoplastic resin may be determined according to the intended use of the print medium and the printed material. The thermoplastic resin may be transparent, translucent, or opaque or may be colored. For example, in a case where the pigment image is made visible both from the substrate side and from the thermoplastic resin side, the transferred resin layer may be transparent. In a case where the pigment image is made visible only from the substrate side, the resin layer may be colored to provide a background color. The transferred resin layer may be colored so as to provide a white background color in order to improve the image visibility of the printed pigment image. In that case, the particle size of the pieces of thermoplastic resin may be set larger than the wavelength of visible light or a white pigment 1616 or the like may be added to the pieces of thermoplastic resin 1002 as depicted in parts (a) to (c) of FIG. 58. In a case where the print contents are made visible from the resin layer side, the thermoplastic resin is preferably completely formed into a molten film to provide a high transparency.

(1-10-11. Re-Peelable Resin Material)

The sea-and-island-like resin layer may be designed so as to be able to freely control the film formation state during transfer. That is, the resin layer can be transferred in a surface bonding state by melting and softening the whole thermoplastic resin contained in the sea-and-island-like resin layer into a complete film. Alternatively, the resin layer can be transferred in a point bonding state by melting and softening only the surface of each of the piece of thermoplastic resin contained in the sea-and-island-like resin layer. In a case where most or all of the resin layer is completely formed into a film and the film is then transferred, a bonding area is maximized to allow appropriate bonding to be achieved in a surface bonding state. In a case where the resin layer is completely formed into a film so as to fill the bypass portion of the sea-and-island-like resin layer, liquids such as water and chemicals and gases such as ozone can be substantially restrained from entering the printed material formed, and weatherability such as water resistance and chemical resistance can be improved. On the other hand, in a case where the resin layer is not substantially formed into a film and is transferred in a point bonding state, the image support and the like can be made peelable.

(1-10-12. Pressurized Sticking Material)

Figure 47:
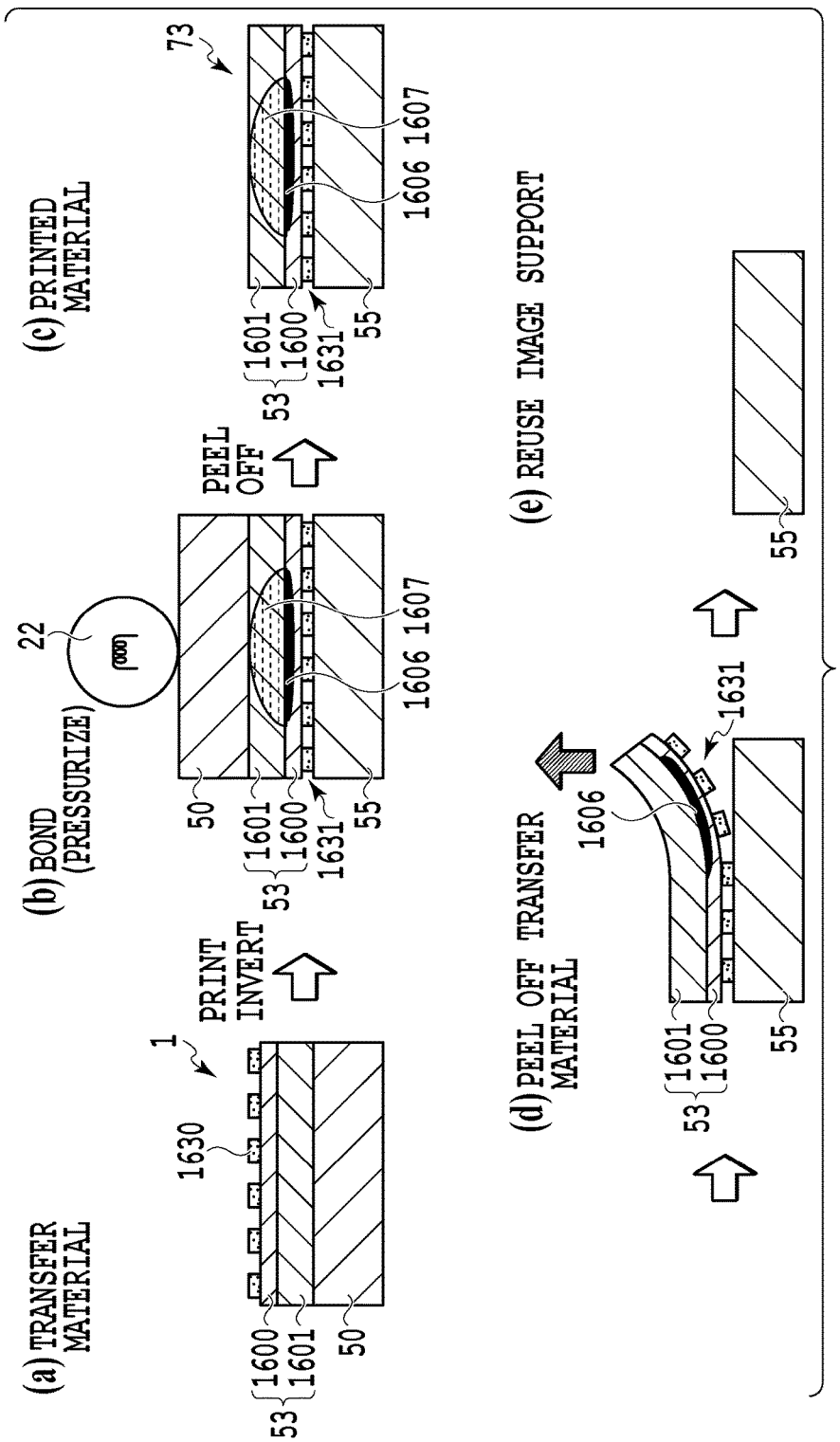
FIG. 47 is a diagram illustrating a manufacturing method for a printed material including a print medium in which the resin layer is formed of film-like pieces of thermoplastic resin.

As described above, the pigment ink infiltrates and diffuses through the pigment permeation layer and moves around to the area immediately below the pieces of thermoplastic resin to enable an image to be printed. Thus, the pigment ink is not limited to the particle-shaped pieces of thermoplastic resin 1002. For example, as depicted in a part (a) of FIG. 47, a resin layer 1631 of the pressure-sensitive tackifier type can be shaped into a sea-and-island form using film-like pieces of thermoplastic resin 1630 formed of a pressure-sensitive tackifier material.

Typically, a pressure sensitive tackifier has a low film formation temperature Tg, and at room temperature, the pressure sensitive tackifier is in a film form and itself exhibits a bonding capability. The use of such a tackifier facilitates adjustment of a peel strength. That is, in a case where the amount of tackifier in the discretely disposed film-like pieces of pressure-sensitive tackifier material is increased or a tackifier with high tackiness is used, the need for a heating process is eliminated and the transfer to the image support 55 can be achieved simply by using a pressurization step as depicted in parts (b) and (c) of FIG. 47. The image support 55 can be peeled off by a regulated force equal to or higher than the peel strength for reuse as depicted in parts (d), (e) of FIG. 47.

Figure 48:
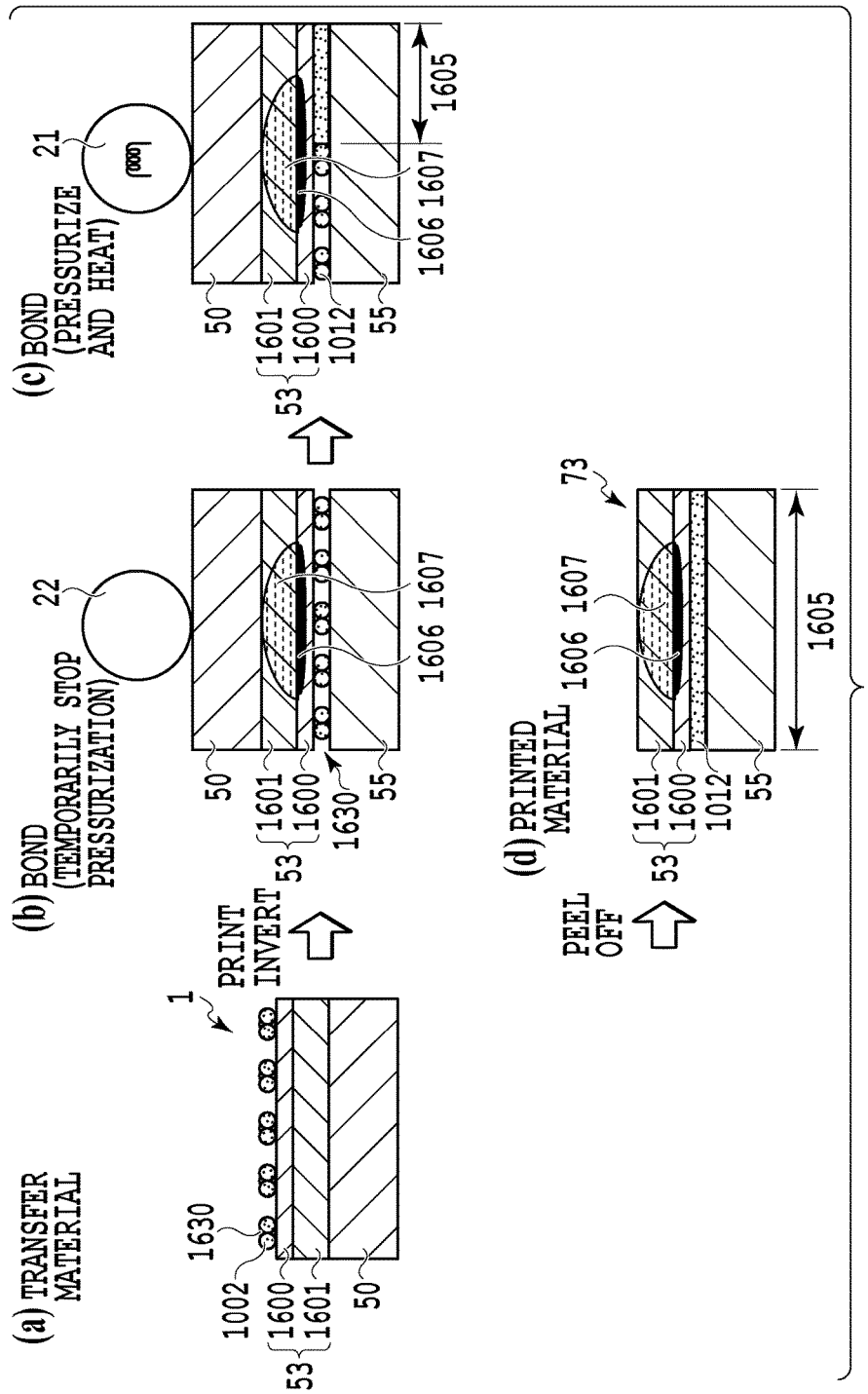
FIG. 48 is a diagram illustrating a manufacturing method for a printed material including a print medium in which the resin layer is formed using a thermobonding thermoplastic resin and a slightly tacky tackifier.

On the other hand, in a case where the amount of tackifier in the discretely disposed film-like pieces of pressure-sensitive tackifier material is reduced or a tackifier with slight tackiness is used, the print medium can be temporarily attached or re-stuck to the image support during the transfer to the image support. Therefore, in a case where the image support and the print medium are laminated on each other, the image support and the print medium can be easily and accurately aligned with each other. For example, as depicted in a part (a) of FIG. 48, it is possible to use both the thermoplastic resin 1002 that exhibits the bonding capability on heating and the slightly tacky tackifier 1630. In this case, after the pigment image 1606 is formed using an ink jet printing apparatus 600, the print medium 1 is temporarily fixed to the image support 55 by applying, to the print medium, a low pressure enough to stroke the print medium as depicted in a part (b) of FIG. 48. Subsequently, as depicted in a part (c) of FIG. 48, a heating roller apparatus 21 is used to pressurize and heat the print medium to soften and melt the resin layer 1012 into a film, thus really bonding the print medium to the image support 55. As a result, the alignment between the image support 55 and the print medium 1 is facilitated, allowing possible wrinkles during transfer to be suppressed. After the image support 55 and the print medium 1 are really bonded together, the substrate 50 is peeled off to form a printed material 73 as depicted in a part (d) of FIG. 48.

(2. Manufacturing Method for the Print Medium)

The substrate of the print medium may be configured such that the conveyance layer included in the substrate is peeled off or not peeled off depending on the intended purpose, and can be manufactured using a well-known method. A film of 5 μm to 300 μm may be used as a substrate depending on the intended purpose. A material that is preferable for the substrate in terms of mechanical properties and thermal properties is a polyethylene terephthalate (PET) film.

(2-1. Formation Method for the Substrate)

In a case where the substrate includes the conveyance layer, the peel-off layer, and the protect layer and only the conveyance layer is peeled off via the peel-off layer, in other words, the substrate is peeled off with a part thereof left as a protect layer for the front surface of the solvent absorption layer, the peel-off layer is pre-provided on the substrate using a well-known coating apparatus. On the other hand, in a case where the substrate and the solvent absorption layer are integrally peeled off at the interface between the solvent absorption layer and the pigment permeation layer, an adhesion layer that adheres to the solvent absorption layer may be pre-provided on the substrate using a well-known coating apparatus. The peel-off layer and the adhesion layer are formed by coating the substrate with a composition containing the above-described release agent or adhesion agent using the known coating method, and then drying the composition.

(2-2. Formation Method for the Protect Layer)

A protect layer coating liquid is prepared, and a protect layer can be formed by coating the front surface of the substrate previously provided with the peel-off layer, with the protect layer coating liquid, using the known coating method, and then drying the composition.

The protect layer may be transparent, translucent, opaque, or colored as a result of transfer, according to the intended purpose. The thickness of the protect layer and the like may be adjusted so as to provide the protect layer with the desired optical properties as a result of transfer by selecting the material of the protect layer as needed.

As the medium for the coating liquid for the protect layer, an aqueous medium is preferably used. Examples of the aqueous medium include water and a mixed solvent of water and a water-soluble organic solvent.

The protect layer coating liquid may contain various additives unless the additives hinder the effects of the present invention. The coating amount of the coating liquid for the protect layer is set preferably to 1 to 40 g/m$^2$, more preferably to 2 to 30 g/m$^2$, and much more preferably 4 to 20 g/m$^2$. In a case where the coating amount is set preferably to 1 g/m² or more, more preferably to 2 g/m² or more, and much more preferably to 4 g/m² or more, the protect layer can offer appropriate water resistance and appropriate scratch resistance. In a case where the coating amount is set preferably to 40 g/m² or less, more preferably 30 g/m² or less, and much more preferably to 20 g/m² or less, the transparency of the protect layer can be enhanced according to the intended purpose. Moreover, heat is more appropriately transmitted through the protect layer during thermocompression bonding to allow improvement of adhesion (transfer capability) between the protect layer and the ink receiving layer.

In a case where the protect layer is formed, a drying (heating) step may be included in which the resin E1 contained in the protect layer is formed into a film, with the resin 132 remaining in the particle state. The drying temperature may be set considering film-forming state, foil cutting performance during transfer, adhesiveness to the ink receiving layer, chemical resistance, interlayer peel-off, productivity, and the like.

The substrate or the protect layer may be subjected to a known surface modification. In a case where surface modification is performed to roughen the front surface of the substrate, the wettability of the substrate can be improved to enhance the coatability of the protect layer.

(2-3. Formation Method for the Solvent Absorption Layer)

The solvent absorption layer can be formed by the same method as in the first embodiment. The particle concentration of the coating liquid, the amount of coating liquid, and the like are set in the same manner as in the first embodiment.

(2-4. Formation Method for the Peel-Off Layer)

In a case where the peel-off layer is provided between the pigment permeation layer and the solvent absorption layer, the peel-off layer can be formed by mixing the release agent with the appropriate medium to prepare a coating liquid, coating the front surface of the solvent absorption layer with the coating liquid, and drying the coating liquid. A surfactant may be added as needed. In a case where the peel-off layer is applied using a coating liquid of particle-shaped pieces of release agent, the front surface of the solvent absorption layer may be treated using dampening water or soaking water to fill the air gaps in the solvent absorption layer with the liquid before the release agent is applied so that fine release agent particles are inhibited from entering the air gaps in the solvent absorption layer. The particle concentration of the release agent in the coating liquid may be determined as needed with coatability with the coating liquid and the like taken into account, and is not particularly limited. In view of the coating speed and the uniformity of the film, the particle concentration is preferably 0.1 wt % or more and 5 wt % or less with respect to the total weight of the coating liquid. The amount of coating liquid applied is preferably 0.1 g/m² or more and 1 g/m² or less in terms of solid content. In a case where the amount of coating liquid applied is 0.1 g/m² or more and preferably 1 g/m² or less, the appropriate speed can be maintained at which the water components and the solvent components in the ink are absorbed by the solvent absorption layer.

A coating method may be equivalent to the formation method for the solvent absorption layer.

(2-5. Formation Method for the Pigment Permeation Layer)

The pigment permeation layer can be formed by the same method as in the first embodiment. The particle concentration of the coating liquid, the amount of coating liquid are set in the same manner as in the first embodiment.

(2-6. Formation of the Resin Layer)

The resin layer can be formed by the same method as in the first embodiment.

(3. Manufacturing Method for the Printed Material)

(3-1. Image Printing Method Based on the Ink Jet System)

An image printing method based on the ink jet system may be similar to the image printing method in the first embodiment. An image is printed from above the resin layer using the ink jet printing system with the pigment ink to form a pigment ink on the pigment permeation layer.

In multi-pass printing, color printing, or full-line color printing, in a case where, with unabsorbed ink 1632 remaining on the print surface of the print medium 1, a next ink droplet 1633 lands on the print surface, ink mist 1636 may fly to degrade the image quality.

Ink jet printing may be performed using UV ink or solvent ink without the need to provide, on the image support, a special ink receiving layer such as a plastic card, a vinyl chloride sheet, or any other resin film, or glass or metal. In multi-pass printing and color printing, in a case where, on the liquid surface of non-reacted and undried UV ink or solvent ink 1632, a next droplet of the UV ink or solvent ink 1633 lands, mist 1636 may be generated, as is the case with FIG. 49A. The non-reacted UV ink is irritating to human bodies and mist of the solvent components of the solvent ink generates smell and is thus irritating in an operational environment for image printing. The image support with non-reacted UIV ink or insufficiently dried solvent ink remaining adhering thereto is irritating to the user.

Figure 49B:
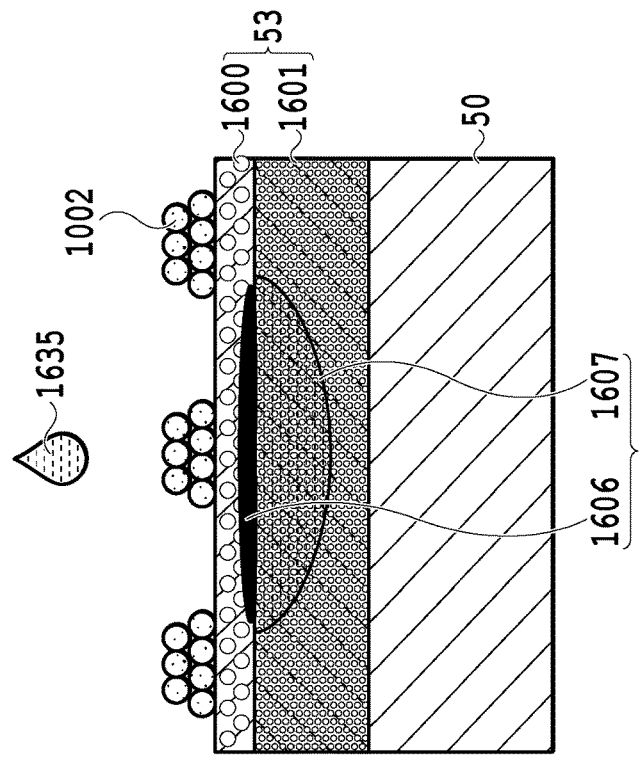
FIG. 49A and FIG. 49B are each a diagram illustrating an occurrence mechanism of ink mist.
Figure 49A:
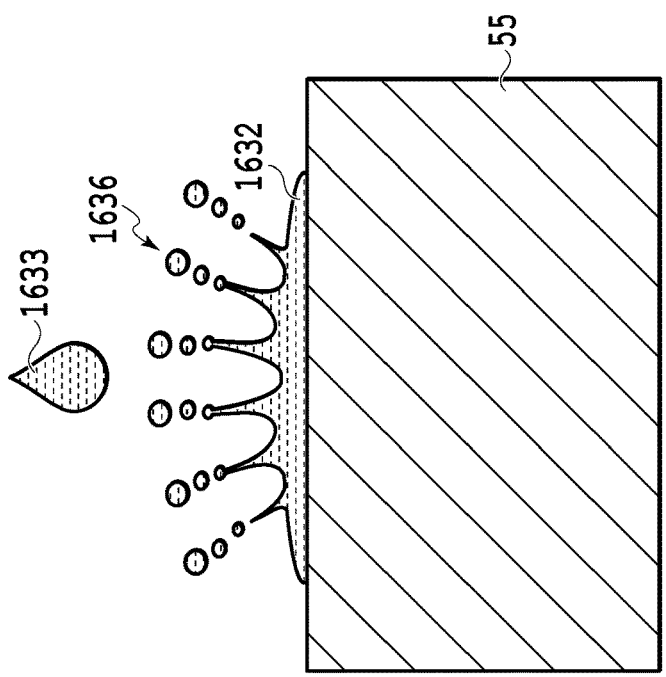

The print medium of the present invention allows a high-definition ink jet image to be transferred to and formed on various image supports provided with no special ink receiving layer, using a safe aqueous pigment ink. In the print medium of the present invention, an image is printed, from above the resin layer, on the pigment permeation layer of the air gap absorption type, which has a high ink absorption speed, using the ink jet printing system. Thus, as depicted in FIG. 49B, the pigment ink 1634 is quickly absorbed by the pigment permeation layer 1600 and subjected to solid-liquid separation, with the solvent components 1607 absorbed by the solvent absorption layer 1601. Thus, when the next ink droplet 1635 lands, a liquid film of the preceding pigment ink 1634 is unlikely to be present on the pigment permeation layer 1600. Therefore, scatter of the ink mist is inhibited, and the use of safe aqueous pigment ink results in safe high-resolution high-quality image.

(3-1-1. Pigment Ink)

The print medium of the present invention includes the pigment permeation layer through which the pigment particles can infiltrate and diffuse to allow an appropriate pigment image to be formed on the entire surface of the print medium including the area below the pieces of thermoplastic resin, making the ink less likely to remain on the front surface of the resin layer or inside the resin layer. As a result, both the print properties and the bonding capability can be achieved. With the storage stability and durability of a print image applicable to various purposes taken into account, the pigment ink may preferably used. As the pigment ink, the pigment ink in the first material may be used.

Substantially all of the liquid components of the pigment ink, which correspond to the solvent of the pigment ink, are quickly absorbed by the solvent absorption layer side, and thus, substantially no liquid components remain in the resin layer. Thus, after the ink jet printing, the print image can be quickly transferred to image support.

In the print medium of the present invention, the pigment particles allow a dense pigment image to be formed like a thin film at the bottom of the pigment permeation layer, and thus, the pigment particles, which may affect the bonding capability, are inhibited from remaining on the front surface of the pigment permeation layer. This is also suitable for the use of a self-dispersing pigment containing pigment particles that themselves have no bonding capability.

A resin dispersing pigment allows pigment particles separated from the ink medium to be more appropriately bound together to form a firm thin-film-like pigment image at the bottom of the pigment permeation layer. Substantially all of the solvent in the pigment ink, which corresponds to the liquid components in the pigment ink, are absorbed by the solvent absorption layer, which has a higher ink absorption speed than the pigment permeation layer. Thus, resin dispersing pigment particles are placed in proximity to one another and more firmly bonded together by a dispersing resin added for pigment dispersion. The dispersing resin has a high affinity for polyvinyl alcohol, which is the water-soluble resin of the ink receiving layer, the constituent material of the thermoplastic resin of the resin layer, and the like. Thus, in a case where the dispersing resin, the water-soluble resin, and the thermoplastic resin are melted under heat during transfer, the compatibility between the resins is improved, firmly bonding the resin dispersing pigment also to the pigment permeation layer. Since the dispersing resin has a high affinity for the constituent material of the image support and the like, when the dispersing resin and the constituent material of the pigment permeation layer are melted under heat during transfer, the compatibility between the dispersing resin and the constituent material is improved, firmly binding the resin dispersing resin into the pigment permeation layer. A material and an acid value of the resin with which the periphery of the pigment particles is coated are set in the same manner as in the first embodiment.

(3-1-1-1. Permeability and Diffusibility of the Pigment Ink)

The viscosity and surface tension of the pigment ink can be set in the same manner as in the first embodiment.

(3-1-1-2. Pigment Concentration)

The concentration of the color material in the pigment ink (pigment concentration) can be set in the same manner as in the first embodiment. Setting the color material concentration within this range allows both the visibility of the image and the bonding capability to be achieved.

(3-1-2. White Ink)

In the present invention, after or before any image is printed, ink jet printing may be performed on at least a part of the pigment permeation layer using a white ink. In a case where a white ink is applied according to the intended purpose to provide a background for an image printed on the pigment permeation layer, the capability of masking the print image is improved, allowing the visibility of the print image to be enhanced. In a case where the average particle size of the white pigment particles of the white ink is larger than the average pore size of the pigment permeation layer, the white pigment components, the water components, and the solvent components are subjected to solid-liquid separation on the front surface of the pigment permeation layer. In a case where each of the thermoplastic resin portions (island portions) of the resin layer has a sufficient height, the pigment components of the white ink are also coated with the resin layer by thermocompression bonding. Thus, no pigment of the white ink remains on the front surf ace, and appropriate scratch resistance is obtained. A composition for the white ink may be a composition for any white ink normally used for the ink jet printing method. As such a white pigment, a well-known material is applicable. Examples of the white pigment include an inorganic white pigment, an organic white pigment, or white hollow polymer particulates.

(3-2. Transfer Method)

In a case where a printed material is produced using a print medium from which the substrate is not peeled off, first, an image is printed on the print medium (for example, ink jet printing) by applying the pigment ink to the pigment permeation layer via the resin layer. As the image, a normal image or an inverted image is printed depending on the direction in which the image is viewed. Then, a printed material is obtained by transferring the print medium to the image support via the discretely disposed pieces of thermoplastic resin.

In a case where a printed material is produced using a print medium from which all of the substrate including the conveyance layer is peeled oft, for example, an inverted image is printed on the print surface of the print medium. Then, the print medium is transferred to the image support via the discretely disposed pieces of thermoplastic resin, and subsequently, the conveyance layer (all of the substrate) is peeled off. Consequently, a printed material is obtained in which a dense thin-film-like pigment image formed on the pigment permeation layer.

In a case where the substrate includes a functional layer such as a transparent protect layer, a hologram layer, or a protect layer, first, for example, an inverted image is printed on the print surface of the print medium including the functional layer. Then, the print medium is transferred to the image support via the discretely disposed pieces of thermoplastic resin, and subsequently, only the conveyance layer (a part of the substrate) is peeled off from the substrate including the functional layer such as the conveyance layer, the transparent protect layer, the hologram layer, or a print layer. Consequently, a printed material can be obtained with which the functional layer is integrated and in which the pigment permeation layer with the image printed thereon is laminated onto the image support.

In the present invention, in the transfer step, appropriate transfer can be achieved even in a state where the solvent absorption layer contains a sufficient amount of moisture. The solvent absorption layer of the air gap absorption type can absorb a large amount of ink, and the air gap structure of the solvent absorption layer is unlikely to be destroyed during transfer and can be maintained even after the transfer, as described above. Thus, the solvent of the ink absorbed into the solvent absorption layer can be maintained inside the solvent absorption layer even in a case where the thermoplastic resin and the binder are melted during transfer, and possible vapor can be sealed inside the solvent absorption layer. Therefore, appropriate transfer can be achieved even in a case where the solvent absorption layer contains a sufficient amount of moisture. In the resin layer including the pieces of thermoplastic resin discretely disposed on the pigment permeation layer, the thermoplastic resin absorbs substantially no ink or absorbs the ink at a low absorption speed. Thus, the ink is unlikely to remain on the front surface of the resin layer and inside the resin layer. As a result, the ink, which may hinder the transfer, is unlikely to remain in the resin layer, allowing the print medium to be appropriately transferred to the image support.

A preferable bonding method in the present invention may be selected according to the properties of the thermoplastic resin. For example, in a case where a stimulation responsive material is used for the thermoplastic resin and the thermoplastic resin is of a water activation type, water is applied in a water application step using a water application apparatus after an image is formed on the print medium. This allows the discretely disposed pieces of thermoplastic resin to be provided with the bonding property. In a case where the thermoplastic resin is of a ultraviolet activation type, ultraviolet rays are applied in an ultraviolet irradiation step using an ultraviolet irradiation apparatus after an image is formed on the print medium. This allows the discretely disposed pieces of thermoplastic resin to be provided with the bonding property.

In a case where the thermoplastic resin is of a thermal activation type, the resin layer including the discretely disposed pieces of thermoplastic resin is heated in a heating step using a heating apparatus, so as to be provided with the bonding property. Examples of the heating apparatus include a heating fan, a heating belt, and a thermal transfer head, but the present embodiment is not limited to these heating apparatuses.

In a case where the thermoplastic resin is of a tacky type, the resin layer including the discretely disposed pieces of thermoplastic resin, itself, exhibits the adhesion capability, and thus, the resin layer including the discretely disposed pieces of thermoplastic resin is compressively bonded in a compressive bonding step, so as to be provided with the bonding property. In a case where the thermoplastic resin is formed of a plurality of materials, the method may include a plurality of transfer steps executed using a combination of a plurality of apparatuses.

(3-2-1. Heat Roller Transfer)

In the present invention, the thermoplastic resin is particularly preferably thermoplastic particles that are softened and melted into a film by heat and pressure to exhibit the bonding capability, and thus, the transfer method is preferably based on a thermocompression bonding step including heating and compressive bonding. A configuration for such transfer uses both the heat roller and the pressurization roller.

Figure 55:
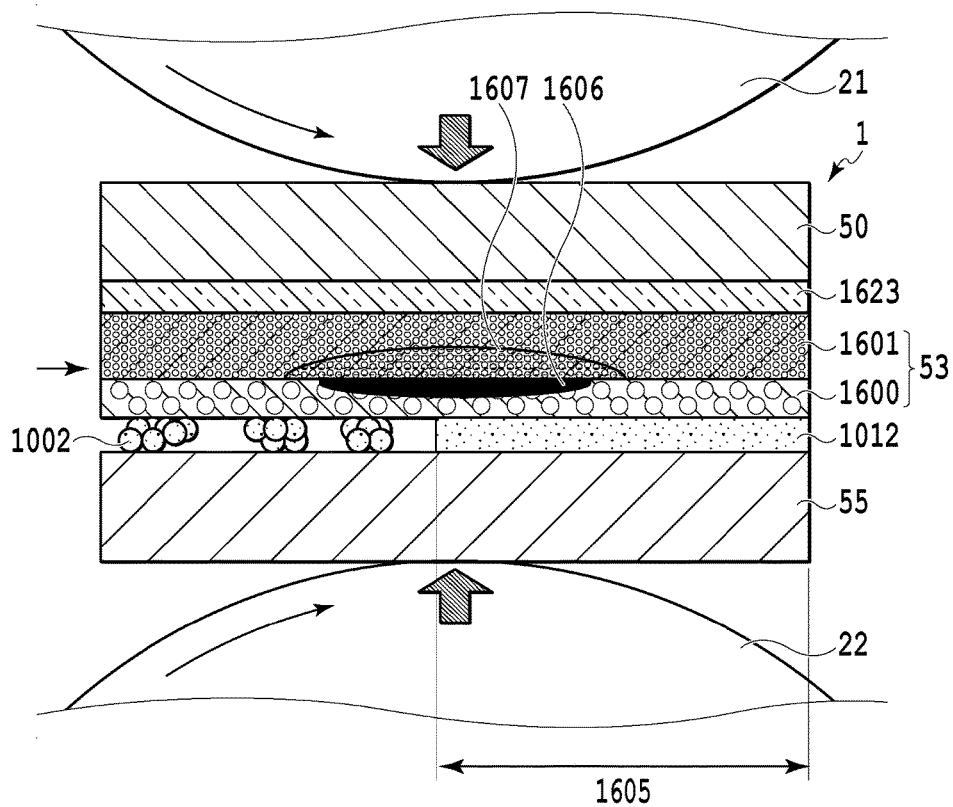
FIG. 55 is a cross-sectional view of the print medium and an image support during transfer.

In the example in FIG. 55, the print medium 1 with an image formed thereon is laid on top of the image support 55, and the print medium 1 and the image support 1 are passed between the heated heat roller 21 and the pressurization roller 22. As described above, the pigment image 1606 is formed on the pigment permeation layer 1600 of the print medium 1, the pigment permeation layer 1600 is laid on top of the image support 55 via the resin layer 1012, and the print medium 1 and the image support 1 are conveyed between the heated heat roller 21 and the pressurization roller 22. Consequently, the print medium and the image support 55 are bonded to each other via the discretely disposed pieces of thermoplastic resin 1002, and subsequently, the substrate 50 is peeled off to allow a printed material to be provided. The thermoplastic resin 1002 is softened and melted into a film portion 1605 by pressure and heat and bonds firmly to the image support 55.

In the present invention, in a case where the print medium with the pigment image formed on the pigment permeation layer is transferred to the image support by thermocompression bonding, it is important to control heat and pressure during the thermocompression bonding so as to maintain the air gap structure in the solvent absorption layer even after the thermocompression bonding. As depicted in FIG. 55, the heat roller 21 and the pressurization roller are used to pressurize and heat and melt the particle-shape pieces of thermoplastic resin 1002 into a film, but the solvent components 1607 of the pigment ink absorbed by the solvent absorption layer 1601 are held in the air gap structure. Due to the thus maintained air gap structure, even when the liquid components of the ink are subjected to bumping in the air gaps in the solvent absorption layer 1601 by heat and pressure during thermocompression bonding to generate vapor, the vapor can be sealed in each air gap. As a result, appropriate bonding can be achieved with no air layer or the like formed on the bonding surface. The air gap structure in the solvent absorption layer 1601 is inhibited from being maintained during transfer to suppress collapse of the air gaps resulting from pressure and melting of the air gaps resulting from heat. This prevents the nonvolatile solvent, which corresponds to the liquid components of the ink, from seeping out, allowing appropriate bonding to be achieved.

The substrate 50 can be peeled off using a separation member 1626 and a peeling roller 1609 as depicted in FIG. 56. As described above, the resin layer 1012 is pressurized and heated into a film by the heat roller 21 and the pressurization roller 22, thus bonding the pigment permeation layer 1600 with the pigment image 1606 formed at the bottom thereof to the image support 55. Subsequently, the separation member 1626 and the peeling roller 1609 separates the substrate 50 so as to leave the pigment permeation layer 1600 with the pigment image 1606 formed thereon, the solvent absorption layer 1601 having absorbed the solvent components 1607, and the protect layer 1623.

Figure 42:
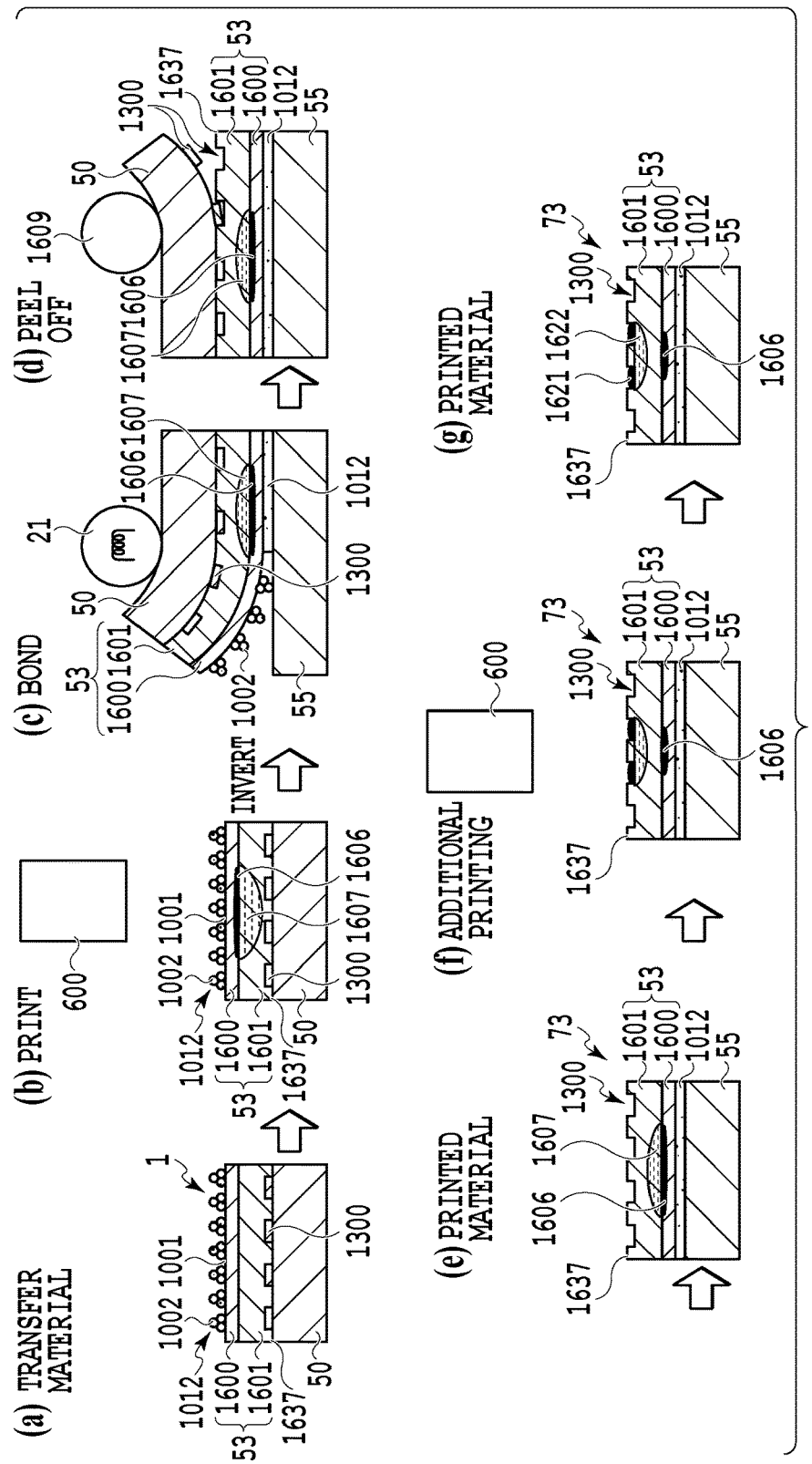
FIG. 42 is a diagram illustrating a printed material on which a structural latent image is printed.
Figure 43:
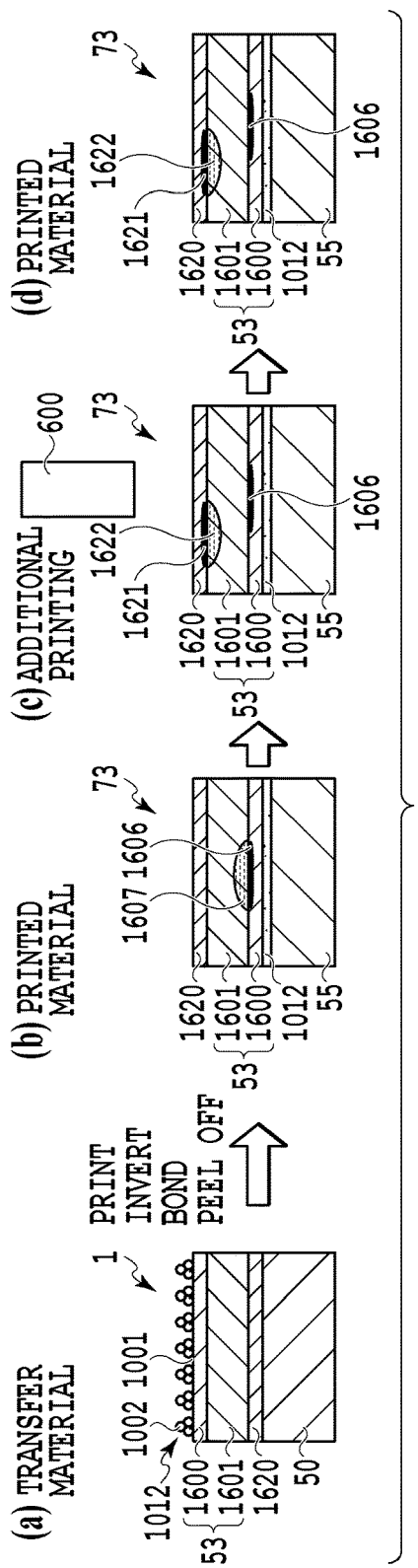
FIG. 43 is a diagram illustrating a manufacturing method for a printed material in which an image can be printed in multiple layers.

An image may be printed on the printed material 73 with the recess and protrusion-like solvent absorption layer 1601 corresponding to the front surface as depicted in parts (e) and (f) of FIG. 42 (multilayer printing), and an image may be printed on the printed material 73 with the second pigment permeation layer 1620 corresponding to the front surface as depicted in parts (b) to (d) of FIG. 43 (multilayer printing). Importantly, heat and pressure during thermocompression bonding are controlled so as to maintain, in the former case, the recesses and protrusions of the structural latent image formed on the solvent absorption layer 1601 and to maintain, in the latter case, the air gap structure in the second pigment permeation layer 1600. Even in a case where the pigment ink is used to perform multilayer printing on the printed material 73 with the recess-and-protrusion-shaped solvent absorption layer 1601 or the air gap structure of the second pigment permeation layer corresponding to the front surface, an additional image 1621 with excellent scratch resistance performance can be formed.

The temperature during thermocompression bonding is controllably adjusted to the glass transition temperature at which the discretely disposed pieces of thermoplastic resin 1002 exhibits the bonding capability, or higher. Consequently, the print medium can be transferred to the image support via the discretely disposed pieces of thermoplastic resin. More preferably, the temperature for thermocompression bonding is controllably adjusted to the glass transition temperature at which the water-soluble resin forming the ink receiving layer of the air gap absorption type (the solvent absorption layer and the pigment permeation layer) is melted, or higher. Consequently, the water-soluble resin of the ink receiving layer and the thermoplastic resin are melted and bonded together to allow the bonding capability to be improved. More preferably, appropriate foil cutting can be achieved by controllably adjusting the temperature for thermocompression bonding to the temperature at which the resin particles E2 forming the transparent protect layer is melted, or higher.

Importantly, the temperature during thermocompression bonding is controlled so as to maintain the air gap structure of the solvent absorption layer after bonding instead of collapsing the air gap structure more significantly than necessary when the image support and the print medium are thermocompression bonded together. That is, the transfer is preferably performed at the melting temperature of the components forming the air gaps, or lower, so as to inhibit a situation where the air gaps are melted by heating to cause the nonvolatile solvent of the ink, which corresponds to the liquid components of the ink, to seep out from the front surface. In particular, the transfer is preferably performed at the boiling point of water or lower so as to avoid subjecting the water and solvent components of the ink to bumping or vaporization in the air gaps.

The pressure during thermocompression bonding is preferably 0.5 kg/cm or more and 0.0 kg/cm or less. Setting the pressure during thermocompression bonding to 0.5 kg/cm or more allows the front surface of the pigment permeation layer with the pigment image printed thereon to adhere to the image support via the resin layer, thus enabling the image support and the print medium to be compressively bonded to each other. That is, the spaces defined, between the pigment permeation layer and the image support, by fine recesses and protrusions of the pigment permeation layer of the air gap absorption type can be formed into a film by being sufficiently filled with the softened and melted, discretely disposed pieces of thermoplastic resin. On the other hand, setting the pressure during thermocompression bonding to 7.0 kg/cm or higher allows the air gap structure of the solvent absorption layer to be maintained instead of being collapsed more significantly than necessary in a case where the image support and the print medium are thermocompression bonded together. As a result, water and the nonvolatile solvent, which correspond to the liquid components of the pigment ink, can be prevented from seeping out from the front surface, allowing appropriate bonding to be achieved.

The pressurization roller 22 contacting the back surface side of the image support 55 is preferably a silicone roller that is excellent in releasability. The silicone roller has a low affinity for the pigment permeation layer and the resin layer, and can thus inhibit the front surface of the pigment permeation layer from being transferred even in a case where the image support 55 is not present between the heat roller 21 and the pressurization roller 22, in other words, in a case where the front surface of the pigment permeation layer, having the resin layer with the discretely disposed pieces of thermoplastic resin, is in direct contact with the pressurization roller 22. Therefore, the front surface of the ink receiving layer can be prevented from being inadvertently bonded to the pressurization roller 22 via the discretely disposed pieces of thermoplastic resin.

(3-3. Peeling Method)

In a case where the substrate is of a hot-state peel-off type that is peeled off in a hot state, the substrate is preferably peeled off immediately after thermocompression bonding before the temperature lowers. As depicted in FIG. 56, in a case where the substrate 50 is of the hot-state peel-off type, the substrate 50 is preferably peeled off using a peeling mechanism including a separation pawl 1626, or a peeling roll. Such a peeling method improves productivity in a case where the print medium is supplied in a roll to roll manner, in other words, in a case where the print medium 50 is paid out and fed from a roll of the print medium and the substrate peeled off from the print medium is rolled.

In a case where the substrate is of a cold-state peel-off type that is peeled off in a cold state, the substrate may be peeled off even at reduced temperatures and may thus be peeled off not only using a roll or peel mechanism but also manually. Therefore, the substrate of the cold-state peel-off type is particularly suitable for a case where the print medium is machined into a cut sheet form.

Figure 41A:
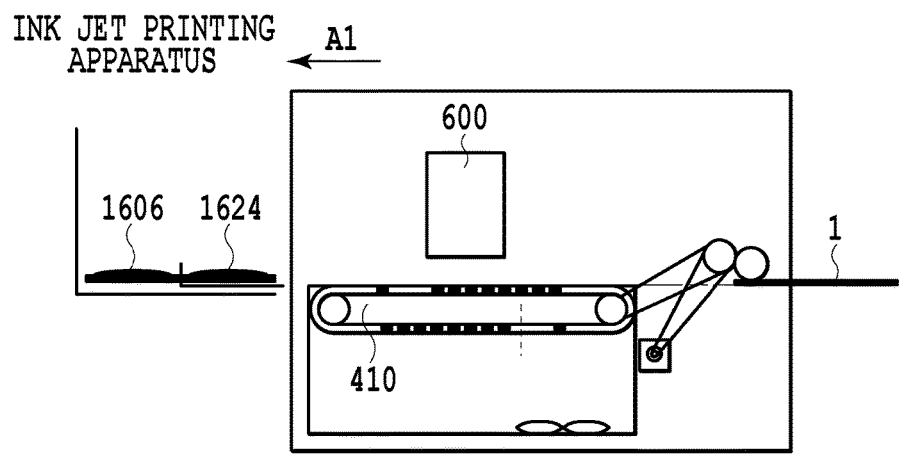
FIGS. 41A to 41C are diagrams illustrating a manufacturing method for a printed material including a cut sheet-like print medium.
Figure 41B:
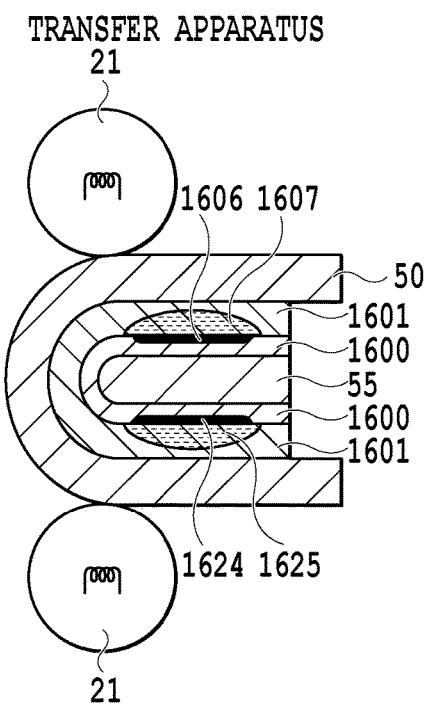
Figure 41C:
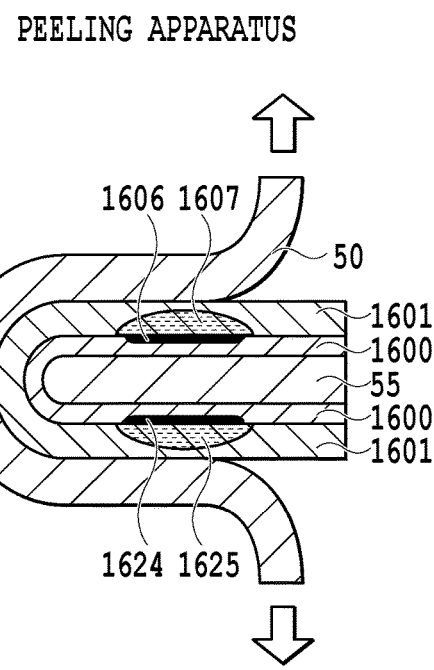

An ink jet printing apparatus in FIG. 41A prints pigment images 1606, 1624 on the pigment permeation layer 1600 of the print medium 1 using a print head 600, while conveying the cut sheet-like print medium 1 in the direction of an arrow A1 using a conveying mechanism 410. Subsequently, as depicted in FIG. 41B, the print medium 1 with the pigment images 1606, 1624 printed thereon is folded to hold the image support 55 in a sandwiching manner. The print medium 1 and the image support 55 are inserted into a double-sided pressurization and heating transfer apparatus configured using an upper heat roller 21 and a lower heat roller 21, and then pressurized and heated to allow the pigment permeation layer 1600 to adhere to the front and back surfaces of the image support 55. Subsequently, as depicted in FIG. 41C, the front and back surfaces of the substrate 50 are manually peeled off from the solvent absorption layer 1601. The solvent absorption layer 1601 is configured to be able to hold the air gap structure, and thus, the solvent components 1607, 1625 of the pigment ink may remain in the solvent absorption layer 1601.

A peeling angle $\theta$ at which the substrate is peeled off is 0° to 165° and more preferably 90° to 165°. Setting the peeling angle $\theta$ allows appropriate foil cutting to be achieved. The peeling angle $\theta$ is not limited to the above-described values.

In the thermocompression bonding step and the peeling step, a laminate machine of a well known two-roll type or a four-roll type may be used. Compared to the two-roll type, the four-roll type is preferably used because this type facilitates heat transfer during thermocompression bonding to allow the peeling step to be easily executed.

In the present invention, in a case where all of the substrate including the conveyance layer is peeled off, an inverted image may be printed via the discretely disposed pieces of thermoplastic resin. Then, the print medium with the image printed thereon is transferred (bonded) to the image support, and subsequently, the conveyance layer (all of the substrate) is peeled off in the peeling step. Consequently, a printed material can be obtained in which the pigment permeation layer with the image printed thereon is laminated on the image support via the discretely disposed pieces of thermoplastic resin. In a case where the substrate includes the functional layer such as the hologram layer or the print layer, the conveyance layer (a part of the substrate) of the substrate may exclusively be peeled off in the peeling step after the print medium and the image support are bonded together. Consequently, a printed material can be obtained in which the solvent absorption layer integrated with the functional layer and the pigment permeation layer with the pigment image printed thereon are laminated on the image support via the thermoplastic resin.

(4. Manufacturing Apparatus for the Printed Material)

Now, a manufacturing apparatus will be manufactured that manufactures a printed material using the above-described print medium. As an apparatus that prints an image on the print medium of the present invention, either a well-known small-sized ink jet printer or a large-format printer may be used so long as the printer uses the pigment ink for printing. As an apparatus that bonds and transfers the print medium to the image support and releases the substrate as needed, any well-known laminator may be used, such as D-10 manufactured by DYNIC CORPORATION or LPD3223 CLIVIA manufactured by FUJITEX. The laminator may include a pair of heat rollers 21 and a pair of pressurization roller 22 such that, when the image support and a transfer material pass between the rollers, the pigment permeation layer of the print medium is thermocompression bonded to the image support. As depicted in FIG. 40, the manufacturing apparatus may include a feeding unit that feeds the print medium to a printing unit, the printing unit that prints an image using the ink jet printing system or the like, a thermocompression bonding unit, peeling unit that peels off the substrate, and a discharge unit that discharges and accumulates printed materials with pigment images transferred thereto; all of the units are integrated together. As such an integral apparatus, for example, an apparatus described in Japanese Patent No. 05944947 may be used.

(5. Printed Material)

Figure 39:
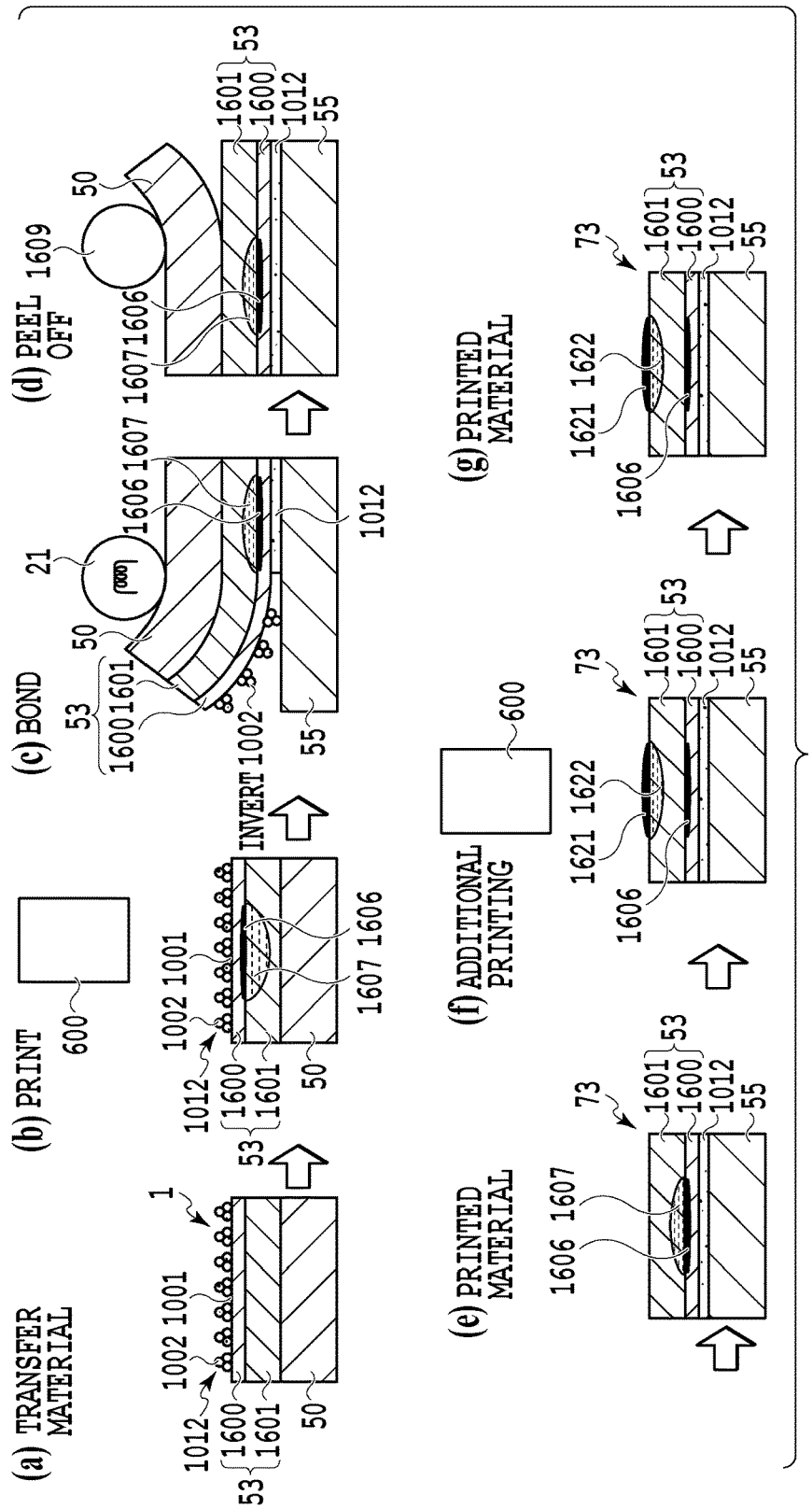
FIG. 39 is a process diagram illustrating an example of a manufacturing method for a printed material.

To manufacture a printed material, first, a first image 1606 is printed by using the print head 600 to apply the ink to the print surface of the print medium 1 as depicted in a part (b) of FIG. 39. At this time, a portion of the pigment ink passes through the space between the thermoplastic resin portions 1000 of the resin layer 1012 in a bypassing manner to come into contact with the exposed portion 1001 of the pigment permeation layer 1600, which has a high ink absorption speed. Consequently, the ink is drawn and absorbed into the pigment permeation layer 1600 without passing through the pigment permeation layer 1600. As described above, the pigment ink forms a dense thin-film-like pigment image 1606 at the bottom of the pigment permeation layer 1600, and the solvent components is subjected to solid-liquid separation and absorbed by the solvent absorption layer 1601. Then, as depicted in a part (c) of FIG. 39, the pigment permeation layer 1600 is bonded (transferred) to the image support 55 using the discretely disposed pieces of thermoplastic resin 1002 to provide a printed material as depicted in a part (d) of FIG. 39. In the printed material, the resin layer 1012, the pigment permeation layer 1600, the solvent absorption layer 1601, and the substrate 50 are sequentially laminated on the image support 55. Peel-off of the substrate 50 allows the solvent absorption layer 1601 to serve as a protect layer for the pigment image 1606 printed from the resin layer 1012 side, improving the weatherability of the image. In a case where the image support 55 is transparent, the pigment image 1606 is visible through the transparent image support 55 side. On the other hand, in a case where the pigment image 1606 is viewed from the transparent solvent absorption layer 1601 side, an inverted image is printed on the print medium 1.

(5-1. Printed Material from which the Substrate is Peeled Off)

(5-1-1. Printed Material from which all of the Substrate is Peeled Off)

The following description relates to print medium from which all of the substrate including the conveyance layer is peeled off and the printed material produced using the print medium.

The substrate 1 from which all of the substrate including the conveyance layer is peeled off includes the solvent absorption layer 1601 and the pigment permeation layer 1600, both of which are provided on the substrate 50 and are of the air gap absorption type, and the pieces of thermoplastic resin 1002 provided on the front surface of the pigment permeation layer 1600 and serving as the resin layer 1012, as depicted in a part (a) of FIG. 42. The front surface of the pigment permeation layer 1600 is provided with areas in which the thermoplastic resin portions 1000 of the resin layer 1012 are positioned, and the bypass portion including no thermoplastic resin. To produce a printed material, first, an inverted image is printed on the print medium 1 via the resin layer 1012 using the pigment ink ejected from the ink jet print head 600 as depicted in a part (b) of FIG. 42. At this time, a portion of the pigment ink passes through the space between the thermoplastic resin portions 1000 of the resin layer 1012 in a bypassing manner to come into contact with the exposed portion 1001 of the pigment permeation layer 1600. Consequently, the ink is drawn and absorbed into the pigment permeation layer 1600. Subsequently, when the pigment ink diffuses and infiltrates through the pigment permeation layer 1600 to reach the interface with the solvent absorption layer 1601, solid-liquid separation occurs at the interface between the solvent absorption layer 1601, which has the air gaps each smaller than each pigment particle, and the pigment permeation layer 1600. Consequently, a dense thin-film-like pigment image 1606 is formed at the bottom of the pigment permeation layer 1600 on the interface side. Substantially all of the solvent components are absorbed by the solvent absorption layer 1601 side, which has a higher ink absorption speed. Then, as depicted in a part (c) of FIG. 42, the print medium 1 with the image printed thereon is bonded (transferred) to the image support 55 via the discretely disposed pieces of thermoplastic resin 1002. Subsequently, as depicted in a part (d) of FIG. 42, the conveyance layer (all of the substrate 50) is peeled off to provide a print medium 73 as depicted in a part (e) of FIG. 42.

In the thus produced printed material 73, the uppermost layer corresponds to the solvent absorption layer 1601 as depicted in the part (e) of FIG. 42, and thus, a secondary image (pigment image) 1622 can be formed on the front surface of the printed material 73. Since the solvent absorption layer 1601 is formed to maintain the air gap structure also by transfer based on thermocompression bonding as described above, a print surface that is excellent in ink absorptivity can be re-formed. Thus, in addition to the pigment image 1606 printed on the pigment permeation layer 1600 and inhibited from being altered, a new image can be printed by drawing or seal affixture (additional printing). Such additional printing is preferable in a case where the printed material is used for applications, for example, for ID cards, employee ID cards, and delivered public documents such as my number cards and passports. In a case where the structural latent image 1300 is formed on the uppermost solvent absorption layer 1601 and a second image 1622 is formed, the scratch resistance of the second image 1622 can be improved. Specifically, a printed material is produced in which the pigment image (inverted image) 1606 with high-security text information is printed on the print medium 1 from the resin layer 1012 side as depicted in the part (e) of FIG. 42. Subsequently, the second image (pigment image; normal image) 1622 may be formed on the front surface of the printed material as depicted in a part (g) of FIG. 42.

The second image 1622 may be additionally printed by ink jet printing, drawing, seal affixture, or the like as depicted in a part (f) of FIG. 42. In a case where the second image is additionally printed using the pigment ink, the pigment particles subjected to solid-liquid separation on the front surface of the solvent absorption layer are placed in proximity to one another and bonded together by the pigment dispersing resin. In a case where the front surface of the solvent absorption layer 1601 has a recess- and protrusion-shaped structural latent image, the pigment particles remaining in the recessed portions of the front surface are less likely to be rubbed, allowing the scratch resistance performance of the front surface to be improved. The structural latent image on the front surface of the solvent absorption layer 1601 can be formed by transfer of a protrusion-and-recess-shaped structural latent image on the substrate. In a case where the second image is additionally printed on the front surface of the solvent absorption layer as described above, the problem with the scratch resistance performance is mitigated, and thus, a pigment ink containing a color material that itself has high weatherability is preferably used. Furthermore, to further improve designability and visibility, a semi-transmissive or semi-reflective light transmission regulating layer may be provided in a protrusion-and-recess-shaped structural latent image on the substrate. In that case, the light transmission regulating layer may be provided on the protrusion-and-recess-shaped structural latent image on the substrate, and the solvent absorption layer and the pigment permeation layer, which are of the air gap absorption type, are provided on the light transmission regulating layer via an anchor layer. Moreover, a sea-and-island-like resin layer may be provided.

(5-1-2. Printed Material from which a Part of the Substrate is Peeled Off)

The printed material manufactured using the print medium from which only the conveyance layer (a part of the substrate) of the substrate may be used in the fields of various security cards such as credit cards and for passports and the like. For such applications, higher-level durability and security are needed. In printed materials for such applications, the substrate may be provided with one or more functional layers such as a transparent protect layer and a print layer with an image pre-printed thereon.

Figure 44:
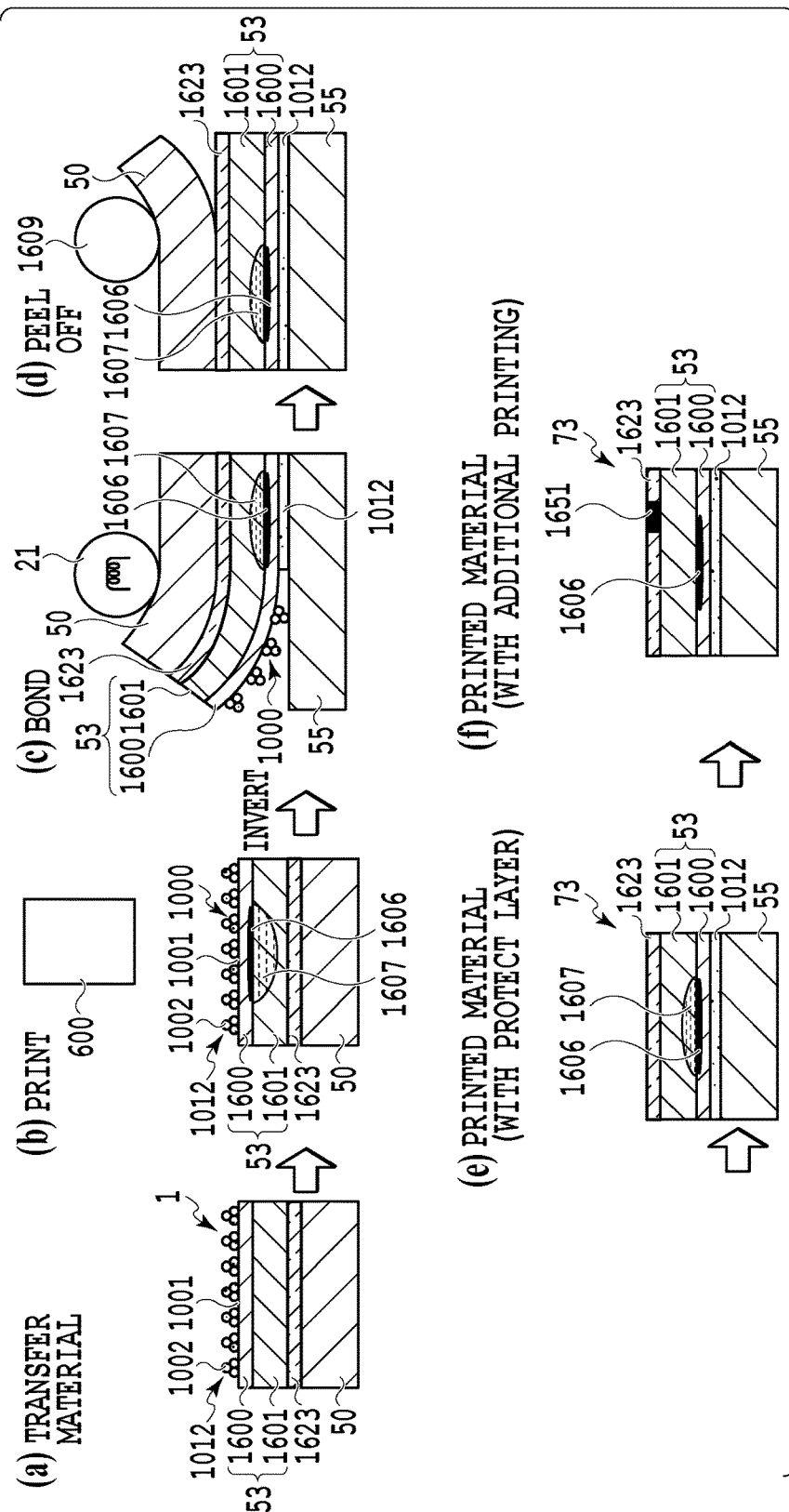
FIG. 44 is a diagram illustrating a manufacturing method for a printed material that enables additional printing.

The print medium in which the substrate includes, on the substrate 50 including the functional layer 1623 such as the protect layer, the solvent absorption layer 1601 and the pigment permeation layer 1600, both of which are of the air gap absorption type, and the resin layer 1012 formed by providing the pieces of thermoplastic resin 1002 on the front surface of the pigment permeation layer 1600, as depicted in a part (a) of FIG. 44. The functional layer 1623 may be, for example, a transparent protect layer or a pre-print layer with an image pre-printed thereon. The front surface of the pigment permeation layer 1600 is provided with areas in which the thermoplastic resin portions 1000 of the resin layer 1012 are positioned, and the bypass portion including no thermoplastic resin (the exposed portion 1001 of the pigment permeation layer 1600).

To produce a printed material, first, a pigment image (inverted image) is printed on the pigment permeation layer 1600 of the print medium 1 using the pigment ink ejected from the ink jet print head 600 as depicted in a part (b) of FIG. 44. Then, as depicted in a part (c) of FIG. 44, the print medium 1 with the inverted image printed thereon is laid on top of the image support 55, and the discretely disposed pieces of thermoplastic resin 1002 are pressurized and heated by the heat roller 21 to bond (transfer) the print medium 1 to the image support 55. Subsequently, as depicted in a part (d) of FIG. 44, a part (conveyance layer) of the substrate 50 other than the functional layer 1623 is peeled off. Consequently, as depicted in a part (e) of FIG. 44, a printed material 73 can be produced in which the functional layer 1623 such as the protect layer or the print layer is laminated at the top. In such a printed material 73, the uppermost layer is the functional layer 1623 such as the protect layer, the hologram layer, or the pre-print layer, allowing high durability and security to be achieved.

(5-2. Printed Materials with Other Configurations)

The sea-and-island-like resin layer in the print medium of the present invention allows the film formation state during transfer to be freely controlled. That is, the transfer can be achieved by melting and softening all the pieces of thermoplastic resin included in the resin layer into a complete film to bring the resin layer into a surface bonding state or melting and softening only the surface of each of the pieces of thermoplastic resin included in the resin layer to bring the resin layer into a point bonding state. In a case where most or all of the resin layer is completely formed into a film and the film is then transferred, the bonding area is maximized to allow appropriate bonding to be achieved. In a case where the resin layer is completely formed into a film so as to fill the bypass portion of the sea-and-island-like resin layer, liquids such as water and chemicals and gases such as ozone can be substantially restrained from entering the printed material formed, and weatherability such as water resistance and chemical resistance can be improved. In a case where the functional material contained in the sea-and-island-like resin layer is masking particles and the resin layer is formed into a film to spread the masking particles all over the film, the masking capability can be further improved.

In a case where the resin layer is not completely formed into a film and the resultant film is transferred, the ink receiving layer (the pigment permeation layer, the solvent absorption layer) can be peeled off from the image support. In a case where the resin layer is completely formed into a film and the resultant film is transferred in the surface bonding state, water is absorbed only through the ends of the pigment permeation layer and the solvent absorption layer in a case where the printed material manufactured is immersed in water. Thus, swelling of the pigment permeation layer and the solvent absorption layer is significantly delayed. As a result, even in a case where long-time immersion causes the pigment permeation layer and the solvent absorption layer to be swollen, the swollen pigment permeation layer 1600 and solvent absorption layer 1601 only push the entire surface of the image support 55 as depicted in FIG. 45B, and no peeling force is exerted that peels off the pigment permeation layer 1600 and the image support 55 from each other.

Figure 45A:
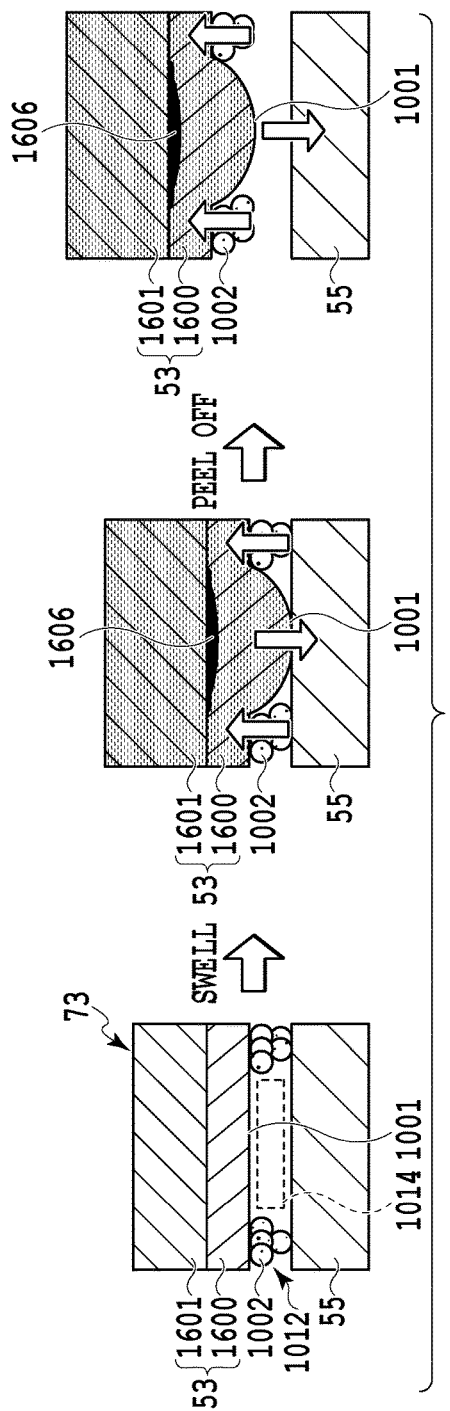
FIG. 45A and FIG. 45B are diagrams illustrating a difference in peel-off force associated with a difference between surface contact and point contact of a resin layer.
Figure 45B:
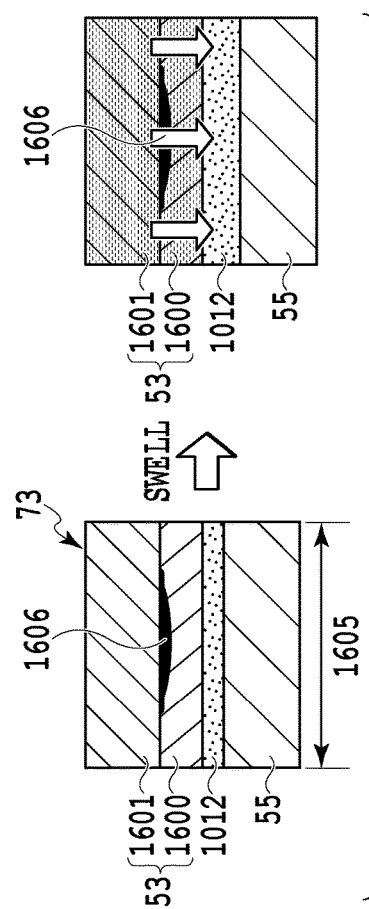

On the other hand, in a case where the resin layer is transferred in the point contact state as depicted in FIG. 45A, in a case where the printed material manufactured is immersed in water, a part of the pigment permeation layer 1600 at the exposed portion 1001 swollen with water pushes the image support 55 to exert a force in a direction in which the pigment permeation layer 1600 is peeled off from the image support 55. The force corresponds to the peeling force that peels off the pigment permeation layer 1600 and the image support 55 from each other, enabling the pigment permeation layer 1600 and the image support 55 to be peeled off from each other In a case where the resin layer is thus transferred in the point contact state, since the bypass portion 1014 of the sea-and-island-like resin layer 1012 is maintained, water flows through the bypass portion 1014 to seep throughout the thermoplastic resin, enabling the image support 55 to be peeled off in a short time. In a case where the printed material is immersed in high-temperature water to increase a swelling ratio of the pigment permeation layer 1600, the pigment permeation layer 1600 can be easily peeled off from the image support 55 in a shorter time. Furthermore, the image support 55 may be recycled.

In a case where the image support 55 is reused, printing an image on the print medium of the present invention using the pigment ink is advantageous. That is, since the pigment image 1606 is formed like a dense thin film at the inner bottom of the pigment permeation layer 1600 and is not direct contact with the image support 55, image migration to the image support can be suppressed, which may affect the image support during reuse. For a print medium in which the pigment ink is subjected to solid-liquid separation on the front surface of the ink receiving layer (solvent absorption layer) with a small air gap diameter, the pigment image 1606 formed on the ink receiving layer as a result of the solid-liquid separation may come into direct contact with the image support during transfer. Thus, image migration may occur to transfer the pigment image to the image support, causing print information to remain on the image support. This may degrade the re-usability of the image support.

Specific Examples of the Second Embodiment

Specific examples of the present invention will be described below. However, the present invention is not limited by the examples described below. In the description below, "pts" and "%" refer to mass standards unless otherwise specified.

(Preparation of a Water Solution of Polyvinyl Alcohol 1)

Polyvinyl alcohol (trade name "PVA123", manufactured by KURALRAY CO., LTD.) was dissolved into ion exchange water to prepare a water solution of polyvinyl alcohol with a solid content of 8%. The polyvinyl alcohol had a weight-average degree of polymerization of 2,300 and a degree of saponification of 98 to 99 mol %.

(Preparation of a Solvent Absorbing Layer Coating Liquid 1)

One hundred pts.wt. water solution of silica (trade name "SNOWTEX O-40" (solid content (SiO2) concentration: 40%, average primary particle size: 25 nm) manufactured by NISSAN CHEMICAL INDUSTRIES LTD.) was mixed with 125 pts.wt. water solution of polyvinyl alcohol 1 using a static mixer to prepare a solvent absorption layer coating liquid 1.

(Preparation of a Solvent Absorbing Layer Coating Liquid 2)

One hundred pts.wt. water solution of silica (trade name: "SNOWTEX O" (solid content (SiO2) concentration: 20%, average primary particle size 10 nm manufactured by NISSAN CHEMICAL INDUSTRIES LID.) were mixed with 50 pts.wt. water solution of polyvinyl alcohol 1 using a static mixer to prepare a solvent absorption layer coating liquid 1.

(Preparation of a Solvent Absorbing Layer Coating Liquid 3)

A stirrer, a reflux condenser, a thermometer, and a nitrogen gas introduction pipe were installed on a first glass reaction container. The following were fed into the container: 6 g Aqualon RN-30 (manufactured by DKS Co., Ltd.) as a nonionic emulsifier, 6 g Aqualon HS-30 (manufactured by DKS Co., Ltd.) as an anionic emulsifier, 130.0 g methyl methacrylate, 5.0 g ethyl acrylate, 5.0 g methacrylic acid, and 275 g water. The solution was stirred to prepare a mixture with a total amount of 427.0 g. Then, 36 g of the mixture was extracted and transferred to a similar second reaction container, where the mixture was emulsified at 73° C. for 40 minutes with nitrogen gas introduced into the second reaction, container. Then, as a polymerization initiator, 17 g ammonium peroxodisulfate was dissolved into 36 g water and thus added to the emulsifier. Subsequently, the remaining amount of the mixture was extracted from the first reaction container and gradually dripped into the second reaction container over 100 minutes for polymerization at 73° C. Once the dripping of the remaining amount of the mixture ended, the mixture was continuously stirred at 73° C. for 80 minutes and thus synthesized into a water solution of emulsion 1 (Tg: 101° C., resin solid content: 35.0%). The dispersed particles had an average primary particle size of 20 nm. Then, 100 pts.wt. water solution of resin 1 and 43.75 pts.wt. water solution of polyvinyl alcohol 1 were mixed using the static mixer to prepare a solvent absorption layer coating liquid 3.

(Preparation of a Solvent Absorbing Layer Coating Liquid 4)

A stirrer, a reflux condenser, a thermometer, and a nitrogen gas introduction pipe were installed on a first glass reaction container. The following were fed into the container: 6 g Aqualon RN-30 (manufactured by DKS Co., Ltd.) as a nonionic emulsifier, 6 g Aqualon HS-30 (manufactured by DKS Co., Ltd.) as an anionic emulsifier, 100.0 g methyl methacrylate, 20.0 g ethyl acrylate, 10.0 g 2-hydroxyl ethyl acrylate, 5.0 g methacrylic acid, and 275 g water. The solution was stirred to prepare a mixture with a total amount of 427.0 g. Then, 36 g of the mixture was extracted and transferred to a similar second reaction container, where the mixture was emulsified at 73° C. for 40 minutes with nitrogen gas introduced into the second reaction container. Then, as a polymerization initiator, 17 g ammonium peroxodisulfate was dissolved into 36 g water and thus added to the emulsifier. Subsequently, the remaining amount of the mixture was extracted from the first reaction container and gradually dripped into the second reaction container over 100 minutes for polymerization at 73° C. Once the dripping of the remaining amount of the mixture ended, the mixture was continuously stirred at 73° C. for 80 minutes and thus synthesized into a water solution of emulsion 1 (Tg: 78° C., resin solid content: 35.0%). The dispersed particles had an average primary particle size of 40 nm. Then, 100 pts.wt. water solution of resin 2 and 43.75 pts.wt. water solution of polyvinyl alcohol 1 were mixed using the static mixer to prepare a solvent absorption layer coating liquid 4.

(Preparation of a Pigment Permeation Coating Liquid 1)

One hundred pts.wt, water solution of silica (trade name: "SNOWTEX ST-PS-MO" (solid content (SiO2) concentration: 18%, average primary particle size 125 nm) manufactured by NISSAN CHEMICAL INDUSTRIES LTD.) were mixed with a water solution of polyvinyl alcohol 1 using the static mixer to prepare a pigment permeation layer 1.

(Preparation of a Pigment Permeation Coating Liquid 2)

A stirrer, a reflux condenser, a thermometer, and a nitrogen gas introduction pipe were installed on a first glass reaction container. The following were fed into the container: 6 g Aqualon RN-30 (manufactured by DKS Co., Ltd.) as a nonionic emulsifier, 6 g Aqualon HS-30 (manufactured by DKS Co., Ltd.) as an anionic emulsifier, 100.0 g methyl methacrylate, 20.0 g ethyl acrylate, 10.0 g 2-hydroxyl ethyl acrylate, 5.0 g methacrylic acid, and 275 g water. The solution was stirred to prepare a mixture with a total amount of 427.0 g. Then, 36 g of the mixture was extracted and transferred to a similar second reaction container, where the mixture was emulsified at 73° C. for 40 minutes with nitrogen gas introduced into the second reaction container. Then, as a polymerization initiator, 17 g ammonium peroxodisulfate was dissolved into 36 g water and thus added to the emulsifier. Subsequently, the remaining amount of the mixture was extracted from the first reaction container and gradually dripped into the second reaction container over 100 minutes for polymerization at 73° C. Once the dripping of the remaining amount of the mixture ended, the mixture was continuously stirred at 73° C. for 80 minutes and thus synthesized into a water solution of emulsion 1 (Tg: 78° C., resin solid content: 35.0%). The dispersed particles had an average primary particle size of 120 nm. Then, 100 pts.wt. water solution of resin 1 and 43.75 pts.wt. water solution of polyvinyl alcohol 3 were mixed using the static mixer to prepare a pigment permeation layer coating liquid 2.

(Preparation of a Pigment Permeation Coating Liquid 3)

A water solution of resin 4 (Tg: 90° C., resin solid content: 35.0%) was obtained by synthesizing 20.0 g methyl methacrylate, 115.0 g ethyl acrylate, 5.0 g 2-hydroxyl ethyl acrylate, and 10.0 g methacrylic acid as is the case with preparation of the pigment permeation layer coating liquid 2. The dispersed particles had an average primary particle size of 110 nm. Then, 100 pts.wt. water solution of resin 4 and 43.75 pts.wt. water solution of polyvinyl alcohol 3 were mixed using the static mixer to prepare a pigment permeation layer coating liquid 3.

(Preparation of a Pigment Permeation Coating Liquid 4)

A water solution of resin 5 (Tg: 90° C., resin solid content: 35.0%) was obtained by synthesizing 20.0 g methyl methacrylate, 115.0 g ethyl acrylate, 5.0 g 2-hydroxyl ethyl acrylate, and 10.0 g methacrylic acid as is the case with preparation of the pigment permeation layer coating liquid 4. The dispersed particles had an average primary particle size of 180 ram. Then, 100 pts.wt. water solution of resin 5 and 43.75 pts.wt. water solution of polyvinyl alcohol 1 were mixed using the static mixer to prepare a pigment permeation layer coating liquid 4.

(Preparation of a Resin Layer Coating Liquid 1)

A resin layer coating liquid 1 was obtained using 50 pts.wt. DXA 4081 manufactured by VANORA (solid content concentration: 50%, average secondary particle size: 300 nm), 50 pts.wt. Bondic 1940 NE manufactured by DIC (solid content concentration: 50%, average secondary particle size: 620 nm), and 10 pts.wt. ion exchange water. The resin layer is formed of an acrylic resin and a urethane resin. The resin layer has a high affinity for a vinyl acetate group of a PVA resin, which is a water-soluble resin forming the pigment permeation layer, and thus, the pigment permeation layer and the resin layer can be firmly bonded to each other after transfer. On the other hand, in a case where the image support is an acrylic and PET substrate, since the constituent material of the resin layer has a high affinity for the constituent material of the image support, the image support and the pigment permeation layer can be appropriately bonded to each other after transfer.

(Preparation of a Resin Layer Coating Liquid 2)

The resin layer coating liquid 1 was obtained using 50 pts.wt. DXA 4081 manufactured by VANORA (solid content concentration: 50%, average secondary particle size: 300 nm), 50 pts.wt. Bondic 1940 NE manufactured by DIC (solid content concentration: 50%, average secondary particle size: 620 nm), a water solution of hollow resin particles manufactured by JSR (trade name: "SX8022-04EM", solid content concentration: 28.2%), and 10 pts.wt. ion exchange water.

(Preparation of a Resin Layer Coating Liquid 3)

A resin layer coating liquid 3 was obtained by adding, to the resin layer coating liquid 1, first resin particles 1002 softened and melted into a film and N phosphorescent Luminova BGL-300FF manufactured by Nemoto & Co., Ltd. And serving as phosphorescent luminescent particles 1617 or second resin particles.

(Preparation of a Protect Layer Coating Liquid 1)

Nine pts.wt. water solution of acrylic emulsion (JONCRYL 352D manufactured by BASF, Tg: 56° C., solid content concentration: 45%), 1 pts.wt. water solution of urethane emulsion (SUPERFLEX 130 manufactured by DKS Co., Ltd., Tg: 103° C., solid content concentration: 35%), and 0.5 pts.wt. water solution of PVA were added together. The resultant solution was stirred and mixed to prepare a protect layer coating liquid 1.

(Preparation of a Protect Layer Coating Liquid 2)

The following were stirred and mixed for five minutes to prepare a protect layer coating liquid 2: 50 pts.wt. DXA4081 manufactured by VANORA (solid content concentration: 50%), 50 pts.wt. water solution of hollow resin particles (trade name: "SX8022-04EM", solid content concentration: 28.2%) manufactured by JSR Corporation, 5 pts.wt. N phosphosphorescent Luminova BGL-300OFF manufactured by Nemoto & Co., Ltd., 90 pts.wt. water solution of acrylic emulsion (JONCRYL 352D manufactured by BASF, Tg: 56° C., solid content concentration: 45%), 10 pts.wt. water solution of urethane emulsion (SUPERFLEX 130 manufactured by DKS Co., Ltd., Tg: 103° C., solid content concentration: 35%), and 5 pts.wt. water solution of polyvinyl alcohol.

(Preparation of a Pigment Ink 1)
(Synthesis of a (Meth) Acrylic Ester-Based Copolymer)

One thousand pts.wt. methyl ethyl ketone was fed into a reaction container equipped with a stirrer, a dripper, a temperature sensor, and a reflux apparatus having a nitrogen feeder at the top thereof. With the methyl ethyl ketone stirred, the content of the reaction container was substituted with nitrogen. With the inside of the reaction container maintained in a nitrogen atmosphere, the temperature in the reaction container was raised to 80° C. A mixed solution was dripped over four hours using the dripper, the mixed solution being a mixture of 63 pts.wt. methacrylate 2-hydroxyethyl, 141 pts.wt. methacrylic acid, 417 pts.wt. styrene, 188 pts.wt. benzyl methacrylate, 25 pts.wt. glycidyl methacrylate, 33 pts.wt. polymerization modifier (trade name "BLEMMER TGL" manufactured by NOF Corporation), and 67 pts.wt. peroxy-2-ethylhexanoic acid-t-butyl. When the dripping ended, the reaction was allowed to last at the same temperature for 10 hours to prepare a solution of an ester (meth) acrylate copolymer (A-1) (resin content: 45.4%) having an acid value of 110 mgKOH/g, a glass transition temperature (Tg) 89° C., and a weight average molecular weight of 8,000.

One thousand pts.wt. phthalocyanine-based blue pigment, the solution of the ester (meth)acrylate copolymer (A-1) obtained by the above-described synthesis, 25% water solution of potassium hydroxide, and water were fed into a mixing tank with a cooling function and stirred and mixed to prepare a mixed solution. The amount of the ester (meth) acrylate copolymer (A-1) was 40% of the amount of the phthalocyanine-based blue pigment in nonvolatile content. The amount of the 25% water solution of potassium hydroxide was such that the ester (meth) acrylate copolymer (A-1) was neutralized 100%. The amount of the water was such that the nonvolatile content of the resultant mixed solution was 27%. The resultant mixed solution was passed through a disperser filled with zirconia beads with a diameter of 0.3 mm so as to disperse for four hours in accordance with a circulation method. The temperature of a dispersion liquid was maintained at 40° C. or lower.

After the dispersion liquid was extracted from the mixing tank, a channel between the mixing tank and the disperser was cleaned with 10,000 pts.wt. water, and a cleaning solution and the dispersion liquid were mixed to prepare a diluted dispersion liquid. The resultant diluted dispersion liquid was placed in a distillator, and a total amount of the methyl ethyl ketone and a portion of the water were distilled away to provide a concentrated dispersion liquid. The concentrated dispersion liquid was allowed to cool down to room temperature, and with the concentrated dispersion liquid being stirred, 2% chlorine acid was dropped into the liquid. When the pH of the concentrated dispersion liquid was adjusted to 4.5, a Buchner funnel was used to filter solids. The solids were then washed in water. The resultant solids (cake) were placed in the container, water was added to the solids, and a dispersing stirrer was used to re-disperse the solids. The pH of the solids was adjusted to 9.5 using a water solution of potassium hydroxide. Subsequently, a centrifugal separator was used to remove coarse particles at 6,000 G over 30 minutes. The nonvolatile contents were then regulated to provide an aqueous cyan pigment dispersion element 1 (pigment content: 14%, acid value: 110, the average secondary particle size of the pigment: 90 nm).

An aqueous black pigment dispersion element, an aqueous magenta pigment dispersion element, or an aqueous yellow pigment dispersion element was obtained as is the case with the aqueous cyan pigment dispersion element by changing a phthalocyanine-based blue pigment in the aqueous cyan pigment dispersion element to a carbon black-based black pigment, a quinacridone-based magenta pigment, or a diazo-based yellow pigment. Table 4 indicates the average secondary particle size of the pigment particles in each of a black (Bk) pigment, a cyan (C) pigment ink, a magenta (M) pigment ink, and a yellow (Y) pigment ink.

(Preparation of a Pigment Ink 1)

In order to provide the composition illustrated in Table 4 (total: 100 pts.wt.), the aqueous pigment dispersion element 1, the aqueous pigment dispersion element 2, and the components were fed into the container and stirred for 30 minutes or longer using a propeller stirrer. Subsequently, the mixture was filtered using a filter with a pore size of 0.2 µm (manufactured by NIHON PALL LTD.) to prepare the pigment ink. "AE-100" in Table 4 indicates acetylene glycol 10 mol ethylene oxide additive (trade name "ACETYLENOL E100" manufactured by Kawaken Fine Chemicals Co., Ltd.).

(Preparation of a Pigment Ink 2)

For the pigment ink, 100 g commercially available carbon black "45L" (secondary particle size: 40 nm; DBP oil absorption amount: 45 ml/100 g; manufactured by Mitsubishi Chemical Corporation) was well mixed into 1,000 ml water, and the mixture was slightly dispersed. Then, 300 g sodium hypochlorite (effective chlorate concentration: 12%) was dropped into the mixture, and the mixture was stirred at 100° C. to 104° C. for 10 hours for wet oxidation. The resultant slurry was filtered using Qualitative Filter Paper No. 2 (manufactured by Toyo Roshi Kaisha, Ltd.), and the slurry was then washed in water until surface modified carbon black particles leaked from the slurry. The wet cake was re-dispersed in five kiloliters of water and desalinated using a reverse osmosis membrane until an electric conductivity decreased to 2 mS. The mixture was concentrated so as to achieve a surface modified carbon black concentration of 15 wt % to prepare a surface modified carbon black dispersing liquid.

Then, the aqueous pigment dispersion elements and components were fed into the container so as to provide the composition indicated in Table 4 (total: 100 pts.wt.) and stirred for 20 minutes or longer using the propeller stirrer. Subsequently, the mixture was filtered using a filter with a pore size of 0.2 µm (manufactured by NIHON PALL LTD.) to prepare a pigment ink. The resultant pigment ink had an average secondary particle size of 40 nm. An aqueous cyan pigment dispersion element with an average secondary particle size of 42 nm, an aqueous magenta pigment dispersion element with an average secondary particle size of 45 nm, or an aqueous yellow pigment dispersion element with an average secondary particle size of 48 nm was obtained as is the case with the carbon black-based black pigment dispersion element by changing a carbon black-based black pigment of the carbon black-based black pigment dispersion element to a phthalocyanine-based blue pigment, a quinacridone-based magenta pigment, or a diazo-based yellow pigment.

Example 1-1

(Preparation of a Substrate 1)

A structural latent image was formed by using an apparatus that forms a structural latent image, to form recesses and protrusions on a front surface of a PET substrate (trade name: "Tetoron G2"; thickness: 19 µm; manufactured by Teijin Dupont Film Japan Limited). The width of the recesses and protrusions in the structural latent image was 10 µm, and the thickness of the recesses and protrusions was 2 µm. The width and thickness of the recesses and protrusions in the structural latent image were measured by observing a cross section of the substrate using the SEM. Then, the surface of the structural latent image was coated with PORIRON 788 manufactured by CHUKYO YUSHI CO., LTD., serving as a release agent. A peel-off layer was thus formed to prepare a substrate 1. The gravure coater was used for the coating, the coating speed was 5 m/min., and the amount of release agent applied as measured after drying was 0.5 g/m².

(Manufacture of a Print Medium 1-1)

A laminate sheet including a substrate and a solvent absorption layer was manufactured as a constituent material for the print medium by coating the substrate 1 with the solvent absorption layer coating liquid 1 and drying the coating liquid. A die coater was used for the coating, the coating speed was 5 m/min., and the amount of coating liquid applied as measured after drying was 25 g/m². The drying temperature was 60° C. The solvent absorption layer had a thickness of 25 µm. Subsequently, a laminate sheet including a substrate, a solvent absorption layer, and a pigment permeation layer was manufactured as a constituent material for the print medium by coating the laminate sheet 1 including the substrate and the solvent absorption layer with a pigment permeation layer coating liquid 1 while treating the front surface with dampening water and drying the coating liquid. The gravure coater was used for the coating, the coating speed was 5 m/min., and the amount of release agent applied as measured after drying was 5 g/m². The drying temperature was 60° C. The pigment permeation layer had a thickness of 5 µm.

A sea-and-island-like resin layer was provided on the front surface of the pigment permeation layer in the laminate sheet 1 by coating the front surface with the resin layer coating liquid 1 and drying the coating liquid. That is, a print medium 1-1 was manufactured by discretely providing pieces of thermoplastic resin with inferior ink absorptivity on the front surface of the pigment permeation layer to form the resin layer such that the front surface of the pigment permeation layer is exposed from a part of the resin layer. The gravure coater was used for the coating, and the coating speed was 5 m/min. The drying temperature was 60° C., and the number of groove lines on a gravure roll was 200. The print medium was rolled with the substrate facing inward, and a rolled print medium was obtained. The island-like pieces of resin layer had a thickness of 1.24 µm.

A cross section of the ink jet print medium 3-1 was observed using the SEM, and the size of that part of each thermoplastic resin particle which was in contact with the pigment permeation layer was measured. At this time, the average value of the sizes of 100 particles of thermoplastic resin in contact with the pigment permeation layer was calculated, and based on the average value, the area of that part of one particle of thermoplastic resin which was in contact with the pigment permeation layer was calculated. Then, based on an SEM projection from the print surface, the number of the particles of thermoplastic resin in contact with the pigment permeation layer was calculated, and the total area of those parts of the particles of thermoplastic resin which were in contact with the pigment permeation layer was determined. The area of the exposed portion of the pigment permeation layer 1600, which had no thermoplastic resin on the front surface, (exposed portion area) was calculated by subtracting the total area of those parts of the pieces of thermoplastic resin which were in contact with the pigment permeation layer from the total area of the measurement range. Based on the SEM projection from the print surface side, the area of the thermoplastic resin portion as directly viewed from the print surface side of the print medium (thermoplastic resin portion area) was checked. As a result, the contact area of a part of the particle which was in contact with the pigment permeation layer was smaller than the thermoplastic resin portion area, and the exposed portion area was 75% of the total area of the pigment permeation layer 1600.

For the resultant print medium 1-1, the pore size of the air gaps in the pigment permeation layer and the pore size of the air gaps in the solvent absorption layer were measured using the BET method. The air gaps in the pigment permeation layer had a pore size of 125 nm, and the air gaps in the solvent absorption layer had a pore size of 25 nm.

(Manufacture of the Print Medium 1-1)

The above-described first manufacturing apparatus 25 in FIG. 40 was used to print a first image on the print medium 1-1 using a resin-dispersing pigment ink. Subsequently, the print medium was thermocompression bonded to the image support, and the PET substrate was peeled off to provide a printed material with a structural latent image on the front surface of the solvent absorption layer. Then, a second image (normal image) was printed on the front surface of the solvent absorption layer with the structural latent image. Moreover, an image was drawn on the solvent absorption layer using a felt-tip pen, and a seal was affixed to the solvent absorption layer using a vermilion ink pad. As described above, the printed material 1-1 in Example 1-1 was obtained. The printed material 1-1 corresponds to the printed material 73 in a part (c) of FIG. 57.

As the printing unit of the manufacturing apparatus printing the first image and the second image, a pigment ink jet printer (trade name: "PIXUS PRO-1"; manufactured by Canon Inc.) equipped with a serial head was used. The above-described resin dispersing pigment ink was installed in the printer, and the images were printed in a plain paper mode (ejection volume: 4 pl; resolution: 1,200 dpi; color printing). As the image support, a PET card with a thickness of approximately 1 mm (trade name: "PET CARD"; manufactured by Goudou Giken) was used. Conditions for thermocompression bonding included a temperature of 160° C., a pressure of 3.9 Kg/cm, and a conveyance speed of 50 mm/sec. The resin layer was softened and melted into a film, and transfer was performed so as to maintain the air gaps in the solvent absorption layer and in the pigment permeation layer.

Figure 57:
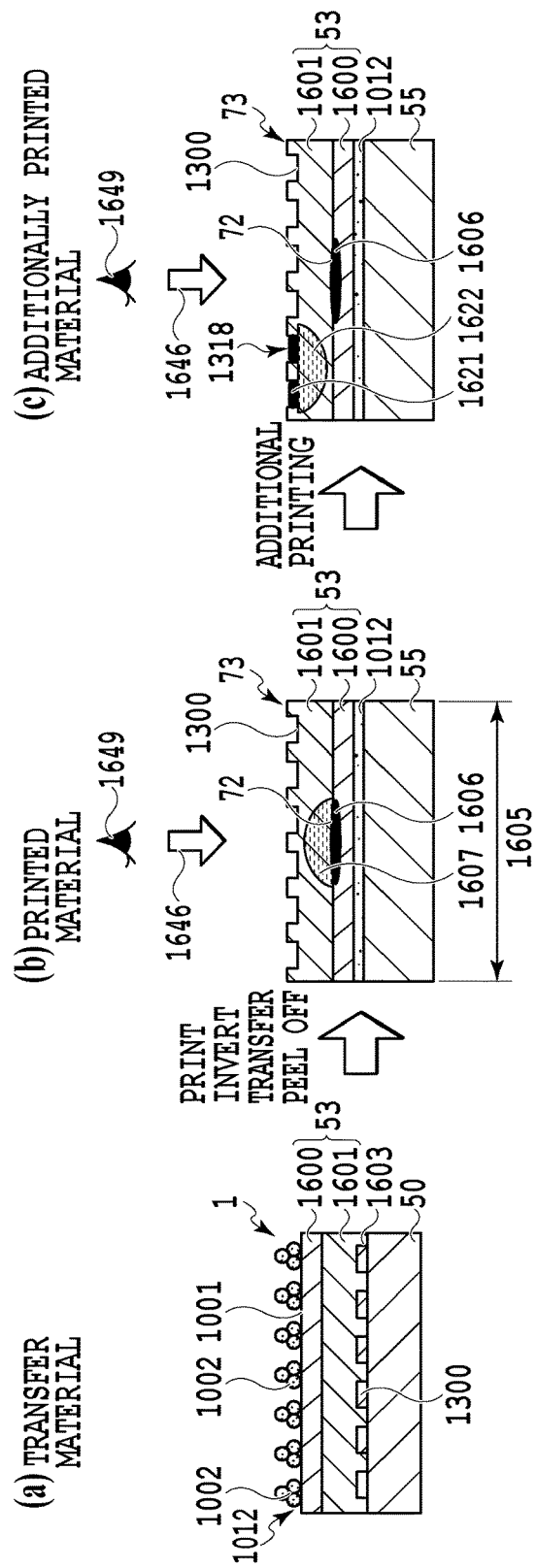
FIG. 57 is a diagram illustrating a manufacturing method for yet another example of a printed material enabling additional printing.

In Example 1-1, as depicted in a part of FIG. 57, the print medium 1-1 is used in which the resin layer 1012 is provided on the front surface of the ink receiving layer 53 for the pigment ink provided on the substrate 50. The ink receiving layer 53 includes at least the solvent absorption layer 1601 and the pigment permeation layer 1600. Pieces of thermoplastic resin with inferior ink absorptivity are provided on the front surface of the pigment permeation layer 1600 to form the resin layer 1012 such that the resin layer 1012 includes the exposed portion 1001 in which the front surface of the pigment permeation layer is exposed.

The solvent absorption layer in Example 1-1 is formed of inorganic particulates with a small pore size to provide a high transparency and formed like a thick film to provide a high solvent absorptivity. The solvent absorption layer is configured to have a firm air gap structure formed of inorganic particulates and a water-soluble resin and to maintain the air gap structure after transfer. A protrusion-and-recess-like structural latent image is formed on the front surface of the pigment permeation layer, and the front surface of the structural latent image is regulated to have a matte texture.

The pigment permeation layer in Example 1-1 is formed of inorganic particulates with a larger particle size than the solvent absorption layer to allow the pigment particles to appropriately permeate the solvent absorption layer and is formed like a thin film to allow an excellently colored pigment image to be formed. The solvent absorption layer is configured to have a firm air gap structure formed of inorganic particulates and a water-soluble resin and to maintain the air gap structure after transfer.

The resin layer, the pigment permeation layer, and the solvent absorption layer, which are related to reception of the ink, are configured to have an increasing ink absorption speed according to the order of the layers. The average pore size of the pigment permeation layer is larger than the average secondary particle size of the pigment, and the average pore size of the solvent absorption layer is smaller than the average secondary particle size of the pigment. The pigment permeation layer and the solvent absorption layer are configured such that the pigment ink is subjected to solid-liquid separation and separated into the pigment components and the solvent components.

The pigment ink ejected by the printing unit of the first manufacturing apparatus and having landed on the resin layer comes into contact with the pigment permeation layer, the pigment ink is instantaneously drawn into the pigment permeation layer. The pigment ink is thus unlikely to remain on the front surface of the resin layer. Thus, unlike in ink jet printing with a UV ink or a solvent ink, a previously ejected ink droplet is not present on the front surface of the print medium when the next ejected ink droplet lands on the front surface. As a result, substantially no ink mist is generated at the time of ink landing, inhibiting a possible decrease in print resolution caused by flying ink mist.

The ink drawn into the pigment permeation layer substantially isotropically permeates the inside of the pigment permeation layer, and equally forms an image below the thermoplastic resin 1002. Therefore, even in a case where an ink is applied from above the resin layer to print an image, an image can be printed that has an increased area factor and a sufficient concentration all over the surface of the print medium, while allowing a possible white point to be suppressed.

The ink having permeated the thin pigment permeation layer comes into contact with the solvent absorption layer and is instantaneously drawn into the solvent absorption layer. Since the solvent absorption layer has an average air gap diameter smaller than the average particle size of the pigment, the pigment ink is subjected to solid-liquid separation at the bottom of the pigment permeation layer. Consequently, the pigment particles of the ink form a dense thin-film-like image at the bottom of the pigment permeation layer. The image also had an appropriate saturation. Furthermore, since the pigment permeation layer is thinly formed, the ink reaches the solvent absorption layer before the ink dots spread excessively, and the pigment particles are subjected to solid-liquid separation at the bottom of the pigment permeation layer. Thus, the diameter of each of the dots was successfully controlled to form a dense thin-film-like pigment image, and no bleeding was observed even in a high-resolution image.

The solvent of the ink subjected to solid-liquid separation was substantially completely absorbed by the thickly formed solvent absorption layer. Thus, no solvent of the ink remains in the resin layer or in the pigment permeation layer. Since the solvent absorption layer is a firm air gap structure formed of inorganic particulates and a water-soluble resin, the air gap structure is maintained even after transfer. Therefore, even in a case where transfer based on thermocompression bonding is performed immediately after image printing without a drying operation of vaporizing moisture, the solvent absorbed by the solvent absorption layer is inhibited from flowing reversely, leading to an appropriate transfer capability.

The PET card serving as an image support and the print medium 1-1 with a color image printed thereon as a first image (inverted image) were laid on top of each other and pressurized and heated using the heat roller and the pressurization roller to transfer the print medium 1-1 to the PET card. As a result, the thermoplastic resin particles in a compressed portion of the resin layer compressed against the image support were softened and melted into a film, increasing the area over which the resin layer was bonded to the image support and the pigment permeation layer. Thus, appropriate bonding was achieved. When the substrate is peeled off, the air gap structure of the inorganic particulates has been maintained in compressed portions of the solvent absorption layer and the pigment permeation layer compressed against the image support. Thus, the solvent components of the ink were successfully held.

Heat from the heat roller is unlikely to be transmitted to non-compressed portions formed near end faces of the thick image support. Thus, in the non-compressed portions, the thermoplastic resin particles maintain the particle size, inhibiting the water-soluble resin in the solvent absorption layer and in the pigment permeation layer from being softened. Therefore, at a transfer boundary portion, the resin layer is distinctively separated into the film state and the particle state, and each of the solvent absorption layer and the pigment permeation layer is distinctively separated into a softened state and a non-softened state of the bonding resin. As a result, appropriate foil cutting was achieved.

In the print medium 1-1, the image was successfully transferred to the image support even at the end face portions thereof. Even in a case where a part of the resin layer that is located away from the image support is pressurized and heated by the pressurization roller and the thermoplastic resin in that part of the resin layer is softened and melted into a film, since the heat roller is a silicone rubber roller with high releasability, the thermoplastic resin remains on the substrate side instead of bonding to the pressurization roller 22. Thus, the pressurization roller was inhibited from being contaminated with molten thermoplastic resin.

In the print medium 1-1 in Example 1-1, the average air gap diameter of the solvent absorption layer is adjusted to 10 nm or more and 40 nm or less and is thus smaller than the wavelength of visible light. This serves to reduce possible haze and to improve transparency. Therefore, as depicted in parts (b) and (c) of FIG. 57, an appropriate image density was confirmed when the first image 1606 was viewed by a viewer 1649 in a viewing direction of an arrow 1646.

In Example 1-1, the thermoplastic resin in the resin layer may be a plurality of different types of thermoplastic resins with varying bonding target materials and varying resistance levels. Therefore, the thermoplastic resin achieved the capability of bonding to image supports of a wide variety of materials and also offered solvent resistance to a variety of solvents. In a case where a printed material was produced using a white acrylic plate with a thickness of 3 mm, appropriate print properties, transfer properties, foil cutting capability, image storage stability, and second image print properties were confirmed.

The thermoplastic resin softened and melted into a film eliminates the bypass portion of the resin layer. Thus, liquids, gases, and the like were inhibited from entering the inside of the printed material, resulting in appropriate weatherability. In particular, for solvent resistance, problems such as peel-off were prevented even in immersion tests in a polar solvent, a nonpolar solvent, and a hot environment such as boiling water, leading to an appropriate bonding capability.

In Example 1-1, as depicted in a part (b) of FIG. 57, peeling off the substrate 50 after transfer allows the solvent absorption layer 1601 to be exposed. Thus, a second image (normal image) 1318 can be additionally printed on the exposed solvent absorption layer 1601 by ink jet printing or the like, an image can be drawn on the solvent absorption layer 1601 using a writing utensil, or a seal can be affixed to the solvent absorption layer 1601, as depicted in a part (c) of FIG. 57. The front surface of the solvent absorption layer 1601 has the structural latent image 1300 with fine protrusions and resins and is regulated to have a desired matte surface texture. The first image 1606 formed on the pigment permeation layer 1600 is covered with the solvent absorption layer 1601 and is difficult to forge or alter. Thus, a printed material 73 with high security was successfully produced. The surface exposed by peeling off the substrate 50 was evaluated for scratch resistance performance as is the case with the printed material 1 in Example 1 in the above-described first embodiment. The results indicated a residual OD rate of 99% or more and thus very high scratch resistance performance. In a case where the second image 1318 is additionally printed using the pigment ink, the pigment components 1621 of the ink are protected by the protrusion-and-recess-like structural latent image 1300 on the front surface of the solvent absorption layer 1601. Thus, the scratch resistance of the second image 1318 was also successfully improved.

Example 1-2

(Manufacture of a Print Medium 1-2)

In a print medium 1-2 in Example 1-2, a PET substrate (trade name: "Tetoron G2"; thickness: 19 μm; manufactured by Teijin Dupont Film Japan Limited) was used instead of the above-described substrate 1, and a resin layer coating liquid 2 was used instead of the resin layer coating liquid 1. The print medium 1-2 was obtained similarly to the print medium 1-1 except for the above-described components, and the sea-and-island-like resin layer in the print medium 1-2 also functioned as a white opaque scattering layer. The print medium 1-2 corresponds to the print medium 1 in a part (a) of FIG. 58. The area of the exposed portion of the print medium 1-2 was checked using a method similar to the method for the print medium 1-1. The area of the exposed portion of the print medium 1-2 was 75% of the entire area of the pigment permeation layer.

(Manufacture of the Print Material 1-2)

In a printed material 1-2 in Example 1-2, the print medium 1-2 was used instead of the print medium 1-1, and a transparent glass plate with a thickness of 1 mm was used as an image support. The print medium 1-2 was obtained as is the case with Example 1-1 except for the above-described components. The print material 1-2 corresponds to the print material 73 in a part (c) of FIG. 58.

Figure 58:
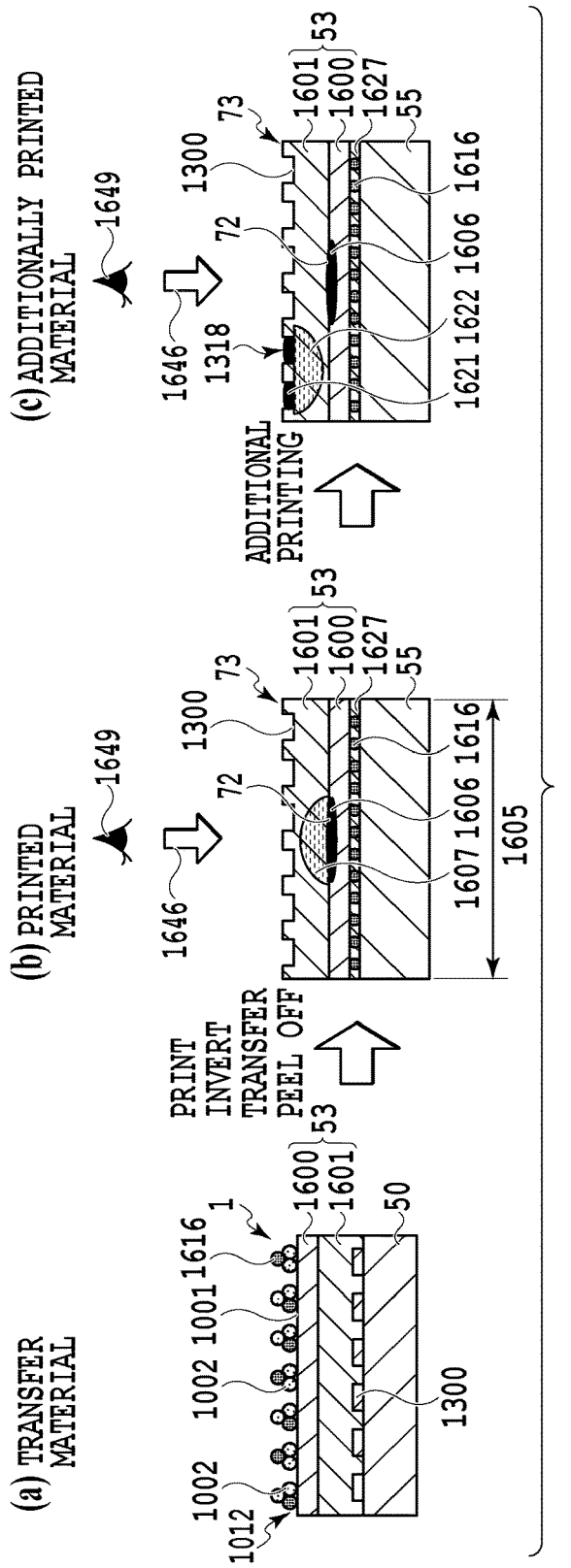
FIG. 58 is a diagram illustrating a manufacturing method for yet another example of a printed material enabling additional printing.

In Example 1-2, as depicted in FIG. 58, the resin layer 1012 contains the hollow resin particles 1616 to function as a white scattering layer, and the pigment permeation layer 1600 is bonded (transferred) to the image support 55 that is transparent like glass. In these respects, Example 1-2 is different from Example 1-1.

Typically, in a case where the image support is transparent, the background of the transferred image is transparent and no light is reflected from the background, possibly leading to inferior visibility of the transferred image. In Example 1-2, the resin layer of the background of the pigment image functions as a white scattering layer, and thus, the transferred image with the white scattering layer in the background has an increased contrast and thus enhanced visibility. In a case where the image support was a transparent acrylic plate with a thickness of 10 mm, the transferred image had appropriate visibility, and appropriate image print properties, bonding transfer properties, foil cutting capability, image storage stability, scratch resistance performance, and second image print properties were confirmed as is the case with Example 1-1.

Example 1-3

(Manufacture of a Print Medium 1-3)

Figure 59:
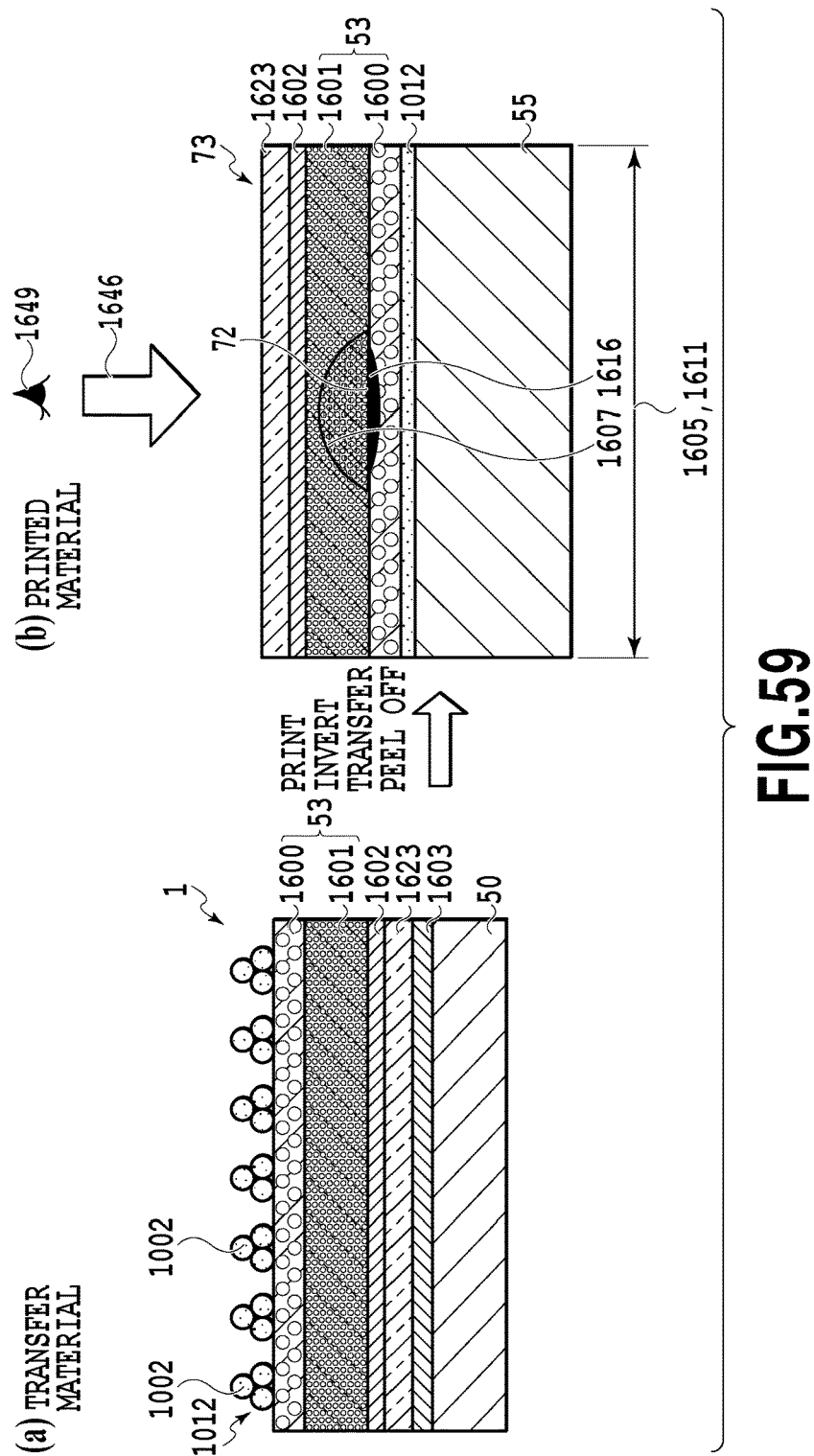
FIG. 59 is a diagram illustrating a manufacturing method for a printed material in which a pigment permeation layer is softened and melted so as to be transparent.

In a print medium 1-3 in Example 1-3, as depicted in FIG. 59, the front surface of a PET substrate (trade name: "Tetoron G2"; thickness: 19 μm; manufactured by Teijin Dupont Film Japan Limited) serving as the substrate 50 was very thinly coated with PORIRON 788 manufactured by CHUKYO YUSHI CO., LTD. to provide a peel-off layer 1603. The front surface of the peel-off layer 1603 was coated with the protect layer coating liquid 1, which was then dried to form a protect layer 1623 serving as a functional layer on the peel-off layer 1603. The die coater was used to apply the coating liquid for the protect layer 1623, the coating speed was 5 m/s, the amount of coating liquid applied as measured after drying was 5 g/m$^2$, and the drying temperature was 90° C. To improve adhesion to the solvent absorption layer 1601, the front surface of the protect layer 1623 was coated with Vylonal MD-1985 manufactured by TOYOBO CO., LTD., which was then dried to provide a thin-film adhesion layer 1602. The die coater was used to apply the coating liquid for the adhesion layer 1602, the coating speed was 5 m/s, and the amount of coating liquid applied as measured after drying was 5 g/m$^2$.

Thus, in print medium 1-3 in Example 1-3, a substrate provided with the protect layer as a functional layer via the peel-off layer was used instead of the above-described substrate 1, the above-described laminate sheet 1 was provided with the adhesion layer, a solvent absorption layer coating liquid 2 was used instead of the solvent absorption layer coating liquid 1, and a pigment permeation layer coating liquid 2 was used instead of the above-described pigment permeation layer coating liquid 1. As the print medium 1-3, the print medium 1-3 in a part (a) of FIG. 59 was obtained using a manufacturing method similar to that for the print medium 1-1 except for the above-described components. The results of measurement using the BET method indicated that the air gaps in the solvent absorption layer had a pore size of 10 nm. On the other hand, the air gaps in the pigment permeation layer in the print medium 1-3 had a pore size of 120 nm. The area of the exposed portion was checked using a method similar to that for the print medium 1-1. The area of the exposed portion of the print medium 1-3 was 75% of the entire area of the pigment permeation layer.

(Manufacture of the Print Material 1-3)

In order to provide a high-image-quality interior decorative photograph as a printed material 1-3, Example 1-3 is different from Example 1-1 as described below. That is, for the printed material 1-3, ink jet printing is performed using a high-image-quality pigment ink 2 containing pigment particles with a small particle size. In the printed material 1-3, the inorganic particulates forming the solvent absorption layer have a very small average particle size, and the solvent absorption layer has a pore size sufficiently smaller than the wavelength of visible light. Consequently, visible light substantially passes through the solvent absorption layer, which thus has a very high transparency. The pigment permeation layer in the printed material 1-3 is formed of resin particulates that can be softened and melted instead of the inorganic particulates, and can thus be softened and melted into a film after transfer. In the printed material 1-3, the pigment permeation layer has a slightly reduced pore size in conformity to the pigment particles with the small particle size, and a protect layer formed between the substrate and the solvent absorption layer protects a transferred image on the front surface of the printed material.

In Example 1-3, the printed material 1-3 in a part (b) of FIG. 59 was manufactured using the print medium 1-3 as described above and using, as a pigment ink, the high-image-quality pigment ink containing the pigment particles with the small pore size, and as an image support, a white acrylic plate with a thickness of 20 mm. The printed material 1-1 was otherwise manufactured as in the case of the manufacturing method for the printed material 1-1.

In the print medium 1-3 in Example 1-3, as described above, the solvent absorption layer 1601 has an average particle size of approximately 10 nm, which is sufficiently smaller than the wavelength of visible light. This leads to significantly suppressed haze and a very high transparency. Moreover, the pigment permeation layer 1600 is formed of the meltable resin particulates instead of the inorganic particulates. Thus, in a case where the pigment permeation layer 1600 is softened and melted into a film after transfer, the pigment permeation layer 1600 contains no air gaps and is substantially transparent. Therefore, as depicted in the part (b) of FIG. 59, when the viewer 1649 viewed the first image 1606 via the protect layer 1623, the adhesion layer 1602, and the solvent absorption layer 1601 in the viewing direction of the arrow 1646.

During transfer, the pigment permeation layer 1600 and the resin layer 1012 are softened and melted into a film to fill the sea-like bypass portion, which is a large air gap in the resin layer 1012, with the molten pigment permeation layer and bonding resin. The air gaps in the resin layer were thus eliminated to significantly improve the bonding to the image support 55. Furthermore, the pigment permeation layer 1600 holding the pigment image 1606 is melted into a film so as to enclose the pigment image. This allowed suppression of unwanted light scattering attributed to the air gaps in the pigment permeation layer. Moreover, since the air gaps in the pigment permeation layer and the bypass portion of the resin layer are sufficiently filled, liquids and gases were unlikely to enter the inside of the printed material, and due to this capability in combination with the properties of the pigment ink, the printed material exhibited various types of very appropriate weatherability (water resistance, solvent resistance, ozone resistance, and the like) and very appropriate storage stability. Furthermore, since the protect layer 1623 is provided on the uppermost layer located on an outer side of the solvent absorption layer 1601, the printed material particularly exhibited very appropriate light resistance and ozone resistance. As is the case with the printed material 1 in Example 1 of the above-described first embodiment, the results of evaluation of scratch resistance performance indicated a residual OD rate of 99% or more, exhibiting very appropriate scratch resistance performance. In addition, in a case where the transfer unit of the manufacturing apparatus for the printed material softens and melts the pigment permeation layer and the resin layer into a film, the adhesive particles maintain the particle state in a non-transferred portion, whereas the thermoplastic resin particles turn into the film state in a transferred portion. Thus, at the transfer boundary portion, the pigment permeation layer and the resin layer are distinctively separated into the film state and the particle state, leading to an appropriate cutting capability.

Example 2-1

(Manufacture of a Print Medium 2-1)

Figure 60:
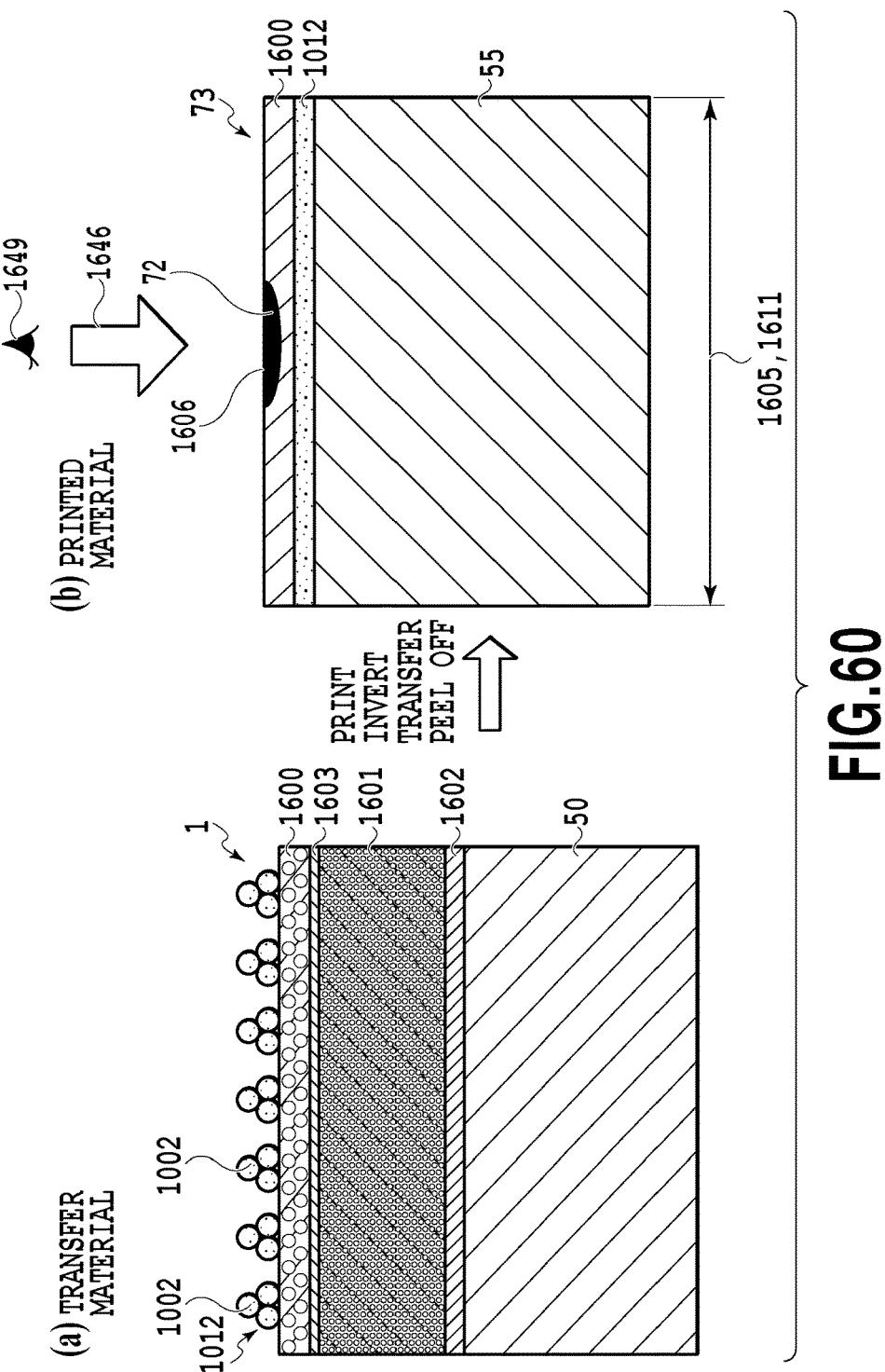
FIG. 60 is a diagram illustrating a manufacturing method for an example of a printed material where the pigment permeation layer is exposed.

In a print medium 2-1 in Example 2-1, as depicted in a part (a) of FIG. 60, the front surface of a PET substrate (trade name: "Tetoron G2"; thickness: 100 µm; manufactured by Teijin Dupont Film Japan Limited) serving as the substrate 50 was coated with Vylonal MD-1985 manufactured by TOYOBO CO., LTD., which was then dried to form an adhesion layer 1602 serving as a functional layer on the substrate 50. The gravure coater was used for the coating, the coating speed was 5 m/min, the amount of coating liquid applied as measured after drying was 0.5 g/m$^2$, and the drying temperature was 90° C. The front surface of the adhesion layer 1602 was coated with the solvent absorption layer coating liquid 2 to form a slightly thick solvent absorption layer 1601, allowing absorption of a sufficient amount of ink solvent for improving the image density. The front surface of the solvent absorption layer 1601 was very thinly coated with PORIRON 788 manufactured by CHUKYO YUSHI CO., LTD. (solid content concentration: 3%) to provide a peel-off layer 1603. The peel-off layer 1603 was provided to facilitate peel-off of the solvent absorption layer 1601 from the pigment permeation layer 1600 after transfer. A printed material 2-1 (a part (a) of FIG. 60) in Example 2-1 was manufactured by forming a pigment permeation layer 1600 on the peel-off layer 1603 using, instead of the above-described pigment permeation layer coating liquid 1, a pigment permeation layer coating liquid 4 that can be softened and melted into a film by being pressurized and heated during transfer, and providing a resin layer 1012 on the front surface of the pigment permeation layer 1600 in a sea and island form. The print medium 2-1 was shaped like a cut sheet by cutting the material, so as to be easily conveyed and printed in an ink jet printing apparatus using the above-described pigment ink 2 with the small pore size. The results of measurement based on the BET method indicated that the air gaps in the solvent absorption layer in the print medium 2-1 had a pore size of 10 nm. On the other hand, the air gaps in the pigment permeation layer in the print medium 2-1 had a pore size of 180 nm. The area of the exposed portion was checked using a method similar to that for the print medium 1-1. The area of the exposed portion of the print medium 2-1 was 75% of the entire area of the pigment permeation layer.

(Manufacture of the Print Material 2-1)

First, a first image (inverted image) 1606 was printed from the resin layer 1012 side of the cut sheet-like print medium 2-1 using the ink jet system with the above-described pigment ink 2 with the small particle size. Then, the resin layer 1012 of the print medium 2-1 was laid on top of the front surface of a white acrylic plate with a thickness of 20 mm serving as the image support 55, and the print medium 2-1 and the image support 55 were pressurized and heated using the heat roller and the pressurization roller to bond (transfer) the print medium to the image support. Subsequently, the printed material 2-1 in Example 2-1 (a part (b) of the FIG. 60) was obtained by peeling off the substrate 50, the adhesion layer 1602, the solvent absorption layer 1601 containing substantially all of the ink solvent components, and the peel-off layer 1603. In the printed material 2-1, the resin layer 1012 and the pigment permeation layer 1600 softened and melted into a film are laminated on the image support 55, and the pigment permeation layer 1600 is formed into a film so as to enclose a high-quality pigment image (inverted image) 1606 printed like a dense thin film.

Example 2-1 is different from Example 1-1 as described below. That is, in Example 2-1, a pigment ink with a small particle size is used in order to form a high-quality inverted image, and an adhesion layer is provided between the substrate and the solvent absorption layer and a peel-off layer is provided between the pigment permeation layer and the solvent absorption layer so as to allow the solvent absorption layer to be peeled off during transfer along with the substrate. In Example 2-1, the pigment permeation layer is formed of resin particulates that can be softened and melted into a film instead of inorganic particulates so that, like the resin layer, the pigment permeation layer is softened and melted into a film during transfer.

The printed material 2-1 in the present example is suitably used for interior decorative photographs and the like which need to have high image quality and long-term storage stability. A high-resolution and high-density pigment image was successfully printed using the ink jet printing system with the pigment ink with the small particle size. The print medium 2-1 in the present example includes the solvent absorption layer 1601 that is sufficiently thick and has a high ink absorption speed to allow the solvent components of a large amount of applied pigment ink to be quickly absorbed without leakage. Thus, even in a case where a dense image was printed, the pigment ink was subjected to solid-liquid separation at the interface without overflowing the print medium, to form a dense high-definition thin-film-like pigment image 1606 at the bottom of the pigment permeation layer 1600. The thick solvent absorption layer 1601 containing a large amount of ink solvent components is peeled off from the pigment permeation layer 1600 via the peel-off layer 1603 along with the substrate 50. Thus, the pigment image 1606 is positioned on the uppermost layer of the printed material 2-1, inhibiting reduced image visibility resulting from possible haze in the solvent absorption layer.

During transfer, the pigment permeation layer 1600, like the resin layer, is softened and melted into a film so as to enclose the pigment image 1606, thus forming a flat print surface. This inhibited unwanted light scattering on the pigment image 1606 to improve the glossiness of the front surface, leading to further improved image quality. On the other hand, in terms of long-term storage stability, the use of a pigment ink containing weatherable pigment particles as a color material served to provide a pigment image 1606 excellent in light resistance, ozone resistance, and water resistance. In the pigment permeation layer, during ink jet printing, the pigment particles are internally densely present in the air gaps formed of the resin particulates and the bonding resin. During transfer, the resin particles and the bonding resin are softened and melted into a film so as to enclose the pigment particles. As a result, a printed material excellent in mechanical strength such as scratch resistance and long-term storage stability was obtained. In addition, in a case where the transfer unit of the manufacturing apparatus for the printed material softens and melts the pigment permeation layer and the resin layer into a film, the thermoplastic resin particles maintain the particle state in the non-transferred portion, whereas the thermoplastic resin particles turn into the film state in the transferred portion. Thus, at the transfer boundary portion, the pigment permeation layer and the resin layer are distinctively separated into the film state and the particle state, allowing the image support 55 to be appropriately cut off at ends thereof. As a result, a high-quality interior decorative photograph was obtained. As is the case with the printed material 1 in Example 1 of the above-described first embodiment, the results of evaluation of scratch resistance performance indicated a residual OD rate of 99% or more, exhibiting very appropriate scratch resistance performance.

Example 2-2

Figure 61:
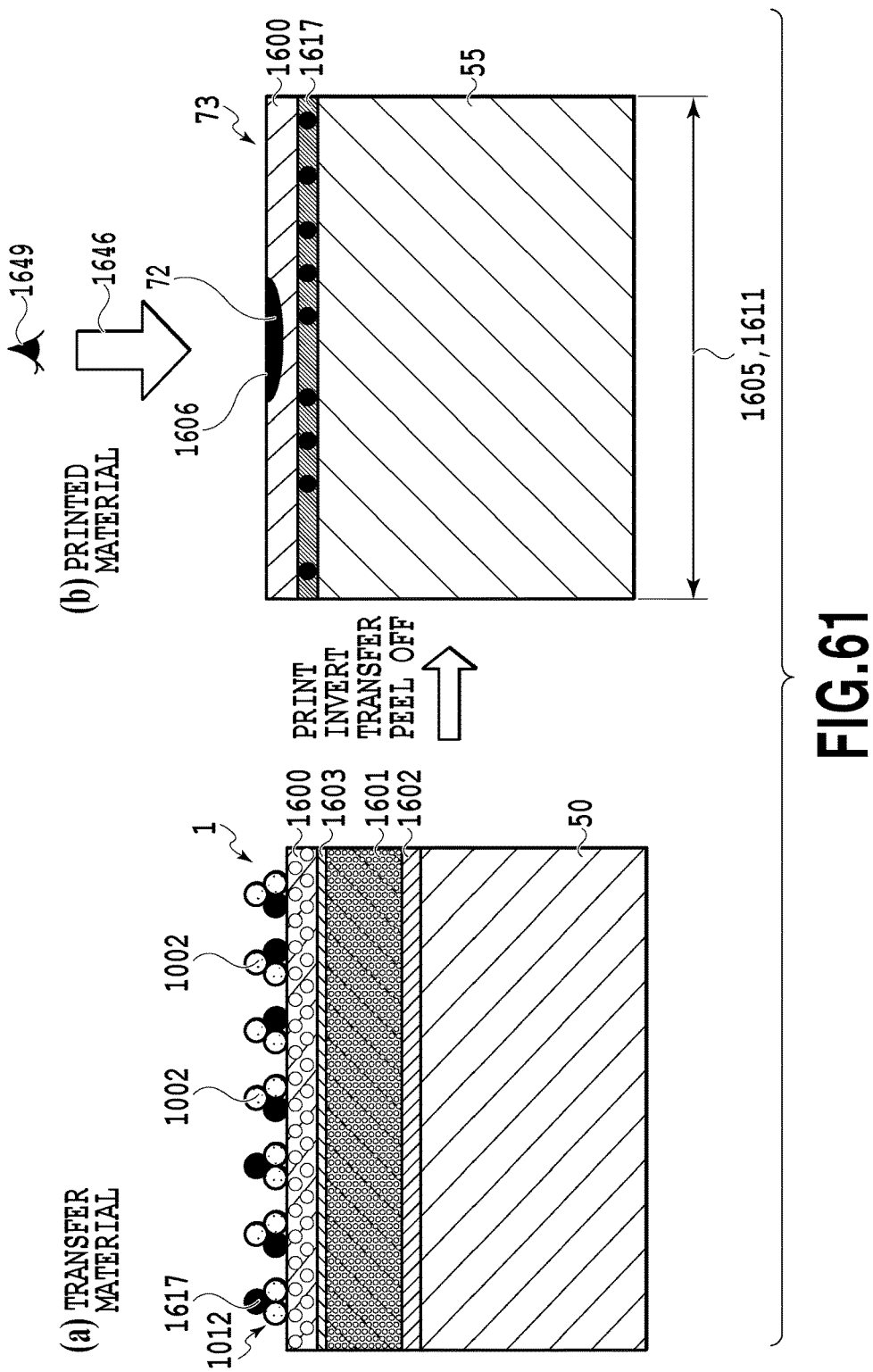
FIG. 61 is a diagram illustrating a manufacturing method for another example of a printed material where the pigment permeation layer is exposed.

In Example 2-2, a print medium 2-2 was produced by adding phosphorescent luminescent particles to the above-described resin layer coating liquid 1 as second resin particles, and using the coating liquid to provide a luminescent resin layer, and a printed material 2-2 for an interior decorative photograph was obtained using the print medium 2-2. The print medium 2-2 is similar to the print medium in Example 2-1 except for the use of a resin layer coating liquid 3 instead of the resin layer coating liquid 1. The area of the exposed portion was checked using a method similar to that for the print medium 1-1. The area of the exposed portion of the print medium 2-2 was 75% of the entire area of the pigment permeation layer. Using a method similar to that for Example 2-1, the printed material 73 for an interior decorative photograph in a part (b) of FIG. 61 was obtained. Typically, fluorescent luminescent particles and phosphorescent luminescent particles are likely to suffer degradation of luminescent properties due to moisture. In the present example, substantially all of the solvent components containing the moisture in the pigment ink are absorbed by the solvent absorption layer 1601, and after transfer, the solvent absorption layer 1601 is peeled off along with the substrate 50. Thus, the pigment image 1606 in the printed material 2-2 successfully provided an excellent visibility, for example, even in a room with a reduced illuminance, and was unlikely to suffer deterioration of the luminescent properties. As is the case with the printed material 1 in Example 1 of the above-described first embodiment, the results of evaluation of scratch resistance performance indicated a residual OD rate of 99% or more, exhibiting very appropriate scratch resistance performance.

Example 2-3

Figure 66:
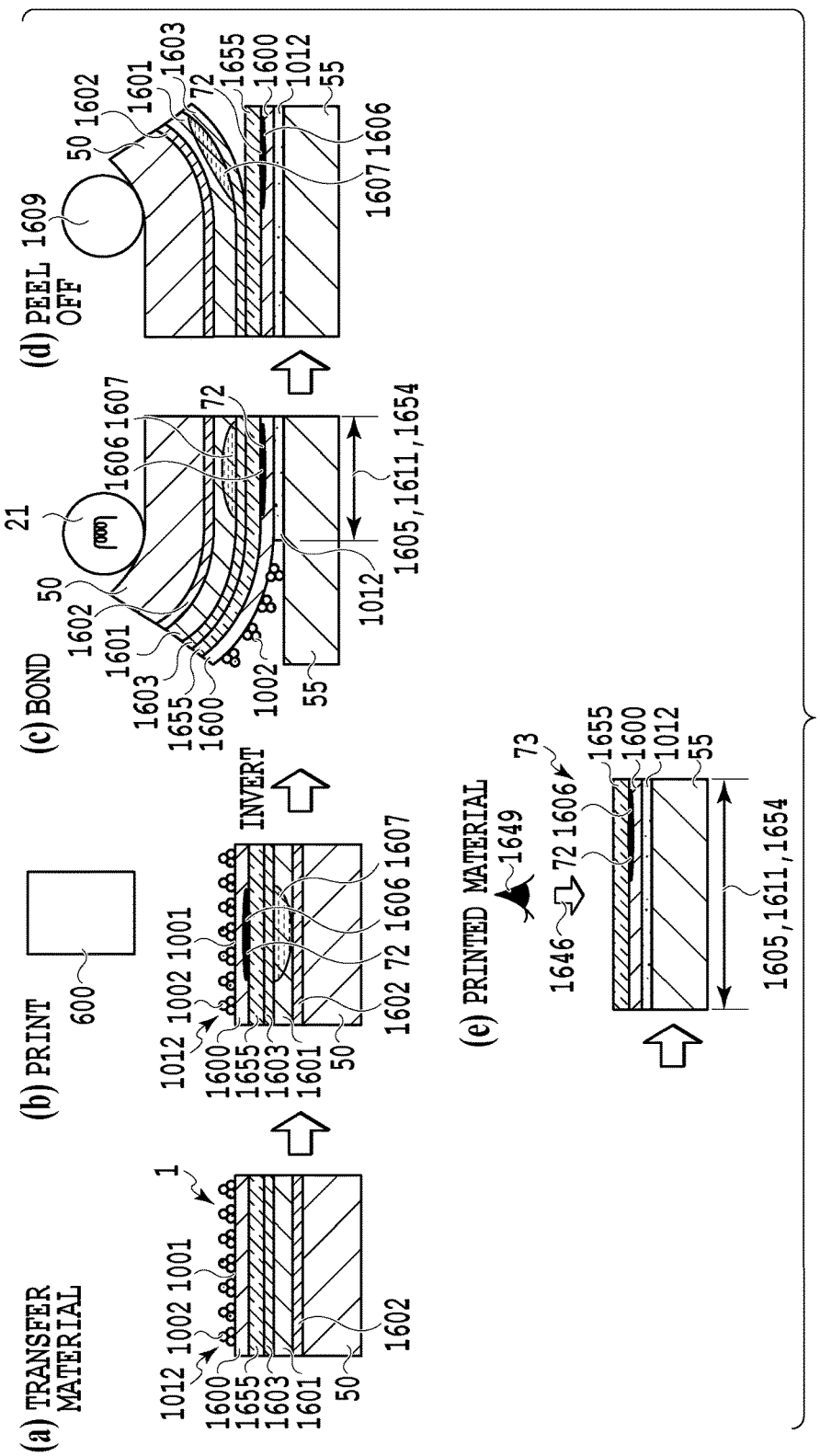
FIG. 66 is a illustrating a manufacturing method for a printed material in which the solvent absorption layer of the print medium functions as a transparent protect layer.

FIG. 66 is a diagram illustrating a print medium 2-3 and a printed material 2-3 as a variation of Example 2 (Example 2-3).

The print medium 2-3 in Example 2-3 (a part (a) of FIG. 66) was produced as follows. First, the front surface of a PET substrate (trade name: "Tetoron G2"; thickness: 100 μm; manufactured by Teijin Dupont Film Japan Limited) serving as the substrate 50 was coated with Vylonal MD-1985 manufactured by TOYOBO CO., LTD., which was then dried to form an adhesion layer 1602 serving as a functional layer on the substrate 50. The gravure coater was used to apply the coating liquid for the adhesion layer 1602, the coating speed was 5 m/min, the amount of coating liquid applied as measured after drying was 0.5 g/m$^2$, and the drying temperature was 90° C. Then, the front surface of the adhesion layer 1602 was coated with a solvent absorption layer coating liquid 3 to provide a first solvent absorption layer 1601 of the air gap absorption type that was thick and had a sufficient ink solvent absorption capacity. The front surface of the solvent absorption layer 1601 was very thinly coated with PORIRON 788 manufactured by CHUKYO YUSHI CO., LTD. (solid content concentration: 3%) so as to avoid hindering permeation and absorption of the ink solvent, thus providing a peel-off layer 1603. The peel-off layer 1603 was coated with the above-described solvent absorption layer coating liquid 4 to provide a second thin-film solvent absorption layer 1655 of the air gap absorption type that can be softened and melted into a film. Then, as is the case with Example 1-1, a thin-film pigment permeation layer 1600 of the air gap absorption type that can be melted into a film was provided on the second solvent absorption layer 1655, and pieces of thermoplastic resin 1002 were provided on the pigment permeation layer 1600 in a sea and island form to form a resin layer 1012. The area of the exposed portion was checked using a method similar to that for the print medium 1-1. The area of the exposed portion of the print medium 2-3 was 75% of the entire area of the pigment permeation layer.

In Example 2-3, the pigment particles in the pigment ink have an average particle size of 90 nm to 150 nm, and the pigment permeation layer 1600 had an average air gap diameter of approximately 125 nm, and the pigment permeation layer 1600 have a thickness of approximately 4 μm. The pigment ink is applied via the resin layer 1012 with a thickness of approximately 2 μm to form a first image 1607, and infiltrates and diffuses quickly through the pigment permeation layer 1600, including the area immediately below the pieces of thermoplastic resin 1002. The pigment ink then reaches the interface with the second solvent absorption layer 1655. The second solvent absorption layer 1655 has an average air gap diameter of approximately 40 nm, and the air gaps fail to absorb the pigment particles. Thus, the pigment ink is subjected to solid-liquid separation at the interface between the pigment permeation layer 1600 and the second solvent absorption layer 1655 to form a dense thin-film-like pigment image 1606 at the bottom of the pigment permeation layer 1600. The solvent components 1607 of the pigment ink are quickly absorbed and infiltrate into the second solvent absorption layer 1655, which has a higher ink absorption speed. The solvent components 1607 absorbed by the second solvent absorption layer 1655 with a thickness of approximately 6 μm are further absorbed by the first solvent absorption layer 1601, which has a much higher ink absorption speed. The first solvent absorption layer 1601 has an average air gap diameter of approximately 20 nm and a thickness of 25 μm. The solvent absorption layer 1601 has a sufficient ink absorption capacity to enable color printing using dense pigment inks in plurality of colors.

The pigment permeation layer 1600 has a significantly higher ink absorption speed than the resin layer 1012, and the second solvent absorption layer 1655 with a small average air gap diameter further has a higher ink absorption speed than the pigment permeation layer 1600. The first solvent absorption layer 1601, which further has a smaller average air gap diameter than the second solvent absorption layer 1655, has an predominantly high ink absorption speed and a sufficient ink absorption capacity. Thus, substantially all of the solvent components 1607 are quickly absorbed by the first solvent absorption layer 1601.

To manufacture the printed material 2-3 in Example 2-3, a first image 1606 is printed on the print medium using the ink jet print head 600 and the above-described pigment ink 1 as depicted in a part (b) of FIG. 66. Subsequently, as depicted in a part (c) of FIG. 66, the resin layer 1012, the pigment permeation layer 1600, and the second solvent absorption layer 1655 are pressurized and heated using the heat roller 21 and melted into a film, which is bonded (transferred) to the image support 55. Subsequently, as depicted in a part (d) of FIG. 66, the peel-off layer 1603, the first solvent absorption layer 1601, and the adhesion layer 1602 are peeled off along with the substrate 50 to form a printed material in a part (e) of FIG. 66.

The printed material in the present variation is suitably used for interior decorative photographs that need high long-term storage stability. During transfer, the pigment permeation layer 1600 is formed into a film so as to enclose the pigment image 1606, and the second solvent absorption layer 1655 forms a transparent protect layer on the front surface of the pigment permeation layer 1600. Thus, the pigment image 1606 was successfully prevented from being contaminated with a pollutant liquid or a toxic gas, and the mechanical strength such as scratch resistance was successfully improved to significantly enhance the long-term storage stability of the printed material. As is the case with Example 2-1, in a case where the first solvent absorption layer 1601 was peeled off, significantly suppressed haze and improved image visibility were confirmed. Appropriate image print properties and transfer properties were also successfully confirmed. The first solvent absorption layer 1601 allows functions, particularly ink absorptivity such as the ink absorption speed and the absorption capacity to be improved without the need to take the optical properties, flexibility, and the foil cutting capability into account. Consequently, dense images were successfully printed by ink jet printing. As is the case with the printed material 1 in Example 1 of the above-described first embodiment, the results of evaluation of scratch resistance performance indicated a residual OD rate of 99% or more, exhibiting very appropriate scratch resistance performance.

Example 3-1

(Manufacture of a Print Medium 3-1)

To manufacture a print medium 3 (a part (a) of FIG. 62) in Example 3-1, the front surface of a PET substrate (trade name: "Tetoron G2"; thickness: 30 µm; manufactured by Teijin Dupont Film Japan Limited) serving as the substrate 50 was very thinly coated with PORIRON 788 (solid content concentration: 3%) manufactured by CHUKYO YUSHI CO., LTD. to provide a peel-off layer 1603. The front surface of the peel-off layer 1603 was coated with the above-described protect layer coating liquid 2, which was then dried to form a water-resistant white fluorescent protect layer 1627 containing white particles 1616 and fluorescent particles 1617. The front surface of the white fluorescent protect layer 1627 was coated with was coated with Vylonal MD-1985 manufactured by TOYOBO CO., LTD., which was then dried to form an adhesion layer 1602. The gravure coater was used to apply the coating liquid for the adhesion layer 1602, the coating speed was 5 m/min, the amount of coating liquid applied as measured after drying was 0.5 g/m², and the drying temperature was 90° C. A slightly thick solvent absorption layer 1601 of the air gap absorption type was provided on the front surface of the adhesion layer 1602 as is the case with Example 1-1 to allow absorption of a sufficient amount of ink solvent to improve the image density. The above-described pigment permeation layer coating liquid 2 was used to form a pigment permeation layer 1600 of the air gap absorption type that can be softened and melted into a film by being pressurized and heated during transfer. A resin layer 1012 with pieces of thermoplastic resin 1002 disposed in a sea and island form was provided on the front surface of the pigment permeation layer 1600 as is the case with Example 1-1 to form a print medium (a part (a) of FIG. 62) in Example 3-1. The print medium 3-1 was shaped like a cut sheet by cutting the material, so as to be easily conveyed and printed in an ink jet printing apparatus using the above-described pigment ink 2 with the small pore size. The area of the exposed portion was checked using a method similar to that for the print medium 1-1. The area of the exposed portion of the print medium 3-1 was 75% of the entire area of the pigment permeation layer.

(Manufacture of the Print Material 3-1)

First, a first image (inverted image) 1606 was printed from the resin layer 1012 side of the cut sheet-like print medium 3-1 using the ink jet system with the above-described pigment ink 2 with the small particle size. Then, the resin layer 1012 of the print medium 3-1 was laid on top of the front surface of a white acrylic plate with a thickness of 30 mm serving as the image support 55, and the print medium 3-1 and the image support 55 were pressurized and heated using the heat roller and the pressurization roller to bond (transfer) the print medium to the image support. Subsequently, the substrate 50 was peeled off to provide the printed material 3-1 (a part (b) of FIG. 62). In the printed material 3-1, the resin layer 1012 and the pigment permeation layer 1600 softened and melted into a film are laminated on the image support 55, and the pigment permeation layer 1600 is formed into a film so as to enclose a high-quality pigment image 1606 printed like a dense thin film. The print medium 3-1 includes the solvent absorption layer 1601 having absorbed the solvent components of the pigment ink, the adhesion layer 1602, and the white fluorescent protect layer 1627 containing the white particles 1616 and the fluorescent particles 1617.

Example 3-1 is different from Example 2-1 as described below. That is, in Example 3-1, a high-quality normal pigment image is formed using a pigment ink with a small particle size and viewed through a thick transparent acrylic plate. In Example 3-1, the white fluorescent protect layer containing the white particles and the fluorescent particles is allowed to adhere to the solvent absorption layer via the adhesion layer to transfer the white fluorescent protect layer to the image support along with the pigment permeation layer. In Example 3-1, the pigment permeation layer is formed of the resin particulates that can be softened and melted into a film instead of the inorganic particulates. Like the resin layer, the pigment permeation layer, is softened and melted into a film after transfer.

Like the printed material 2-1, the printed material 3-1 in Example 3-1 is suitable for interior decorative photographs and the like that need to have high image quality and long-term storage stability. As is the case with Example 2-1, in a case where a high-resolution high-density pigment image was printed using the ink jet printing system with a pigment ink with a small particle size, a dense high-definition thin-film-like pigment image (normal image) was successfully formed at the bottom of the pigment permeation layer. In Example 3-1, even after transfer to the image support, the thick solvent absorption layer containing a large amount of ink solvent components remains on the image support along with the white fluorescent protect layer, the uppermost layer of the printed material 3-1. The viewer 1649 views the image in the direction of the arrow 1646 through the transparent image support, the resin layer formed into a transparent film, and the pigment permeation layer formed into a transparent film by being melted similarly to the resin layer during transfer, as depicted in a part (b) of FIG. 61. Therefore, the visibility of the pigment image is appropriate. The white fluorescent protect layer functions as a background masking layer to improve the visibility of the pigment image, and the fluorescent particles contained in the white fluorescent protect layer emit light to further improve the visibility of the pigment image in a darker room.

In the printed material 3-1, the pigment permeation layer is formed into a film so as to enclose the pigment image to form a flat print surface, as is the case with the printed material 2-1. Thus, unwanted light scattering was inhibited, and a high-quality pigment image was obtained. On the other hand, in terms of long-term storage stability, the use of a pigment ink containing weatherable pigment particles as a color material served to provide a pigment image excellent in light resistance, ozone resistance, and water resistance, as is the case with the printed material 2-1. In the pigment permeation layer, the resin particulates and the bonding resin, which form the air gaps, are softened and melted into a film so as to enclose the pigment particles. Thus, the printed material 3-1 was obtained that is unlikely to be entered by liquids or gases and that is excellent in long-term storage stability. In order to inhibit degradation of the bonding capability (transfer capability) resulting from a reverse flow of the solvent components of the ink, the solvent absorption layer in the printed material 3-1 in the present example was configured to maintain the air gap structure in spite of transfer involving pressurization and heating immediately after ink jet printing. As is the case with the printed material 1 in Example 1 of the above-described first embodiment, the results of evaluation of scratch resistance performance indicated a residual OD rate of 99% or more, exhibiting very appropriate scratch resistance performance.

Example 3-2

In a first variation (Example 3-2) of Example 3, a print medium was produced in which the solvent absorption layer is also softened and melted into a film by being pressurized and heated during transfer, and after image printing an before transfer, the solvent components of the pigment ink were dried using the drying unit or a sufficient time was provided to dry the solvent components. The print medium was configured as is the case with Example 3-1 except for the use of the solvent absorption layer coating liquid 4 instead of the solvent absorption layer coating liquid 1 in Example 3-1 for the solvent absorption layer pressurized and heated into a molten film and the use of the Also forming the solvent absorption layer into a molten film allowed improvement of adhesion to the protect layer and prevention of entry of water and gases through the end faces of the solvent absorption layer. As a, result, a printed material was successfully obtained that enables image printing similar to that in Example 3-1 and that has very high long-term storage stability. Light emission from the white fluorescent protect layer passed easily through the solvent absorption layer, exhibiting further improved visibility of the pigment image. The results of measurement based on the BET method indicated that the air gaps in the solvent absorption layer in the print medium 3-2 had a pore size of 10 nm. On the other hand, the air gaps in the pigment permeation layer in the print medium 3-2 had a pore size of 180 nm. The area of the exposed portion was checked using a method similar to that for the print medium 1-1. The area of the exposed portion of the print medium 3-2 was 75% of the entire area of the pigment permeation layer.

Example 3-3

In a second variation (Example 3-3) of Example 3, a pre-print layer 1648 is pre-formed on the white fluorescent protect layer 1627 in the print medium as depicted in a part (a) of FIG. 63. In the pre-print layer 1648, a hologram layer with a hologram image provided thereon is pre-laminated on the front surface of the peel-off layer 1603 on the substrate 50. The solvent absorption layer 1601 formed into a molten film by being pressurized and heated was provided on the front surface of the hologram layer 1648 via the white fluorescent protect layer 1627 and the adhesion layer 1602 as is the case with Example 3-2. As is the case with the printed material 1 in Example 1 of the above-described first embodiment, the results of evaluation of scratch resistance performance indicated a residual OD rate of 75%. The area of the exposed portion was checked using a method similar to that for the print medium 1-1. The area of the exposed portion of the print medium 3-3 was 75% of the entire area of the pigment permeation layer. In the printed material 3-3 (a part (b) of FIG. 63) manufactured using the print medium 3-3, the pre-formed hologram image appeared on the front surface of the white fluorescent protect layer 1627 positioned on the back surface of the pigment image 1606.

The printed material 3-3 in the present example can be suitably used as an interior decorative photograph because the printed material 3-3 allows a high-definition photograph image to be viewed even from the transparent image support side. The hologram image appears on the white fluorescent protect layer positioned on the back side of the pigment image, and thus, a printed material with higher designability was obtained. As is the case with the printed material 1 in Example 1 of the above-described first embodiment, the results of evaluation of scratch resistance performance indicated a residual OD rate of 99% or more, exhibiting very appropriate scratch resistance performance.

The pre-print layer 1648 is not limited to the hologram layer and may be any of various pre-print layers provided using well-known printing units for gravure printing or the like. The hologram processing was performed using the substrate 50 with the peel-off layer 1603 formed thereon and an apparatus forming a structural latent image.

Example 4

(Manufacture of a Print Medium 4)

Figure 64:
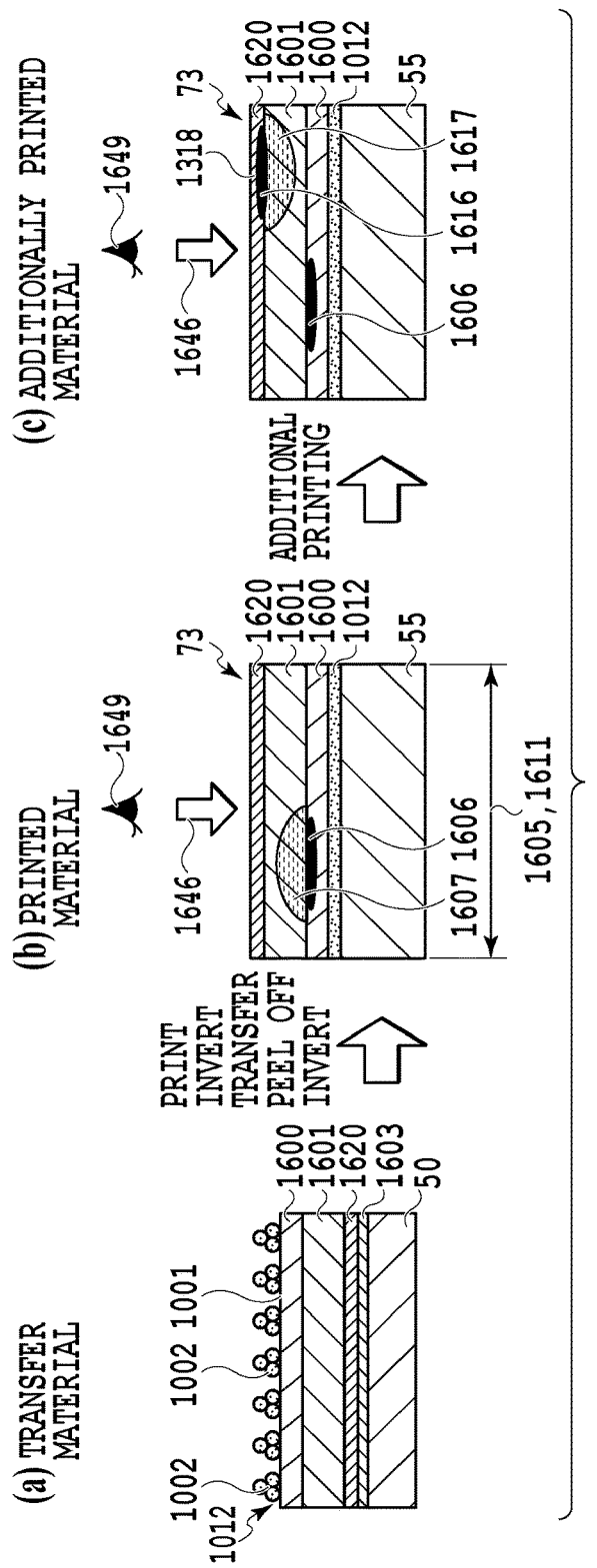
FIG. 64 is a diagram illustrating a manufacturing method for yet another example of a printed material enabling additional printing.

To manufacture a print medium 4 (a part (a) of FIG. 64) in Example 4, the front surface of a PET substrate (trade name: "Tetoron G2"; thickness: 19 µm; manufactured by Teijin Dupont Film Japan Limited) serving as the substrate 50 was very thinly coated with PORIRON 788 (solid content concentration: 3%) manufactured by CHUKYO YUSHI CO., LTD. to provide a peel-off layer 1603. The peel-off layer 1603 was coated with the above-described pigment permeation layer coating liquid 1 to form a second pigment permeation layer 1620. The solvent absorption layer 1601 was provided as is the case with Example 1-1 described above. The pigment permeation layer coating liquid 3 was used to form a first pigment permeation layer 1600 that can be softened and melted into a film by being pressurized and heated during transfer. As is the case with Example 1-1, the resin layer 1012 was provided by placing the pieces of thermoplastic resin 1002 on the front surface of the pigment permeation layer 1600 in a sea and island form. Thus, the print medium 4 (a part (a) of FIG. 64) in Example 4 was manufactured. The print medium 4 was a rolled print medium shaped like a roll sheet so as to be easily conveyed and printed in an ink jet printing apparatus using a pigment ink with a slightly large particle size (an inexpensive pigment ink that can be appropriately used for high-speed printing) and to be easily transferred and peeled off in a transfer apparatus. The results of measurement based on the BET method indicated that the air gaps in the solvent absorption layer in the print medium 4 had a pore size of 25 mm. On the other hand, the air gaps in the first pigment permeation layer in the print medium 4 had a pore size of 125 nm. The area of the exposed portion was checked using a method similar to that for the print medium 1-1. The area of the exposed portion of the print medium 3-2 was 75% of the entire area of the pigment permeation layer.

(Manufacture of a Printed Material 4)

As is the case with Example 1-1, a first image (inverted image) 1606 was formed on the first pigment permeation layer 1600 by ink jet printing. Then, with substantially all of the ink solvent 1607 absorbed by the solvent absorption layer 1601, a white PVC card having a thickness of approximately 1 mm and serving as the image support 55 and the print medium 4 are pressurized and heated using the heat roller to bond (transfer) the pigment image 1606 on the print medium 4 to the image support 55. Subsequently, the substrate 50 was peeled off to form a printed material 4 in a part (b) of FIG. 64. Although the resin layer 1012 and the first pigment permeation layer 1600 are formed into a molten film by pressurization and heating, the solvent absorption layer 1601 maintains the air gap structure. Thus, even during transfer immediately after ink jet printing, the solvent components 1607 are held by the solvent absorption layer 1601, leading to an appropriate bonding capability. The second pigment permeation layer 1620 also maintains the air gap structure.

In the printed material 4, the resin layer 1012 formed into a molten film and the pigment permeation layer 1600 formed into a film and having the first image (inverted image) 1606 formed thereon are laminated on the image support 55 as depicted in a part (b) of FIG. 64. On the pigment permeation layer 1600, the following are further laminated: the solvent absorption layer 1601 having absorbed the solvent components 1607 of the pigment ink while maintaining the air gap structure and the second pigment permeation layer 1620 serving as the uppermost layer and maintaining the air gap structure. As depicted in a part (c) of FIG. 64, a second image (normal image) 1318 can be printed on the printed material 4 in the present example, and for example, an image can be additionally drawn on the printed material 4 using a pen or a seal can be additionally affixed to the printed material 4.

Example 4 is different from Example 1-1 as described below. In Example 1-1, the uppermost surface of the printed material is a protruding and recessed solvent absorption layer, whereas, in Example 4, the uppermost surface of the printed material 4 is the second pigment permeation layer 1600, thus significantly improving the scratch resistance of the second pigment image 1318. In Example 4, as depicted in a part (c) of FIG. 64, a second image (normal image) 1318 was printed using the pigment ink. In Example 4, the pigment ink lands on the front surface of the second pigment permeation layer 1620, and then, the pigment ink, containing the pigment particles, infiltrates and diffuses quickly through the second pigment permeation layer 1601 and is subjected to solid-liquid separation at the interface with the solvent absorption layer 1601 to form a dense thin-film-like pigment image 1616. In Example 4, the solvent components 1617 of the pigment ink are quickly absorbed by the solvent absorption layer 1601, which has a higher ink absorption speed. In Example 4, the second pigment image 1318 is formed at the bottom of the second pigment permeation layer 1600, which has a high film strength to maintain the air gap structure in spite of pressurization and heating, and the second pigment image 1318 exhibits excellent scratch resistance performance.

Successfully confirmed effects of Example 4 will be described below.

The pigment ink applied via the sea-and-island-like resin layer is subjected to solid-liquid separation at the interface between the first pigment permeation layer and the solvent absorption layer to form a dense thin-film-like first image at the bottom interface of the first pigment permeation layer. When the first image is formed, the pigment ink is quickly absorbed by the pigment permeation layer without remaining in the sea-and-island-like resin later because the ink receiving layers (the pigment permeation layer and the solvent absorption layer) are sequentially formed to have an increasing ink absorption speed from the resin layer side toward the substrate side. The average pore size of the first pigment permeation layer is larger than the particle size of the pigment particles, which correspond to the color material of the pigment ink, thus allowing the pigment ink to quickly permeate the inside of the first pigment permeation layer. The average pore size of the solvent absorption layer is smaller than the particle size of the pigment particles. Thus, the pigment ink is subjected to solid-liquid separation at the interface between the first pigment permeation layer and the solvent absorption layer, with the pigment particles forming a dense high-quality first image.

In a case where the ink is absorbed based on the capillary phenomenon in the air gaps, the ink absorption speed increases with decreasing pore size of the air gaps. Thus, substantially all of the solvent components of the pigment ink are absorbed by the solvent absorption layer instead of remaining in the first pigment permeation layer. The solvent components infiltrate and diffuse quickly through the inside of the solvent absorption layer and reach the interface with the second solvent absorption layer. However, since the average pore size of the second pigment permeation layer is larger than the particle size of the pigment particles, the solvent components do not permeate the inside of the second pigment permeation layer. As described above, the ink receiving layers (the first pigment permeation layer and the solvent absorption layer) are configured to have a gradually increasing ink absorption speed so long as the pigment ink for printing of the first pigment image is subjected to permeation and absorption.

Since no pigment ink remains in the sea-and-island-like resin layer, immediately after the first image is printed, the resin layer can be softened and melted into a film, which can then be transferred to the image support. The first pigment permeation layer may be formed into a molten film simultaneously with melting of the resin layer, based on the temperature during transfer involving pressurization and heating. On the other hand, the solvent absorption layer and the second pigment permeation layer are configured to maintain the air gap structure in spite of pressurization and heating during transfer. The second pigment permeation layer that maintains the air gap structure and through which the pigment ink can infiltrate and diffuse is positioned on the front surface of the printed material from which the substrate is peeled off after transfer. Thus, a second image (normal image) can be formed on the second pigment permeation layer using a pigment ink. In a case where the pigment ink is applied to the front surface of the second pigment permeation layer to form a second image, the pigment ink permeates the inside of the second pigment permeation layer because the average pore size of the second pigment permeation layer is larger than the particle size of the pigment particles in the pigment ink. Since the average pore size of the solvent absorption layer is smaller than the particle size of the pigment particles, the pigment particles are separated at the interface with the second pigment permeation layer 1600 to form a dense high-quality thin-film-like second image.

In a case where the ink is absorbed based on the capillary phenomenon in the air gaps, the ink absorption speed increases with decreasing pore size of the air gaps. Substantially all of the solvent components of the pigment ink are absorbed by the solvent absorption layer, with no solvent components remaining in the second pigment permeation layer. Since the second image is printed at the bottom of the second pigment permeation layer, the present example improves the scratch resistance of the pigment, in which ink jet printing with a pigment ink may be poor, and is excellent in storage stability of the printed material. As is the case with the printed material 1 in Example 1 of the above-described first embodiment, the results of evaluation of scratch resistance performance indicated a residual OD rate of 99% or more, exhibiting very appropriate scratch resistance performance.

As described above, the solvent absorption layer and the second pigment permeation layer are configured to also maintain the air gap structure as a result of pressurization and heating during transfer. The air gaps may be formed of resin particulates that are formed into a molten film by being pressurized and heated at a temperature higher than that during transfer. In this case, the layers can be formed into a molten film by being pressurized and heated at a temperature higher than that during transfer after the second image is printed. Furthermore, in this case, the capability of additionally drawing an image is degraded, whereas high storage stability is achieved and the surface glossiness of the second image is improved to provide a higher-quality second image. The solvent absorption layer need not necessarily be softened or melted, but forming the solvent absorption layer into a molten film eliminates the air gap absorption type to increase the transparency, allowing the visibility of the first pigment image to be improved. In a case where the second pigment permeation layer is formed into a molten film, the second pigment permeation layer needs to be brought into direct contact with the heat roller without intervention of the substrate 50 and to be pressurized and heated at a higher temperature. Thus, it is desirable to use a pressurization roller and a heat roller that are formed of silicone rubber and that are excellent in releasability.

Example 5

In Example 5 of the present invention, the sea-and-island-like resin layer in Example 4 was formed of a tacky thermoplastic resin. Thus, the print medium in Example 5 can be transferred to the image support simply by being pressurized without the need to pressurize and heat the resin layer into a molten film. Therefore, the print medium can be easily bonded (transferred), by being manually pressurized, to various image supports formed of a material that has a low Tg temperature and that is difficult to pressurize and heat at high temperature.

In a case where a printed material for a security card or the like is manufactured using, as an image support, a white PVC card including an IC circuit and having a thickness of 1 mm, the IC card may need to be reused because of the very high price of the IC card.
(Preparation of a Material of the Tacky Resin Layer)

A tacky resin layer coating liquid 1 was obtained by mixing 10 pts.wt. Boncoat W-386 manufactured by DIC (solid content concentration: 50%) with 90 pts.wt. ion exchange water.
(Manufacture of a Print Medium 5)

Figure 65:
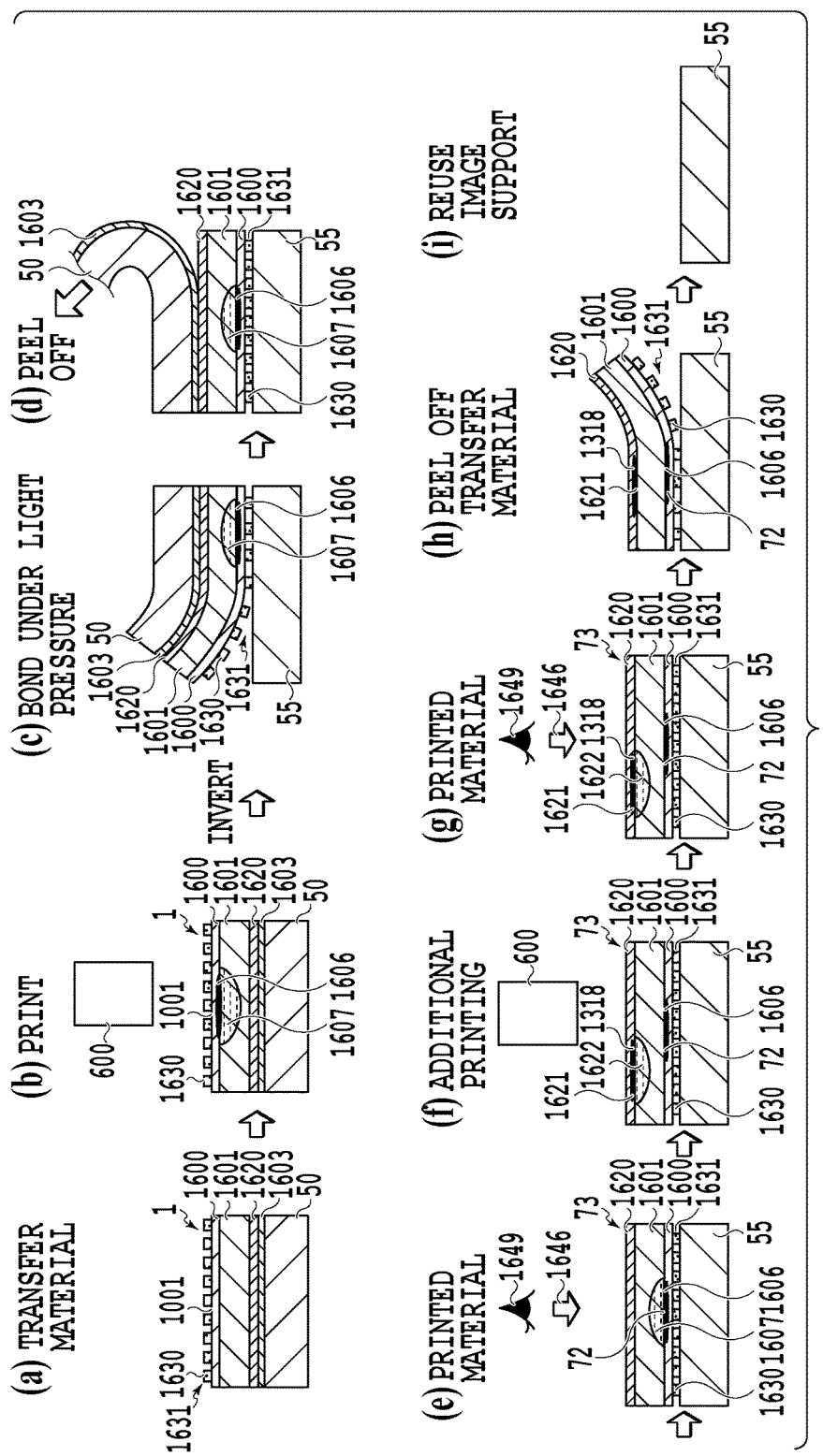
FIG. 65 is a diagram illustrating a manufacturing method for a printed material in which the image support can be recycled.

To manufacture a print medium 5 (a part (b) of FIG. 65) in Example 5, the front surface of a PET substrate (trade name: "Tetoron G2"; thickness: 30 µm; manufactured by Teijin Dupont Film Japan Limited) serving as the substrate 50 was very thinly coated with PORIRON 788 (solid content concentration: 3%) manufactured by CHUKYO YUSHI CO., LTD. to provide a peel-off layer 1603. As is the case with the print medium 4 in Example 4, the peel-off layer 1603 was coated with the above-described pigment permeation layer coating liquid 1 to form a second pigment permeation layer 1620. The solvent absorption layer 1601 was provided on the pigment permeation layer 1620, and the first pigment permeation layer 1600 was formed on the solvent absorption layer 1601 using the above-described pigment permeation layer coating liquid 3. As is the case with Example 1-1, the resin layer was provided by placing the pieces of tacky thermoplastic resin 1630 on the front surface of the pigment permeation layer 1600 in a sea and island form, using the above-described tacky resin layer coating liquid 1. Thus, the print medium 5 (a part (a) of FIG. 65) in Example 5 was manufactured. The print medium 5 was shaped like a cut sheet by cutting the material, so as to be easily conveyed and printed in a general-purpose ink jet printing apparatus. The area of the exposed portion was checked using a method similar to that for the print medium 1-1. The area of the exposed portion of the print medium 5 was 75% of the entire area of the pigment permeation layer.
(Manufacture of a Printed Material 5)

In the cut sheet-like print medium 5, a first image (inverted image) is printed on the first pigment permeation layer 1600 using the general-purpose ink jet printing apparatus as depicted in a part (b) of FIG. 65. Then, with substantially all of the ink solvent 1607 absorbed by the solvent absorption layer 1601, the print medium is laminated to the white PVC card including the IC circuit, having a thickness of approximately 1 mm, and serving as the image support 55 as is the case with a as depicted in a part (c) of FIG. 65. Subsequently, as depicted in a part (d) of FIG. 65, the substrate 50 was peeled off to form a printed material 4 in a part (e) of FIG. 65. In Example 5, the print medium 5 is formed by cutting to have an area slightly smaller than the area of the white PVC card, which serves as the image support 55. Consequently, the need for concern for the foil cutting during transfer is eliminated, and the substrate 50 may be simply peeled off at the ends thereof.

The resin layer 1631 in the print medium in the present example is formed of the discretely arranged island-shaped pieces of tackifier 1630 as depicted in a part (a) of FIG. 65. The pigment ink is quickly absorbed into the first pigment permeation layer 1600 and infiltrates and diffuses through the first pigment permeation layer 1600. Consequently, an appropriate pigment image was successfully formed without forming any white point (blank portion) in the area immediately below the pieces of thermoplastic resin 1630. As depicted in a part (c) of FIG. 65, the print medium can be transferred to the image support 55 under a light pressure enough to manually laminate the print medium to the image support. Subsequently, the substrate 50 was successfully manually peeled off easily by the action of the peel-off layer 1603. A printed material including film-like pieces of tackifier 1630 scattered like islands was prevented from being inadvertently peeled off under normal use conditions, posing no practical problems. In the printed material 5 in the present example, an image can be additionally drawn on the second pigment permeation layer 1620 by ink jet printing or the like as is the case with the printed material 4. The print medium and the printed material in the present example exhibited image print properties, transfer properties, and additional-image drawing capability that are adequate in practical terms. As is the case with the printed material 1 in Example 1 of the above-described first embodiment, the results of evaluation of scratch resistance performance indicated a residual OD rate of 99% or more, exhibiting very appropriate scratch resistance performance.

In the printed material 5 in the present example, the film-like pieces of tackifier scattered like islands allow the print medium to be laminated to the image support. Thus, the image print portion (a part of the print medium) was successfully peeled off from the image support by applying a mechanical peeling force of a predetermined value or larger to the ends of the printed material. The image print portion (a part of the print medium) was successfully peeled off from the image support tinder a slightly weak force by immersing the print medium and the image support in a liquid such as alcohol or water which can chemically dissolve the thermoplastic resin. As described above, the image print portion of the IC card serving as the image support can exclusively be peeled off without damaging the IC card. Thus, for example, the IC card, which is expensive, was successfully reused by electrically rewriting information in the IC card using a well-known unit.

Figure 67:
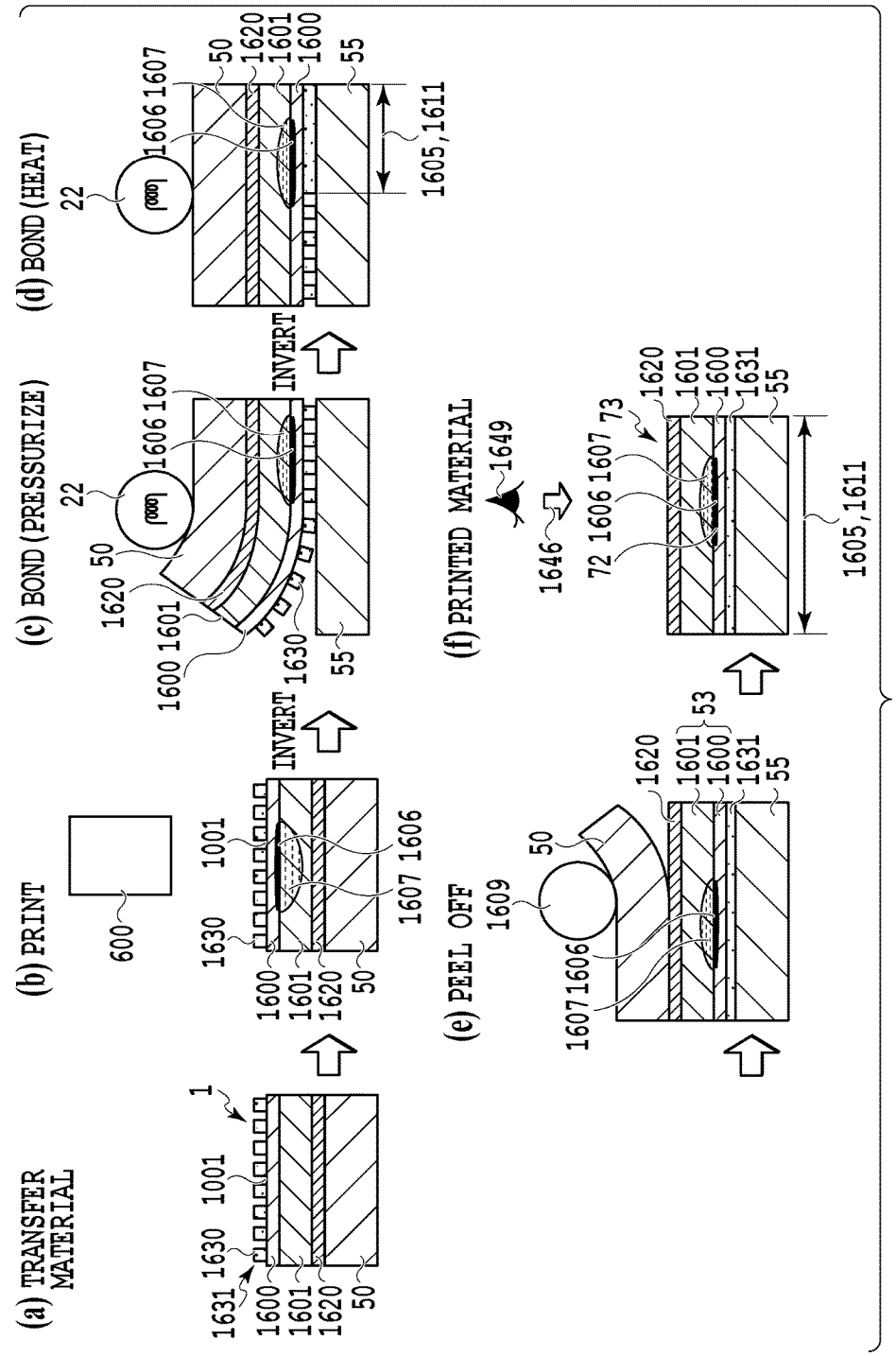
FIG. 67 is a diagram illustrating a manufacturing method for a printed material including a print medium in which the pigment permeation layer is softened and melted into a film.

In the print medium 5 in the present example, the resin layer 1631 and the first pigment permeation layer 1600 are also configured to be softened and melted into a film by being pressurized and heated during transfer. Therefore, as depicted in parts (a) to (f) of FIG. 67, firmer transfer can be achieved by pressurization and heating using the heat roller 21 and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2016-171827, filed Sep. 2, 2016, No. 2016-176883, filed Sep. 9, 2016, and No. 2017-160502, filed Aug. 23, 2017, which are hereby incorporated by reference wherein in their entirety.

What is claimed is:

1. A transfer material including an ink receiving layer to which a pigment ink comprising a pigment and a solvent is to be applied, and (ii) a bonding layer,
   wherein the ink receiving layer and the bonding layer are formed on a substrate in series,
   wherein the ink receiving layer comprises:
     (a) a pigment permeation layer through which the solvent and the pigment are enabled to infiltrate; and
     (b) a solvent absorption layer through which the pigment is inhibited from infiltrating and the solvent is enabled to infiltrate,
   wherein the solvent absorption layer and the pigment permeation layer are laminated in this order from the substrate side,
   wherein the solvent absorption layer comprises inorganic particulates and a water-soluble resin,
   wherein an amount of the water-soluble resin is 3.3 to 20 pts.wt. relative to 100 pts.wt. of the inorganic particulates,
   wherein the bonding layer includes a plurality of thermoplastic resin portions discretely provided on a surface of the pigment permeation layer,
   wherein the thermoplastic resin portions include thermoplastic resin particles, and
   wherein the surface of the pigment permeation layer has portions that contact the thermoplastic resin portions and exposed portions that do not contact the thermoplastic resin portions.

2. The transfer material according to claim 1, wherein an area of the exposed portions of the pigment permeation layer is 50% or more of a whole area of the pigment permeation layer.

3. The transfer material according to claim 1,
   wherein the pigment permeation layer and the solvent absorption layer each have an air gap structure formed of a plurality of air gaps and penetrating the layer from a front surface to a back surface thereof,
   wherein an average pore size of the air gaps formed in the pigment permeation layer is larger than an average particle diameter of the pigment, and
   wherein an average pore size of the air gaps formed in the solvent absorption layer is smaller than the average particle diameter of the pigment.

4. The transfer material according to claim 3,
   wherein the average particle diameter of the pigment is from 40 nm to 110 nm,
   wherein the average pore size of the air gaps formed in the pigment permeation layer is from 50 nm to 200 nm, and
   wherein the average pore size of the air gaps formed in the solvent absorption layer is from 5 nm to 100 nm.

5. The transfer material according to claim 1, wherein pigment permeation layer includes particle-shaped pieces of thermoplastic resin.

6. The transfer material according to claim 1, wherein at least one of a peel-off layer and a protect layer is provided between the substrate and the ink receiving layer as a functional layer.

7. A manufacturing method for a printed material comprising:
   a printing step of printing an image on the transfer material according to claim 1, by applying a pigment ink to the transfer material from the bonding layer side; and
   a bonding step of bonding the transfer material and an image support, by pressurizing and heating in a superposed state, where the bonding layer, in the transfer material, with the image printed thereon contacts to the image support.

8. The manufacturing method according to claim 7, further comprising a peeling step of peeling off at least the substrate from the transfer material bonded to the image support.

9. The transfer material according to claim 1, wherein the transfer material is capable of being bonded to an image support by the bonding layer.

10. A printed material including (i) the transfer material according to claim 1 and (ii) an image support, with the transfer material and the image support being laminated,
- wherein an image is printed on the transfer material by applying a pigment ink to the transfer material from the bonding layer side, and
- wherein the transfer material and the image support are bonded where the bonding layer, in the transfer material, with the image printed thereon contacts to the image support.

11. A manufacturing method for a printed material comprising:
- a printing step of print medium printing an image on the transfer material according to claim 1, by applying a pigment ink to the transfer material from the bonding layer side; and
- a pressurizing and heating step of pressurizing and heating the transfer material that includes the image printed by the printing step,
- wherein the pressurizing and heating step includes forming at least the pigment permeation layer into a molten film.

* * * * *